US012212181B2

(12) United States Patent
Beaston

(10) Patent No.: US 12,212,181 B2
(45) Date of Patent: Jan. 28, 2025

(54) MICROGRID POWER SYSTEM

(71) Applicant: Powin, LLC, Tualatin, OR (US)

(72) Inventor: Virgil Lee Beaston, Tualatin, OR (US)

(73) Assignee: Powin, LLC, Tualatin, OR (US)

( * ) Notice: Subject to any disclaimer, the term of this patent is extended or adjusted under 35 U.S.C. 154(b) by 0 days.

(21) Appl. No.: 18/525,742

(22) Filed: Nov. 30, 2023

(65) Prior Publication Data

US 2024/0258826 A1 Aug. 1, 2024

Related U.S. Application Data

(60) Division of application No. 17/743,134, filed on May 12, 2022, now Pat. No. 11,843,278, which is a continuation of application No. 16/982,454, filed as application No. PCT/US2019/035838 on Jun. 6, 2019, now Pat. No. 11,336,111.

(60) Provisional application No. 62/682,527, filed on Jun. 8, 2018.

(51) Int. Cl.
*H02J 9/06* (2006.01)
*H02J 3/32* (2006.01)
*H02J 3/38* (2006.01)
*H02J 7/00* (2006.01)
*H02J 7/02* (2016.01)

(52) U.S. Cl.
CPC *H02J 9/06* (2013.01); *H02J 3/32* (2013.01); *H02J 3/381* (2013.01); *H02J 7/0048* (2020.01); *H02J 7/02* (2013.01); *H02J 2300/10* (2020.01); *H02J 2300/24* (2020.01); *H02J 2300/28* (2020.01)

(58) Field of Classification Search
CPC .... H02J 9/06; H02J 7/0048; H02J 3/32; H02J 7/02; H02J 2300/28; H02J 2300/10; H02J 2300/24
USPC ......................................................... 307/20
See application file for complete search history.

(56) References Cited

U.S. PATENT DOCUMENTS

| 4,366,389 A | 12/1982 | Hussey |
| 2014/0015469 A1 | 1/2014 | Beaston et al. |
| 2014/0266061 A1* | 9/2014 | Wachal ............... H02J 7/00036 320/134 |

(Continued)

OTHER PUBLICATIONS

Joos et al., "An On-Line UPS with Improved Input-Output Characteristics," *IEEE*, pp. 598-605, Feb. 1992, 8 pages.

*Primary Examiner* — Michael R. Fin
(74) *Attorney, Agent, or Firm* — Klarquist Sparkman, LLP

(57) ABSTRACT

Embodiments are directed to a microgrid power system, and applications thereof. In an embodiment, the microgrid power system comprises a power station including an AC power source and a stabilizing battery system. The power station may be configured to generate an AC power and to provide the first AC power to a power distribution network. A plurality of load centers may be connected to the power distribution system. Each load center may include a local battery and a switch connecting the power station to a local load. A system controller may open the switch to provide power from the local battery to the local load, and close the switch to provide power from the power station to the local load. In an embodiment, a microgrid controller may determine an amount of AC power generated by the power station that may be consumed by each load center.

20 Claims, 120 Drawing Sheets

(56) References Cited

U.S. PATENT DOCUMENTS

2015/0155712 A1 6/2015 Mondal
2017/0126032 A1* 5/2017 Beaston ................ H02J 7/0016

* cited by examiner

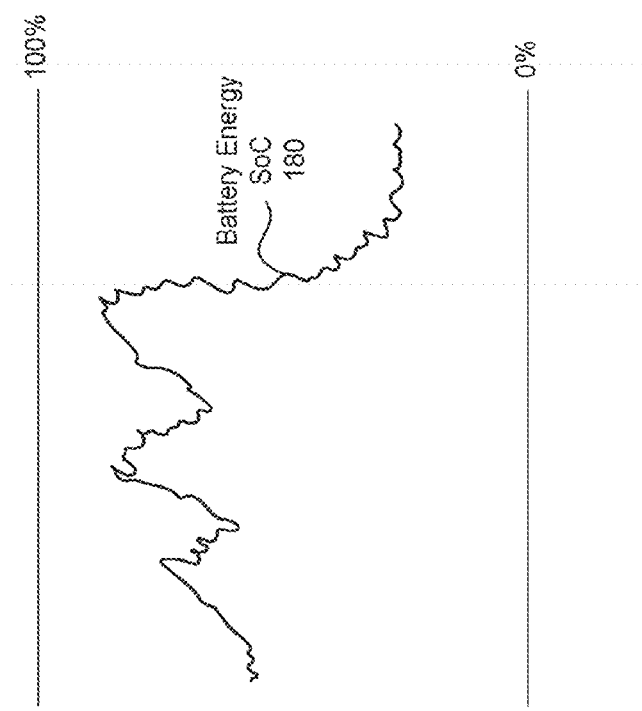

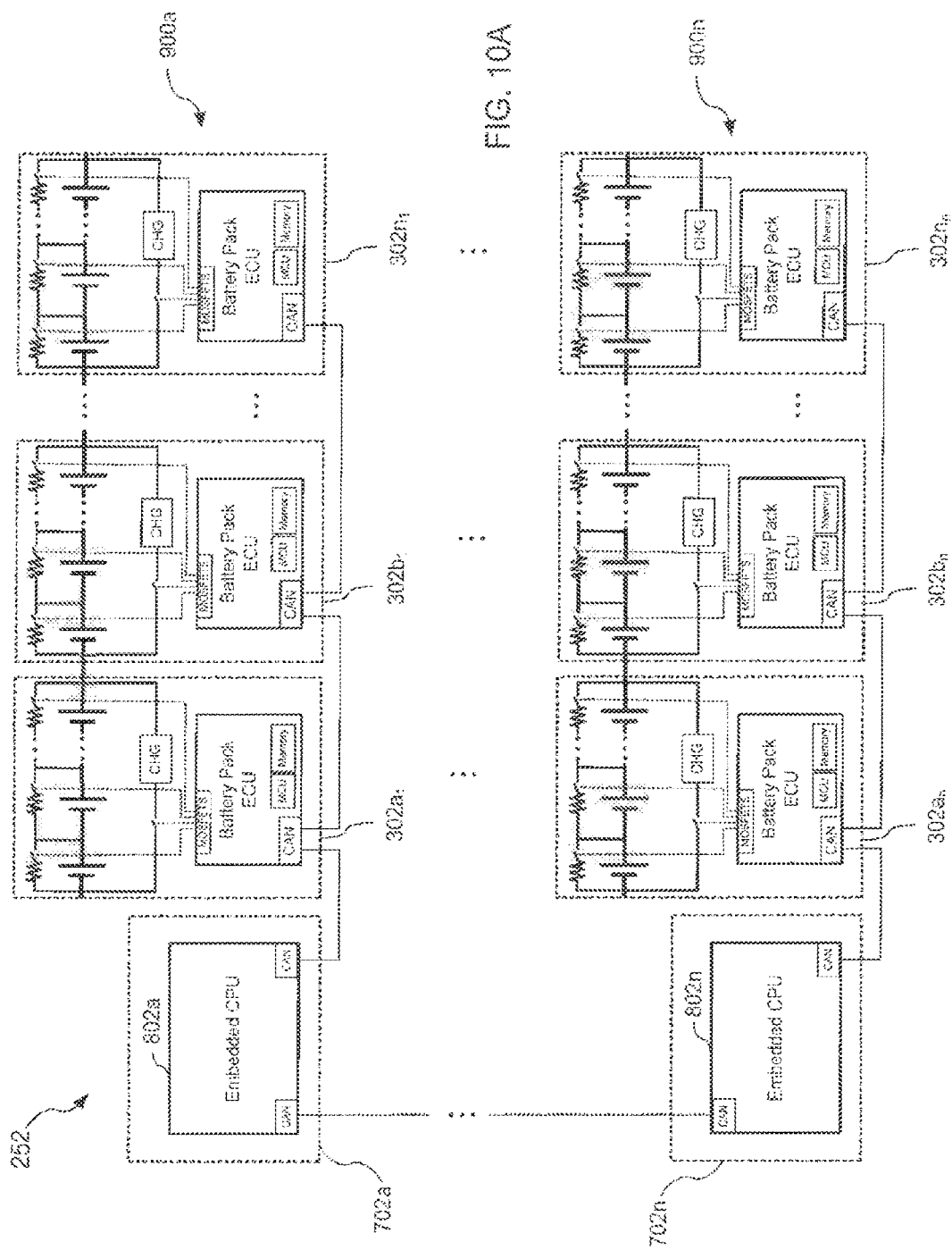

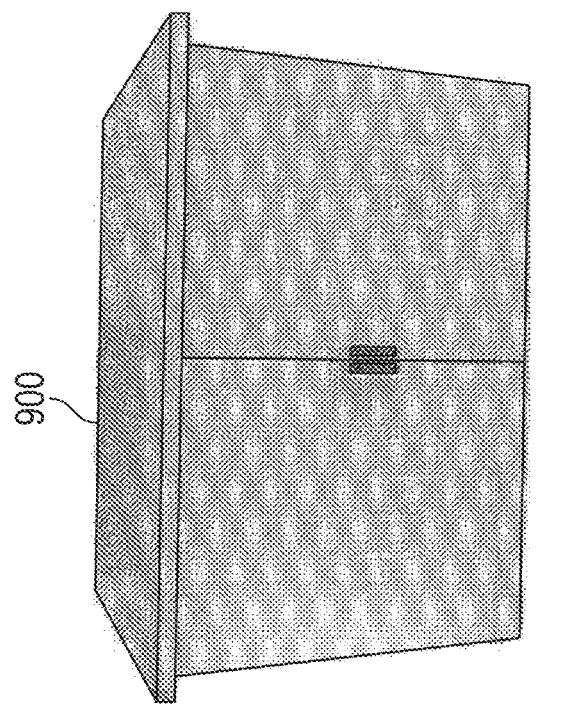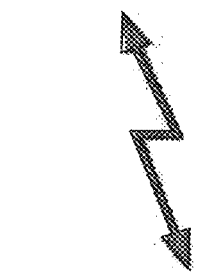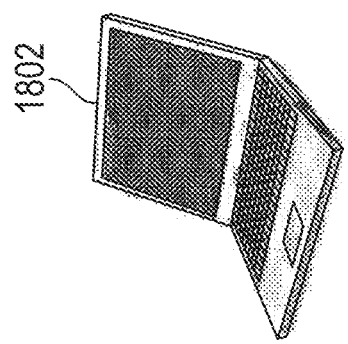
FIG. 18

| Battery Pack Table 2100 | | | | | | | | Last Calibration Discharge | | | Last Calibration Charge | | | AH Eff. | WH Eff. | Self Discharge Rate |
|---|---|---|---|---|---|---|---|---|---|---|---|---|---|---|---|---|
| | SOC | Voltage | Temp | AH Dischargeable | WH Dischargeable | Capacity | Date | AH DCHG | WH DCHG | Date | AH CHG | WH CHG | | | | |
| Battery Pack | 0.70 | 53.44 | 22.0 | 28.6 | 1464 | 40.8 | 0115 2011 | 40.8 | 2091 | 0115 2011 | 40.8 | 2272 | 1.00 | 0.92 | 0.031 |
| Cell-0 | 0.70 | 3.34 | 22.1 | 28.8 | 93 | 41.2 | 0115 2011 | 41.2 | 132 | 0115 2011 | 41.2 | 143 | 1.00 | 0.92 | 0.030 |
| Cell-1 | 0.70 | 3.34 | 22.2 | 28.6 | 92 | 40.9 | 0115 2011 | 40.9 | 131 | 0115 2011 | 40.9 | 142 | 1.00 | 0.92 | 0.030 |
| . . . | . . . | . . . | . . . | . . . | . . . | . . . | . . . | . . . | . . . | . . . | . . . | . . . | . . . | . . . | . . . |
| Cell-N | 0.70 | 3.34 | 22.0 | 28.7 | 92 | 41.0 | 0115 2011 | 41.0 | 131 | 0115 2011 | 41.0 | 142 | 1.00 | 0.92 | 0.031 |

FIG. 21

Battery Table 2200

| Battery | SOC | | | Voltage | | | Temp | | | AH Dischargeable | WH Dischargeable |
|---|---|---|---|---|---|---|---|---|---|---|---|
| | Value | High Cell | Low Cell | Value | High Cell | Low Cell | Value | High Cell | Low Cell | | |
| BP-0 | 0.70 | 0.71 | 0.70 | 427.4 | 3.35 | 3.32 | 22.0 | 22.2 | 21.8 | 28.6 | 11712 |
| BP-1 | 0.70 | 0.70 | 0.70 | 53.44 | 3.34 | 3.32 | 22.0 | 22.1 | 21.9 | 28.7 | 1469 |
| ... | 0.70 | 0.70 | 0.70 | 53.42 | 3.34 | 3.33 | 22.0 | 22.2 | 22.0 | 28.6 | 1464 |
| ... | ... | ... | ... | ... | ... | ... | ... | ... | ... | ... | ... |
| BP-N | 0.70 | 0.71 | 0.70 | 53.43 | 3.35 | 3.34 | 22.0 | 22.2 | 21.9 | 28.6 | 1465 |

FIG. 22A

Battery Table 2200

| Battery | WH Dischargeable | Capacity | Last Calibration Discharge | | | Last Calibration Charge | | | AH Eff. | WH Eff. | Self Discharge Rate |
|---|---|---|---|---|---|---|---|---|---|---|---|
| | | | Date | AH DCHG | WH DCHG | Date | AH CHG | WH CHG | | | |
| BP-0 | 11712 | 40.8 | 0115 2011 | 40.8 | 16732 | 0115 2011 | 40.0 | 18186 | 1.00 | 0.92 | 0.031 |
| BP-1 | 1469 | 40.9 | 0115 2011 | 40.9 | 2096 | 0115 2011 | 40.9 | 2278 | 1.00 | 0.92 | 0.030 |
| | 1464 | 40.8 | 0115 2011 | 40.8 | 2091 | 0115 2011 | 40.8 | 2272 | 1.00 | 0.92 | 0.031 |
| ... | ... | ... | ... | ... | ... | ... | ... | ... | ... | ... | ... |
| BP-N | 1469 | 40.9 | 0115 2011 | 40.9 | 2096 | 0115 2011 | 40.9 | 2278 | 1.00 | 0.92 | 0.030 |

Charge Ampere-Hours vs. SOC Table

| Battery SOC After Charge | Percent Of Battery Capacity Changed | | | | | |
|---|---|---|---|---|---|---|
| | 0-10% | 11-25% | 26-50% | 51-75% | 76-90% | 91-100% |
| 91-100% | 0 | 0 | 1 | 0 | 0 | 1 |
| 75-90% | 0 | 1 | 0 | 0 | 75 | |
| 50-74% | 0 | 0 | 1 | 0 | | |
| 25-49% | 0 | 1 | 0 | | | |
| 10-24% | 0 | 0 | | | | |
| 0-9% | 0 | | | | | |

Discharge Ampere-Hours vs. SOC Table

| Battery SOC After Discharge | Percent Of Battery Capacity Changed | | | | | |
|---|---|---|---|---|---|---|
| | 0-10% | 11-25% | 26-50% | 51-75% | 76-90% | 91-100% |
| 91-100% | 0 | | | | | |
| 75-90% | 1 | 0 | | | | |
| 50-74% | 0 | 1 | 0 | | | |
| 25-49% | 0 | 0 | 1 | 0 | | |
| 10-24% | 0 | 1 | 0 | 0 | 75 | |
| 0-9% | 0 | 0 | 0 | 0 | 0 | 1 |

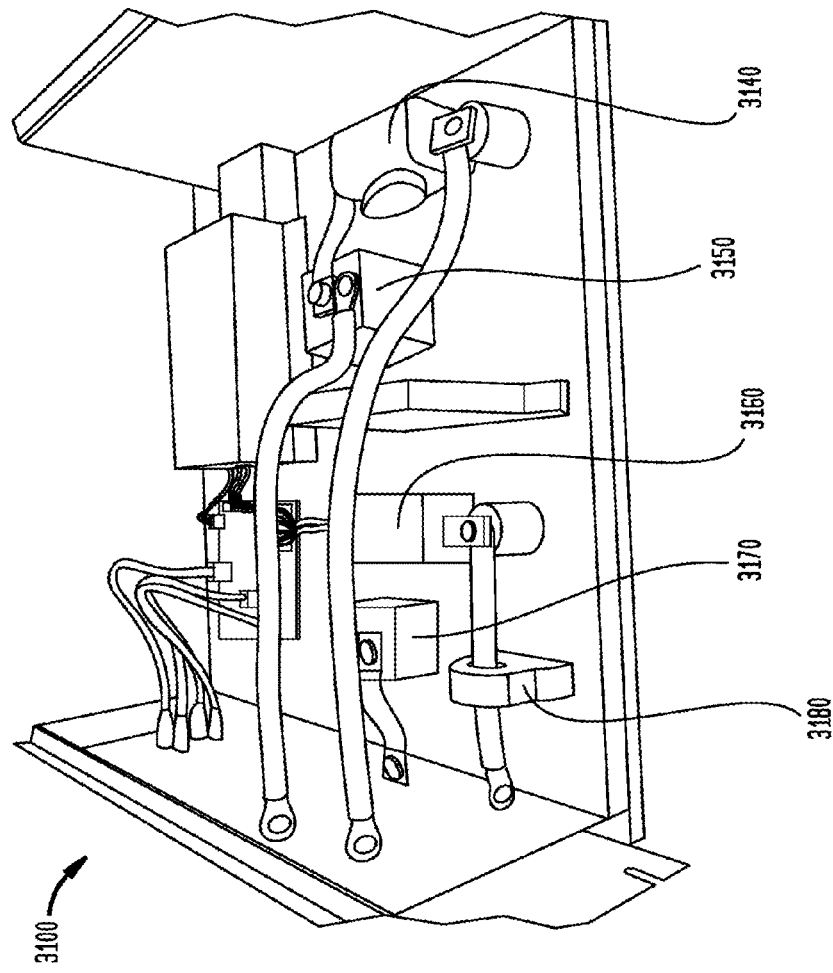

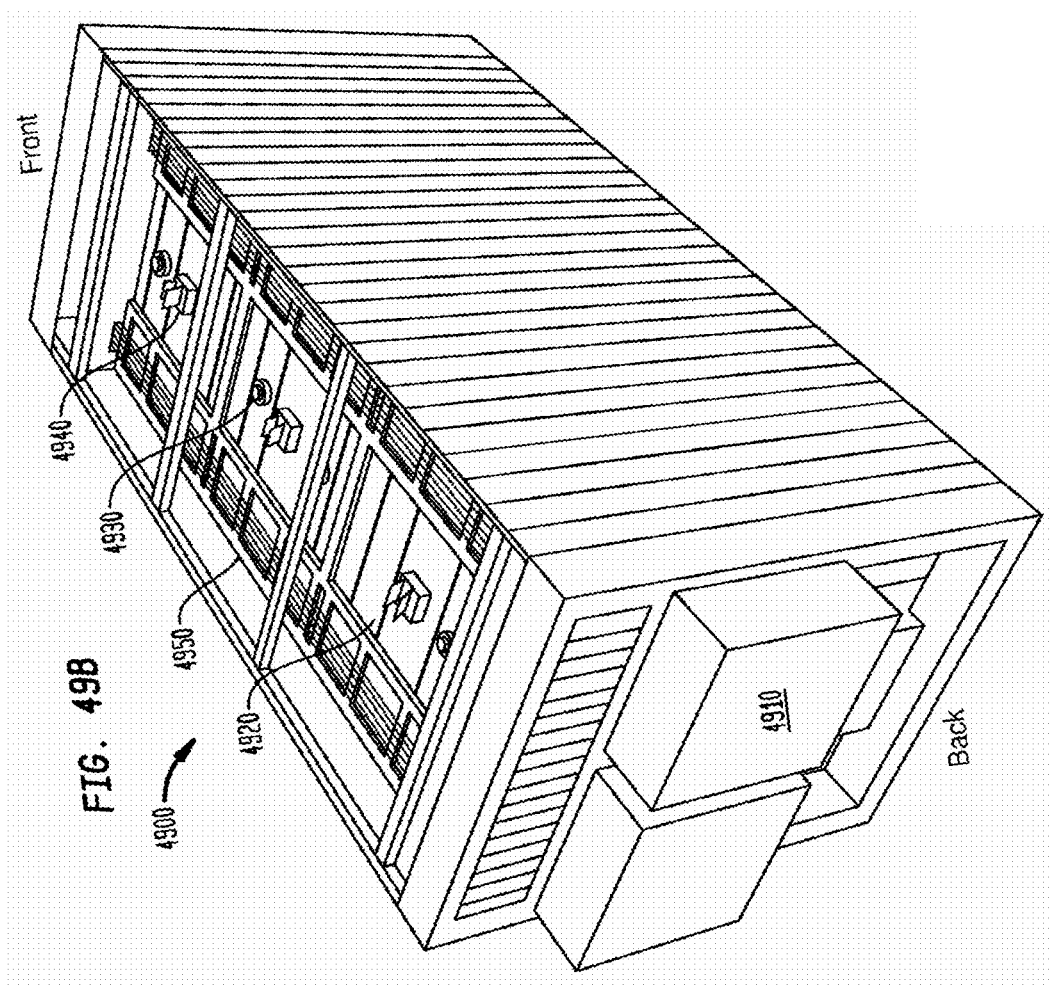

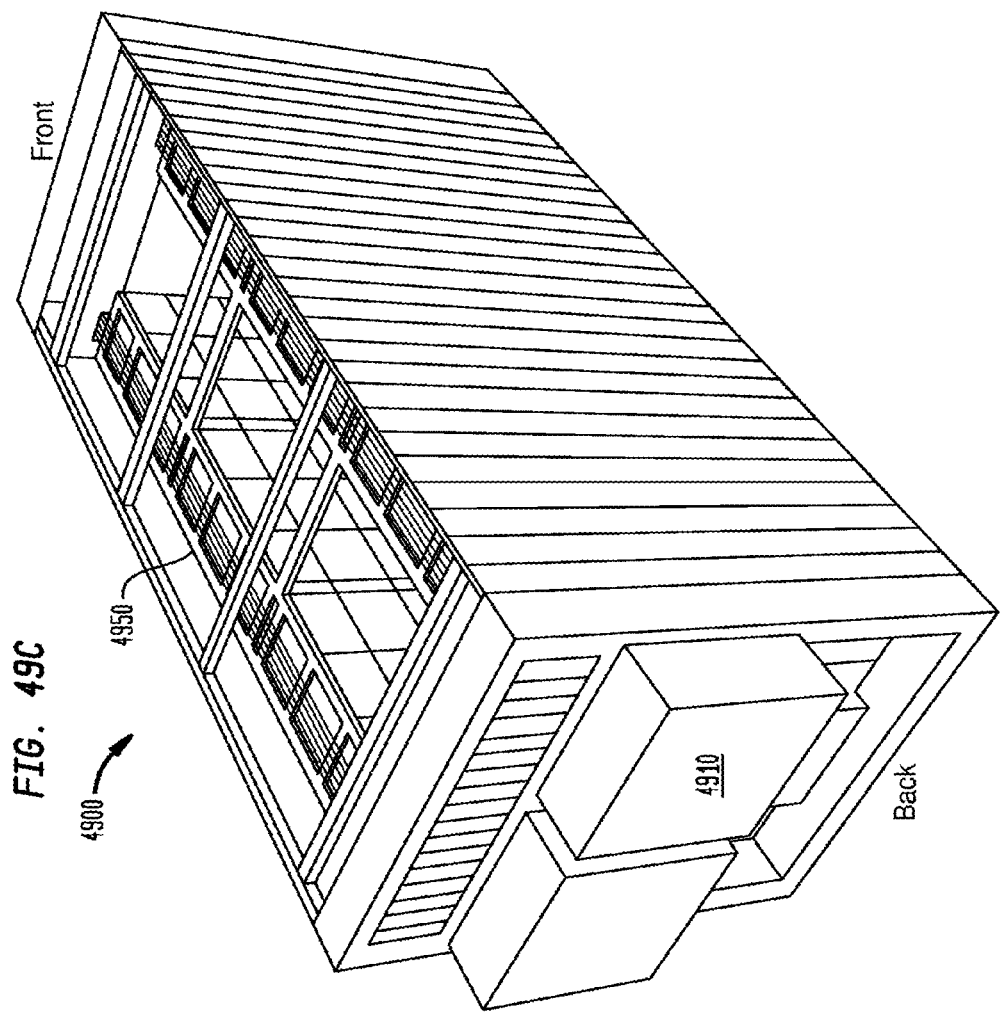

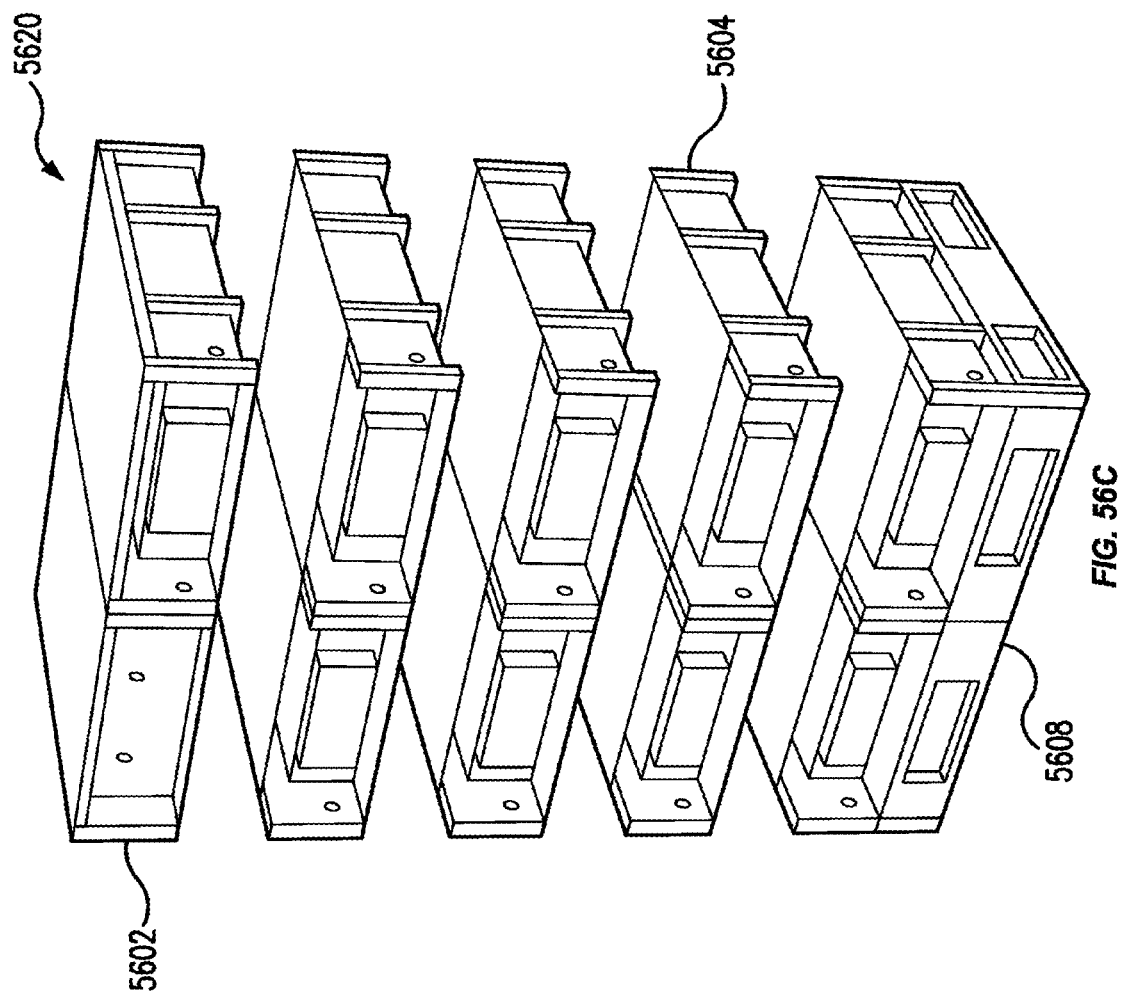

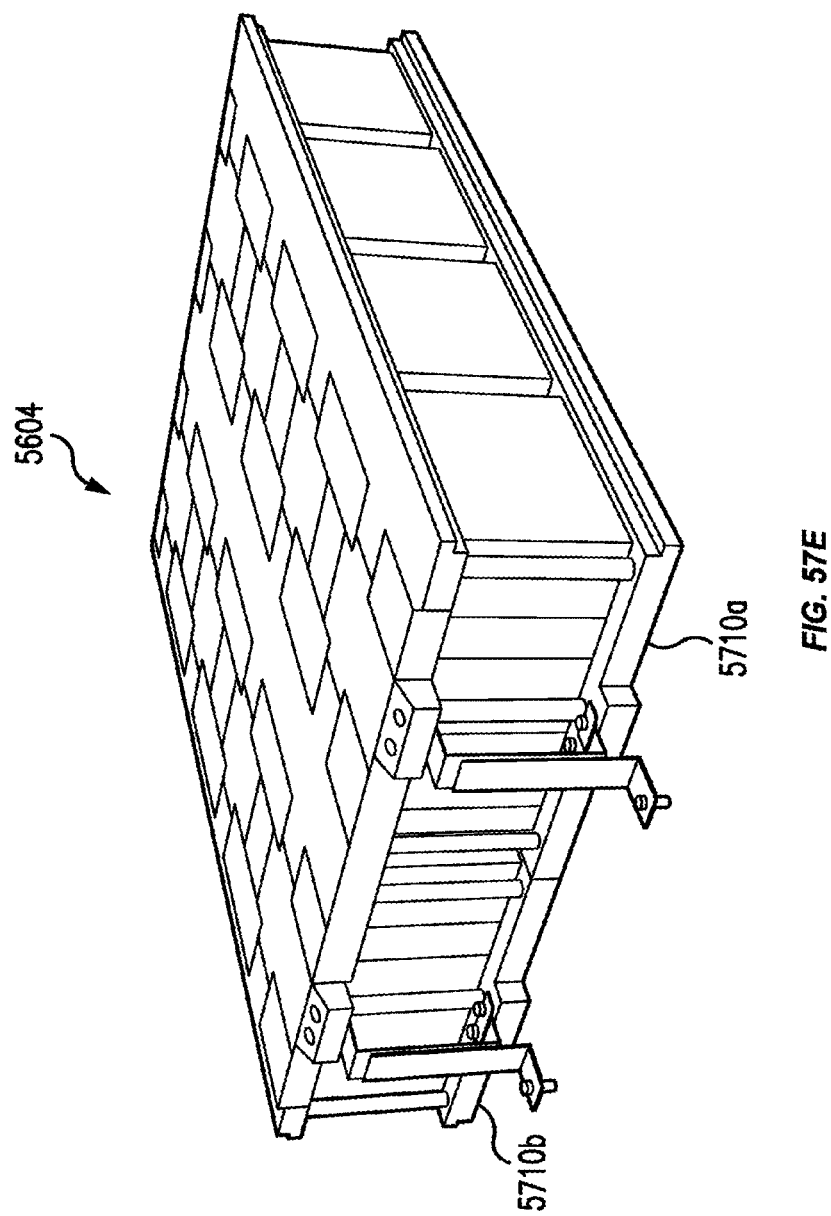

MICROGRID POWER SYSTEM

CROSS REFERENCE TO RELATED APPLICATIONS

This application is a divisional of U.S. patent application Ser. No. 17/743,134, filed May 22, 2022, now U.S. patent Ser. No. 11/843,278, which is a continuation of U.S. patent application Ser. No. 16/982,454, filed Sep. 18, 2020, which is the U.S. National Stage of International Application No. PCT/US2019/035838, filed Jun. 6, 2019, which was published in English under PCT Article 21(2), which in turn claims the benefit of U.S. Provisional Patent Application No. 62/682,527, filed Jun. 8, 2018, all of which are hereby incorporated by reference.

BACKGROUND

Field

The present disclosure generally relates to electrical energy generation, storage, and distribution; and more particularly, to a microgrid power system for providing power to residences and businesses, especially those unserved or underserved by established utility infrastructure.

Background

It is estimated that more than 250 million people live in areas unserved, or underserved, by any electrical utility infrastructure. Without electricity in their homes, the standard of living and quality of life for these people is lower than it would be if they had access to reliable electrical power. Moreover, the lack of electricity also affects the economic development of the areas in which they live, because reliable electrical power is required for industry to move into these areas and provide jobs.

What is needed is a way to provide reliable electrical power to such areas without requiring the enormous capital investment required for a traditional utility infrastructure.

BRIEF SUMMARY

Embodiments of the present invention include a microgrid power system having one or more power stations (i.e., off-site power) and one or more local power systems (i.e., on-site power or load centers) connected to the power stations to provide power to a local load. The local power system is configured to provide electrical power to a home, apartment building, office building, or factory, for example. During certain times, the local power system will receive power from one or more power stations to power the local load and/or to charge a local battery. During other times, the local power system will use the local battery to power the load. During still other times, the local power system will use a combination of the local battery and power from a power station to power the load. The power station may generate power from solar sources (e.g., photovoltaic), wind sources, hydroelectric sources, or internal combustion engine sources (e.g., a diesel generator), and may also include a battery to store and later source power.

The local power system includes a battery, a first switch, a phase sensor, a bidirectional power converter, and a controller. The first switch connects a first AC power from an off-site power station to a local load. The phase sensor senses a phase of the first AC power. The bidirectional power converter is coupled to the power station, to the battery, and to the load. The power converter is configured to selectively convert DC power from the battery to a second AC power, and to selectively convert the first AC power to DC power to charge the battery. The controller controls the first switch to selectively provide the first AC power to the load when power from the power station is desired. The controller controls the power converter to provide DC power from the power converter to the battery to charge the battery from the first AC power, when battery charging is desired. The controller further controls the power converter to provide the second AC power to the load when battery power is desired. When a change is desired from the second AC power to the first AC power, the controller compares the phase of the first AC power to a phase of the second AC power, adjusts the phase of the second AC power, and closes the first switch only when the phase of the second AC power is within a predetermined phase angle of the first AC power.

The local power system further includes an energy management controller configured to monitor a charge state of the battery. During battery charging, the energy management controller controls the system controller to set a charge rate of the battery and, during battery discharging, adjusts the load to manage usage of the battery. The energy management controller adjusts the load by disconnecting non-critical loads.

The local power system further includes a second switch coupled between the power station and the first switch to selectively connect off-site power from the power station to the first switch.

The power station includes an AC power source configured to provide an AC power to the load, and a battery system connected to the load, the battery system comprising a battery and a power controller to control the quality of the AC power. The AC power source may include solar sources (e.g., photovoltaic), wind turbine sources, hydroelectric sources, and/or internal combustion engine sources (e.g., a diesel generator). During times of excess power generation (e.g., during sunny times in the case of solar sources), the power station is configured to charge the battery so that the power station can provide power from the battery during times of little or no power generation (e.g., at nighttime in the case of solar sources). The power station is also configured to provide power from a combination of an AC power source and the battery (e.g., during partially cloudy times in the case of solar sources).

The power controller of the power station is configured to maintain a voltage of the AC power and to control the quality of the AC power. The power controller is further configured to convert DC power from the battery to an AC power and to provide the AC power to the load. The power controller is also configured to convert the AC power from the AC power source to a DC power to charge the battery. The power controller comprises a first power control module to control the quality of the AC power from the AC power source, and a second power control module to alternatively: (a) convert the AC power from the AC power source to DC power to charge the battery when the AC power source is providing more AC power than is being consumed by the load, and (b) convert DC power from the battery to an AC power and to provide that AC power to the load when the AC power source is providing less AC power than is being consumed by the load.

The power station may include a plurality of first power control modules and a plurality of second power control modules.

The microgrid power system includes at least one power station to generate AC power and to provide the AC power to a power distribution network, at least one local power source (load center) connected to the power distribution network, and a microgrid controller. The microgrid controller is configured to: monitor the state of charge of the battery system of the power station; monitor the state of charge of the local battery of each load center; monitor the amount of AC power output by the AC power source; determine for each local battery of the plurality of load centers, based on the state of charge of the battery of the power station and the state of charge of each local battery of the plurality of load centers, an amount of the first AC power that may be consumed to charge that local battery; and control charging of each local battery based on the determined amount of the AC power from the AC power source of the power station.

The microgrid power system is highly scalable, ranging from kilowatt-hour size to megawatt-hour size. It can be used to provide power to areas not presently served by traditional electrical utility infrastructure, thereby allowing social and economic development of such areas.

Further embodiments, features, and advantages, as well as the structure and operation of various embodiments of the disclosure, are described in detail below with reference to the accompanying drawings.

BRIEF DESCRIPTION OF THE DRAWINGS/FIGURES

The accompanying drawings/figures, which are incorporated herein and form a part of the specification, illustrate the present disclosure and, together with the description, further serve to explain the principles of the embodiments disclosed herein and to enable a person skilled in the pertinent art to make and use the embodiments disclosed herein.

FIG. 1A is a diagram illustrating an example microgrid power system, according to an embodiment.

FIGS. 1B, 1C, and 1D are diagrams illustrating example power stations for use within a microgrid power system, according to an embodiment.

Figure 8A:
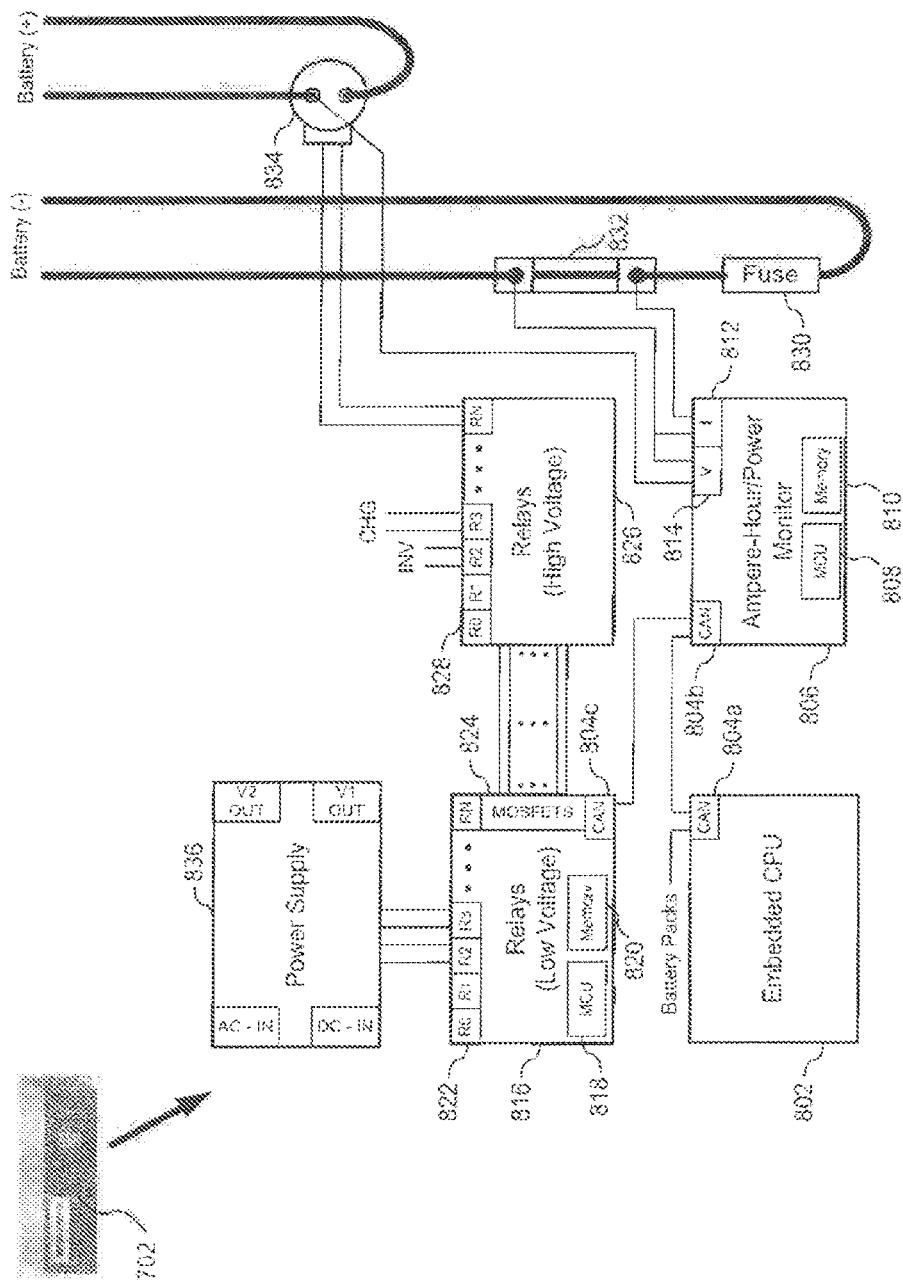
Figure 8B:
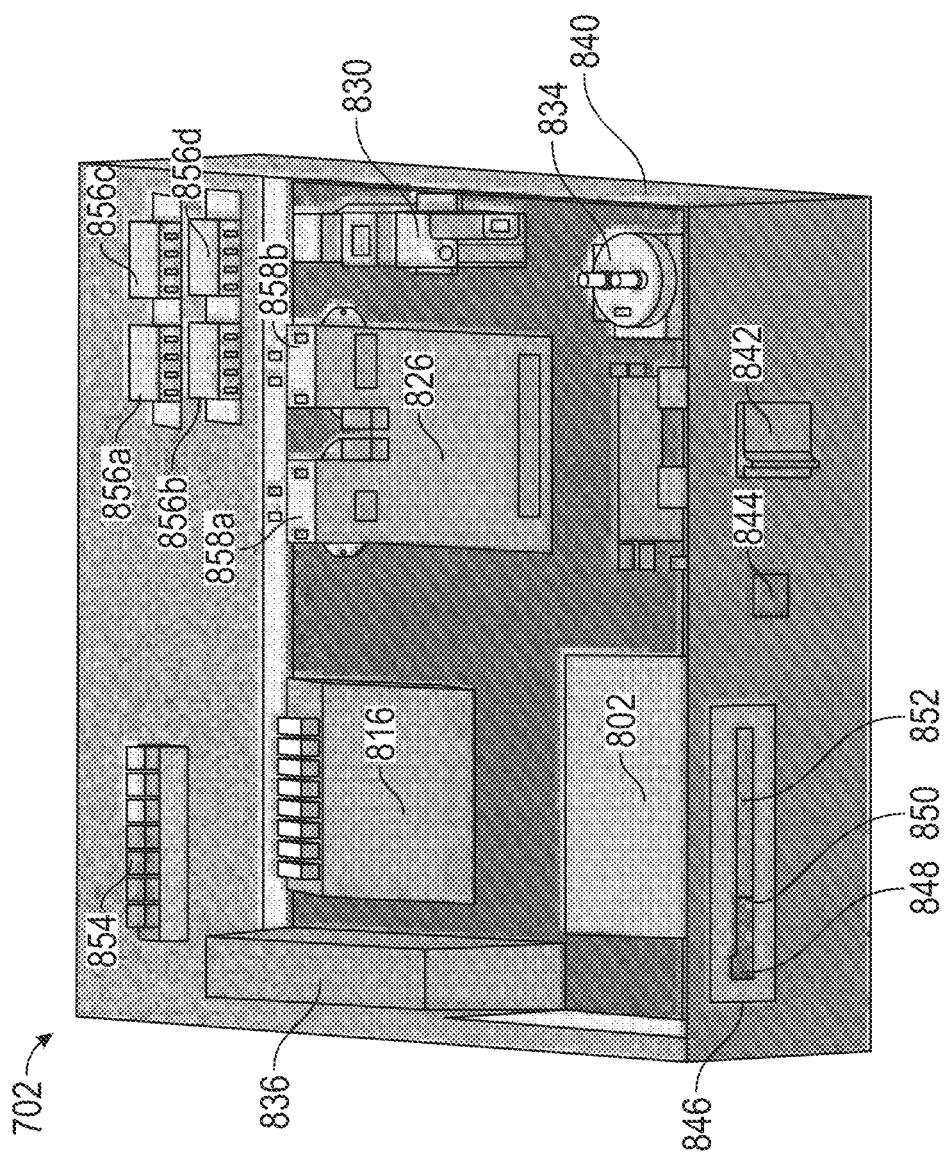
Figure 8C:
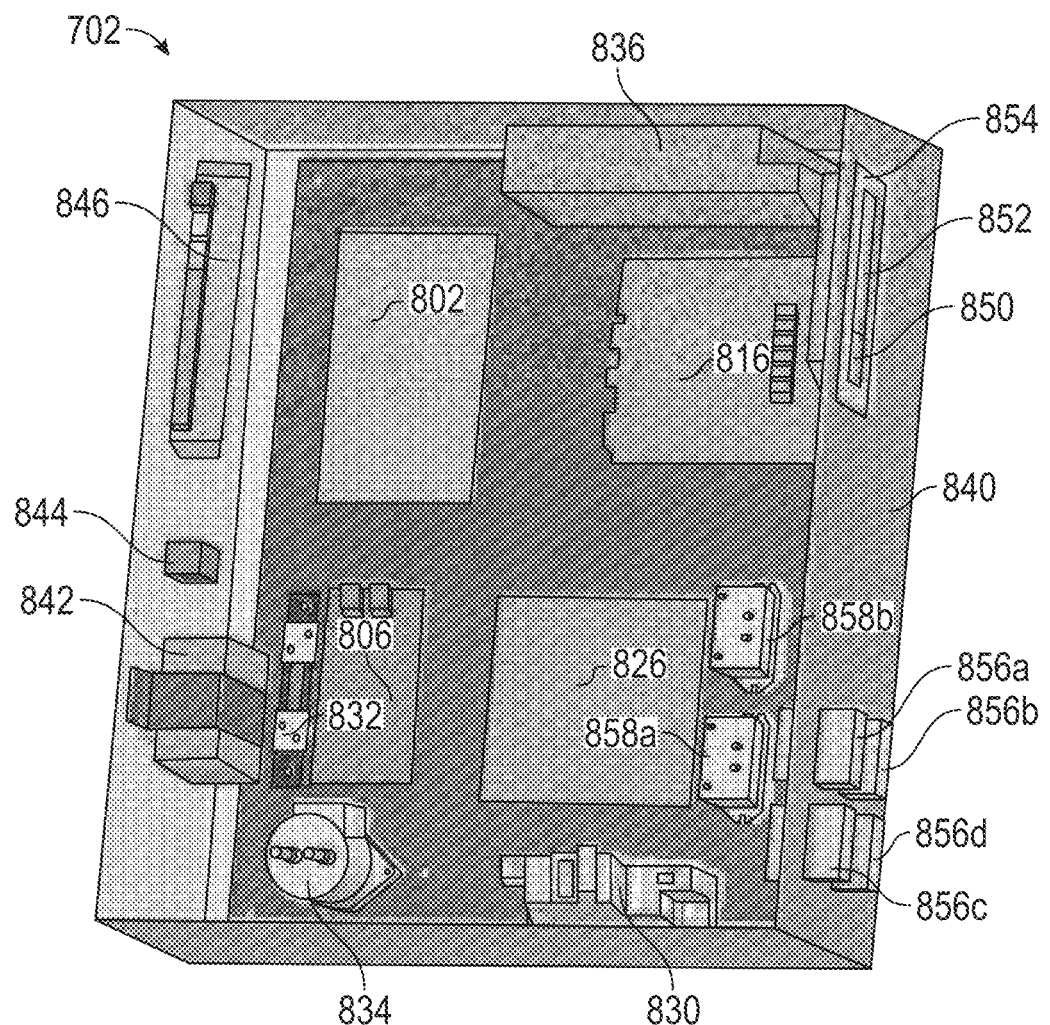

FIGS. 8A, 8B, and 8C are diagrams that illustrate a battery system controller according to an embodiment.

Figure 9:
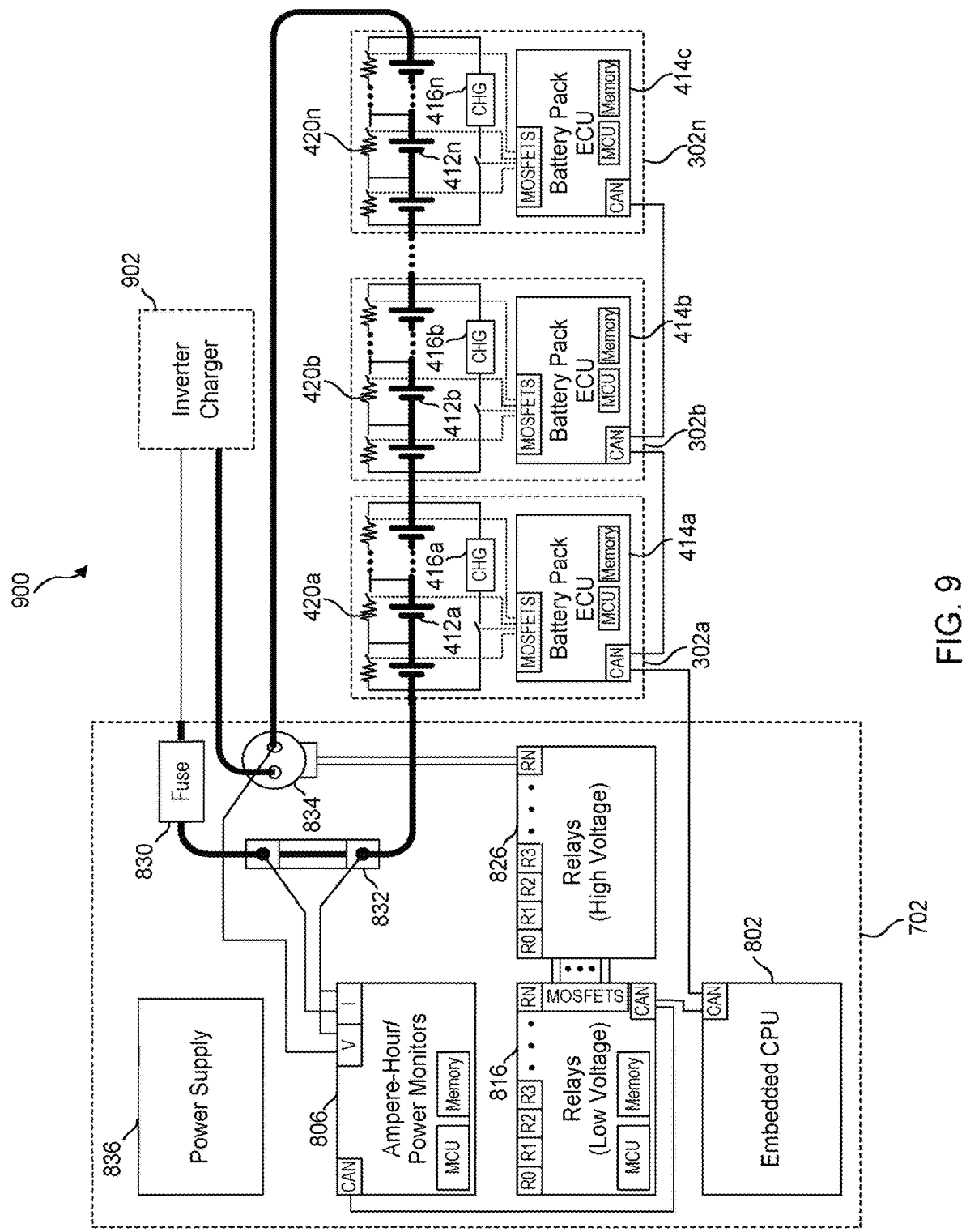

FIG. 9 is a diagram that illustrates an electrical energy storage unit according to an embodiment.

FIG. 10A is a diagram that illustrates an electrical energy storage unit according to an embodiment.

Figure 10B:
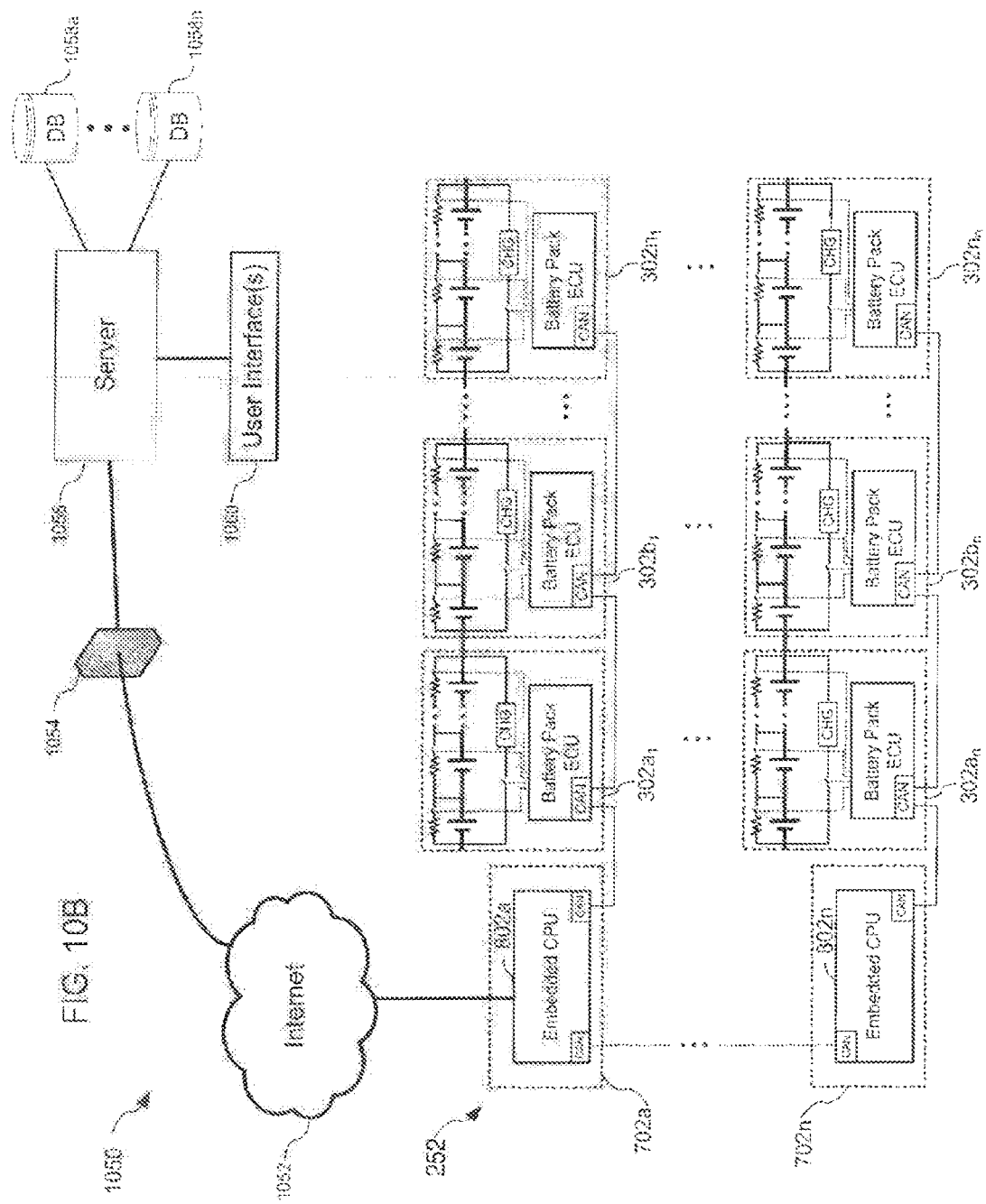

FIG. 10B is a diagram that illustrates an electrical energy storage system according to an embodiment.

Figure 10C:
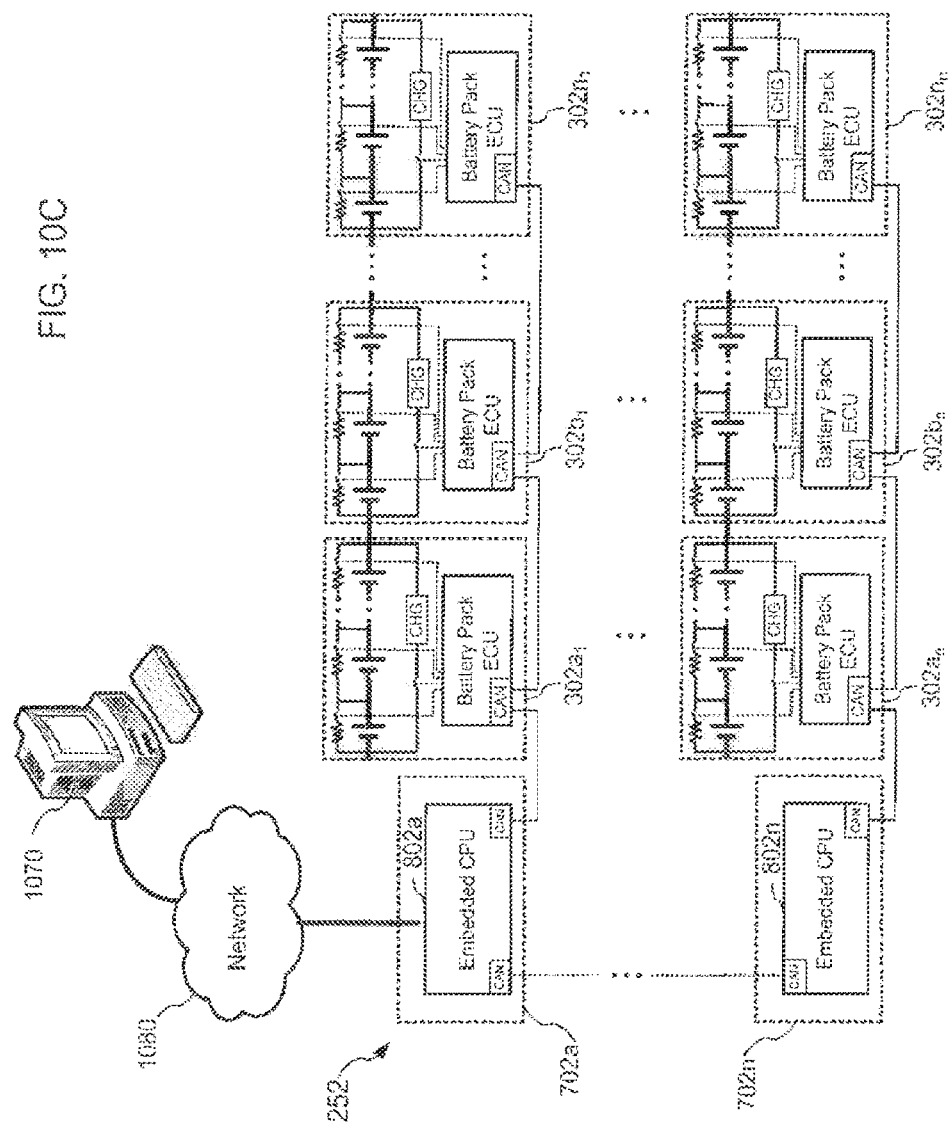

FIG. 10C is a diagram that illustrates another electrical energy storage system according to an embodiment.

Figure 11:
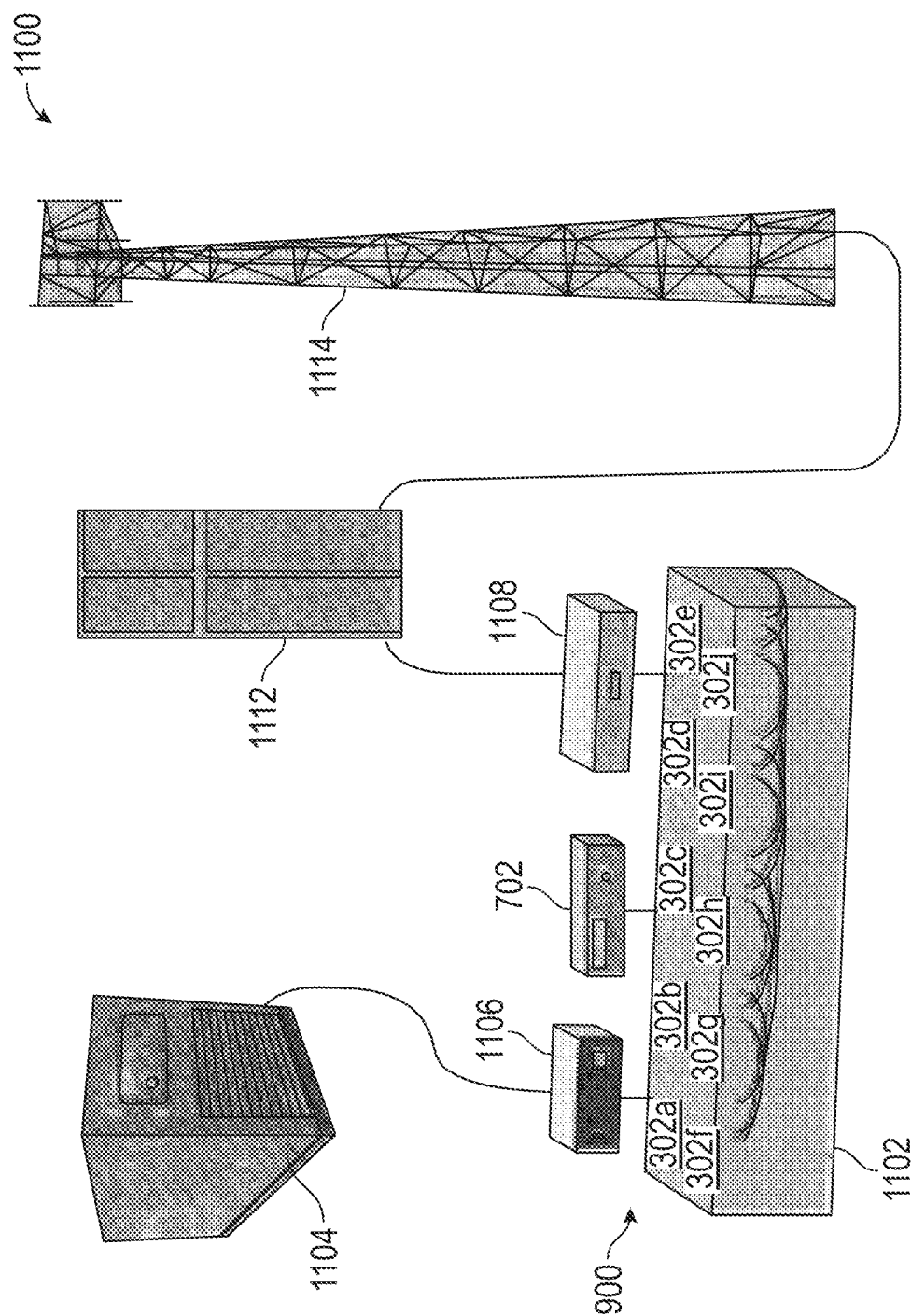

FIG. 11 is a diagram that illustrates an electrical energy storage system according to an embodiment.

Figure 12:
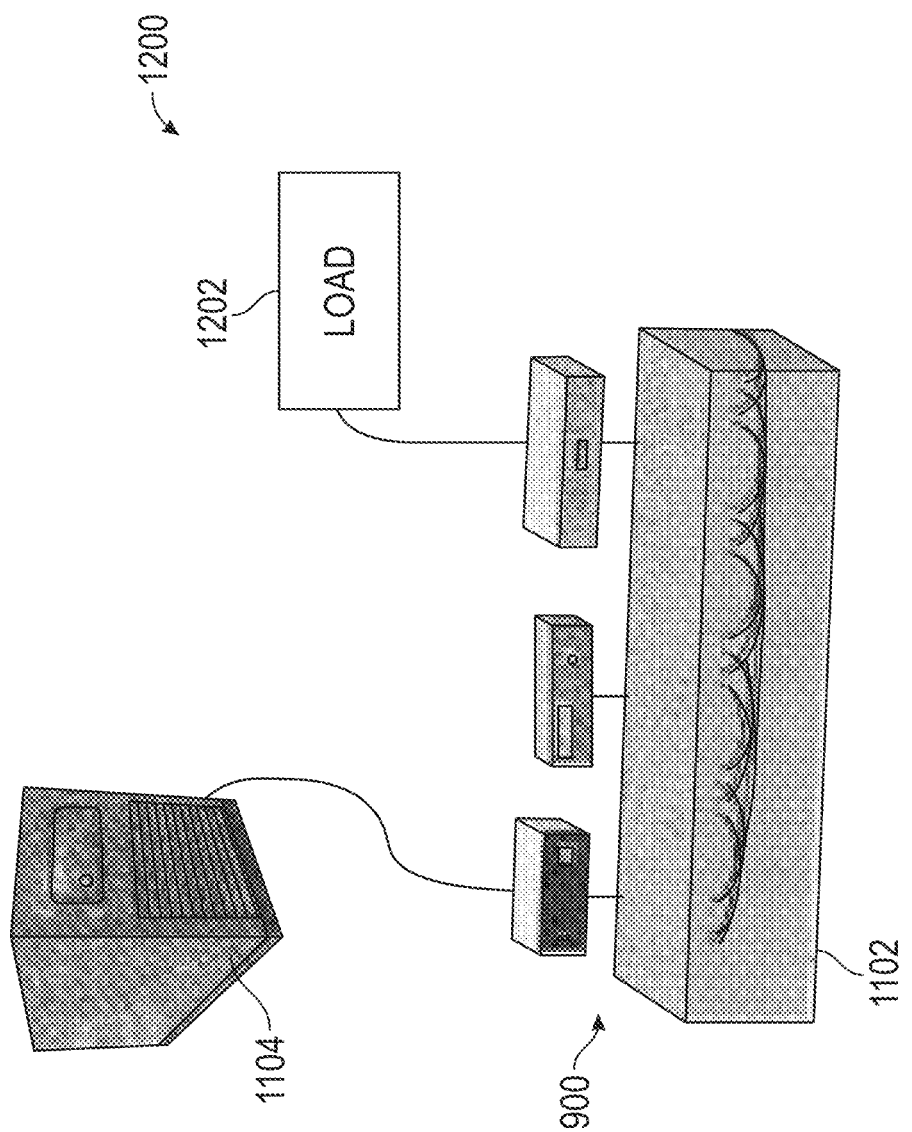

FIG. 12 is a diagram that illustrates an electrical energy storage system according to an embodiment.

Figure 13:
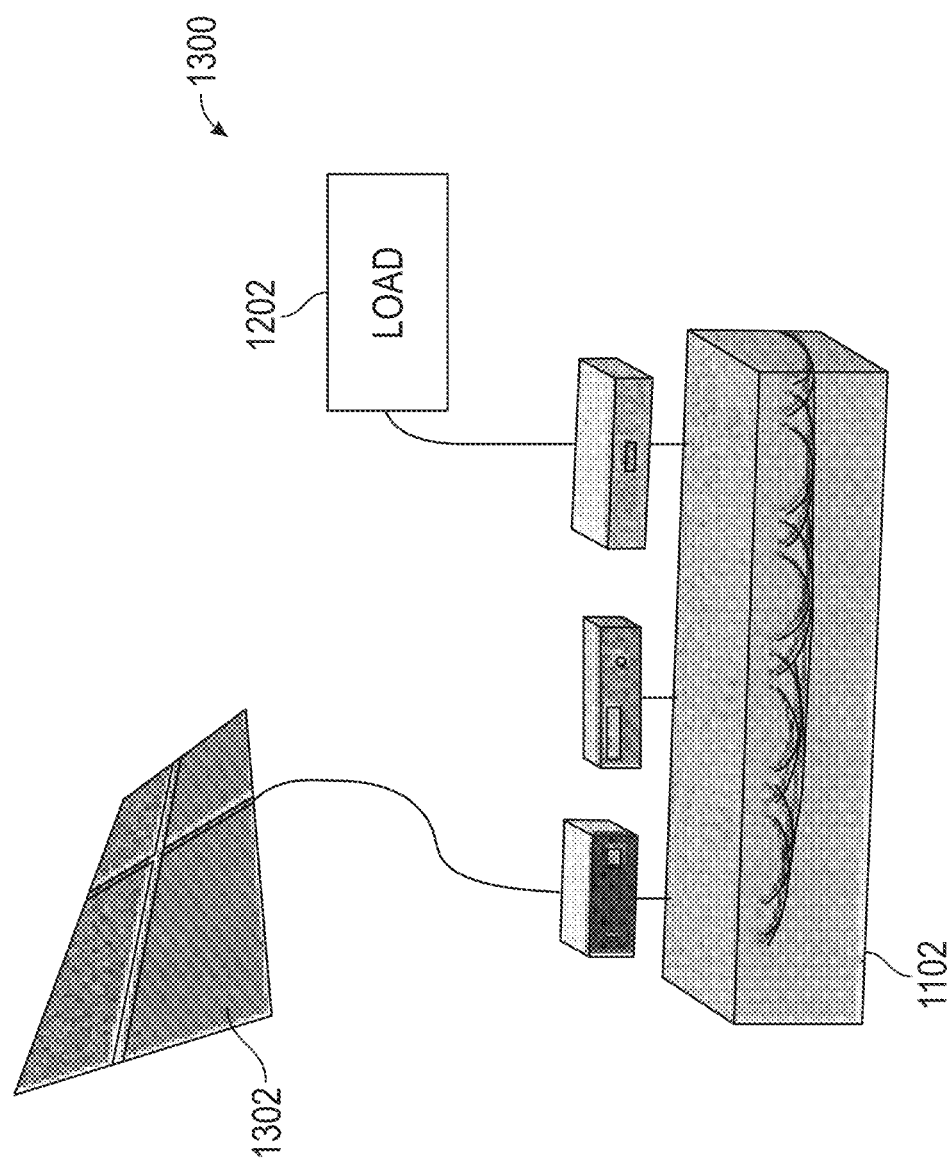

FIG. 13 is a diagram that illustrates an electrical energy storage system according to an embodiment.

Figure 14:
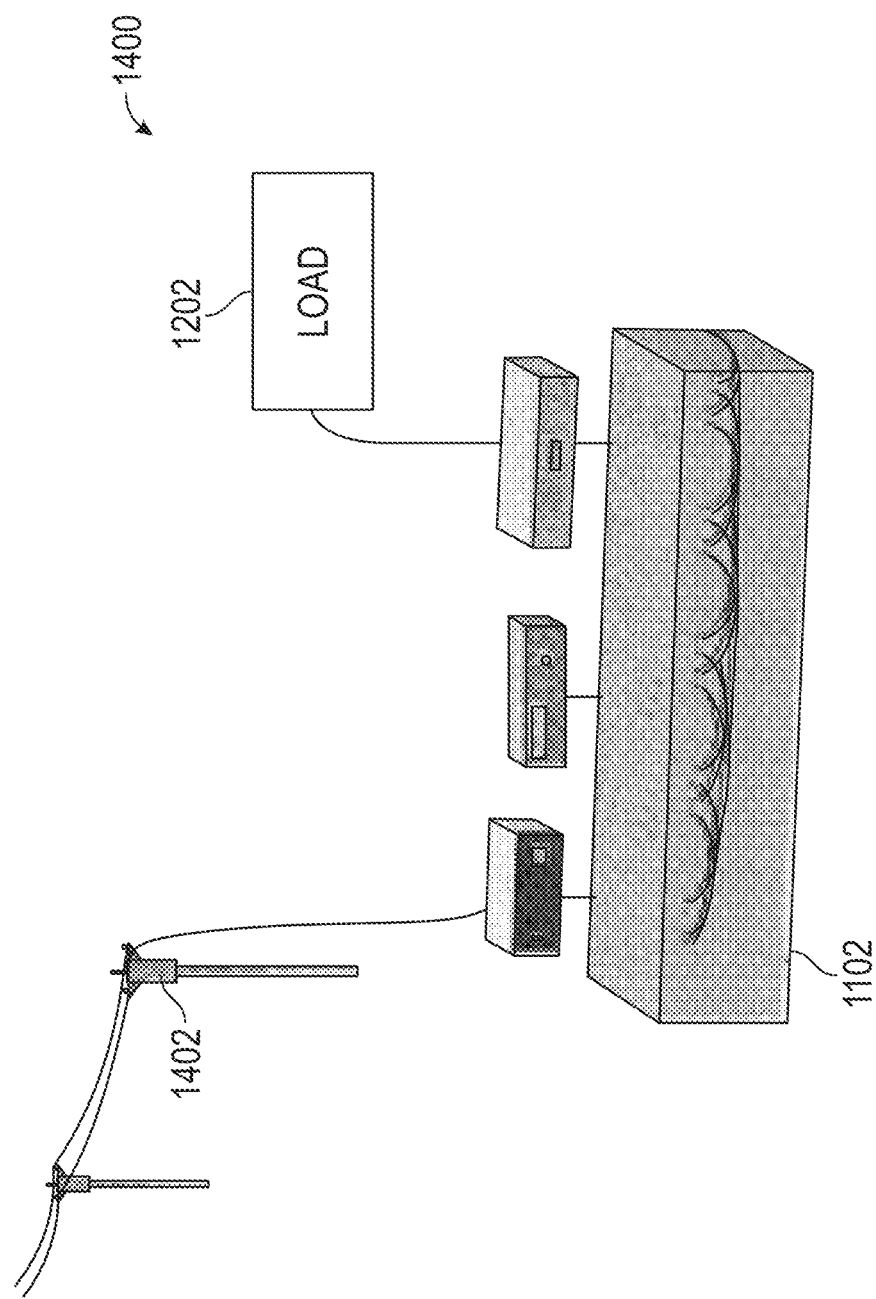

FIG. 14 is a diagram that illustrates an electrical energy storage system according to an embodiment.

Figure 15:
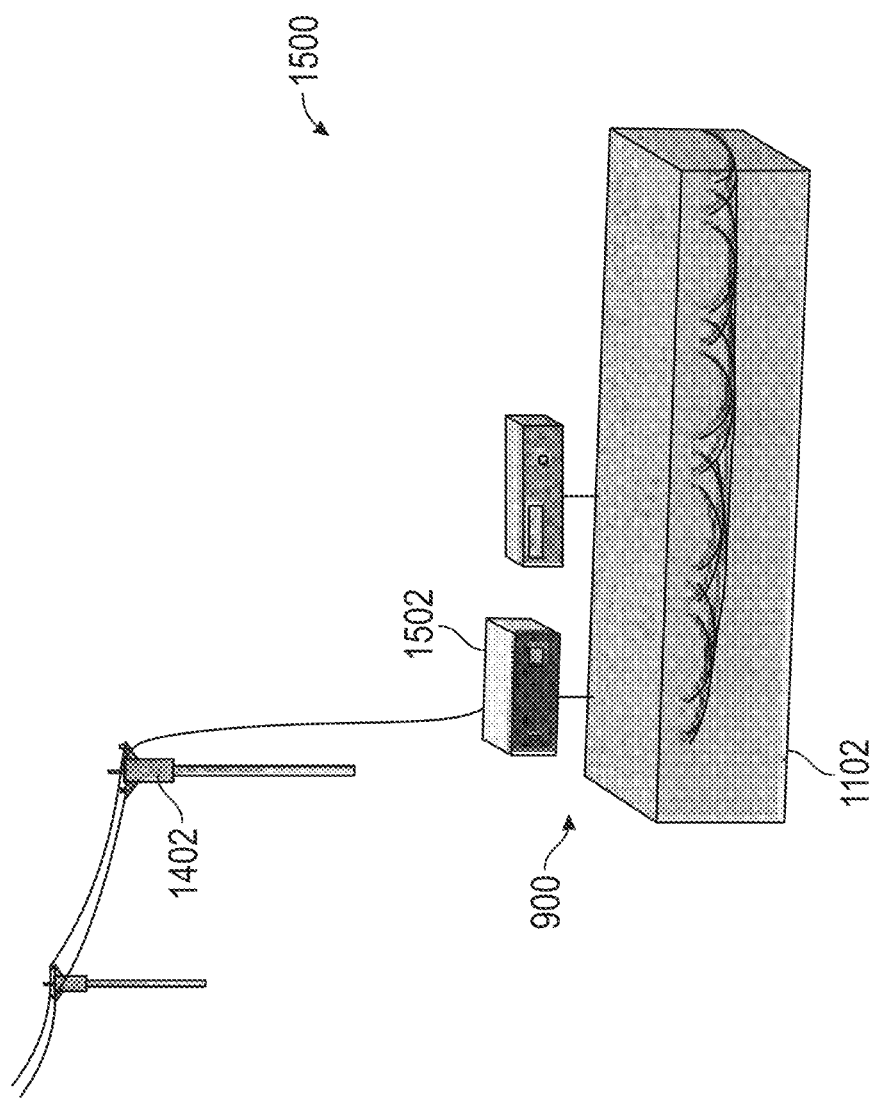

FIG. 15 is a diagram that illustrates an electrical energy storage system according to an embodiment.

Figure 16:
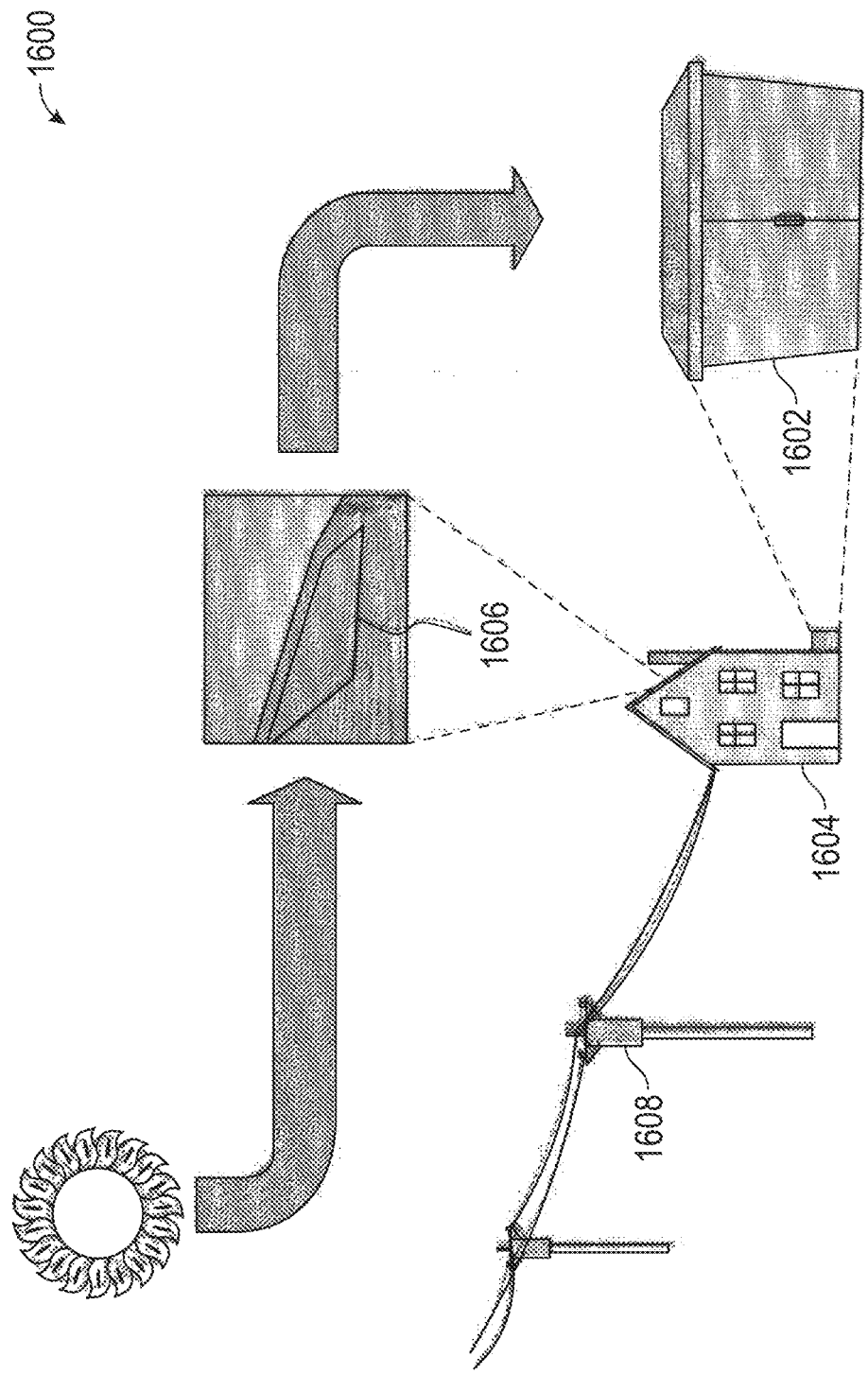

FIG. 16 is a diagram that illustrates an electrical energy storage system according to an embodiment.

Figure 17:
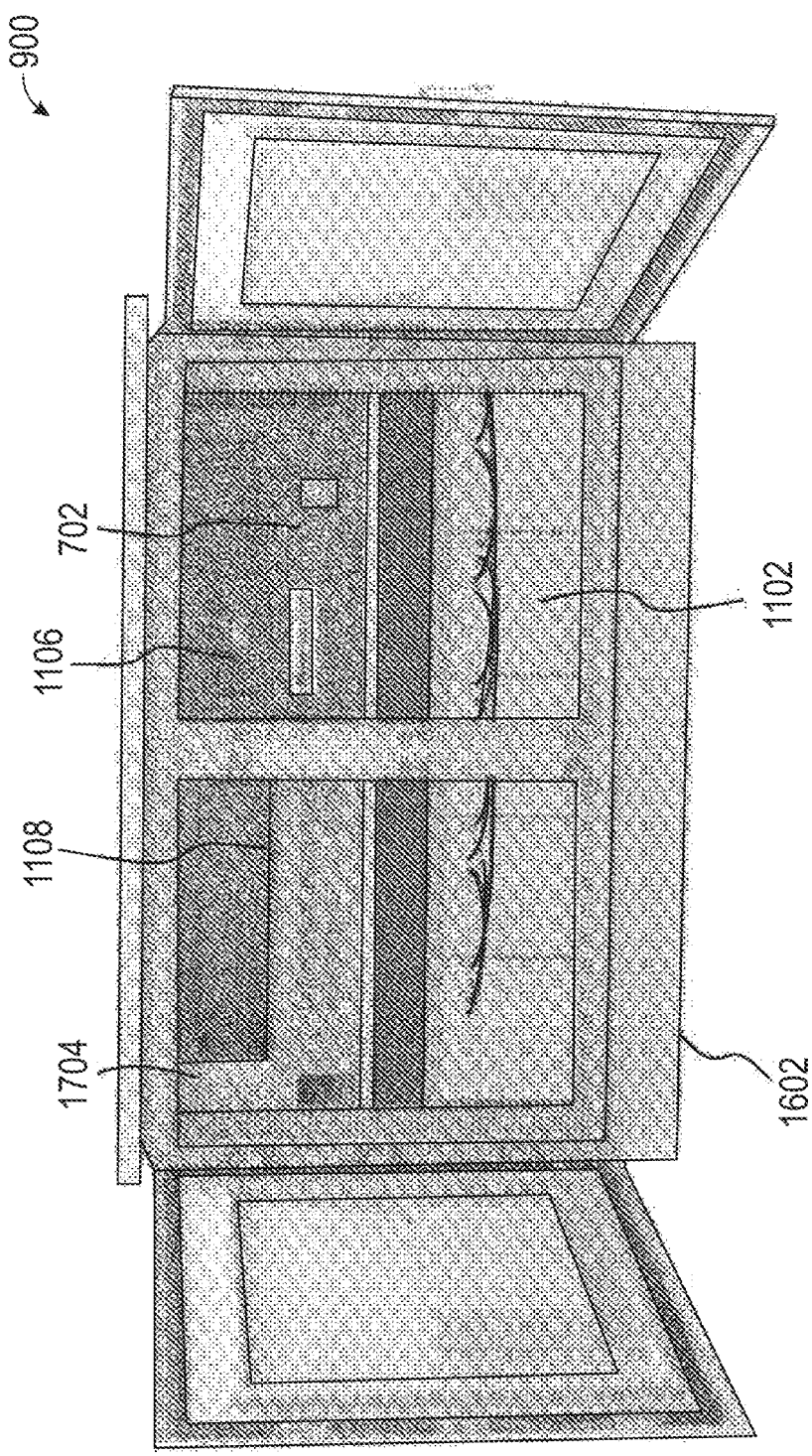

FIG. 17 is a diagram that illustrates an electrical energy storage unit according to an embodiment.

FIG. 18 is a diagram that illustrates an electrical energy storage unit according to an embodiment.

FIGS. 19A, 19B, 19C, 19D, and 19E are diagrams that illustrate an exemplary user interface for an electrical energy storage unit according to an embodiment.

Figure 20:
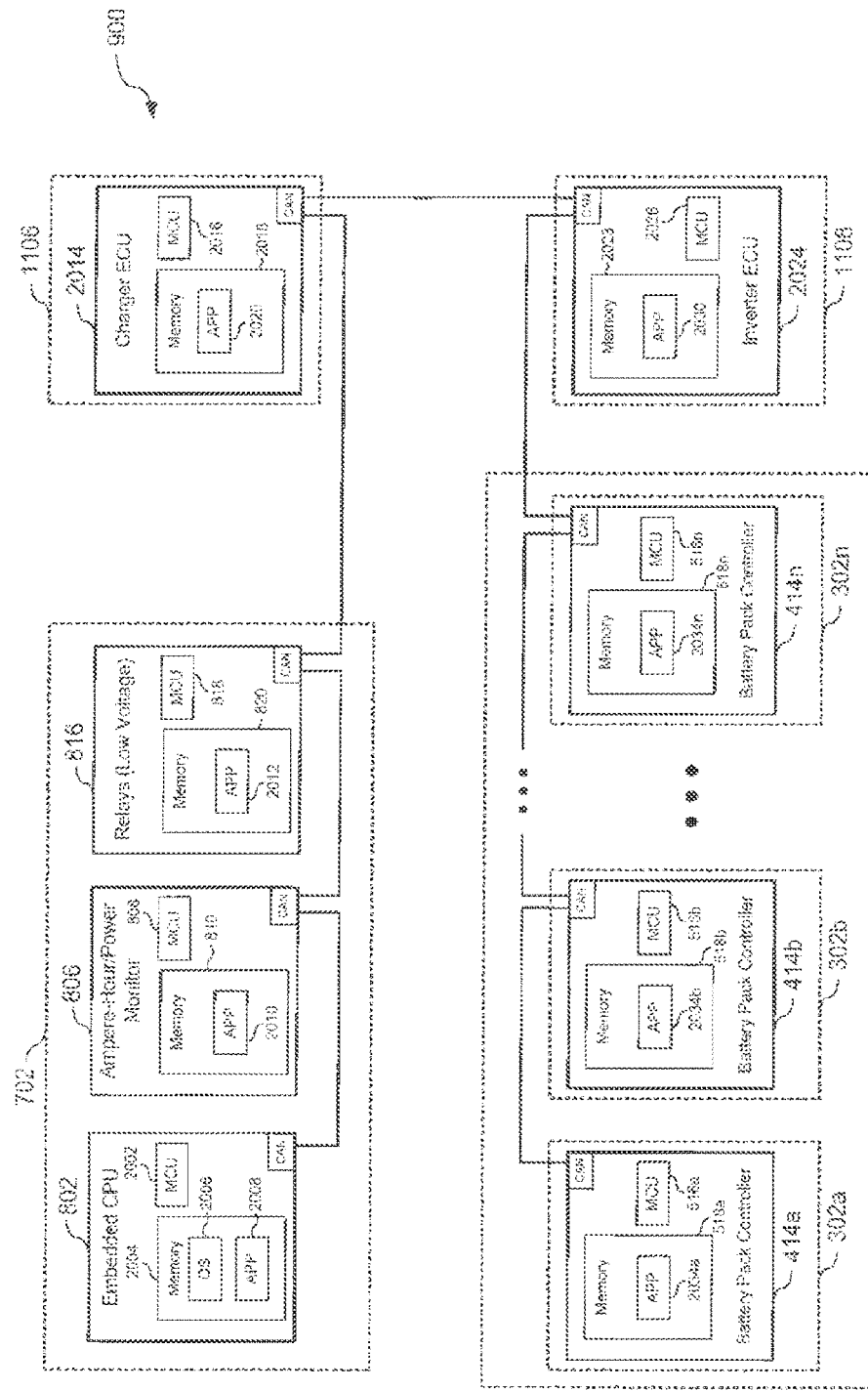

FIG. 20 is a diagram that illustrates an electrical energy storage unit according to an embodiment.

FIG. 21 is a diagram that illustrates exemplary battery pack data used in an embodiment of an electrical energy storage unit.

FIGS. 22A and 22B are diagrams that illustrate exemplary battery data used in an embodiment of an electrical energy storage unit.

FIGS. 23A and 23B are diagrams that illustrates exemplary battery cycle data used in an embodiment of an electrical energy storage unit.

Figure 24A:
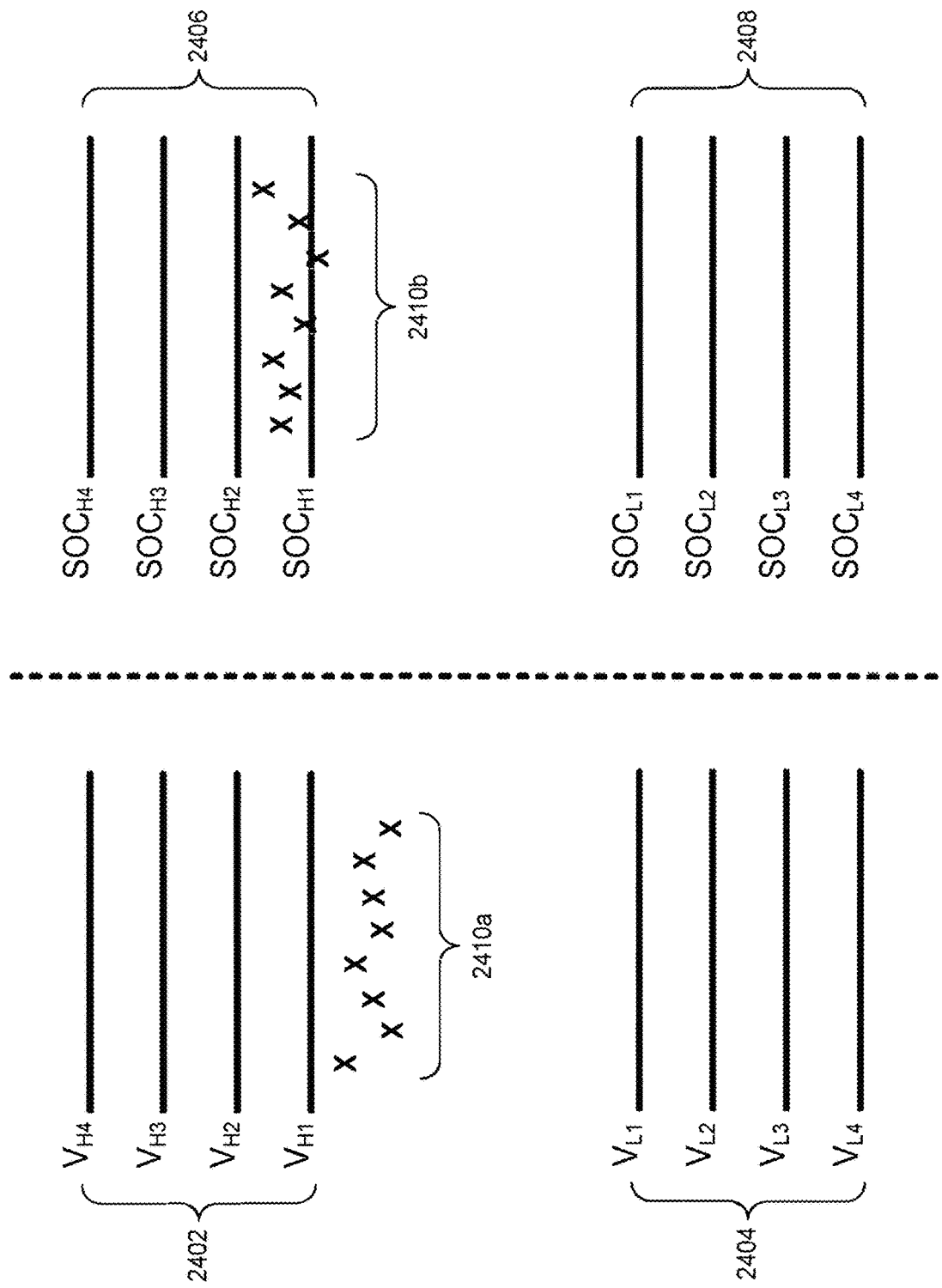
Figure 24B:
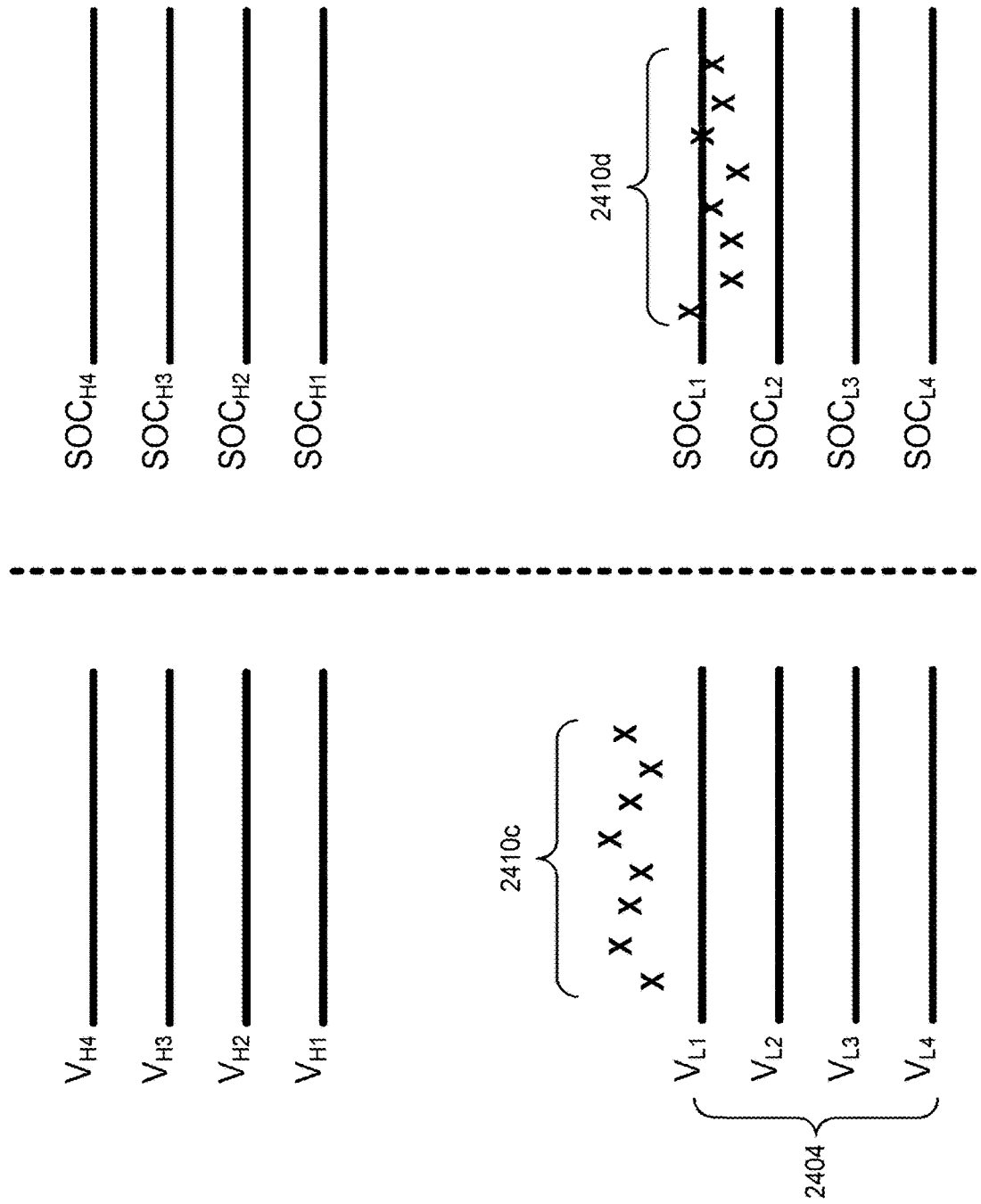

FIGS. 24A and 24B are diagrams that illustrates operation of an electrical energy storage unit according to an embodiment.

Figure 25:
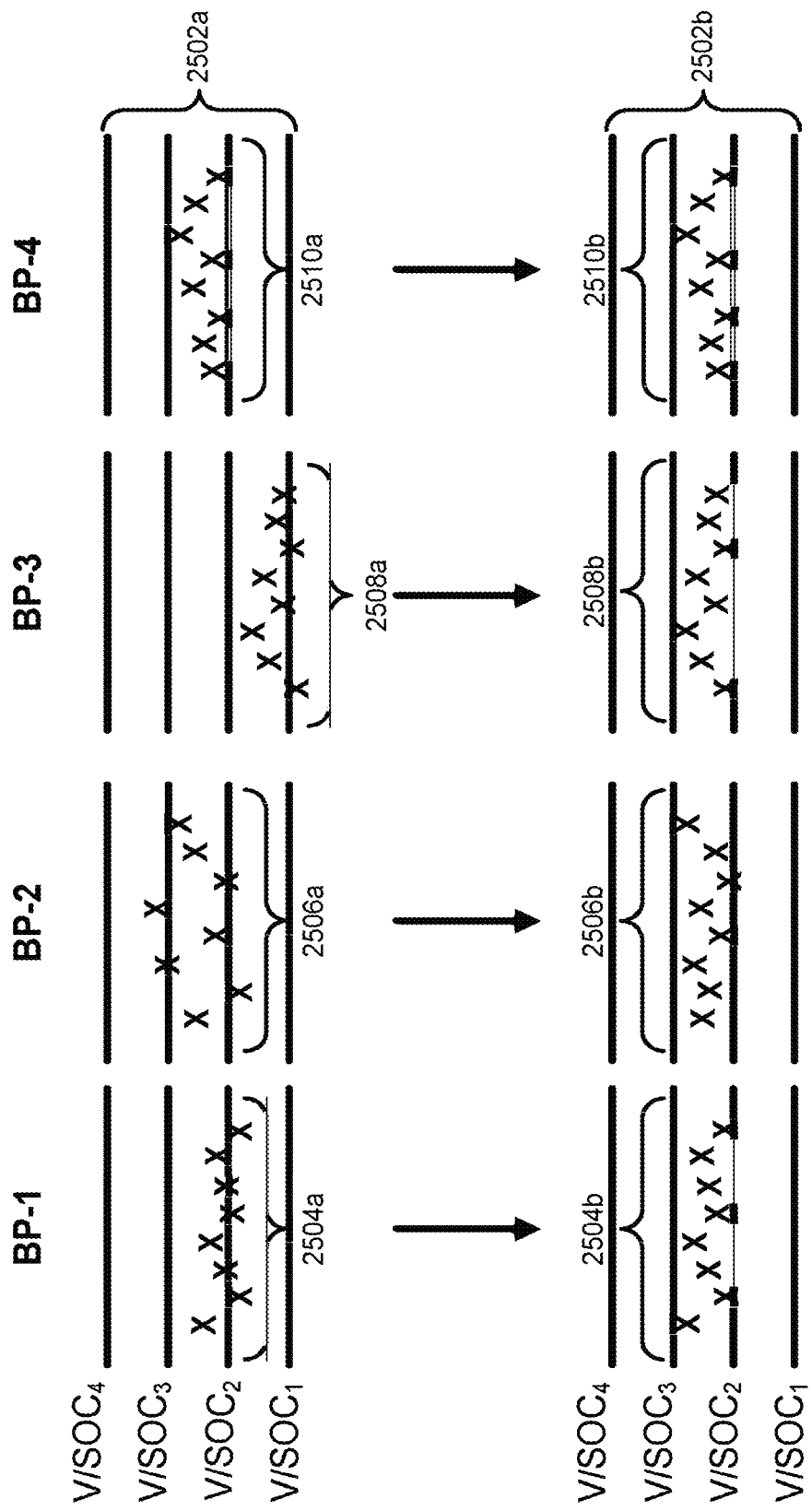

FIG. 25 is a diagram that illustrates operation of an electrical energy storage unit according to an embodiment.

FIGS. 26A, 26B, 26C, and 26D are diagrams illustrating an example battery pack according to an embodiment.

Figure 27A:
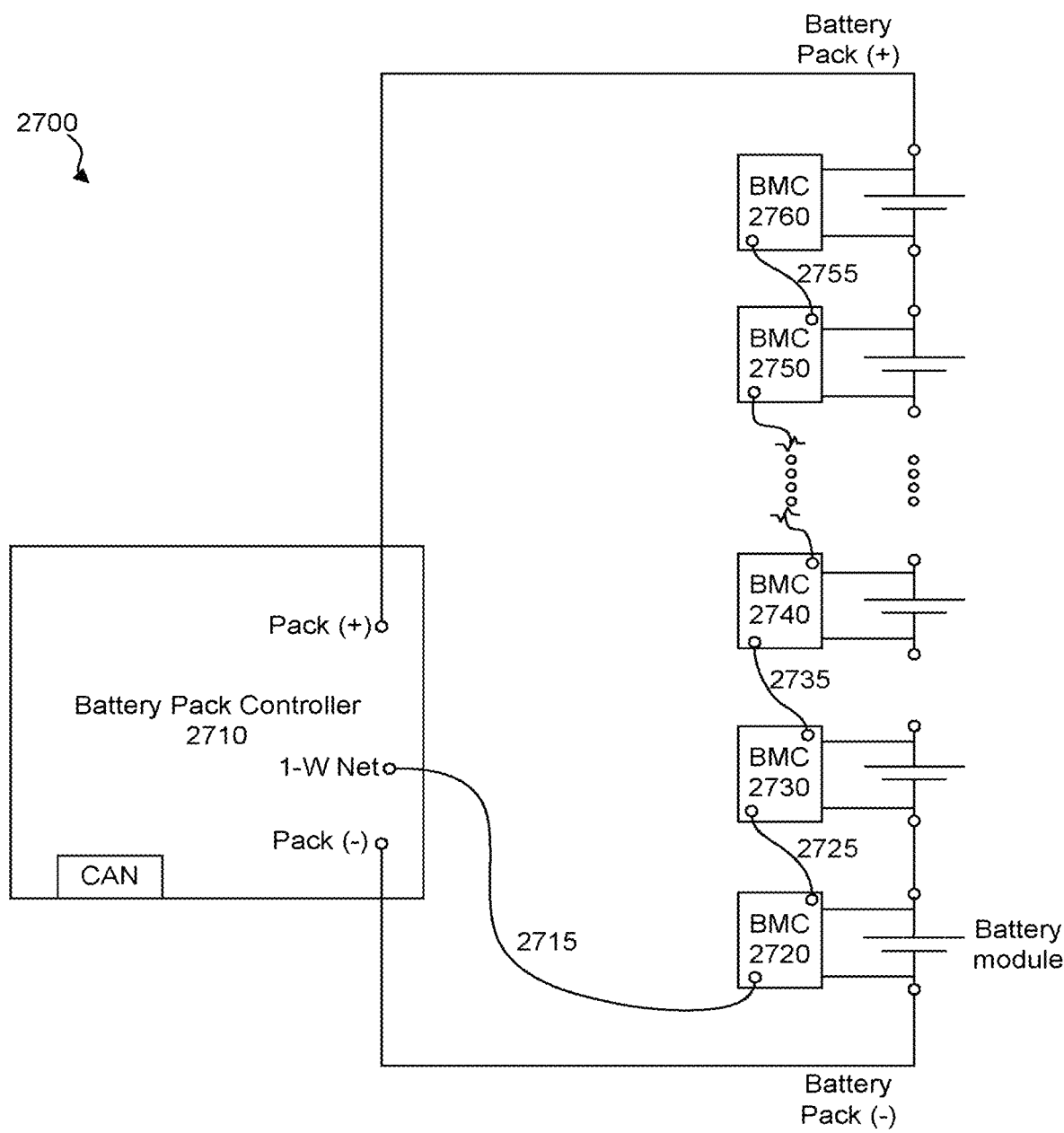

FIG. 27A is a diagram illustrating an example communication network formed by a battery pack controller and a plurality of battery module controllers.

Figure 27B:
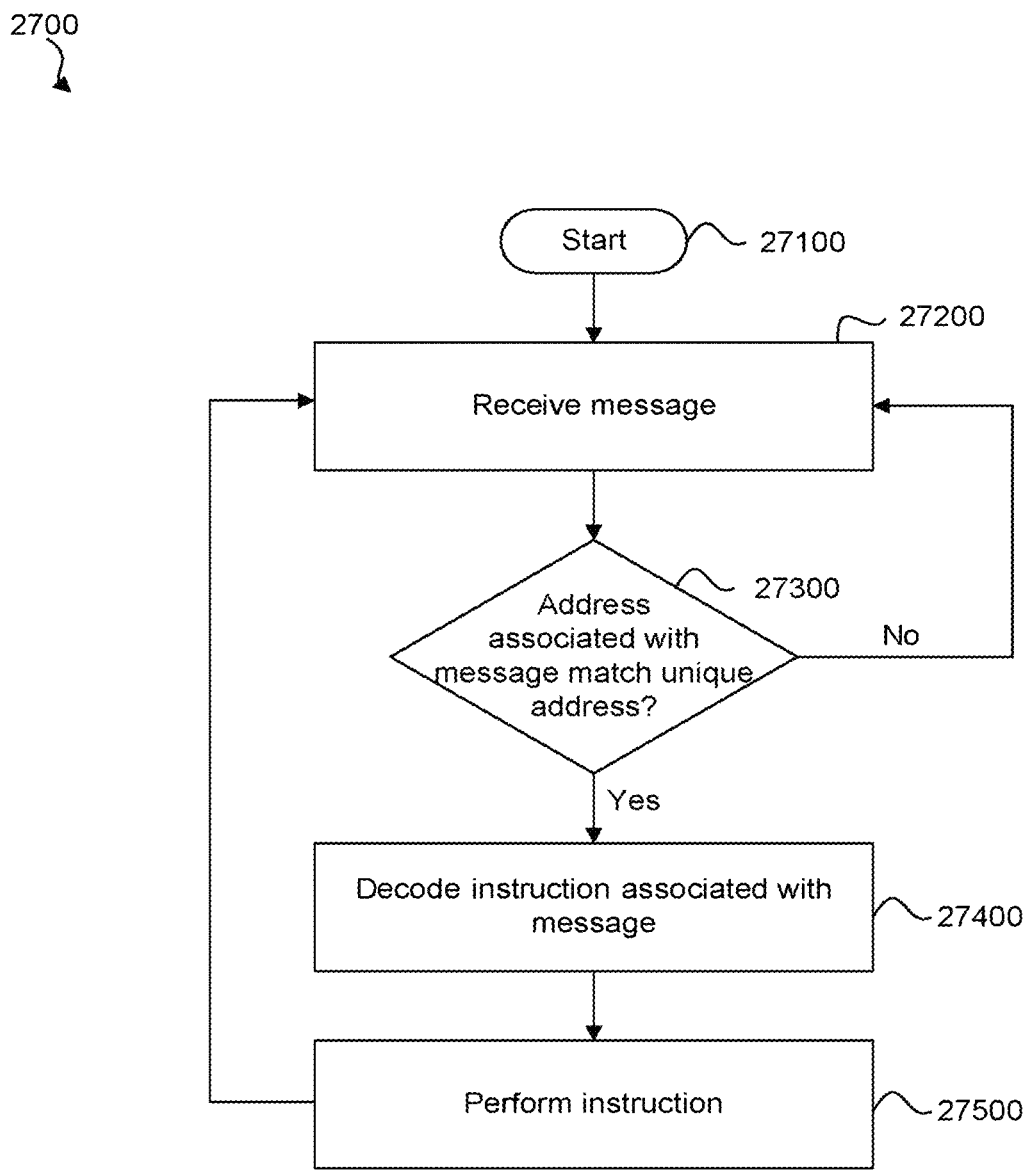

FIG. 27B is a flow diagram illustrating an example method for receiving instructions at a battery module controller.

Figure 28:
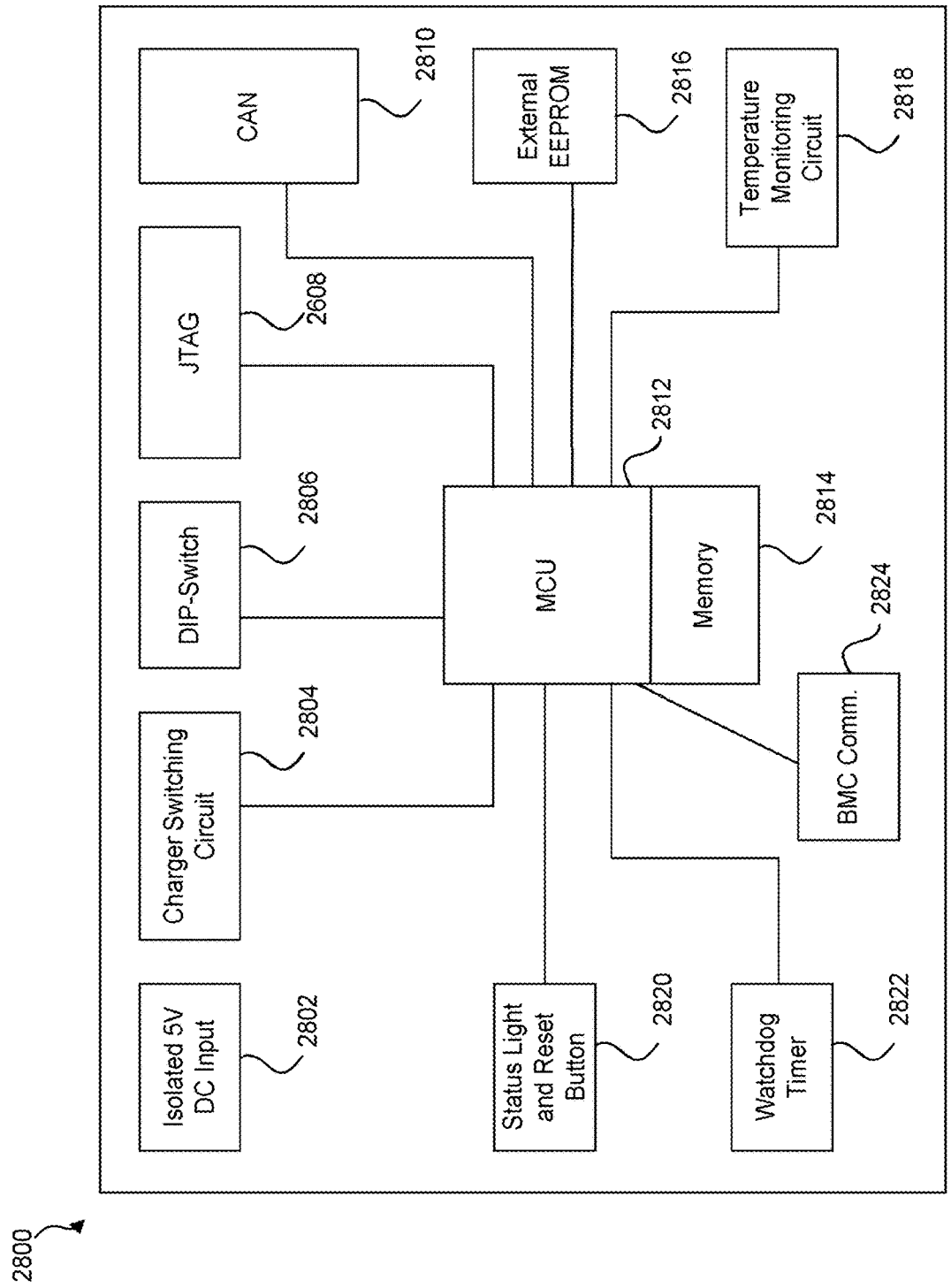

FIG. 28 is a diagram illustrating an example battery pack controller according to an embodiment.

Figure 29:
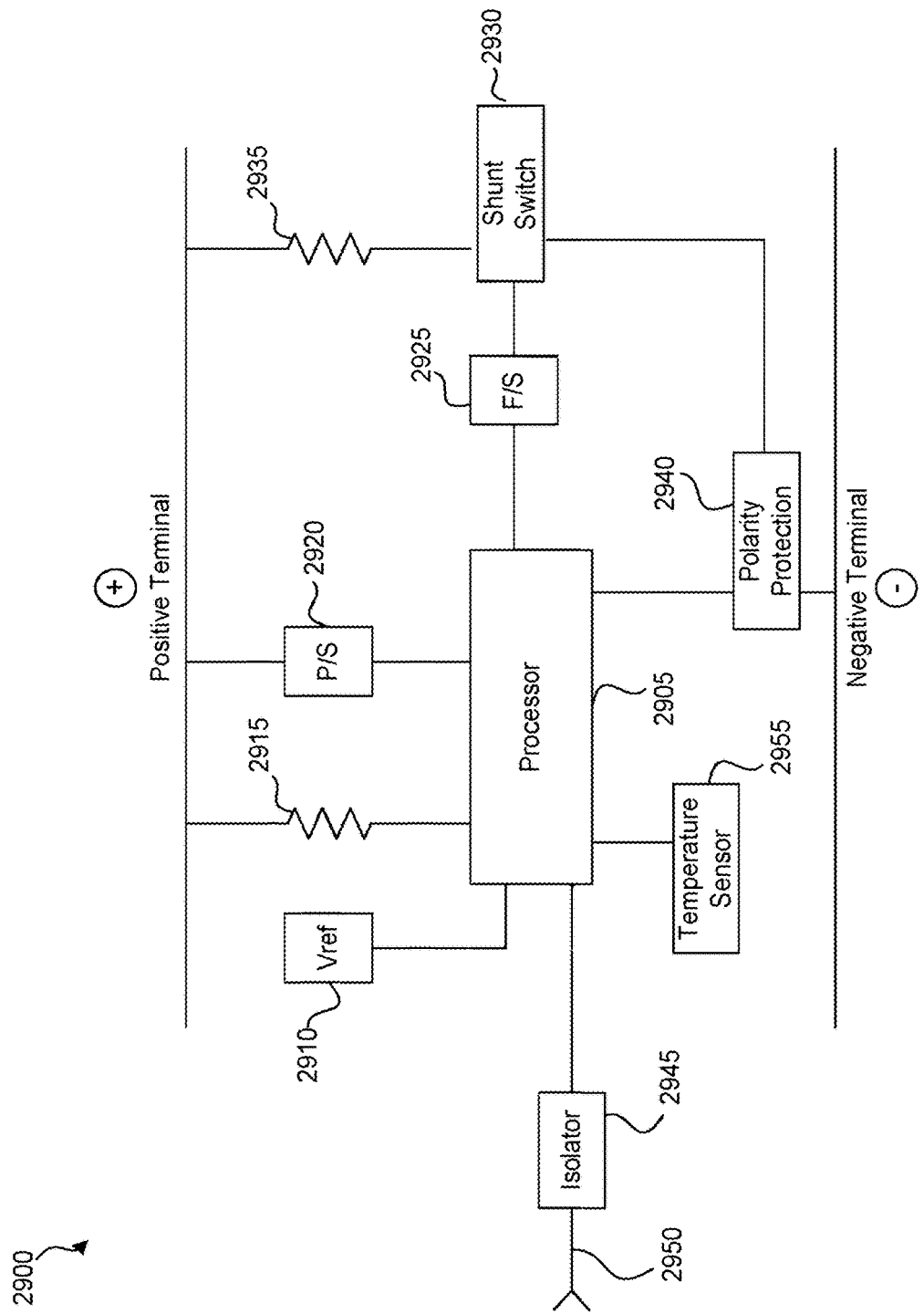

FIG. 29 is a diagram illustrating an example battery module controller according to an embodiment.

Figure 30:
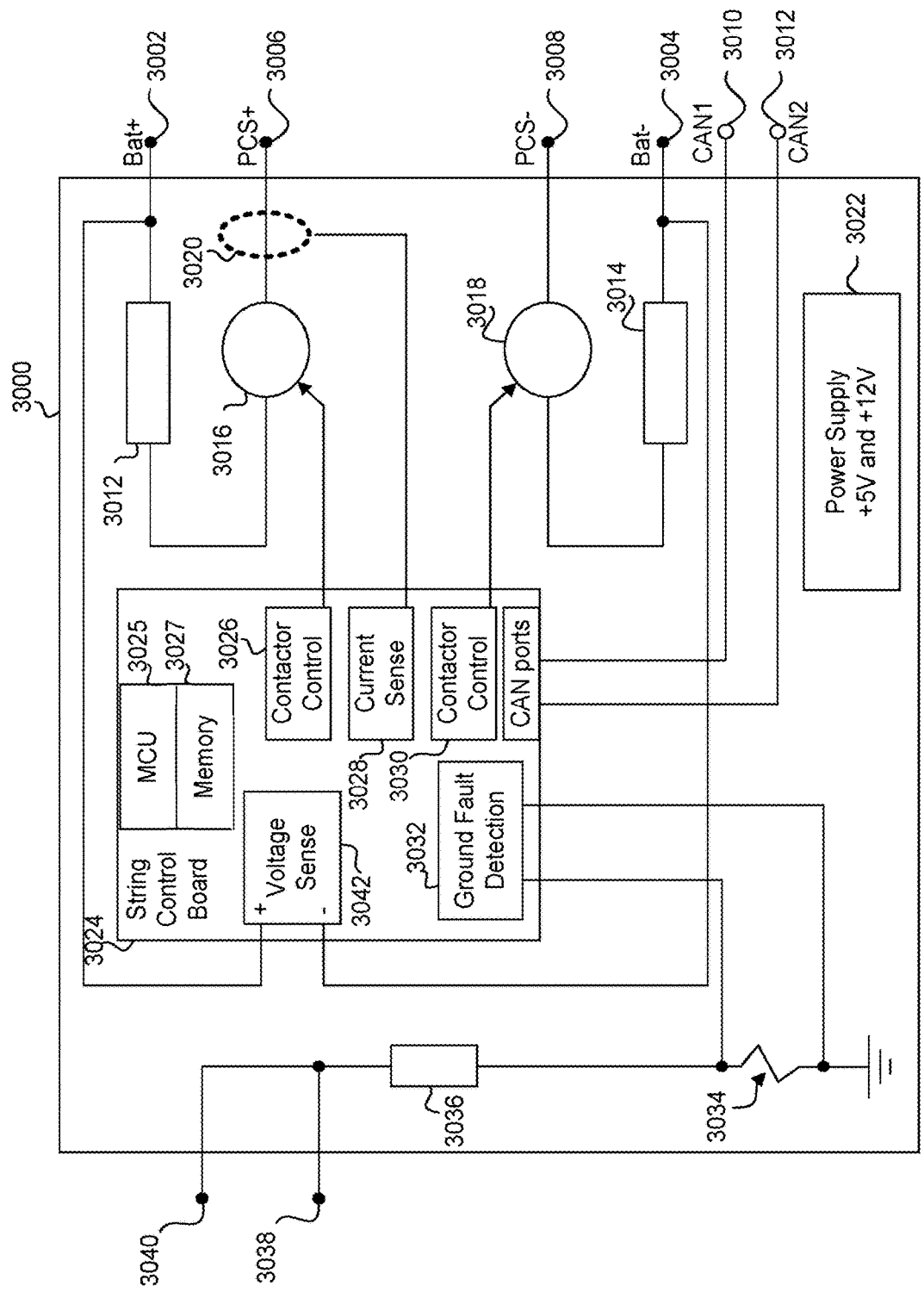

FIG. 30 is a diagram illustrating an example string controller according to an embodiment.

Figure 31A:
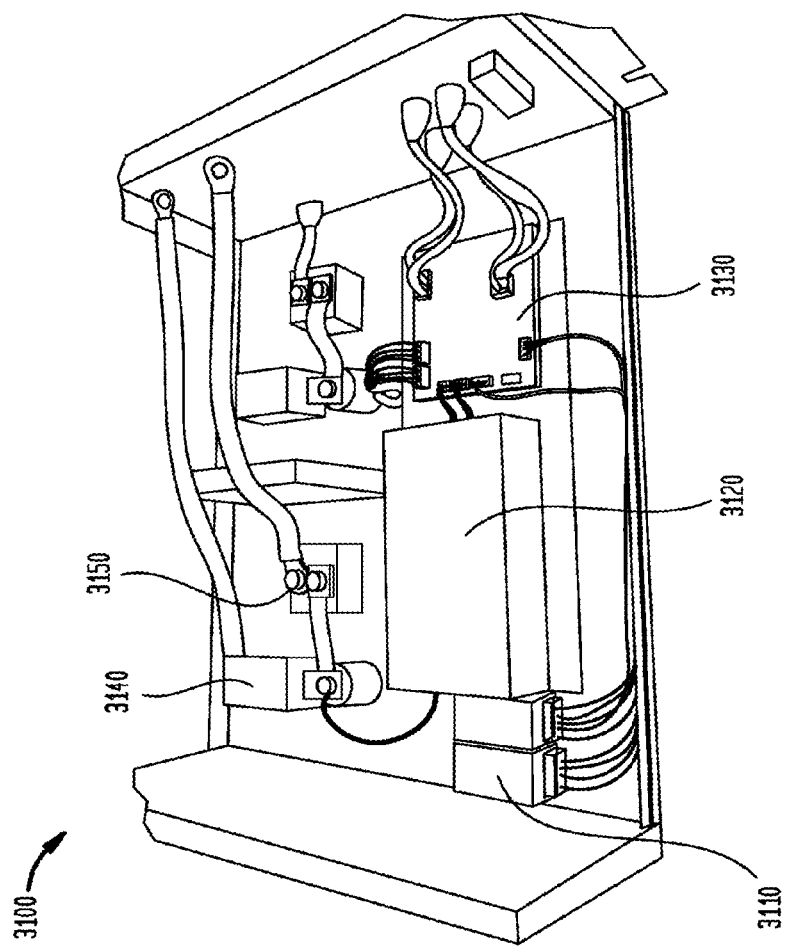

FIGS. 31A and 31B are diagrams illustrating an example string controller according to an embodiment.

Figure 32:
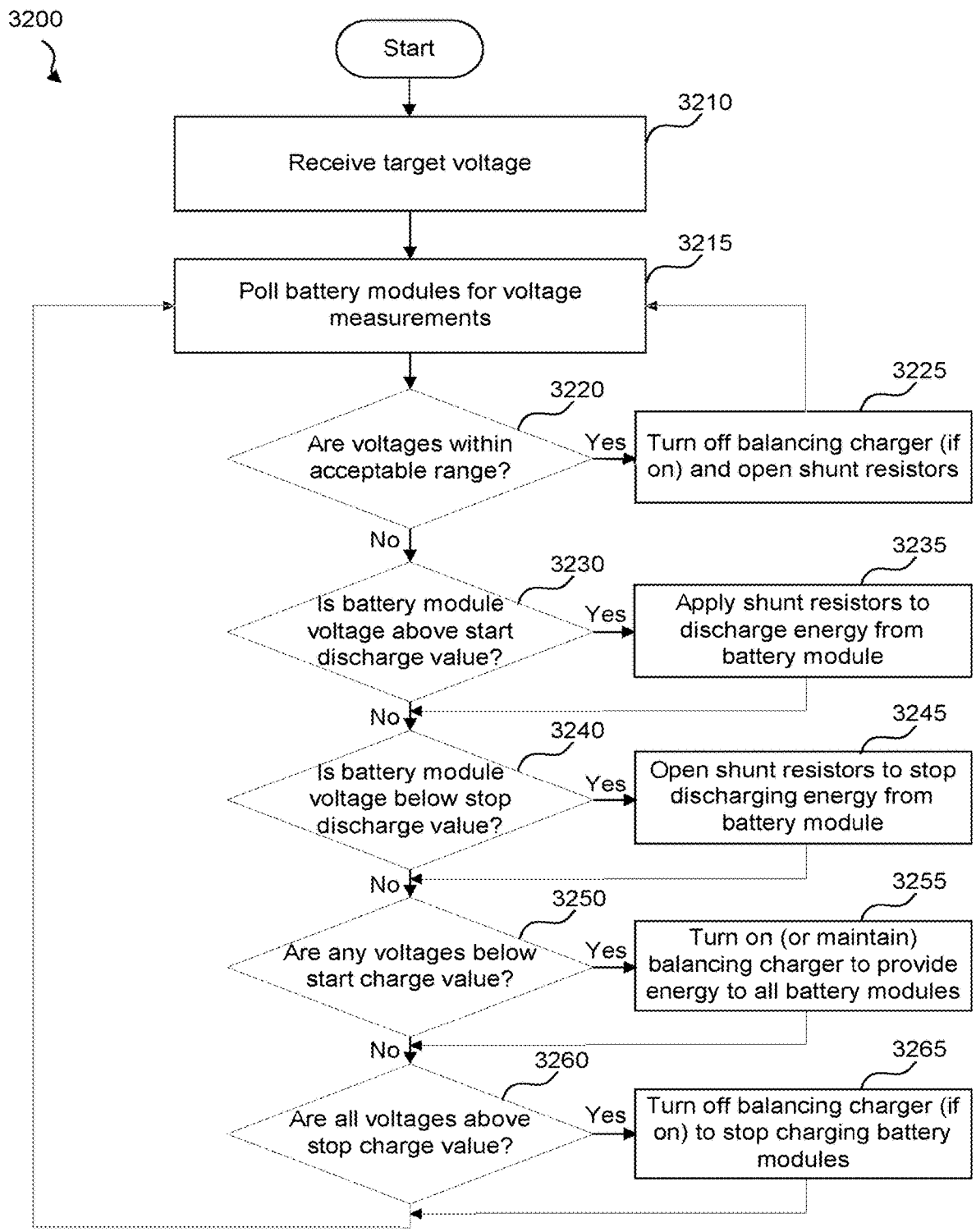

FIG. 32 is a flow diagram illustrating an example method for balancing a battery pack.

Figure 33:
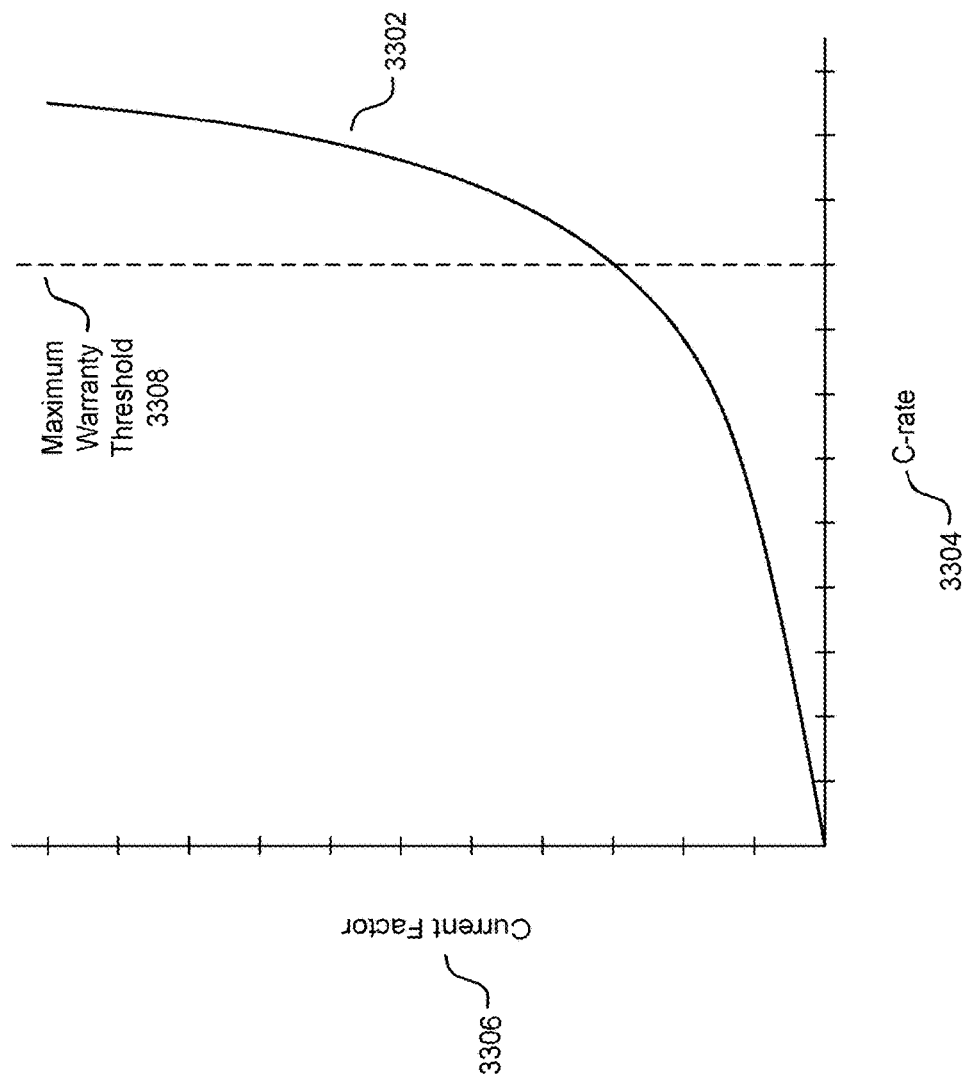

FIG. 33 is a diagram illustrating a correlation between an electric current measurement and a current factor used in the calculation of a warranty value, according to an embodiment.

Figure 34:
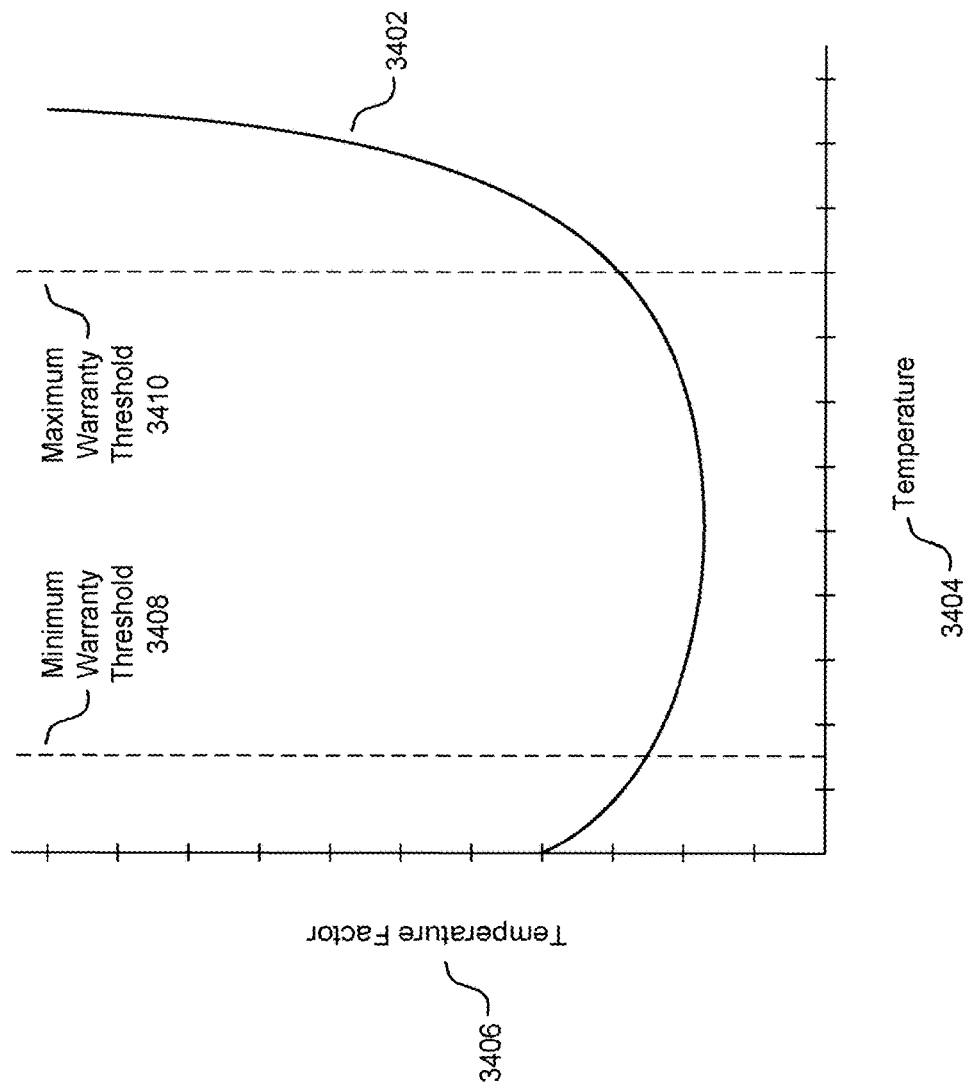

FIG. 34 is a diagram illustrating a correlation between a temperature measurement and a temperature factor used in the calculation of a warranty value, according to an embodiment.

Figure 35:
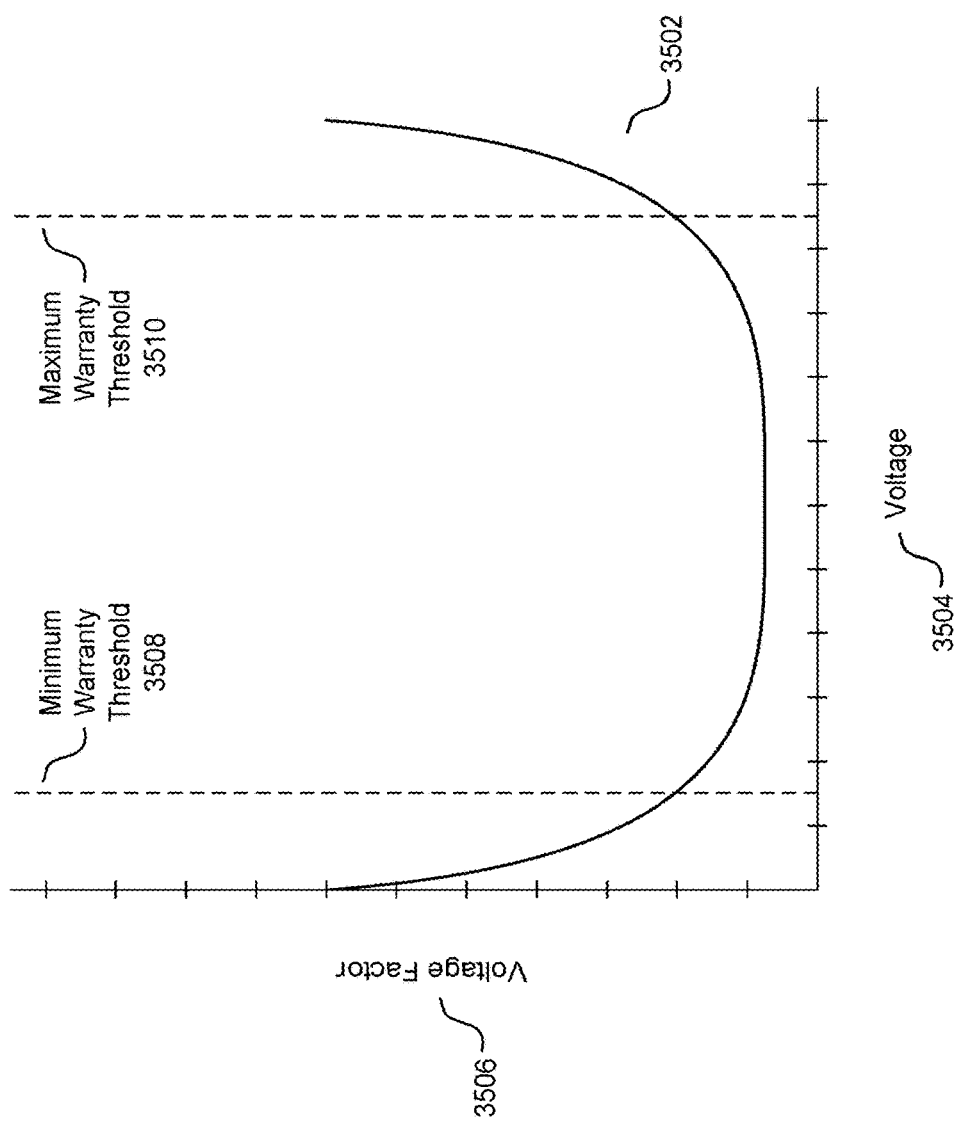

FIG. 35 is a diagram illustrating a correlation between a voltage measurement and a voltage factor used in the calculation of a warranty value, according to an embodiment.

Figure 36A:
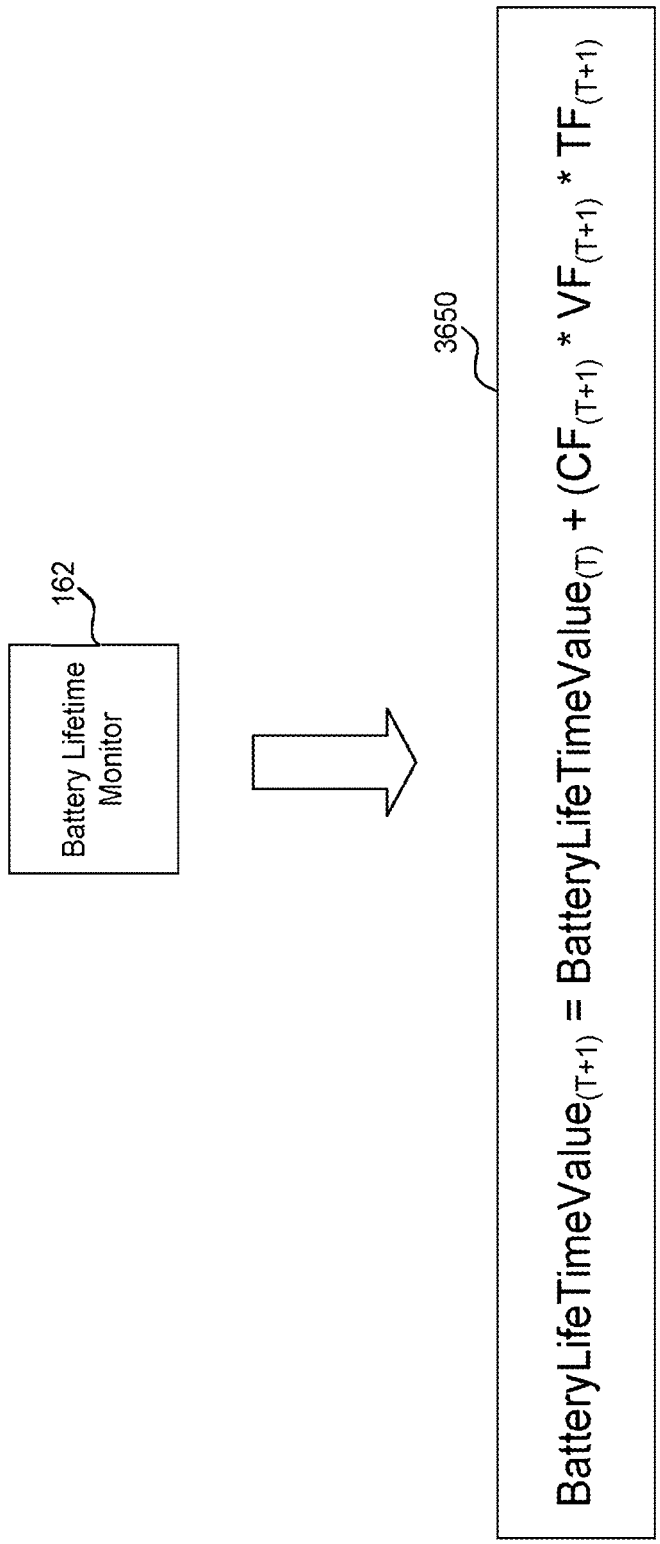

FIG. 36A is a diagram illustrating how to determine a battery lifetime value or warranty value, according to an embodiment.

Figure 36B:
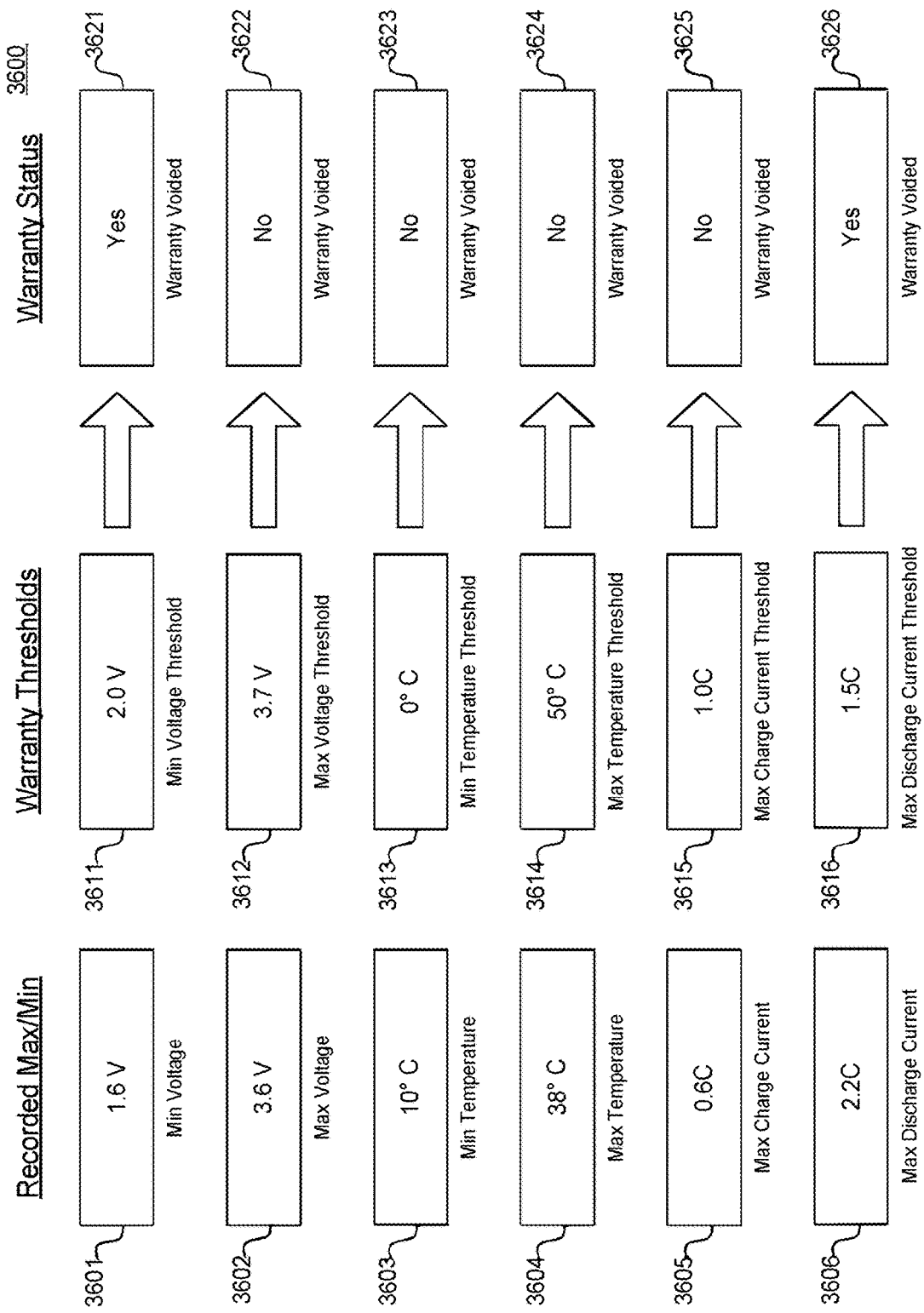

FIG. 36B is a diagram illustrating warranty thresholds used for voiding a warranty for a battery pack, according to an embodiment.

Figure 37:
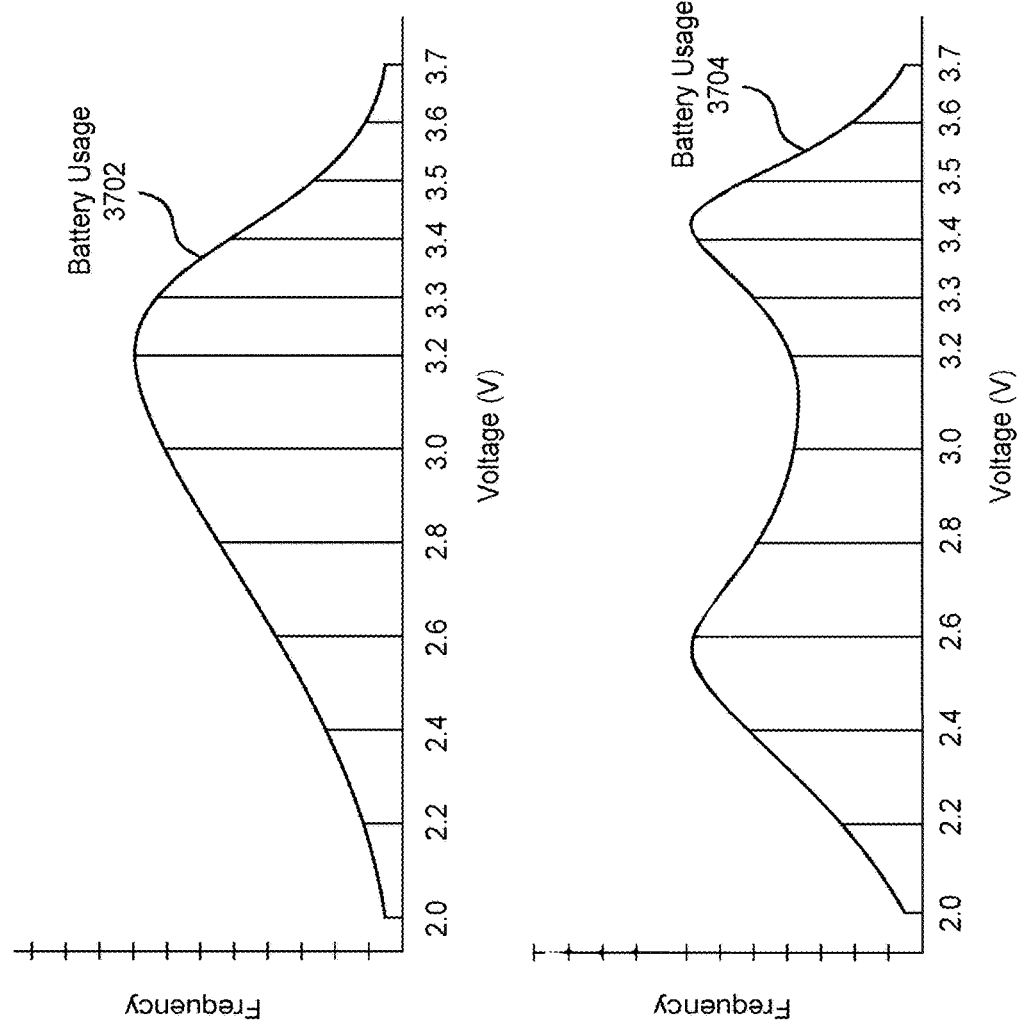

FIG. 37 is a diagram illustrating example usage of a battery pack, according to an embodiment.

Figure 38:
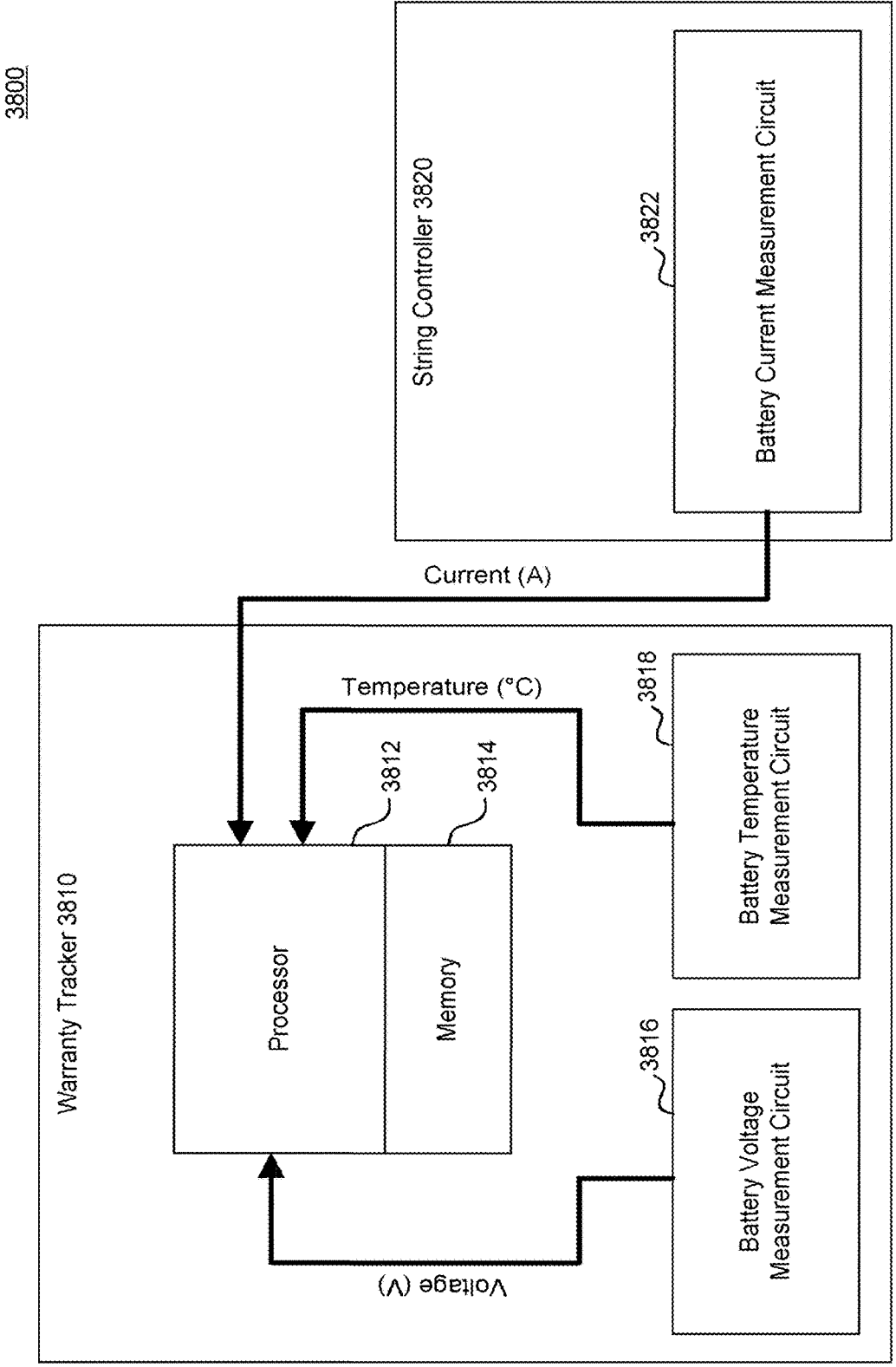

FIG. 38 is a diagram illustrating an example warranty tracker according to an embodiment.

Figure 39:
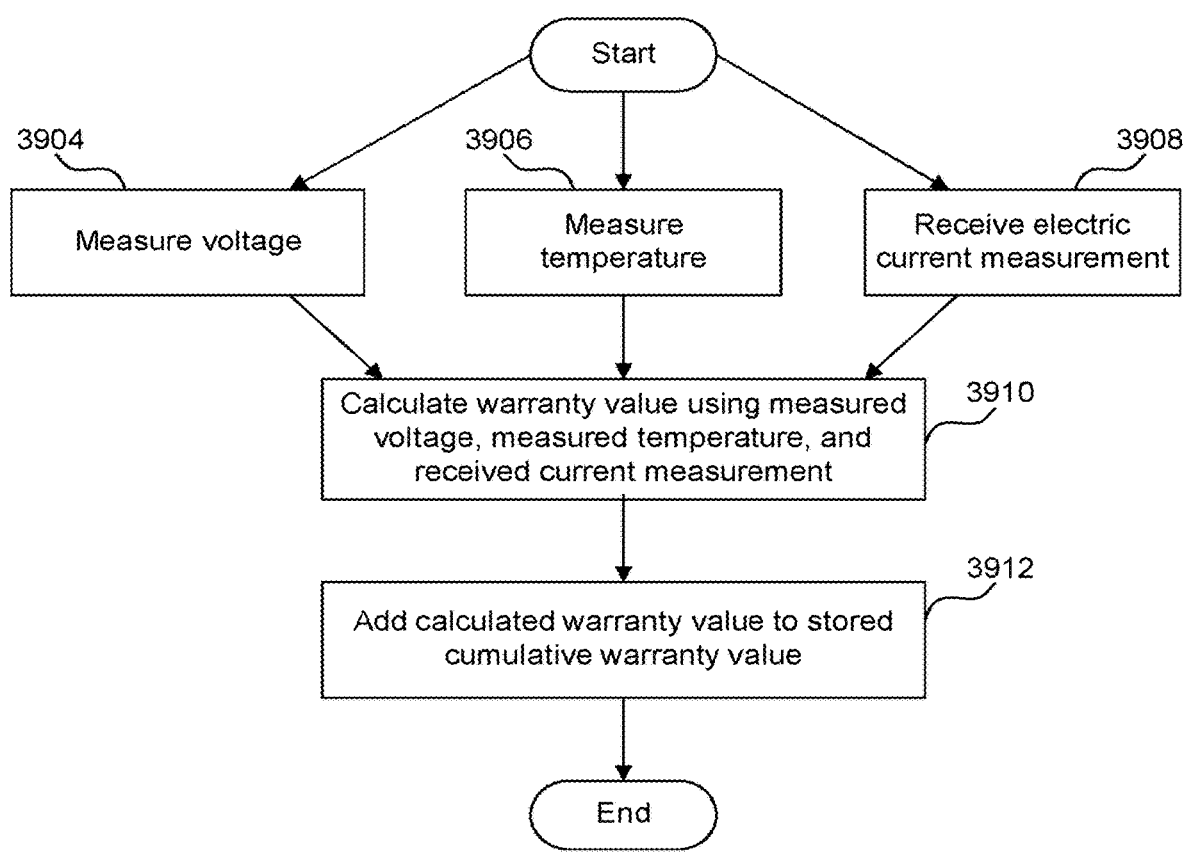

FIG. 39 is an example method for calculating and storing a cumulative warranty value, according to an embodiment.

Figure 40:
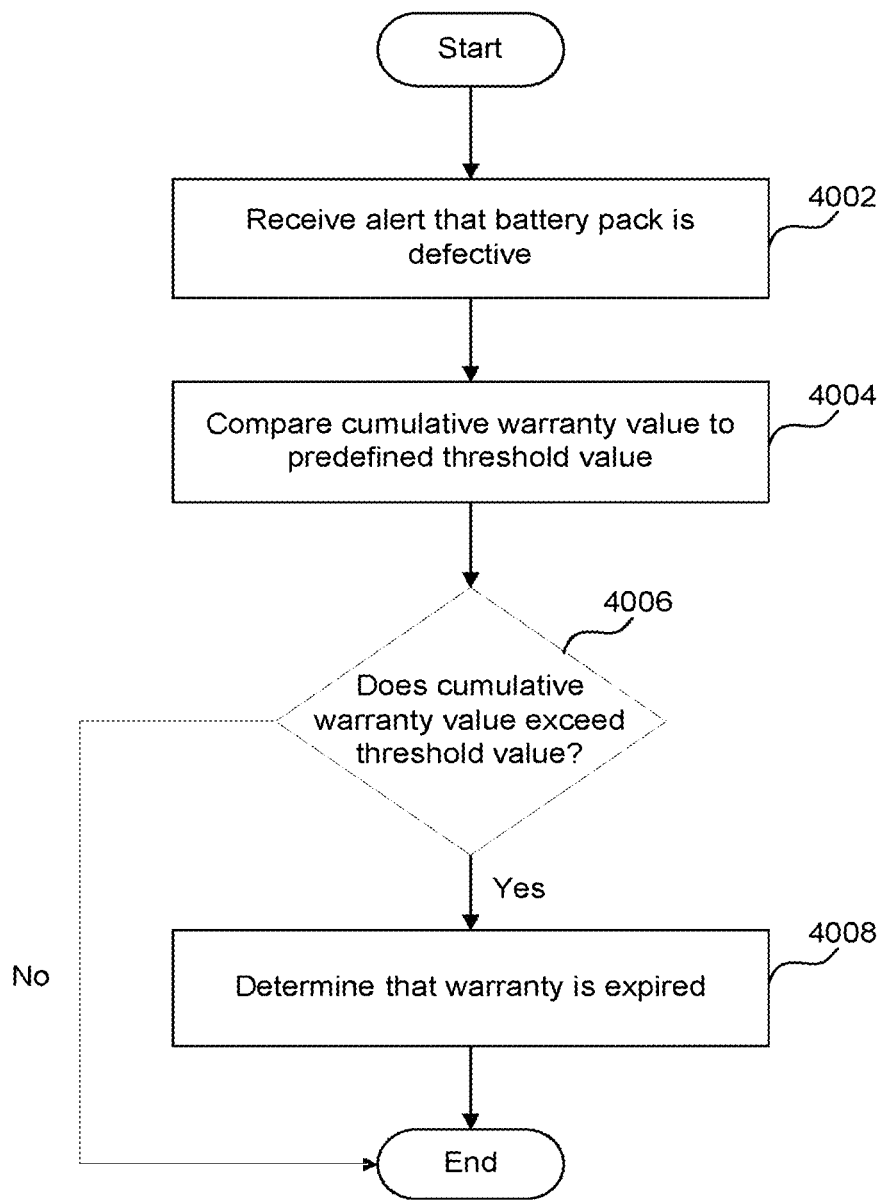

FIG. 40 is an example method for using a warranty tracker, according to an embodiment.

Figure 41:
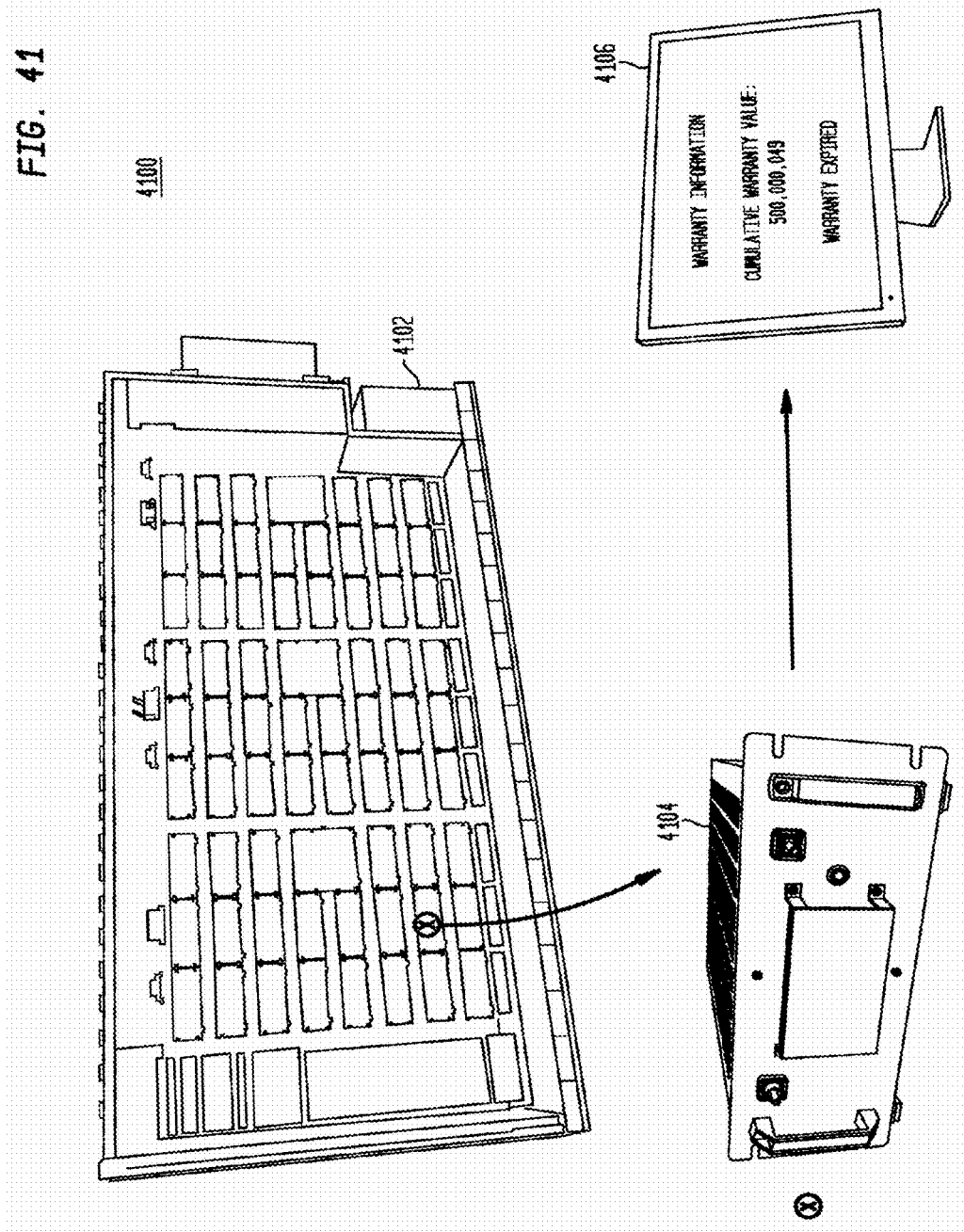

FIG. 41 is a diagram illustrating a battery pack and associated warranty information, according to an embodiment.

Figure 42:
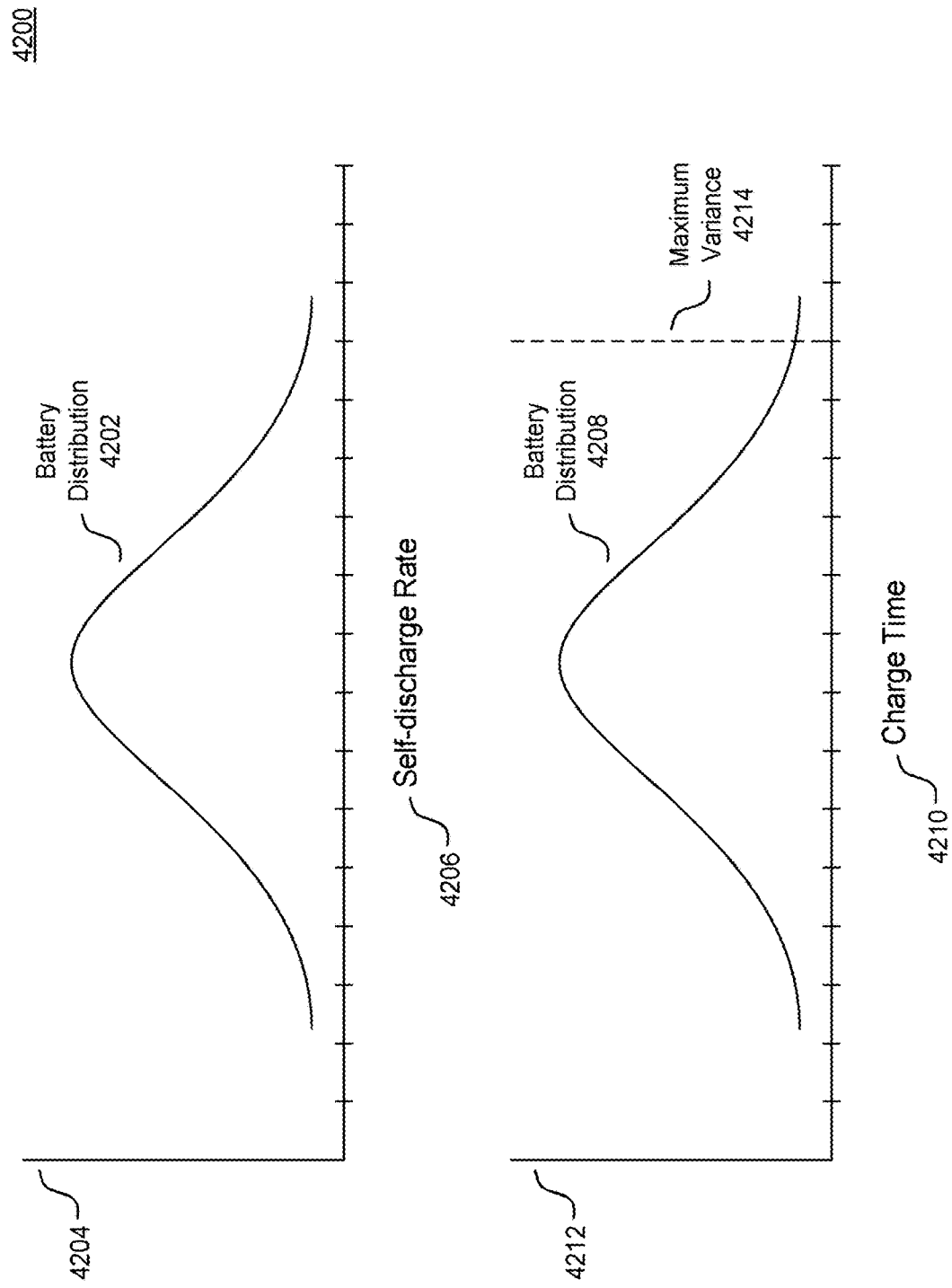

FIG. 42 is a diagram illustrating example distributions of battery packs based on self-discharge rates and charge times according to an embodiment.

Figure 43:
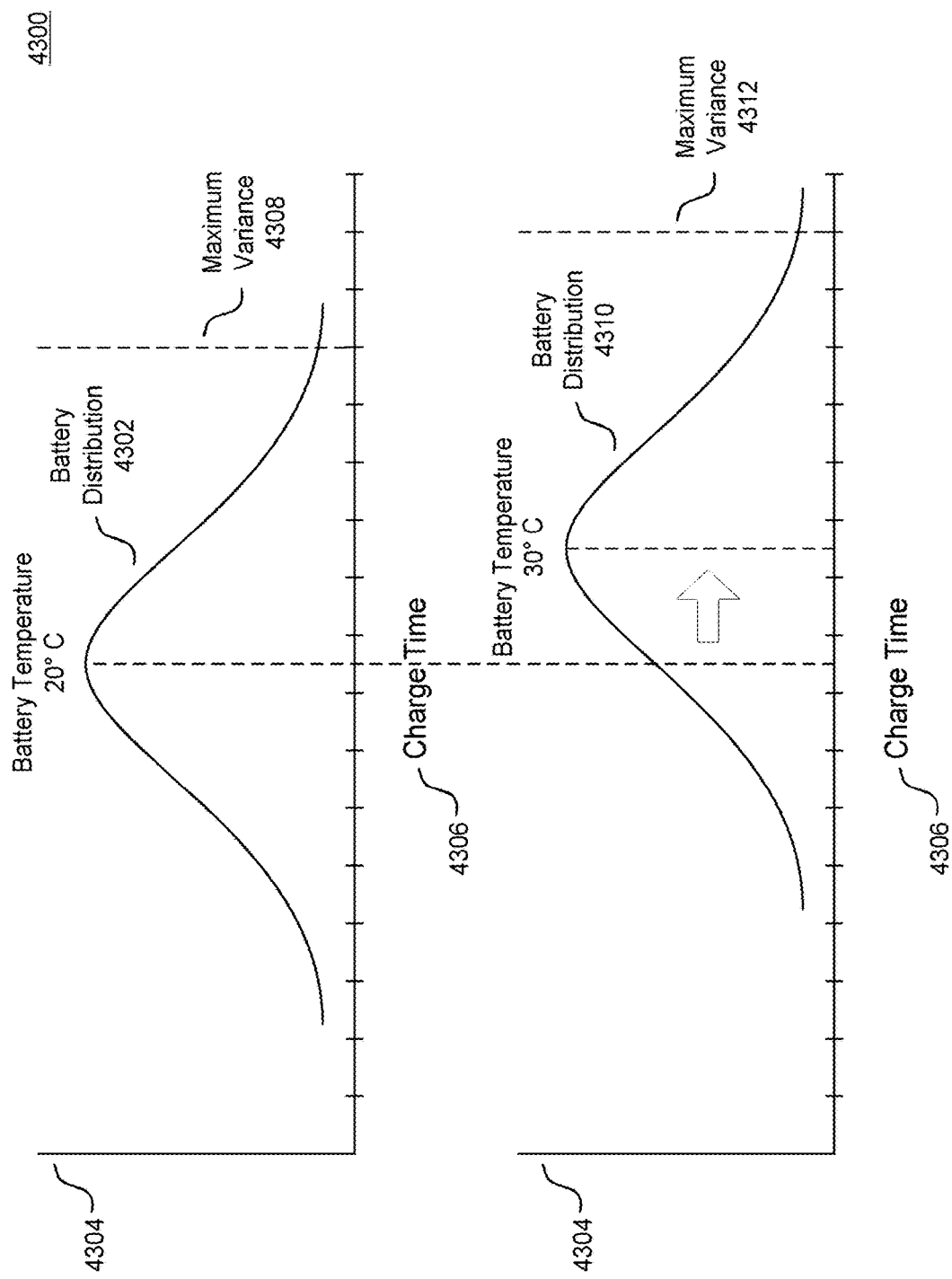

FIG. 43 is a diagram illustrating correlation between temperature and charge time of a battery pack according to an embodiment.

Figure 44:
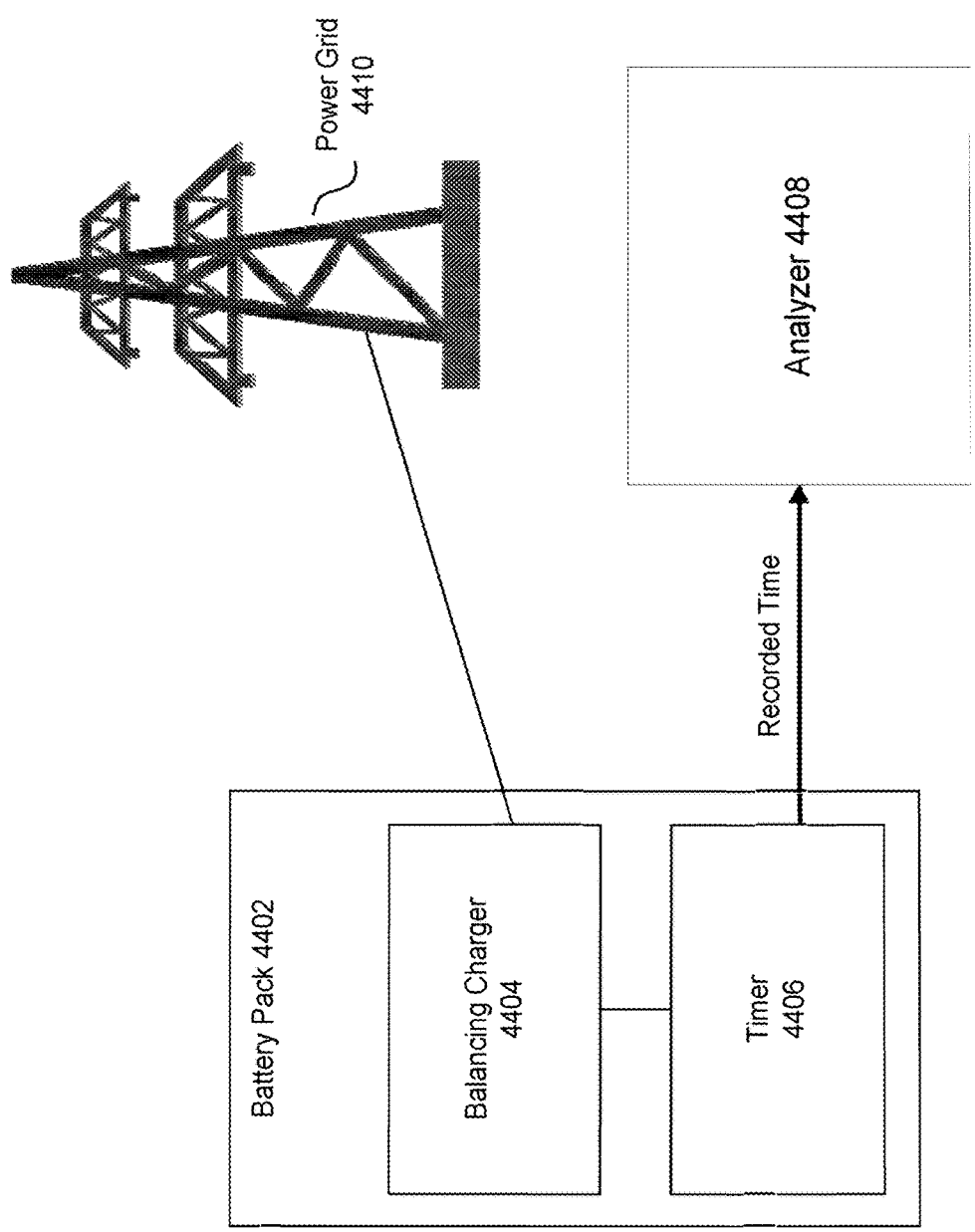

FIG. 44 is a diagram illustrating an example system for detecting a battery pack having an operating issue or defect according to an embodiment.

Figure 45:
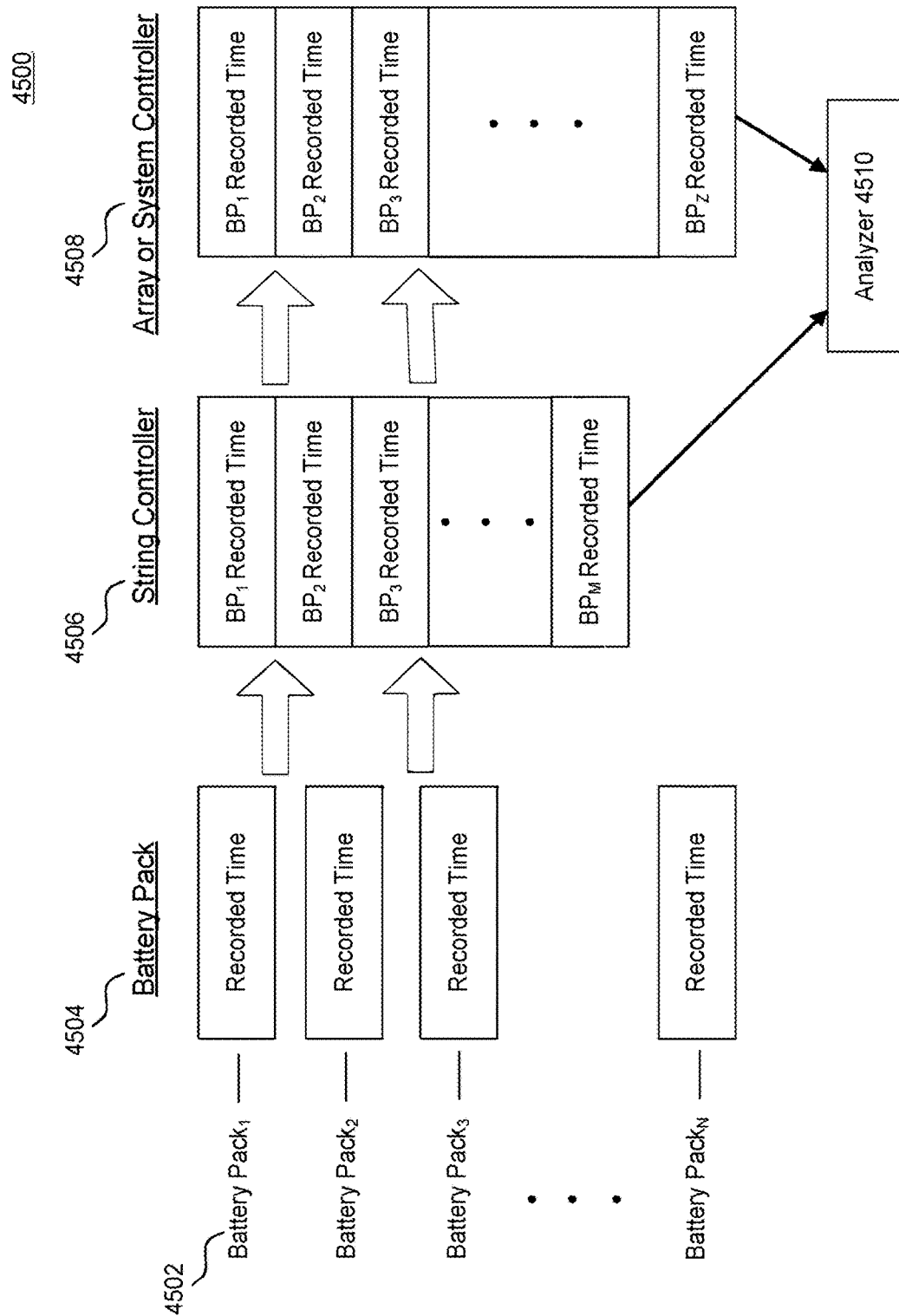

FIG. 45 is a diagram illustrating aggregation of data for analysis from an array of battery packs according to an embodiment.

Figure 46:
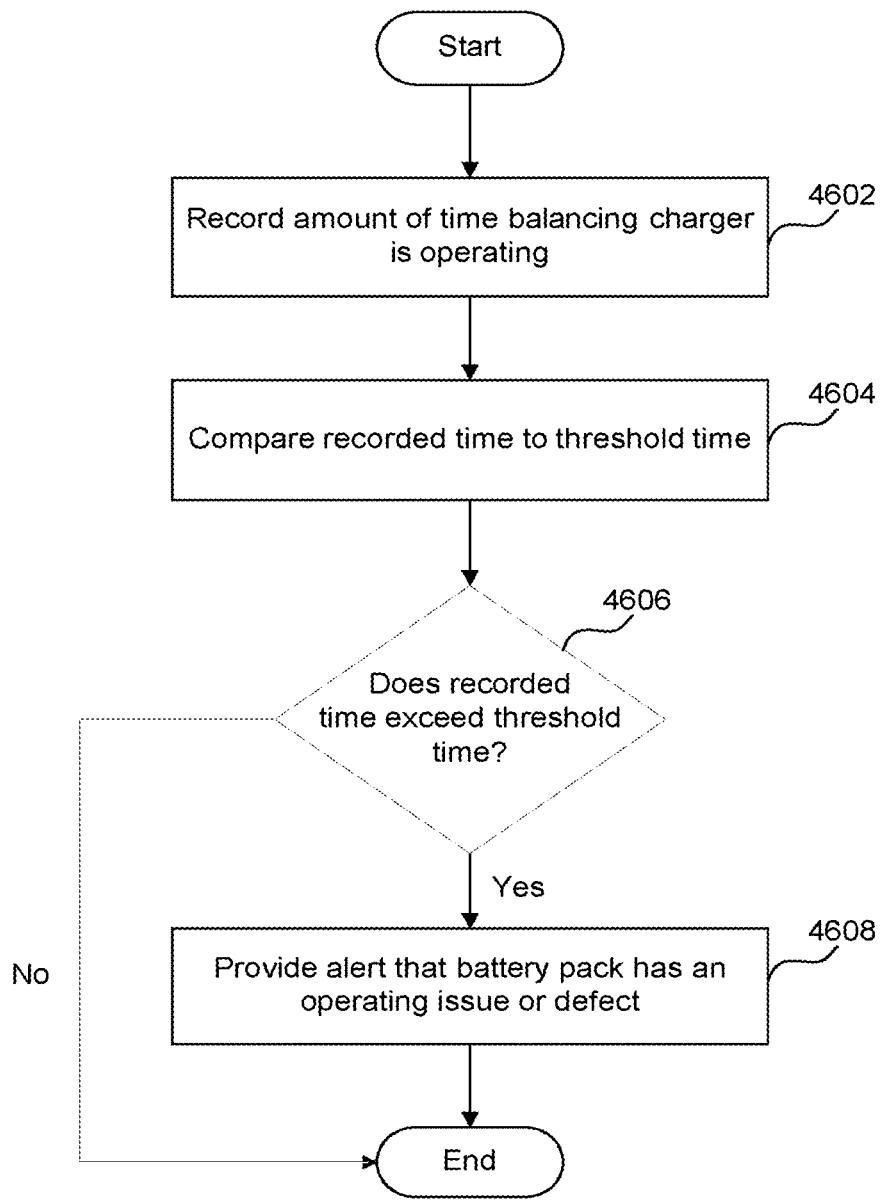

FIG. 46 is a flowchart illustrating an example method for detecting a battery pack having an operating issue or defect according to an embodiment.

Figure 47:
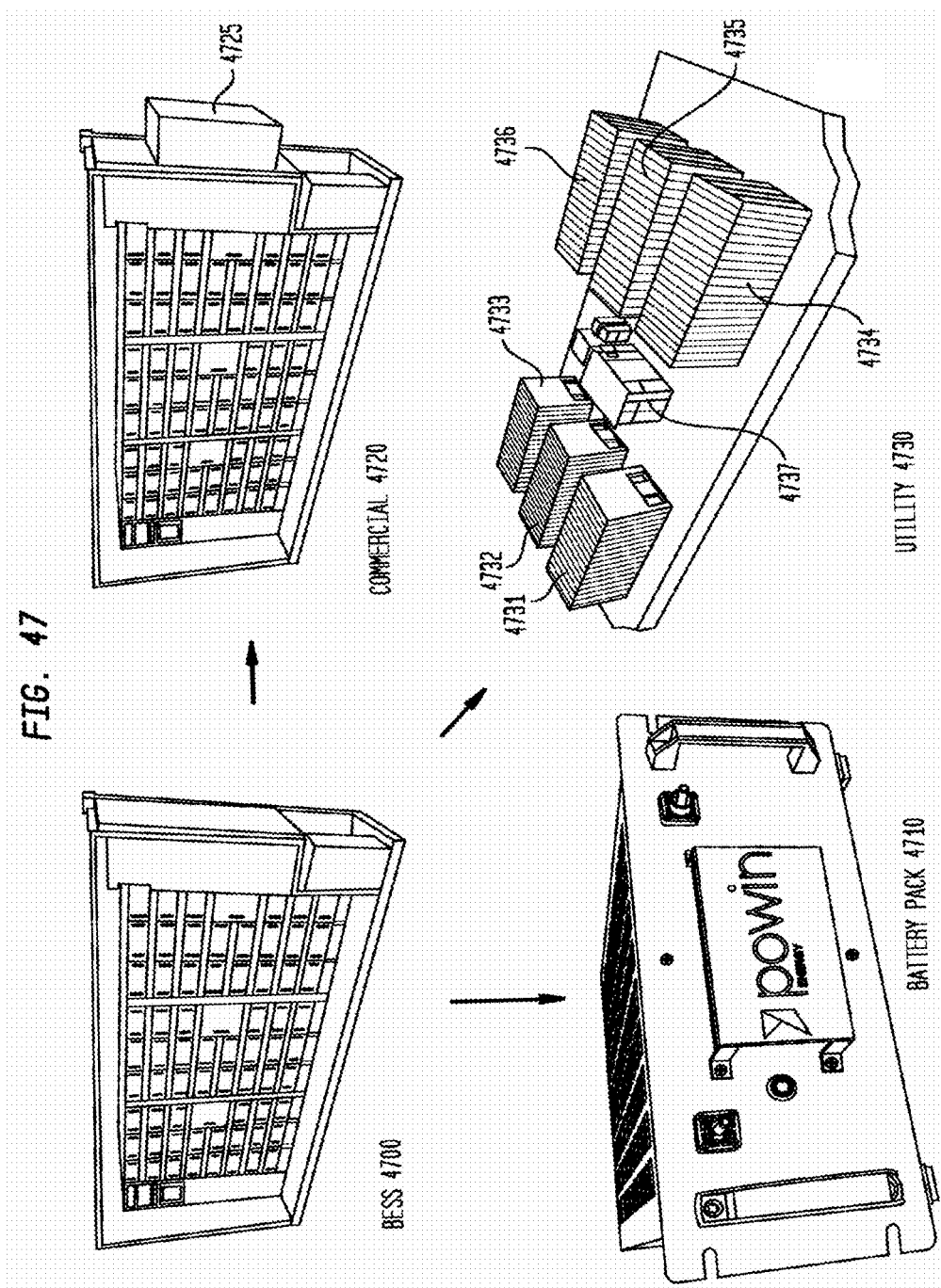

FIG. 47 is a diagram depicting a cross-sectional view of an example BESS and example deployments of one or more BESS units.

Figure 48A:
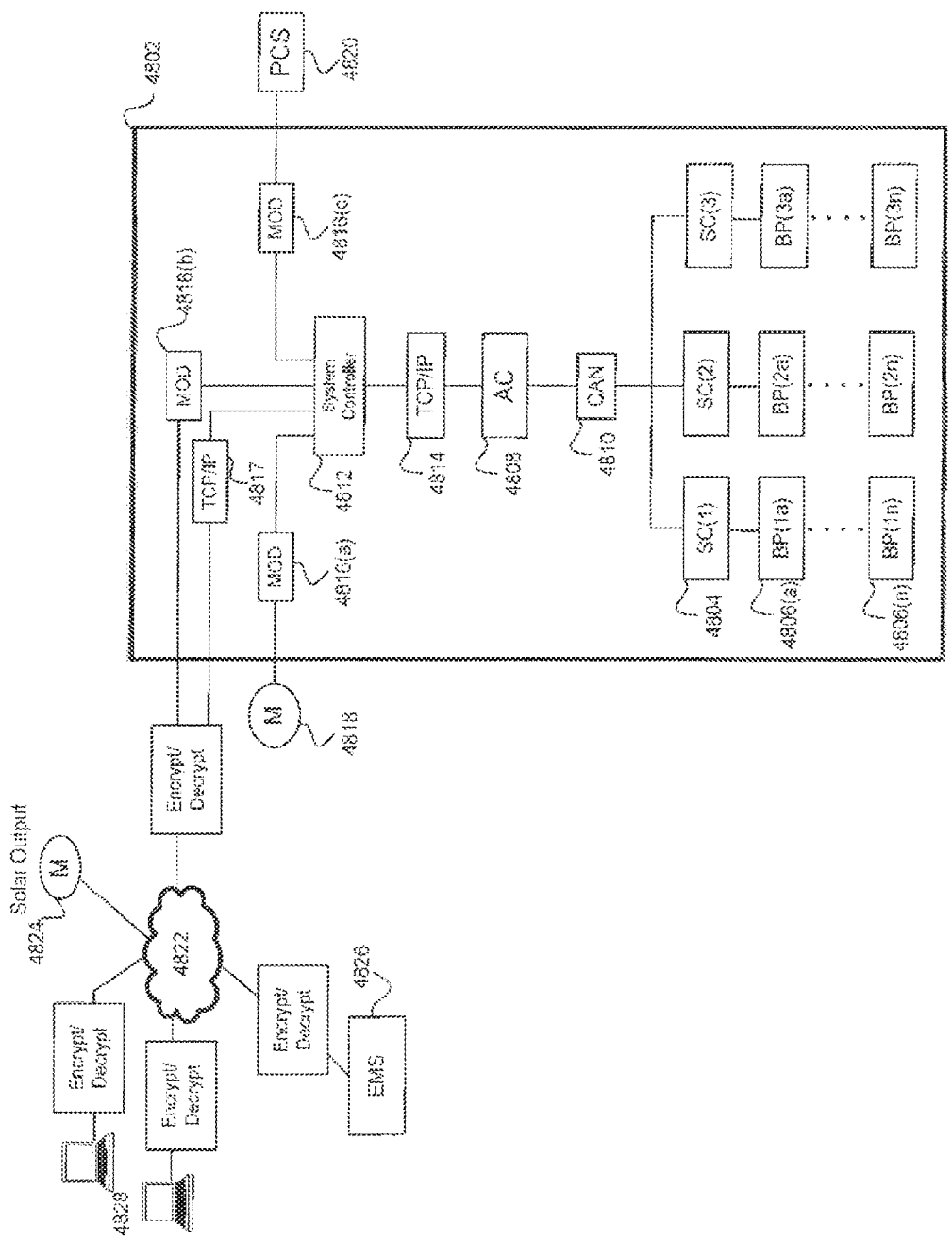

FIG. 48A is a diagram illustrating an example BESS coupled to an example energy system.

Figure 48B:
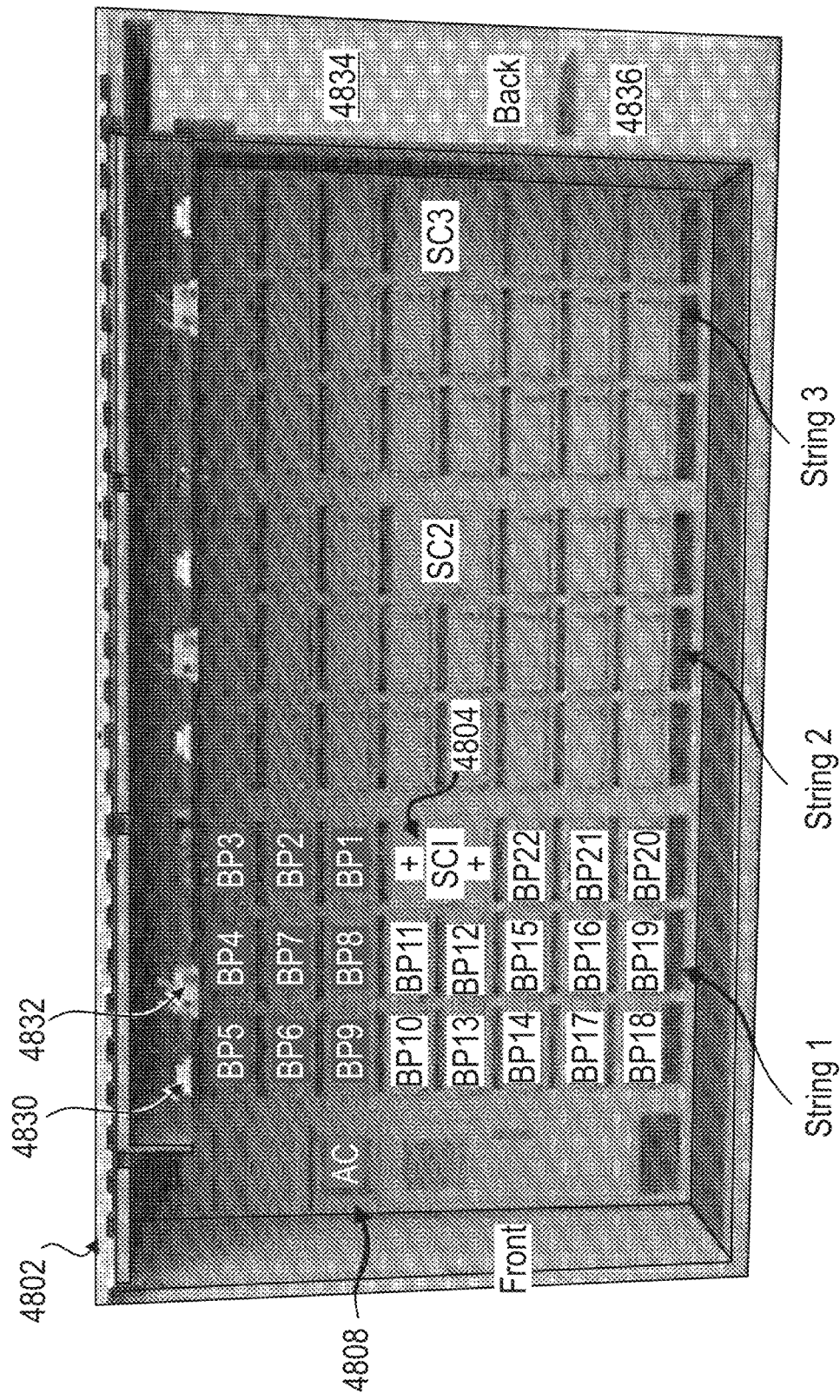

FIG. 48B is a diagram depicting a cross-sectional view of an example BESS.

Figure 49A:
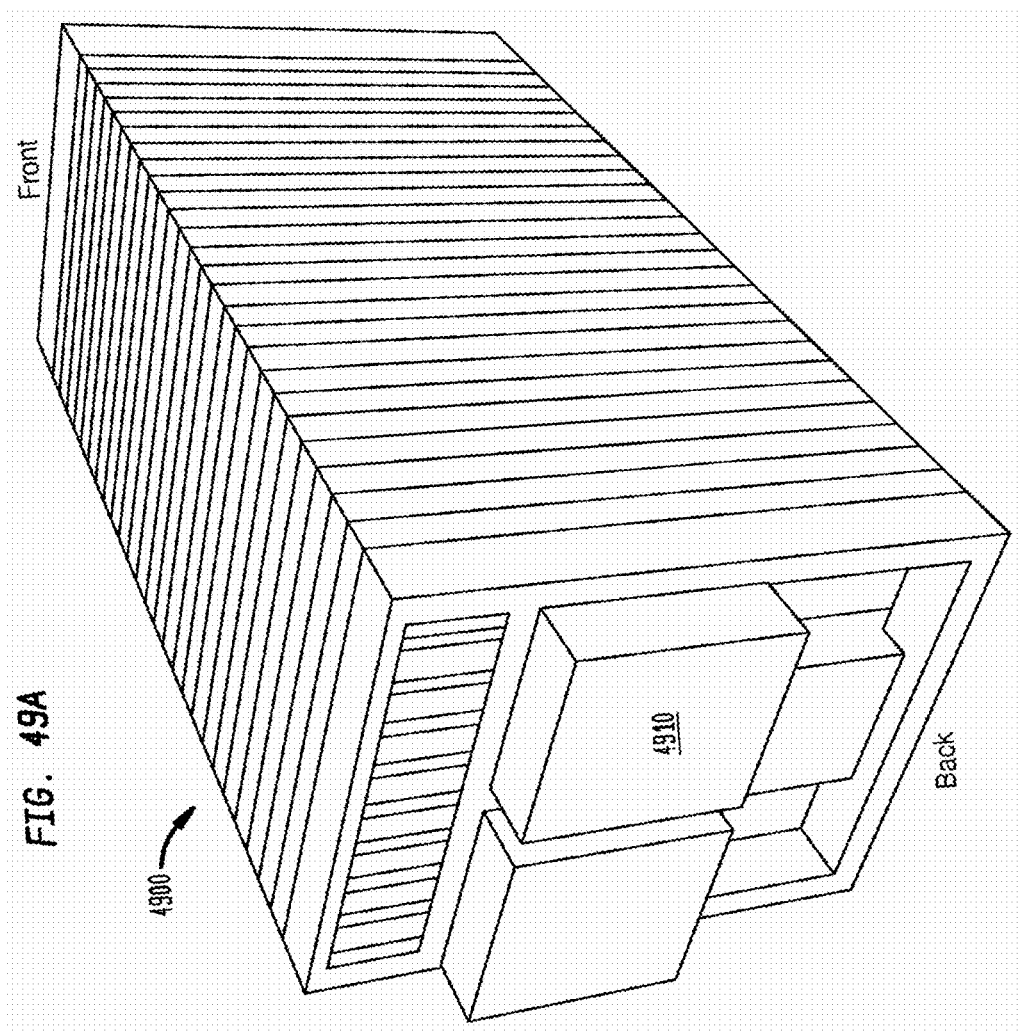

FIGS. 49A, 49B, and 49C are diagrams illustrating the housing of an example BESS.

Figure 50B:
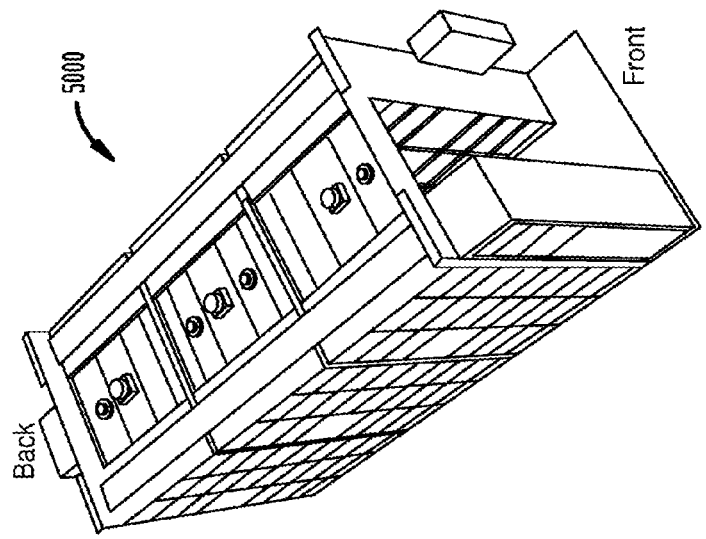
Figure 50A:
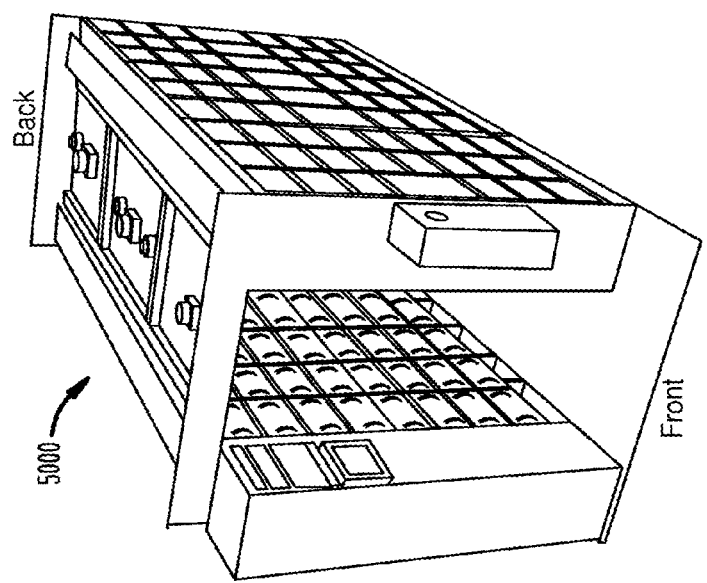
Figure 50C:
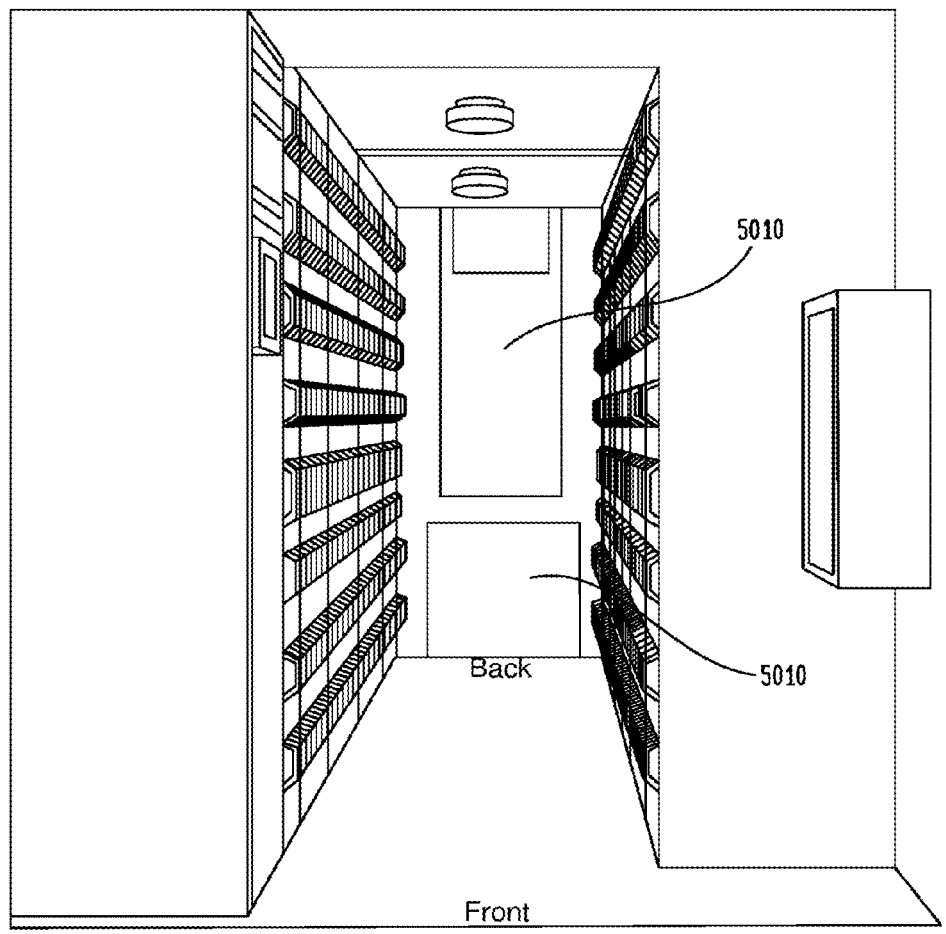

FIGS. 50A, 50B, and 50C are diagrams illustrating an example BESS with its housing removed.

Figure 51:
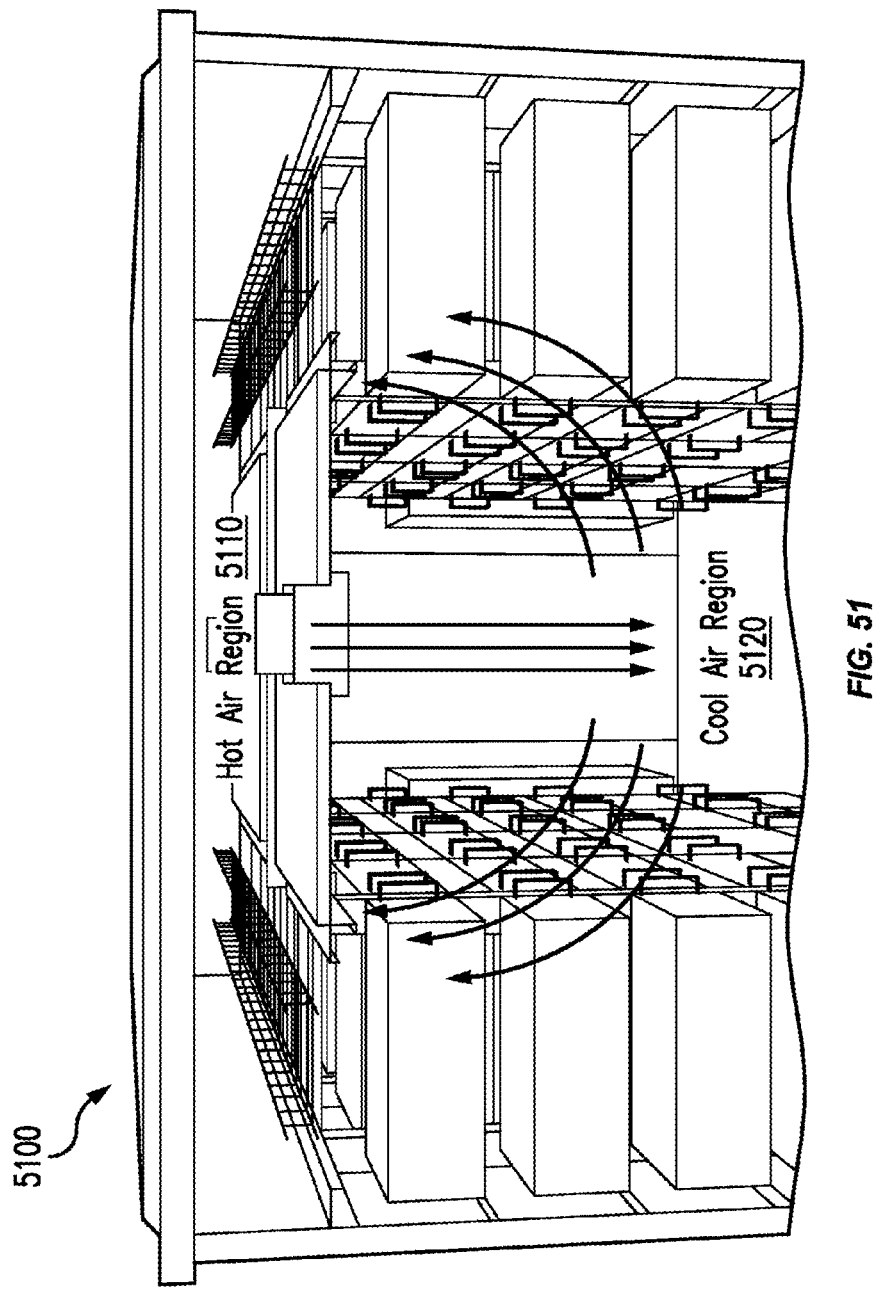

FIG. 51 is a diagram illustrating air flow in an example BESS.

Figure 52A:
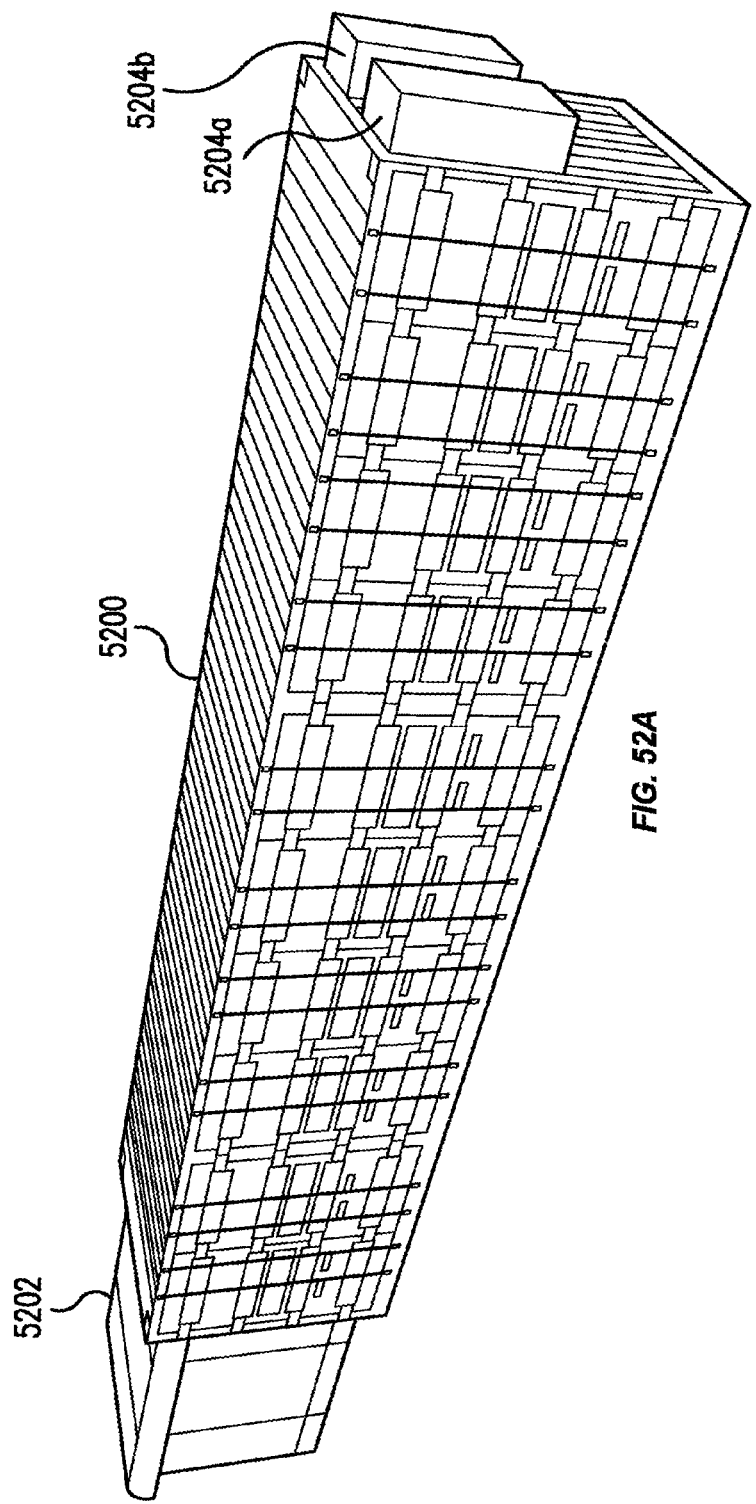
Figure 52B:
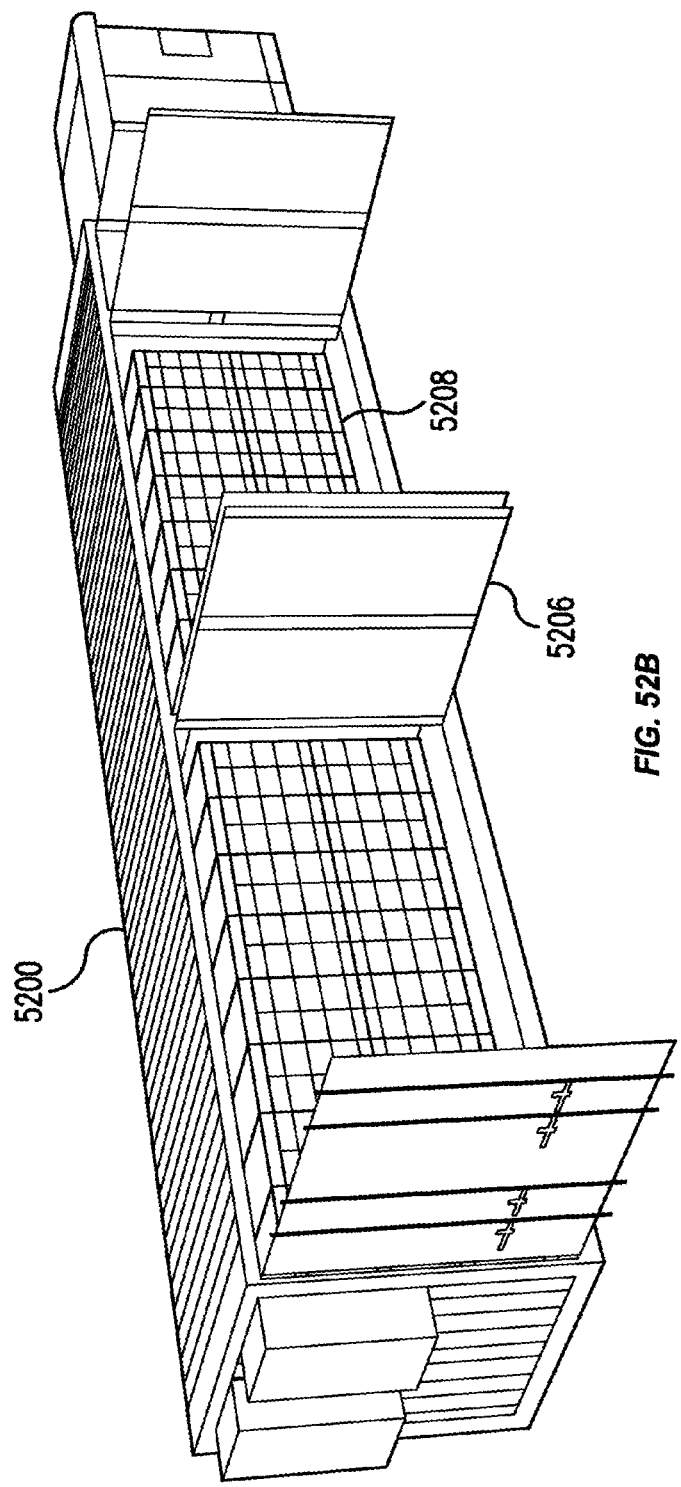

FIGS. 52A and 52B are diagrams illustrating an example BESS coupled to a bi-directional power converter.

Figure 53A:
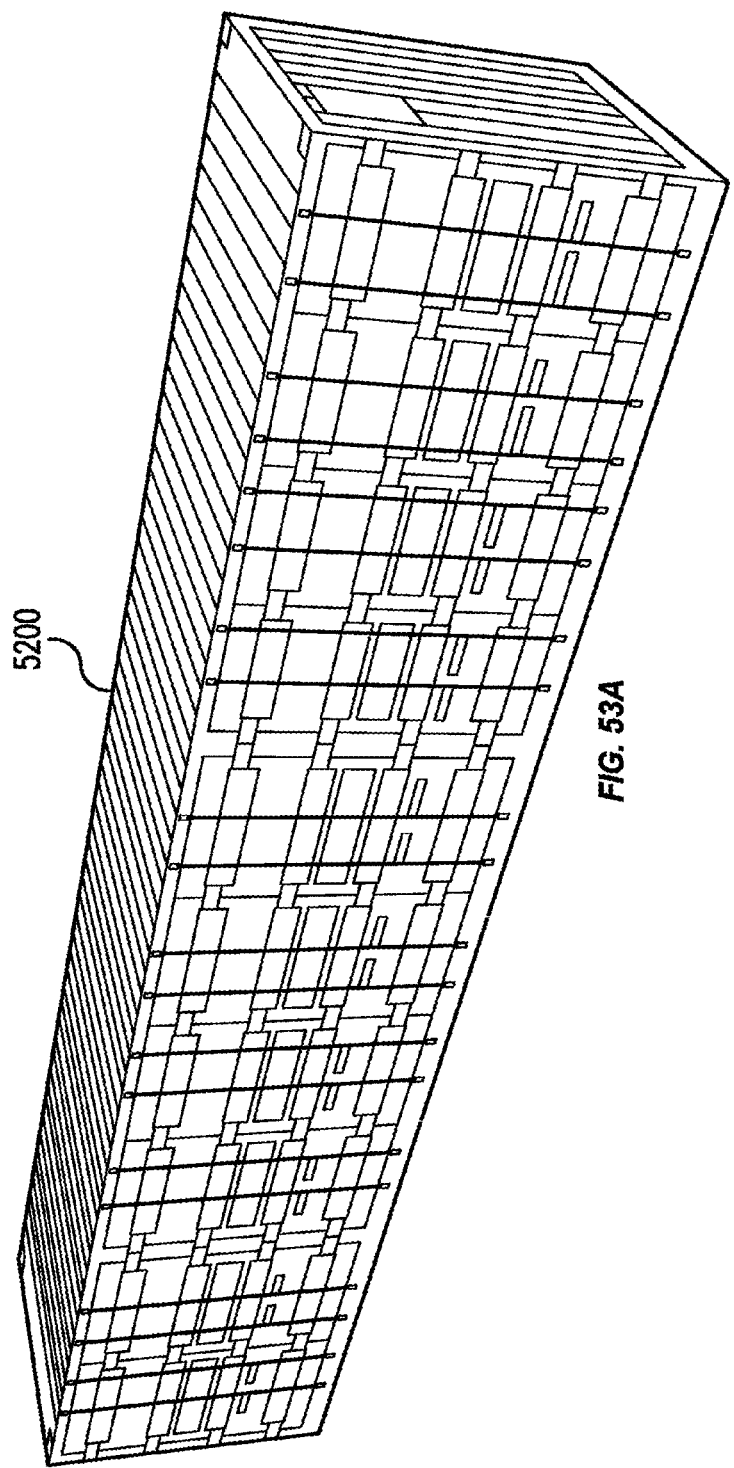
Figure 53B:
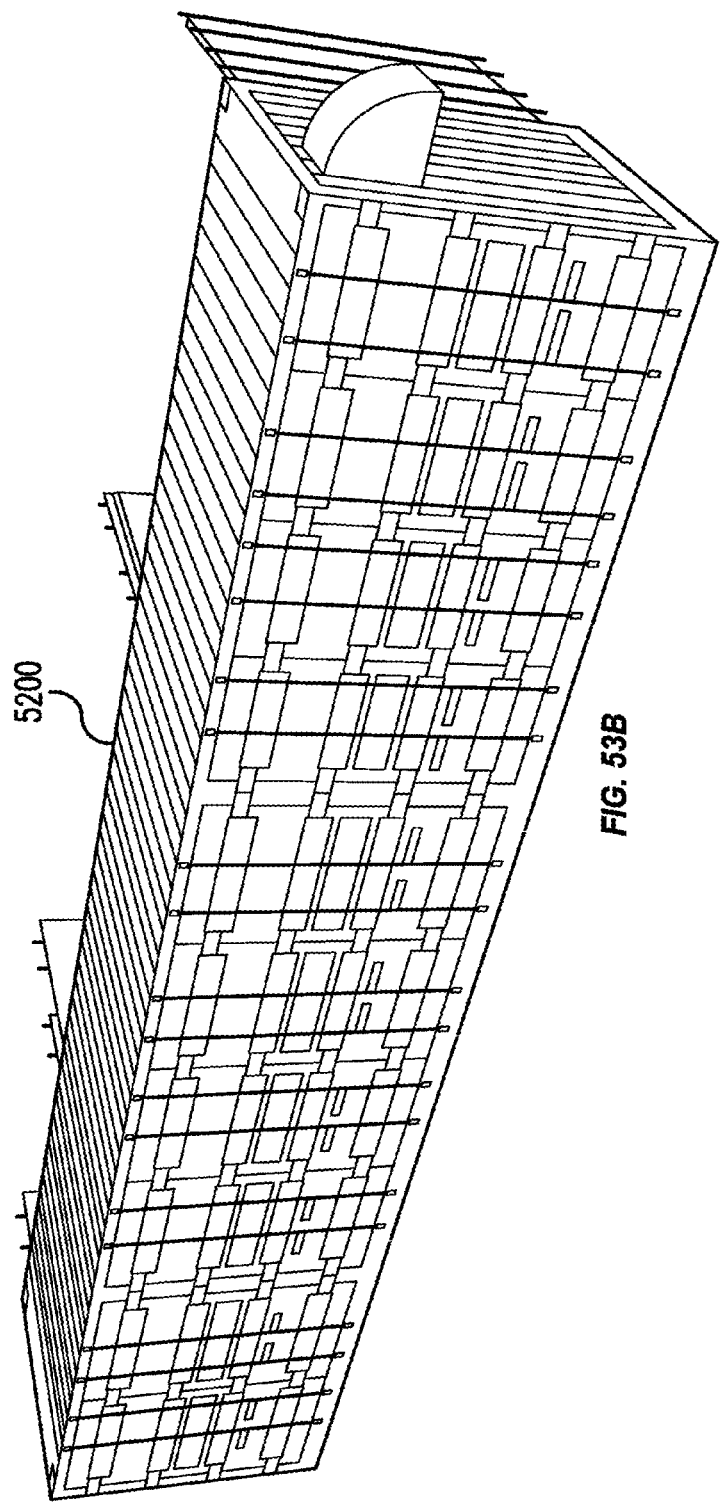

FIGS. 53A and 53B are diagrams illustrating an example BESS.

Figure 54A:
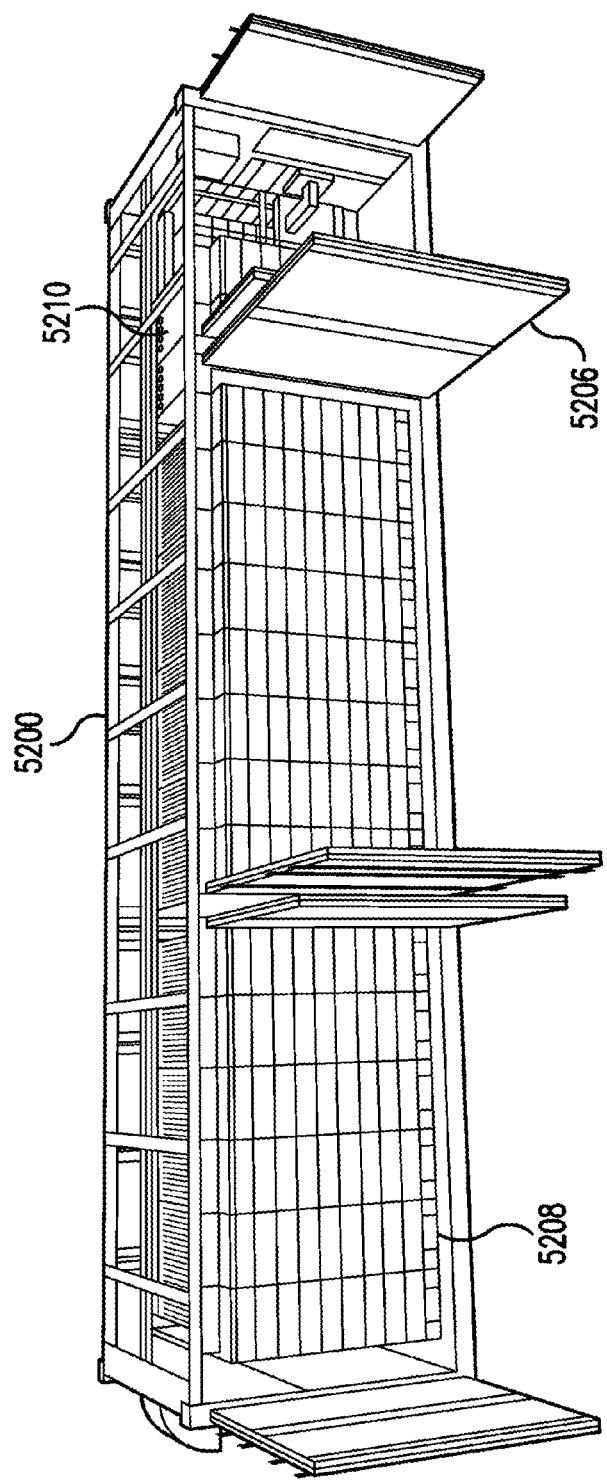
Figure 54B:
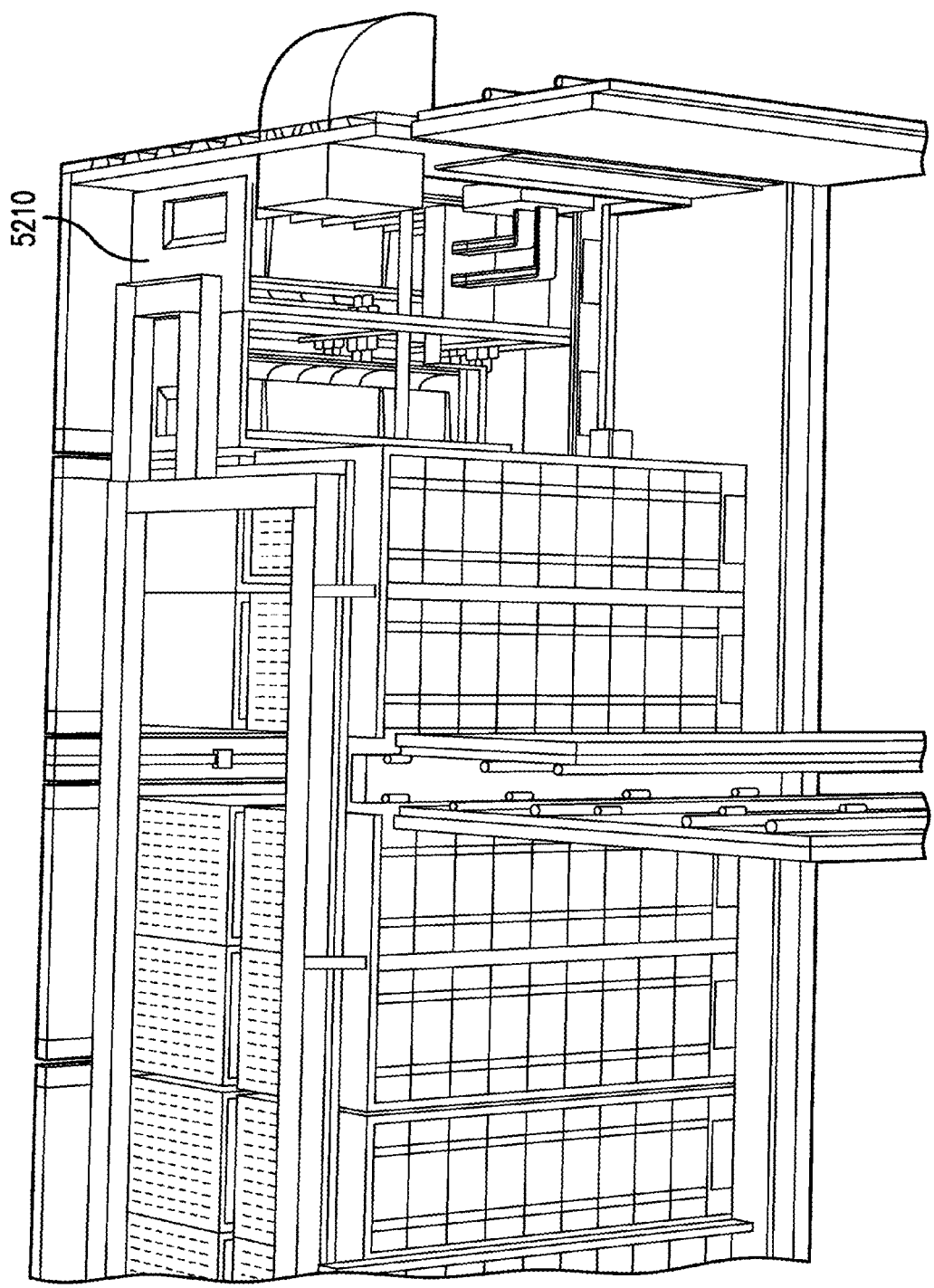
Figure 54C:
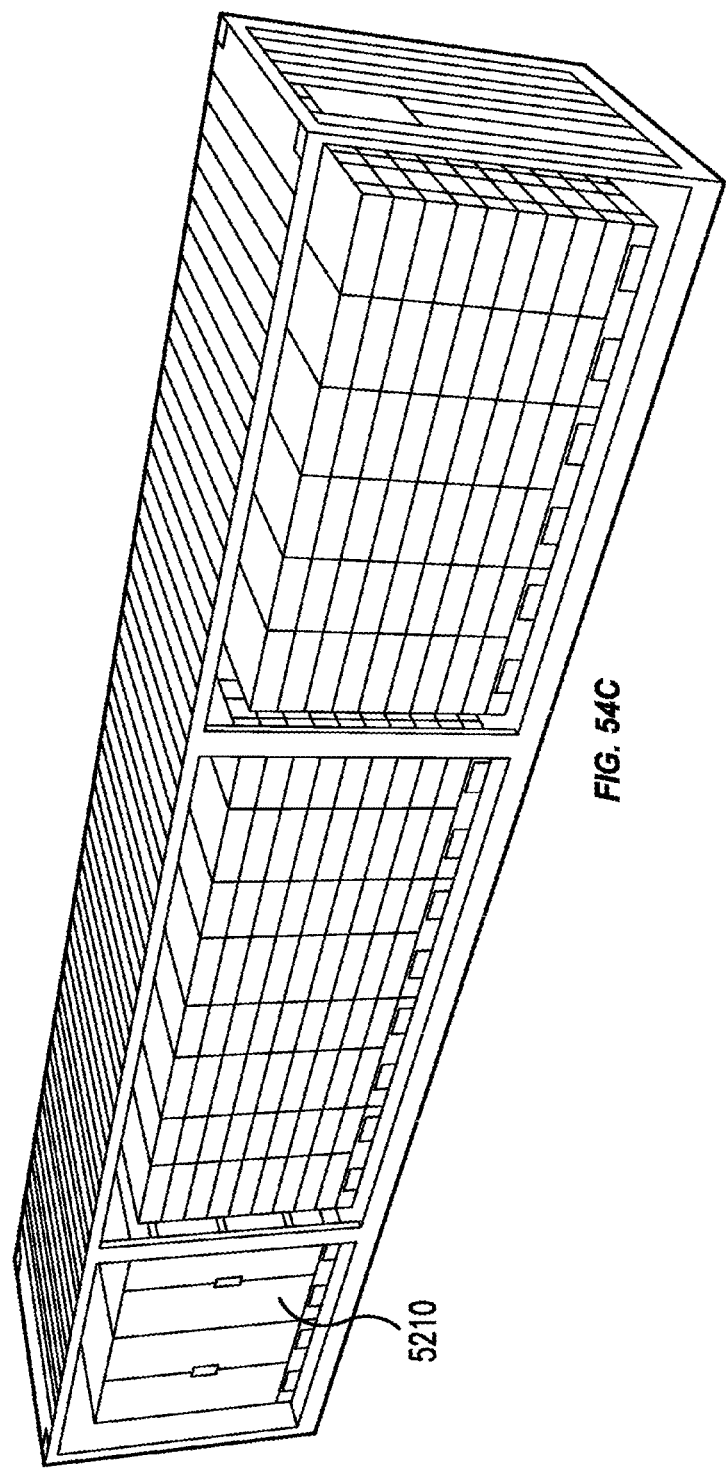

FIGS. 54A, 54B, and 54C are diagrams illustrating an example BESS housed in a modified shipping container.

FIGS. 55A, 55B, 55C, and 55D are diagrams illustrating an example modular, stackable BESS.

FIGS. 56A, 56B, 56C, 56D, and 56E are diagrams illustrating an example modular, stackable battery stack.

FIGS. 57A, 57B, 57C, 57D, 57E, and 57F are diagrams illustrating an example modular, stackable battery pack or battery unit.

Figure 58A:
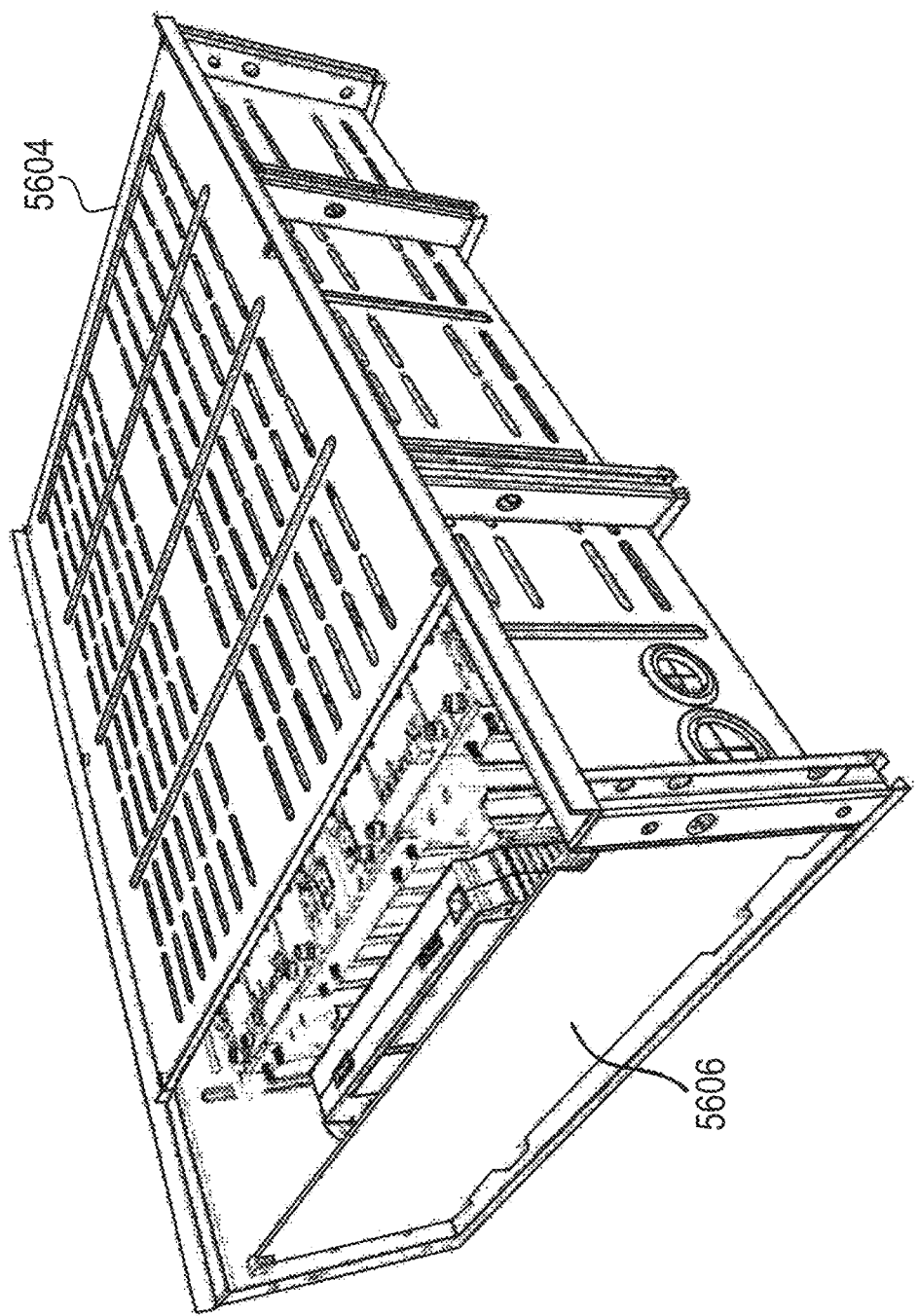
Figure 58B:
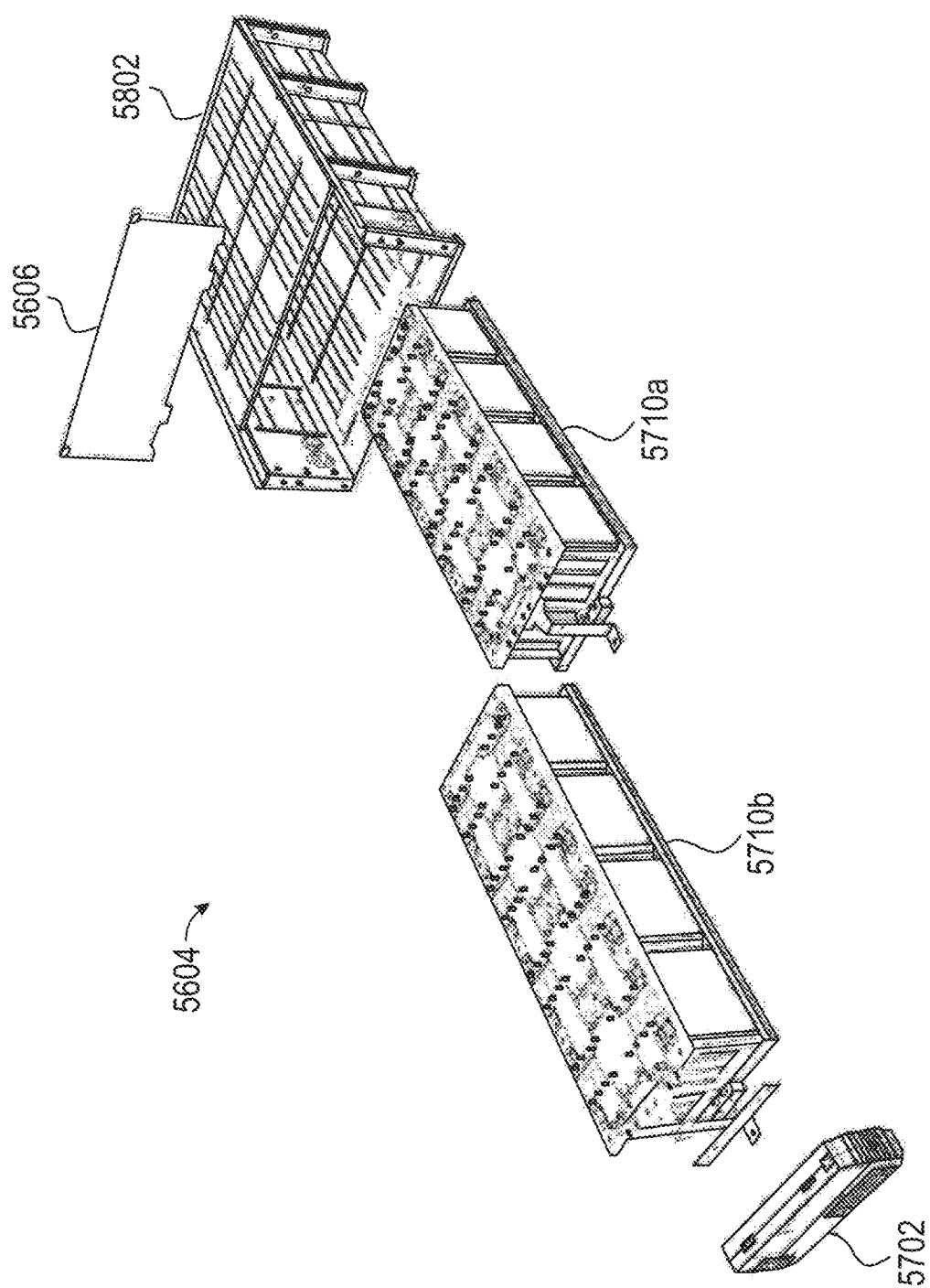
Figure 58C:
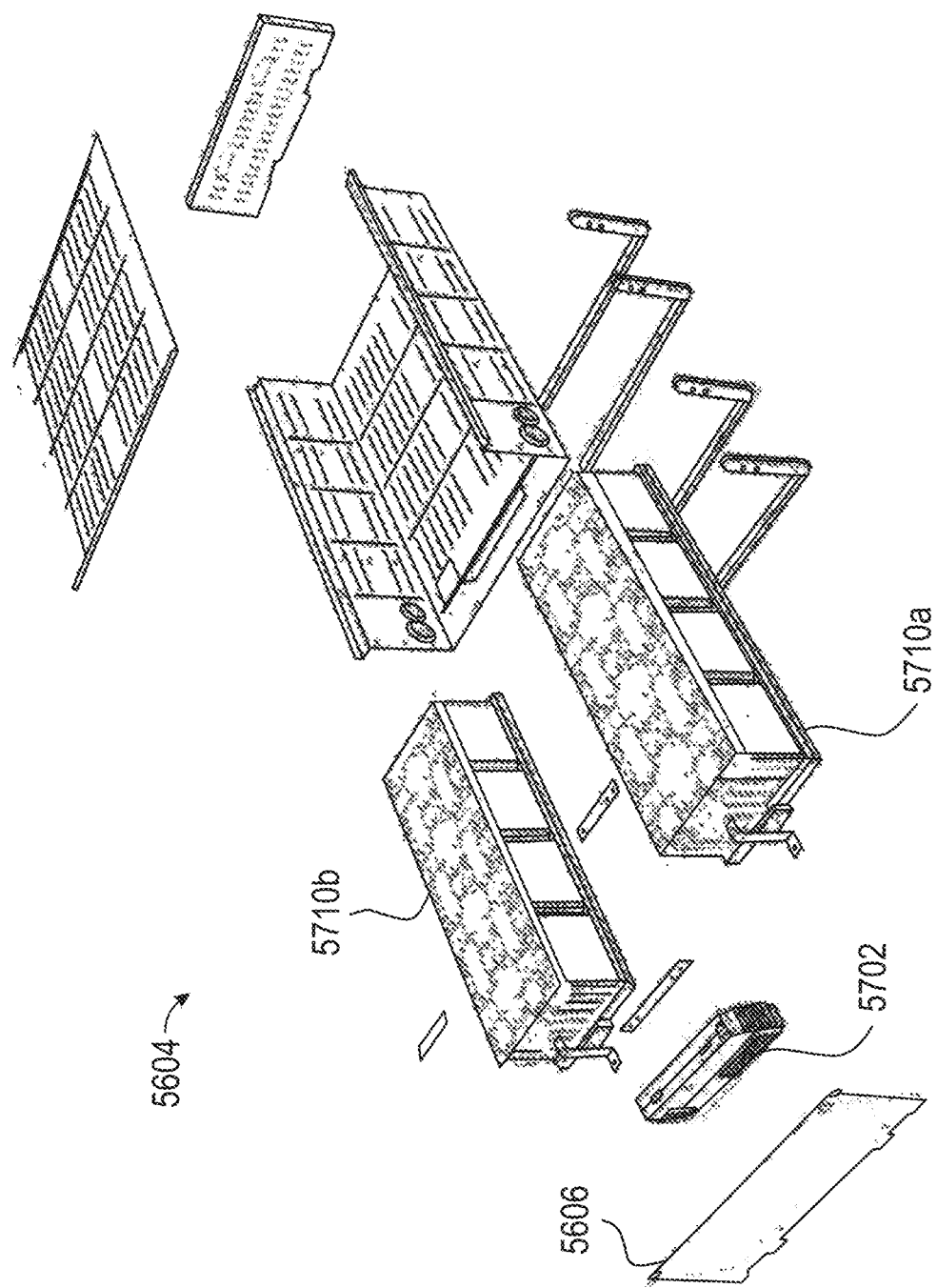

FIGS. 58A, 58B, and 58C are diagrams illustrating an example modular, stackable battery pack or battery unit.

Figure 59A:
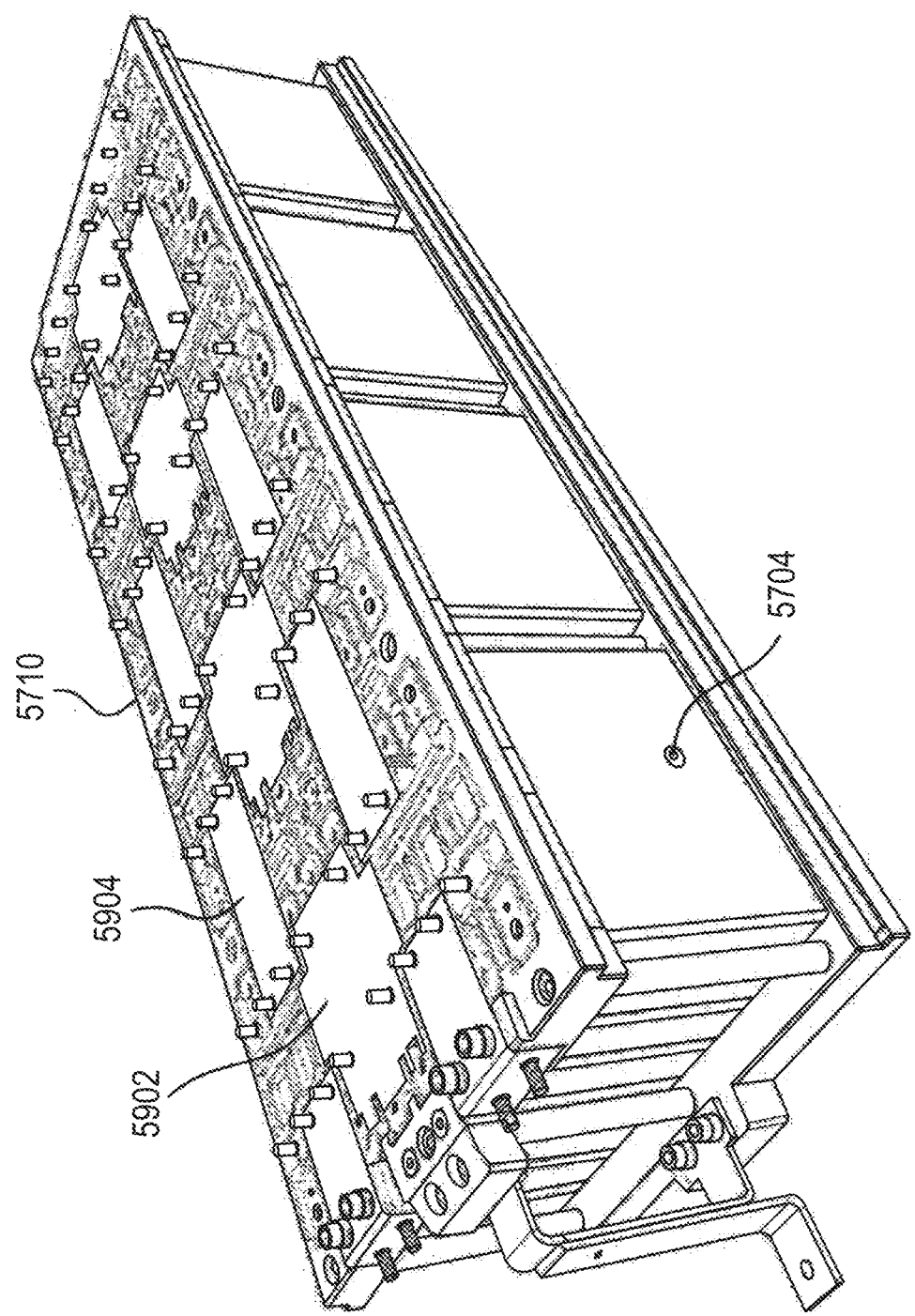
Figure 59B:
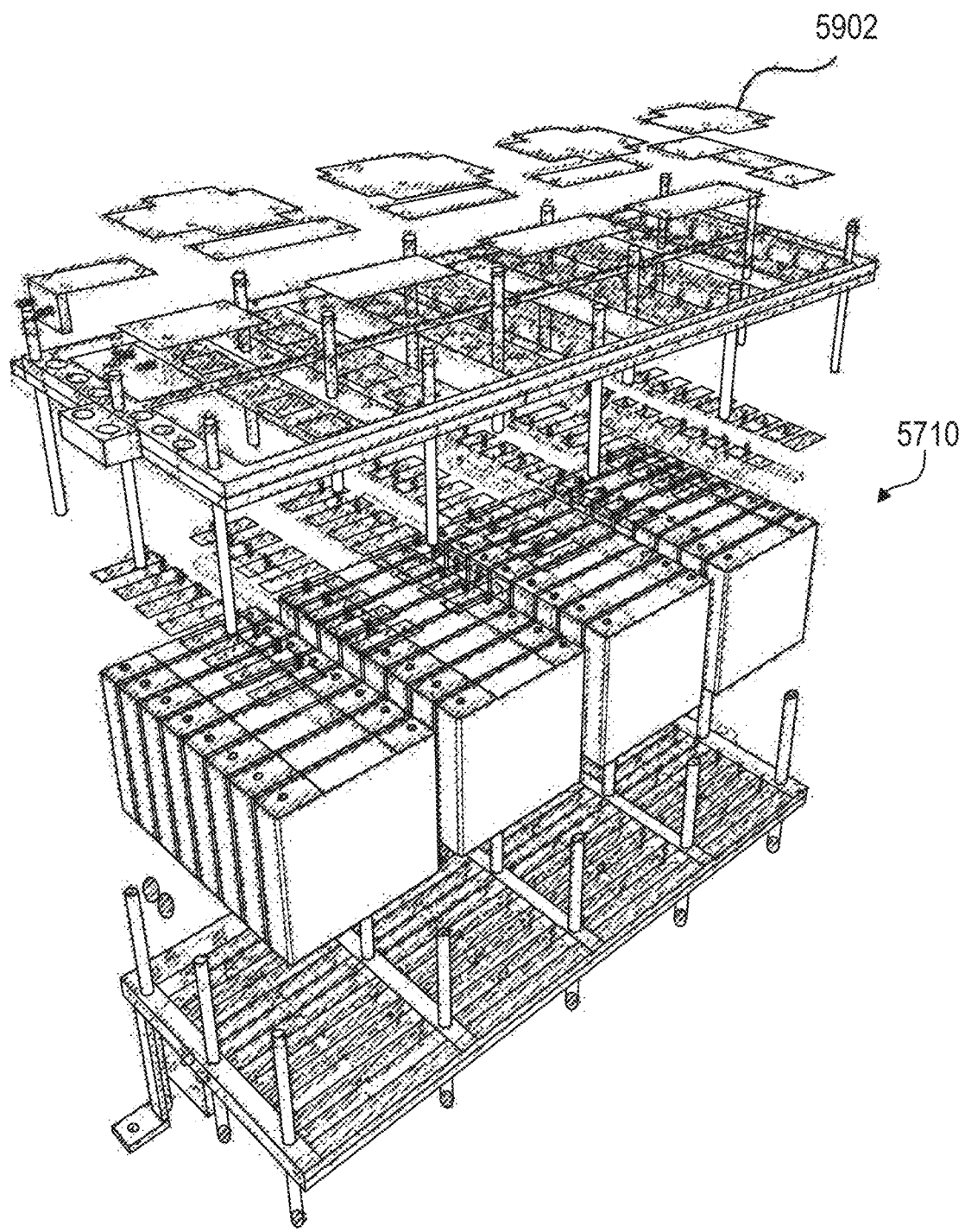
Figure 59C:
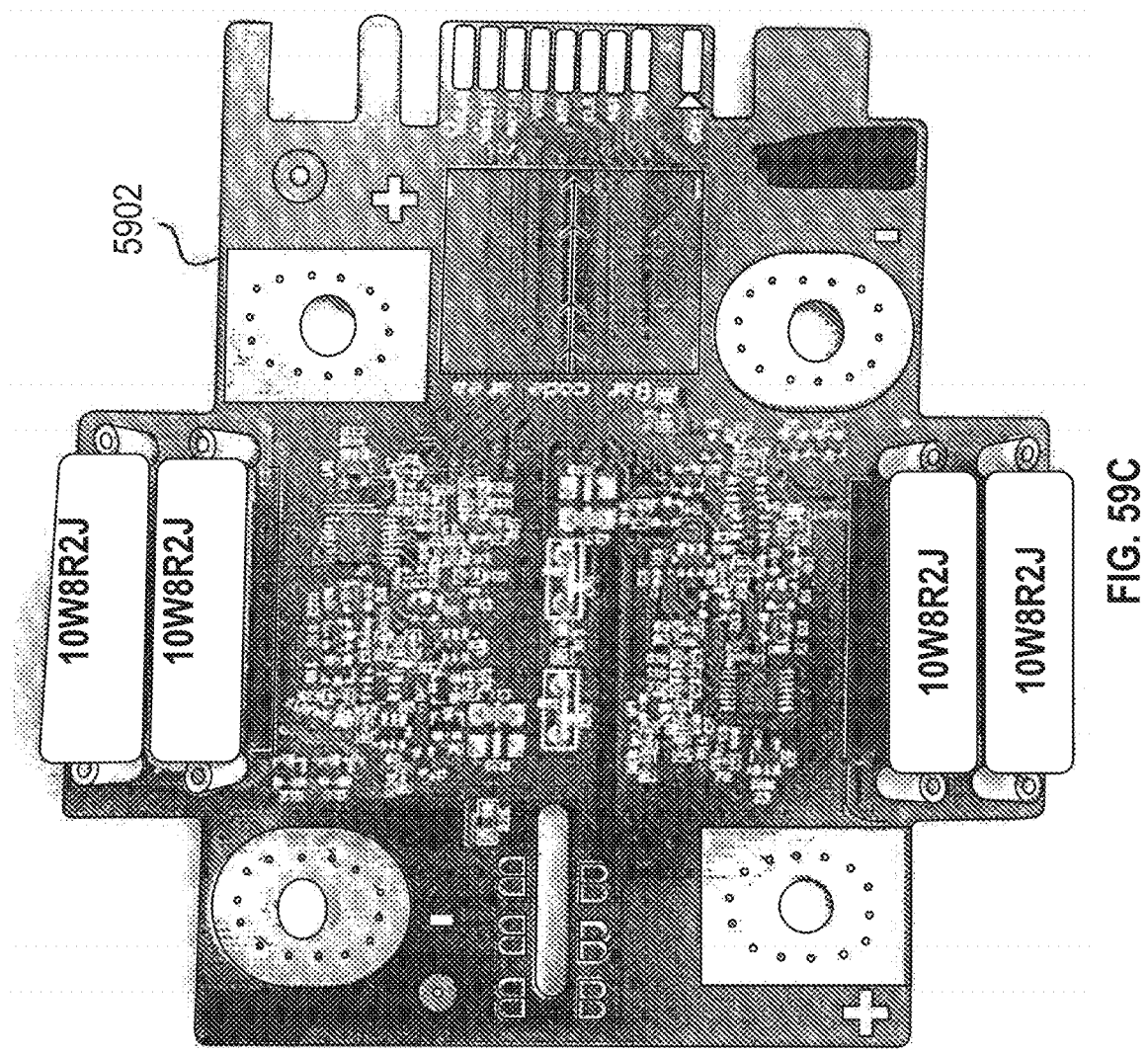

FIGS. 59A, 59B, and 59C are diagrams illustrating an example battery assembly for a modular, stackable battery pack or battery unit.

Figure 60A:
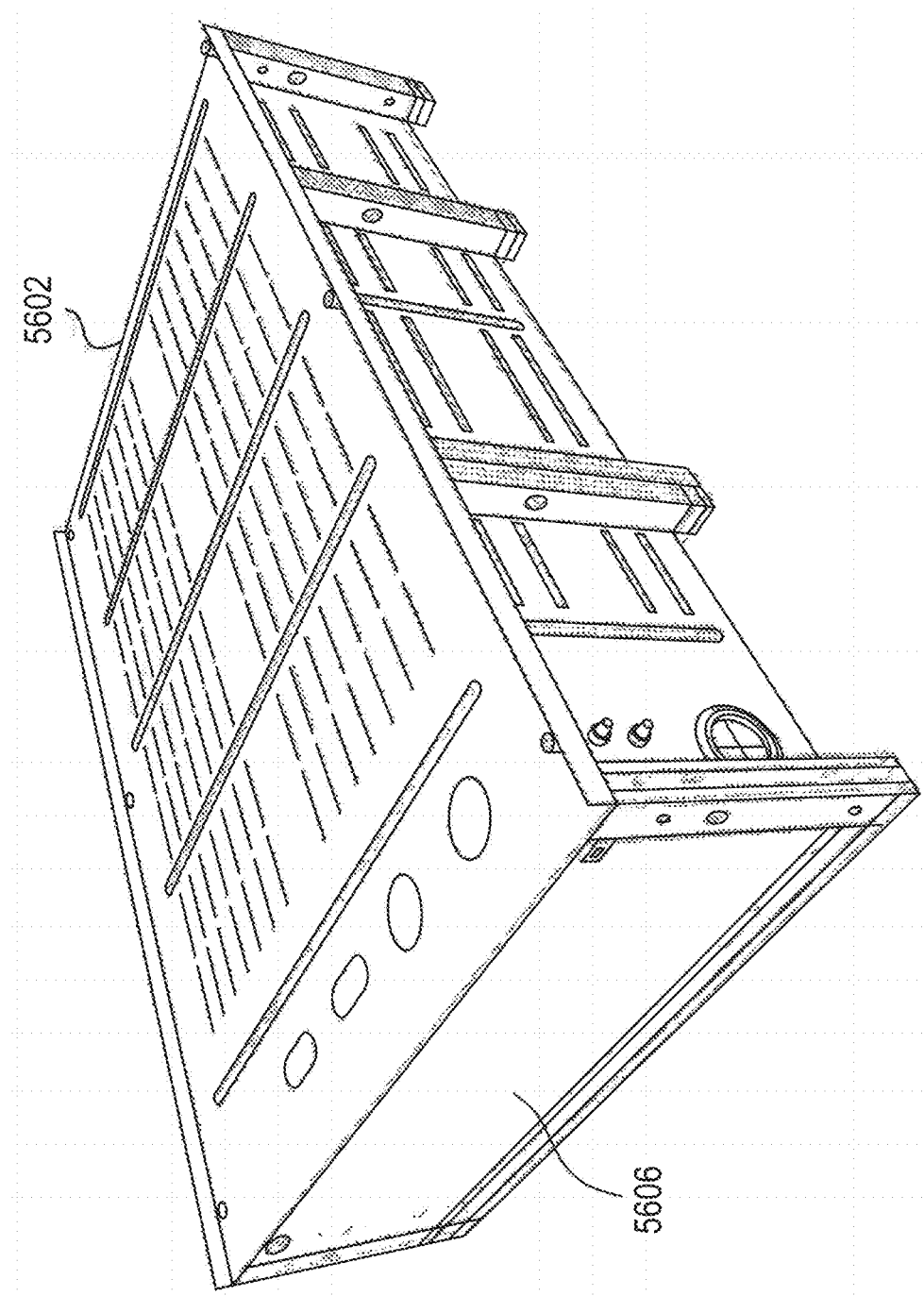
Figure 60B:
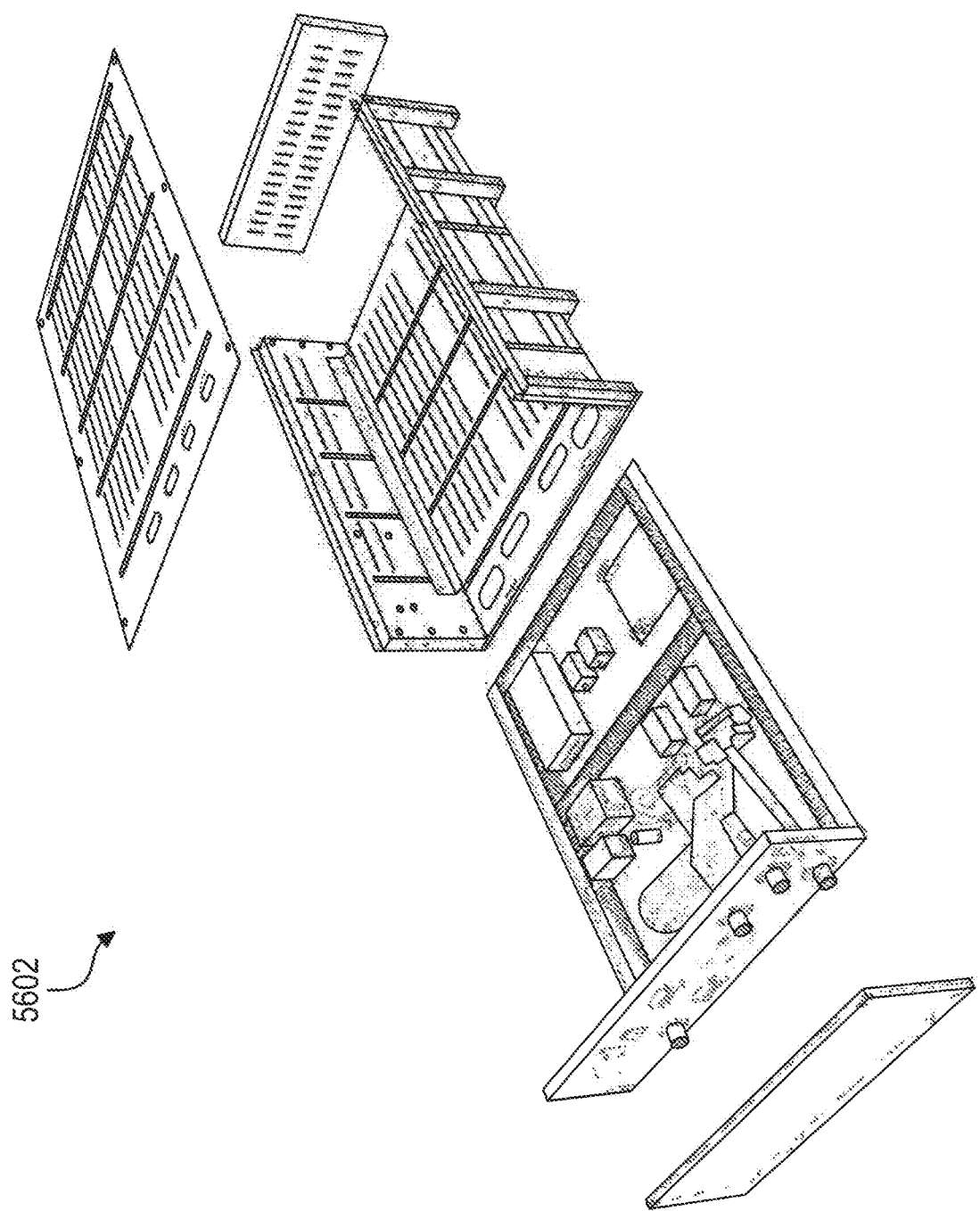

FIGS. 60A and 60B are diagrams illustrating an example battery stack controller or battery string controller.

FIGS. 61A, 61B, 61C, and 61D are diagrams illustrating an example battery pack controller.

Embodiments are described with reference to the accompanying drawings/figures. The drawing in which an element first appears is typically indicated by the leftmost digit or digits in the corresponding reference number.

DETAILED DESCRIPTION

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Figure 1A:
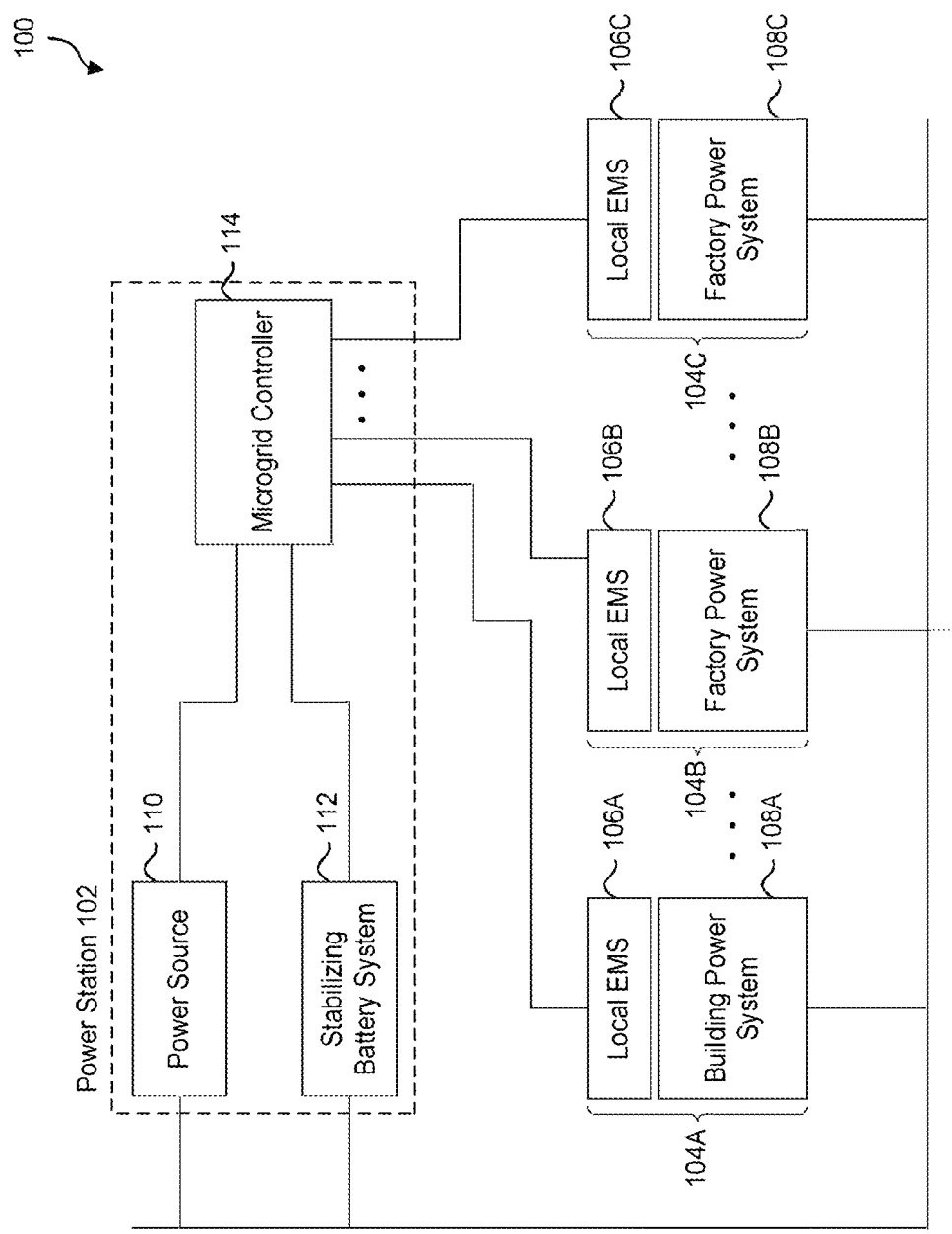
FIG. 1E is a diagram illustrating a local power system for use in a microgrid power system, according to an embodiment.
FIG. 1F is a diagram illustrating an example factory, according to an embodiment.
FIG. 1G is another diagram illustrating an example factory, according to an embodiment.
FIG. 1H is a diagram illustrating an example battery container, according to an embodiment.
FIG. 1I is a diagram illustrating an example state of charge of a battery energy storage system used within a microgrid power system.

FIG. 1A is a diagram illustrating an example microgrid power system 100, according to an embodiment. Microgrid power system 100 includes a power station 102 configured to provide power to one or more load centers 104, such as factories or other buildings desiring stable power. Power station 102 includes a power source 110 coupled to a stabilizing battery system 112, and a microgrid controller 114. In some embodiments, power source 110, stabilizing battery system 112, and microgrid controller 114 may reside in the same geographical location or may be geographically distributed. Power station 102 is coupled to provide AC power to load centers 104. Each load center 104 includes a local energy management system (EMS) 106 and a local power system 108. For example, load center 104A includes an EMS 106A and a building power system 108A; load center 104B includes an EMS 106B and a factory power system 108B; and load center 104C includes an EMS 106C and a factory power system 108C.

In an embodiment, stabilizing battery system 112 may include a plurality of battery packs connected via a common DC bus. Stabilizing battery system 112 may be used to both control the quality of AC power supplied by power source 110 and further provide AC power to load centers 104. In some embodiments, power source 110 may include solar sources, wind turbine sources, hydroelectric sources, and/or internal combustion engine sources. Power generation from power source 110 may vary, and thus stabilizing battery system 112 may be employed to provide stable AC power from power station 102 to load centers 104. Stabilizing battery system 112 may be charged by power source 110 during times of excess power generation, and stabilizing battery system 112 may provide supplementary AC power when power generation from power source 110 is low, for example during the night or overcast days in the case of solar power.

In an embodiment, each load center 104 may include a corresponding local EMS 106 and local power system 108. Each local energy management systems 106 may control, based on AC power availability from power source 110, battery system 112, or local batteries of the load center 108, as well as power consumption of other load centers 104, to connect and/or disconnect non-critical loads in order to adjust the overall load power consumption. Further details of each load center are discussed with respect to FIG. 1E.

Microgrid controller 114 may monitor and coordinate the overall operation of power station 102 and load centers 104 to provide AC power to the one or more load centers. In an embodiment, microgrid controller 114 monitors the state of charge of stabilizing battery system 112. This monitoring may include, for example, recording rates of charge and discharge of batteries within stabilizing battery system 112, as well as determining when batteries need charging or balancing. Microgrid controller 114 may also monitor the state of charge of local battery storage within, and the load requirements of, each load center 104. Additionally, microgrid controller 114 may monitor the amount of AC power output by power source 110.

In an embodiment, microgrid controller 114 may determine, for each load center 104, an amount of AC power that may be consumed by the load center in supplying any active loads (e.g., lighting, HVAC systems, machinery, etc.) as well as to charge local batteries of a load center 104 (e.g., local batteries of a power system 108). This determination by microgrid controller 114 may be based on a number of factors, such as the current loads being drawn by each load center 104, the state of charge of the local battery storage at each load center 104, the state of charge of stabilizing battery system 112, and the amount of AC power currently being provided by power source 110. For example, if a large amount of AC power is being produced by power source 110 and if the state of charge of stabilizing battery system 112 is high, more power may be used for charging the local batteries of one or more of load centers 104. Microgrid controller 114 sends instructions to stabilizing battery system 112 and local EMSs 106 to implement this control.

Microgrid controller 114 may also implement a priority scheme in providing power to load centers 104. For example, a particular load center 104 (e.g., a hospital) may be given priority in receiving more power from power station 102 when there is insufficient power from power station 102 to meet the requirements of all load centers 104. Microgrid controller 104 may implement such a priority scheme to limit the load consumed by certain load centers 104 by, for example, instructing the local EMSs 106 of such load centers 104 to turn OFF certain loads and/or not to charge local batteries.

Figure 1B:
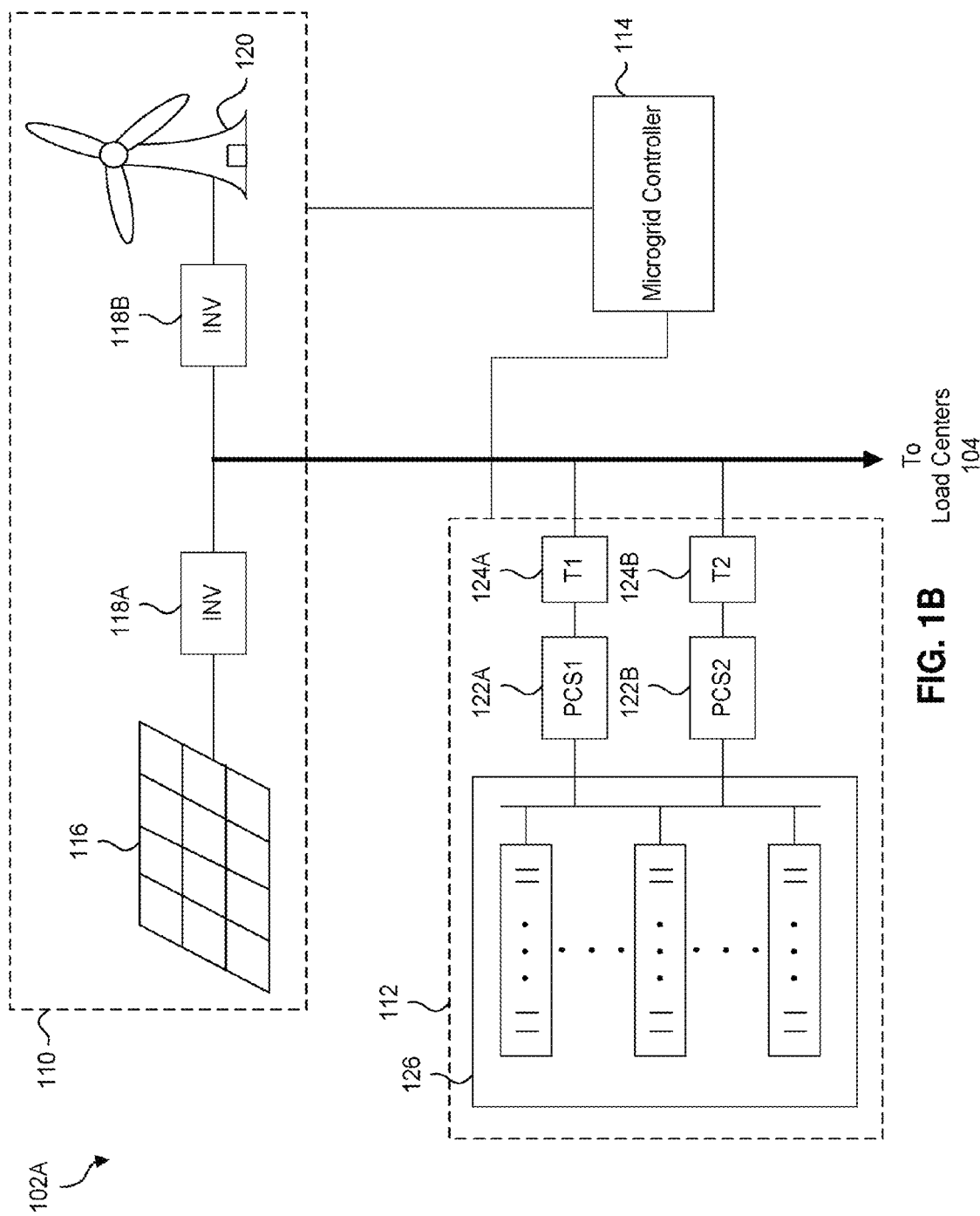

FIG. 1B is a diagram illustrating an example power station 102A for use within microgrid power system 100, according to an embodiment. Power station 102A includes solar energy source 116 coupled to inverter 118A and wind energy source 120 coupled to inverter 118B. In an embodiment, solar energy source 116 may include a plurality of photovoltaic cells arranged in one or more solar panels. Wind energy source 120 may include a plurality of wind turbines or other means for converting kinetic energy into electricity. In an embodiment, solar energy source 116, wind energy source 120, and inverters 118A and 118B may constitute an AC power source, such as power source 110 of FIG. 1A. Power generated by solar energy source 116 and wind energy source 120 may be provided to the load centers through a microgrid power distribution network (not shown). A person skilled in the relevant art will understand that a power distribution network may include, for example, power lines, and circuit breakers, and may also include step-up and step-down transformers.

Inverters 118A and 118B may be coupled to batteries 126 of battery system 112 via power control system (PCS) 122A, isolation transformer 124A, PCS 122B, and isolation transformer 124B. In some embodiments, isolation transformers 124A and 124B may be omitted. Additionally, in some embodiments, PCS 122A and PCS 122B may each constitute a module of a larger power control system. Alternatively, PCS 122A and PCS 122B may each include a plurality of power control modules connected in parallel.

In an embodiment, PCS 122A and/or PCS 122B may be configured to convert AC power provided by solar energy source 116 and wind energy source 120 to DC power in order to charge the plurality of batteries 126. This charging may be performed during periods when solar energy source 116 and wind energy source 120 are producing excess power, and the state of charge of batteries 126 is low. In an embodiment, a microgrid controller, such as microgrid controller 114 of FIG. 1A, may determine when to charge batteries 126 based on energy availability.

In an embodiment, PCS 122A and/or PCS 122B may also be configured to convert DC power provided by batteries 126 to AC power. This AC power may then be provided to load centers 104 through the microgrid power distribution network to supplement (or in lieu of) power provided by solar energy source 116 and wind energy source 120. Stabilizing battery system 112 may be used to provide this power during periods when solar energy source 116 and wind energy source 120 are producing low energy, such as during the night (for solar energy source 116) or periods of low wind (for wind energy source 120), to provide a stable supply of AC power to load centers 104. In an embodiment, the microgrid controller may determine when to use stabilizing battery system 112 to provide AC power to load centers 104. In some embodiments, stabilizing battery system 112 may also be used to control the quality of the power provided by power station 102A to load centers 104.

In some embodiments, PCS 122A and 122B may include respective power converters, or a single power converter may be employed for both.

In an embodiment, PCS 122A may be configured to control the quality of the AC power provided by solar energy source 116 and/or wind energy source 120. This may be accomplished by providing real and/or reactive power from stabilizing battery system 112 to control the voltage and/or frequency of the AC power provided by solar energy source 116 and/or wind energy source 120 to load centers 104. In an embodiment, PCS 122B may be employed to adjust the state of charge of batteries 126 (i.e., charge or discharge batteries 126). In some embodiments, the power converter of PCS 122A may be configured to operate in voltage control mode, while the power converter of PCS 122B may be configured to operate in current control mode. In this case, solar energy source 116 and wind energy source 120 may provide generated current to the microgrid power distribution network via inverters 118A and 118B, each operating in current control mode. PCS 122A may then regulate and maintain the voltage of the resulting AC power provided to load centers 104. In this manner, the operation of PCS 122A, PCS 122B, isolation transformer 124A, and isolation transformer 124B enables use of batteries 126 to stabilize existing solar, wind, or other energy sources, generally without modification to the operation of these energy sources.

Figure 1C:
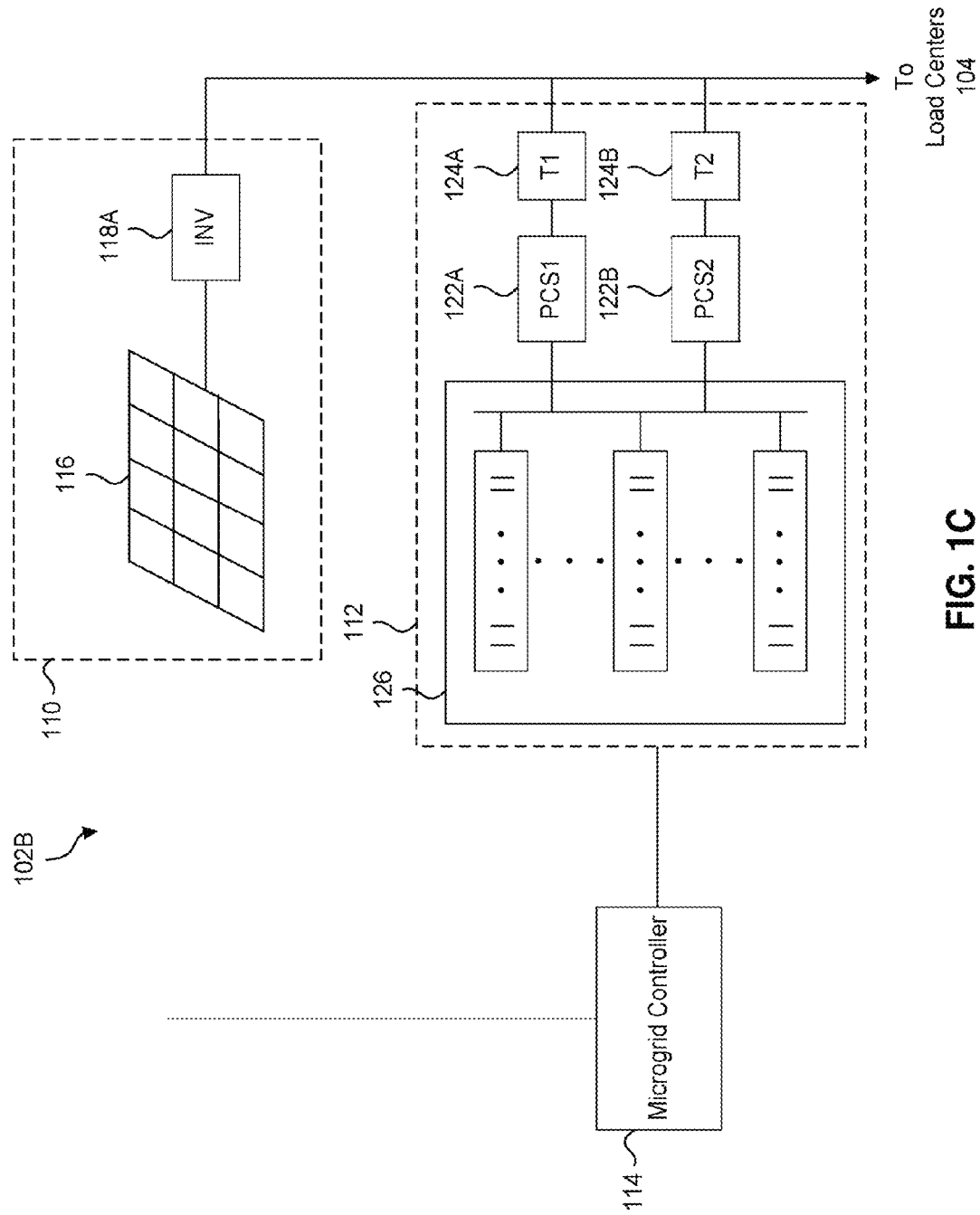

FIG. 1C illustrates an example power station 102B for use within microgrid power system 100, according to an embodiment. Power station 102B includes the same components as power station 102A with the exception of wind energy source 120 and inverter 118B. Thus, the AC power source of power station 102B is driven only by solar energy source 116.

Figure 1D:
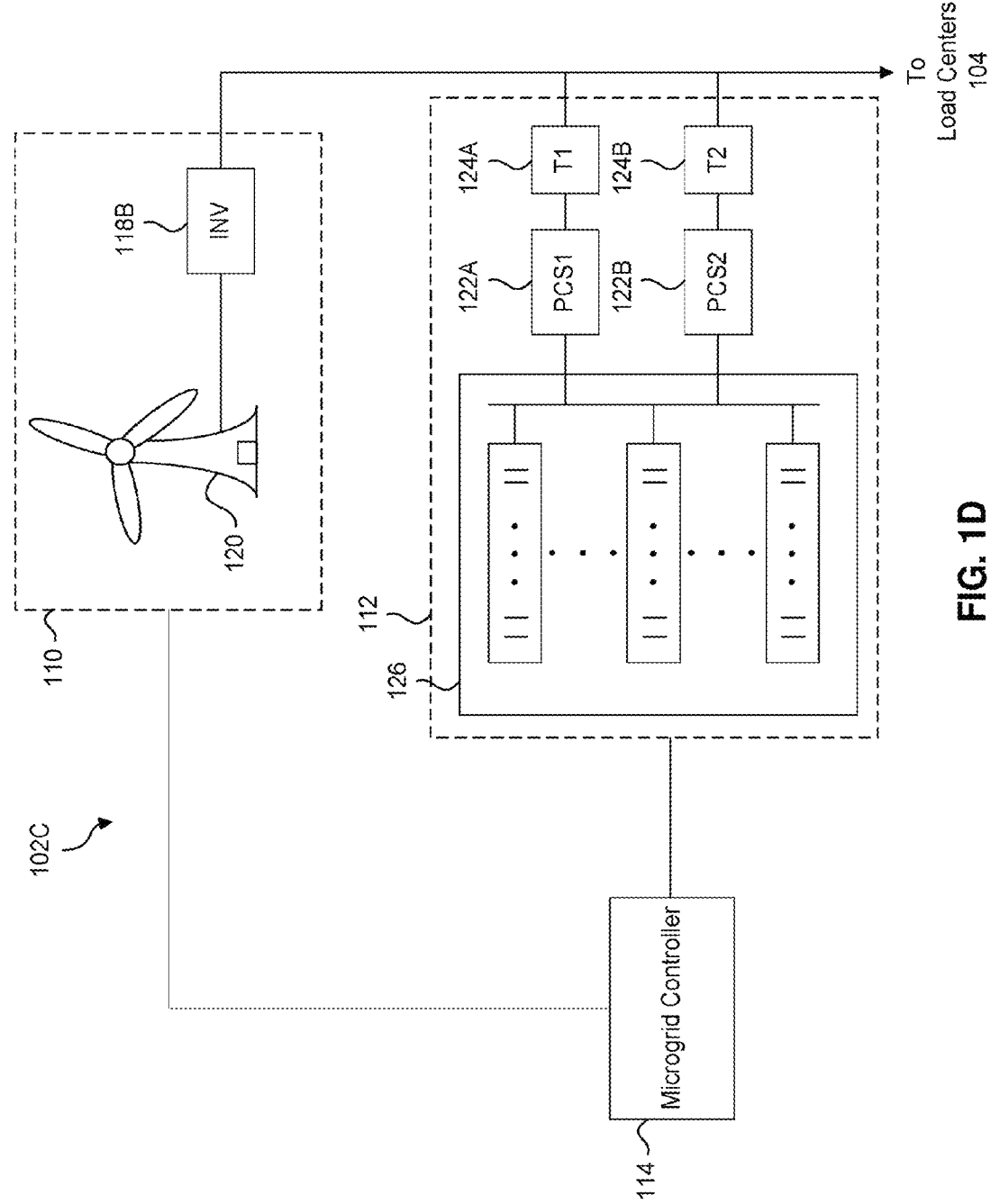

FIG. 1D illustrates an example power station 102C for use within microgrid power system 100, according to an embodiment. Power station 102C includes the same components as power station 102A with the exception of solar energy source 116 and inverter 118A. Thus, the AC power source of power station 102C is driven only by wind energy source 120.

Figure 1E:
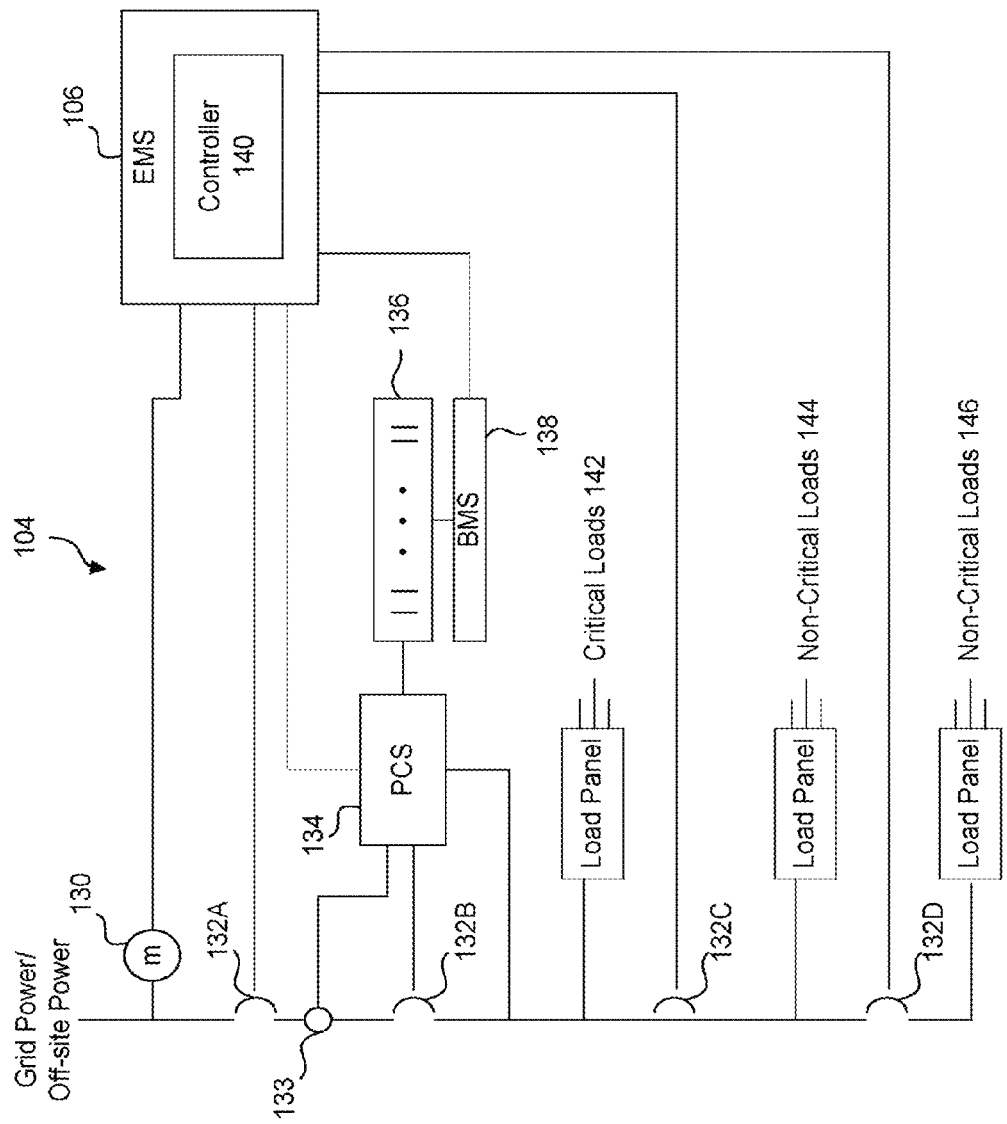

FIG. 1E is a diagram illustrating a load center or local power system 104 for use in microgrid power system 100, according to an embodiment. Local power system 104 includes one or more batteries 136 coupled to a bidirectional power control system (PCS) 134 and a battery management system 138. Battery management system 138 may be similar, for example, to that discussed below. Battery management system 138 may be coupled to a local EMS 106 including a controller 140. Local power system 104 also includes switches 132A-D and a phase sensor 133. Switches 132A-D may comprise circuit breakers or any other switching mechanism known in the art. Switches 132A and 132B may connect a power grid or off-site power station 102, as discussed with respect to FIGS. 1A-1D, to local loads (e.g., loads 142, 144, and 146). In an embodiment, switch 132A is optional. Phase sensor 133 is configured to sense the phase of the AC Power being provided by the power grid or off-site power station 102. Meter 130 may be used to monitor the total power usage of local power system 104 (e.g., power used by the building or factory). In an embodiment, the usage monitored by meter 130 may be transmitted to microgrid controller 114 for use by the microgrid controller in determining how to distribute available power within the microgrid power system.

In an embodiment, EMS 106 and controller 140 control the power supplied to loads 142, 144, and 146 as well as controlling switches 132A, 132C, and 132D. When power is required from batteries 136, PCS 134 may open switch 132B to disconnect off-site power. In some embodiments, PCS 134 may open switch 132B when the required local power demand exceeds the AC power provided by the off-site power, or at set times (e.g., each night). Switch 132B may also be operated manually by a user. In addition, energy management controller 140 may open switch 132A to disconnect off-site power or may send a command to PCS 134 instructing PCS 134 to open switch 132B to disconnect off-site power. PCS 134 may also provide power to the local loads from batteries 136.

When power is required from batteries 136, the power converter of PCS 134 may be configured to convert DC power supplied by batteries 136 to AC power, which can then be provided to loads 142, 144, and 146. When power is available from the off-site power to charge batteries 136, the power converter of PCS 134 may be configured to convert AC power provided by the off-site power to DC power to charge batteries 136.

In an embodiment, a phase sensor 133 may be used to sense and monitor the phase sequence of the AC power provided from the off-site power source. When switching from local batteries 136 to off-site power (e.g., from power station 102), phase sensor 133 ensures safe conditions are met prior to closing switch 132B. For example, when a change is desired to switch from local battery power to off-site AC power, switch 132A (if present) is closed, and PCS 134 compares the phase of the AC power provided by the off-site power source to the phase of the AC power generated by PCS 134 from power stored in batteries 136. PCS 134 then adjusts the phase of the locally generated AC power, for example, and closes switch 132B only when the AC power supplied by PCS 134 (from batteries 136) is within a predetermined phase angle (e.g., a phase angle that will not cause equipment damage when switch 132B is closed) of the AC power provided from off-site.

Local EMS 106 may include energy management controller 140 to control the power usage of the load center (e.g., the factory or building). In this manner, EMS 106 may ensure that enough energy is available from batteries 136 to power critical loads when off-site power is unavailable (e.g., during the night). In an embodiment, when batteries 136 are being discharged, EMS 106 may adjust loads 142, 144, and 146 according to available energy, and control switches 132C and 132D to disconnect non-critical loads 144 and 146 to maintain sufficient power for critical loads 142. For example, critical loads 142 may include power for lights and certain factory machines so that factory workers may continue working during hours of low energy availability. In an embodiment, during periods of excess energy when batteries 136 are being charged, EMS 106 may control PCS 134 to set a charge rate for batteries 136.

In an embodiment, batteries 136 may be omitted from local power system 104. In this scenario, local power system 104 may remain connected to the power grid or off-site power station at all times, relying on power station 102 to provide all AC power. This option reduces the cost of maintaining a local battery system and may be able to provide sufficient AC power for load centers with smaller power requirements.

Figure 1F:
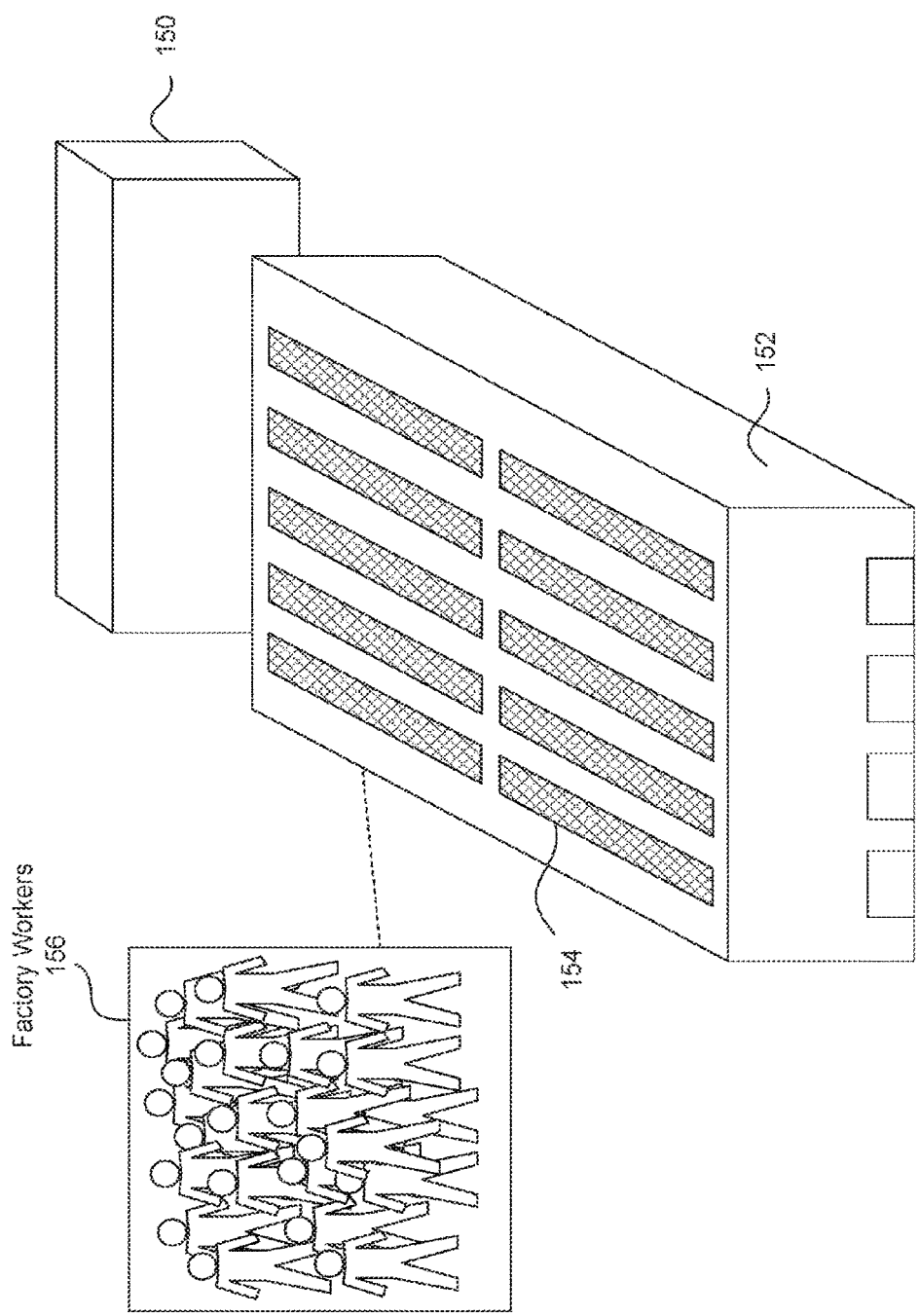

FIG. 1F is a diagram illustrating an example factory 152, according to an embodiment. Factory 152 may be a load center 104 of microgrid power system 100, as described in detail with respect to FIGS. 1A-1E. Factory 152 includes local battery storage 150. Battery storage 150 may include a plurality of batteries, such as batteries 136 of FIG. 1E. In some embodiments, battery storage 150 may be integrated within factory 152, or directly attached or coupled to factory 152. Battery storage 150 may represent any type of battery electrical storage unit, such as those described herein.

In some embodiments, factory 152 may include solar panels 154. Power may be provided to factory 152 via a power grid, an off-site power station (e.g., power station 102 of FIG. 1A), solar panels 154, or any combination thereof. In an embodiment, solar panels 154 may be used to supplement the AC power provided to factory 152 from batteries 136 (see FIG. 1E) or from the off-site power station. Additionally or alternatively, factory 152 may be part of a co-located load center (e.g., load center 104) and power station (e.g., power station 102). In this case, solar panels 154 may be part of a power source 110, as described with respect to FIGS. 1A-1D. In some embodiments, factory 152 does not include solar panels 154 or other power source, and all power is received from a power grid and/or off-site power station.

Factory 152 represents a large-scale factory, for example supporting one thousand to five thousand factory workers 156. The stable power supplied to factory 152 by the energy sources described above provides electricity that enables factory workers 156 to be productive at any time during the day, for example by powering critical lights and machinery.

Figure 1G:
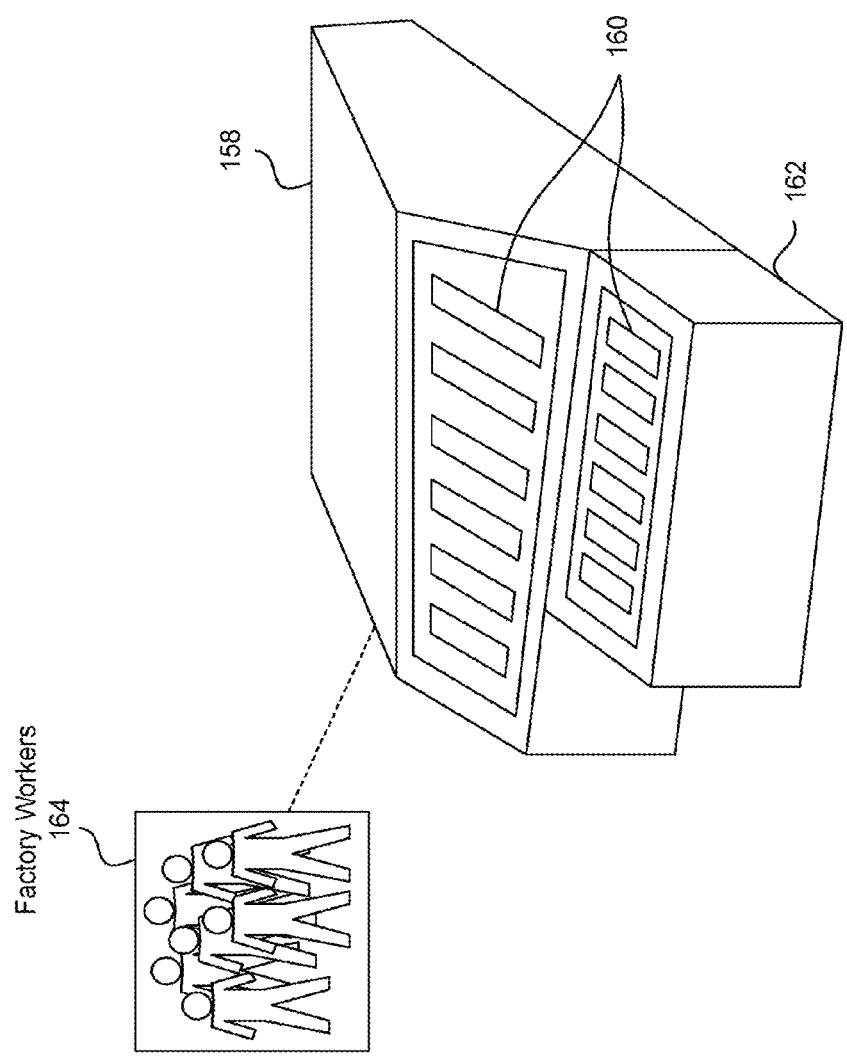

FIG. 1G is a diagram illustrating an example factory 158, according to an embodiment. Factory 158 may be a load center 104 of microgrid power system 100, as described in detail with respect to FIGS. 1A-1E. Factory 158 includes local battery storage 162. Battery storage 162 may include a plurality of batteries, such as batteries 136 of FIG. 1E. In some embodiments, battery storage 162 may be integrated within factory 158, or directly attached or coupled to factory 158. Battery storage 162 may represent any type of battery electrical storage unit, such as those discussed herein.

In some embodiments, factory 158 may include solar panels 160. Power may be provided to factory 158 via a power grid, an off-site power station (e.g., power station 102 of FIG. 1A), solar panels 160, or any combination thereof. In an embodiment, solar panels 160 may be used to supplement the AC power provided to factory 158 from batteries 136 (see FIG. 1E) or from the off-site power station. Additionally or alternatively, factory 158 may be part of a co-located load center (e.g., load center 104) and power station (e.g., power station 102). In this case, solar panels 160 may be part of a power source 110, as described with respect to FIGS. 1A-1D. In some embodiments, factory 158 does not include solar panels 160 or other power source, and all power is received from a power grid and/or off-site power station.

Factory 158 represents a small-scale factory, for example supporting twenty to one hundred factory workers 164. As discussed with respect to factory 152, the stable power supplied to factory 158 by the energy sources described above provides electricity that enables factory workers 164 to be productive at any time during the day, for example by powering critical lights and machinery.

Figure 1H:
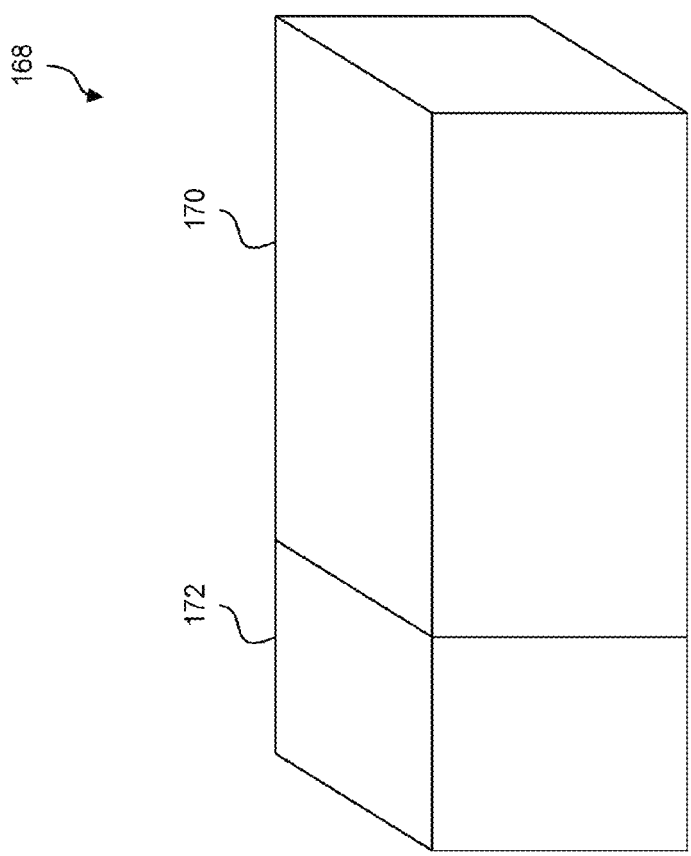

FIG. 1H is a diagram illustrating an example battery container 168, according to an embodiment. Battery container 168 includes a power converter 172 and a plurality of batteries 170. Power converter may be part of a power control system, such as PCS 122A or PCS 122B of FIGS. 1B-1D, or PCS 134 of FIG. 1E. Batteries 170 may represent all or a portion of batteries 126 of FIGS. 1B-1D or local batteries 136 of FIG. 1E. Battery container 168 may be employed in conjunction with various battery storage applications, such as stabilizing battery system 112 of FIGS. 1A-1D and/or batteries 136 of FIG. 1E. For example, battery container 168 may be physically integrated as part of batteries 126 or local batteries 136 within a larger battery storage facility, such as the battery energy storage systems described herein. Battery container 168 may also be implemented as a standalone unit that represents the entirety of batteries 126 or local batteries 136. In an embodiment, power converter 172 may convert AC power to DC power to charge batteries 170, and convert DC power to AC power to provide power to one or more loads, as described with respect to PCS 122A and 122B of FIGS. 1B-1D and PCS 134 of FIG. 1E.

FIG. 1I is a diagram illustrating an example state of charge (SoC) 180 of batteries (e.g., batteries 126) used in stabilizing battery system 112 of a power station 102 within a microgrid power system 100 over a period of time, for example, one day. In the example depicted in FIG. 1I, the state of charge of the battery system may fluctuate throughout the day depending on the energy available from an off-site power source, such as solar energy source 116 or wind energy source 120. Increases in line 180 may represent periods of time in which the battery system is being charged (e.g., in periods of excess power generation), and decreases in line 180 may represent periods of time in which the battery system is being discharged to supplement or maintain the quality of AC power provided by the off-site power source. The final decrease in line 180 may represent a nighttime period in which solar power, for example, cannot be provided, and the battery system is being used to supply AC power to one or more load centers.

In an embodiment, when the term "battery" is used herein, the battery may be an electrical energy storage unit (which may also be referred to as a battery energy storage system ("BESS")) which includes a battery system controller and battery packs. Each battery pack has battery cells, a battery pack controller that monitors the cells, a battery pack cell balancer that adjusts the amount of energy stored in the cells, and a battery pack charger. In an embodiment, the battery pack controller operates the battery pack cell balancer and the battery pack charger to control the state-of-charge of the cells. In an embodiment, the cells are lithium ion battery cells.

As described herein, it is a feature of the disclosure that the electrical energy storage unit and control system are highly scalable, ranging from small kilowatt-hour size electrical energy storage units to megawatt-hour size electrical energy storage units. These electrical energy storage units may be used within the microgrid power system to provide power to various local loads, such as factory and other building loads, as described in more detail below.

Figure 2A:
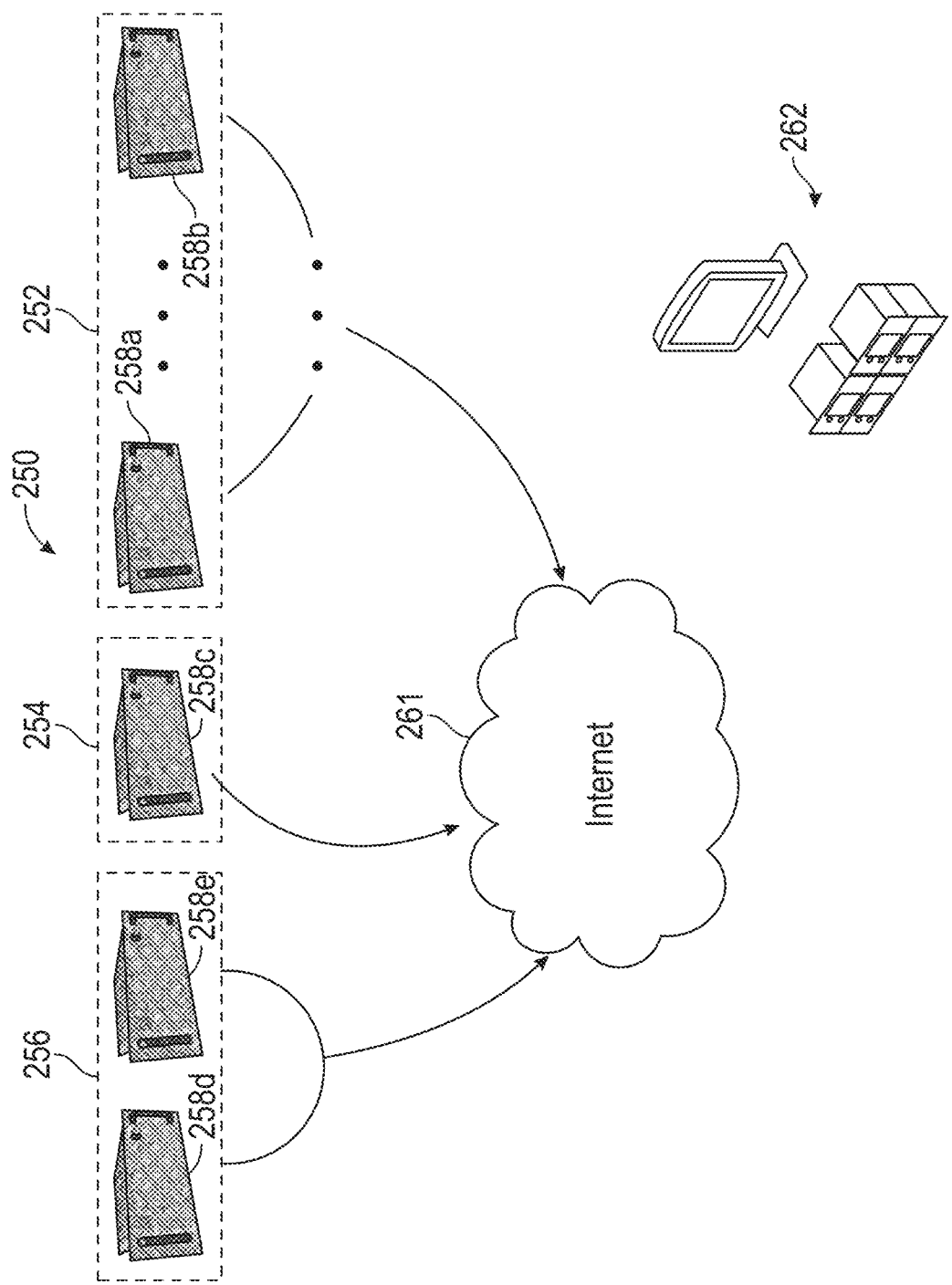
FIG. 2A is a diagram that illustrates a networked group of electrical energy storage units that comprise one or more battery packs according to an embodiment.

FIG. 2A is a diagram that illustrates a networked group of electrical energy storage units 250 that comprise one or more battery packs 258 according to an embodiment. The illustrated electrical energy storage units include energy storage unit 252, energy storage unit 254, and energy storage unit 256. Energy storage unit 252 includes a large number battery packs such as battery packs 258a and 258b. Energy storage unit 254 includes a single battery pack 258c. Energy storage unit 256 includes two battery packs 258d and 258e. Generally speaking, the energy storage units can include any number of battery packs 258.

As shown in FIG. 2A, the networked battery packs 258 are connected to a data center 262 and can send data to data center 262 using the Internet 261. The data from battery packs 258 can be automatically sent to data center 262, or the data can be sent to data center 262 in response to signals sent to energy storage units 252, 254, and 256 of networked energy storage units 250 by data center 262.

Figure 2B:
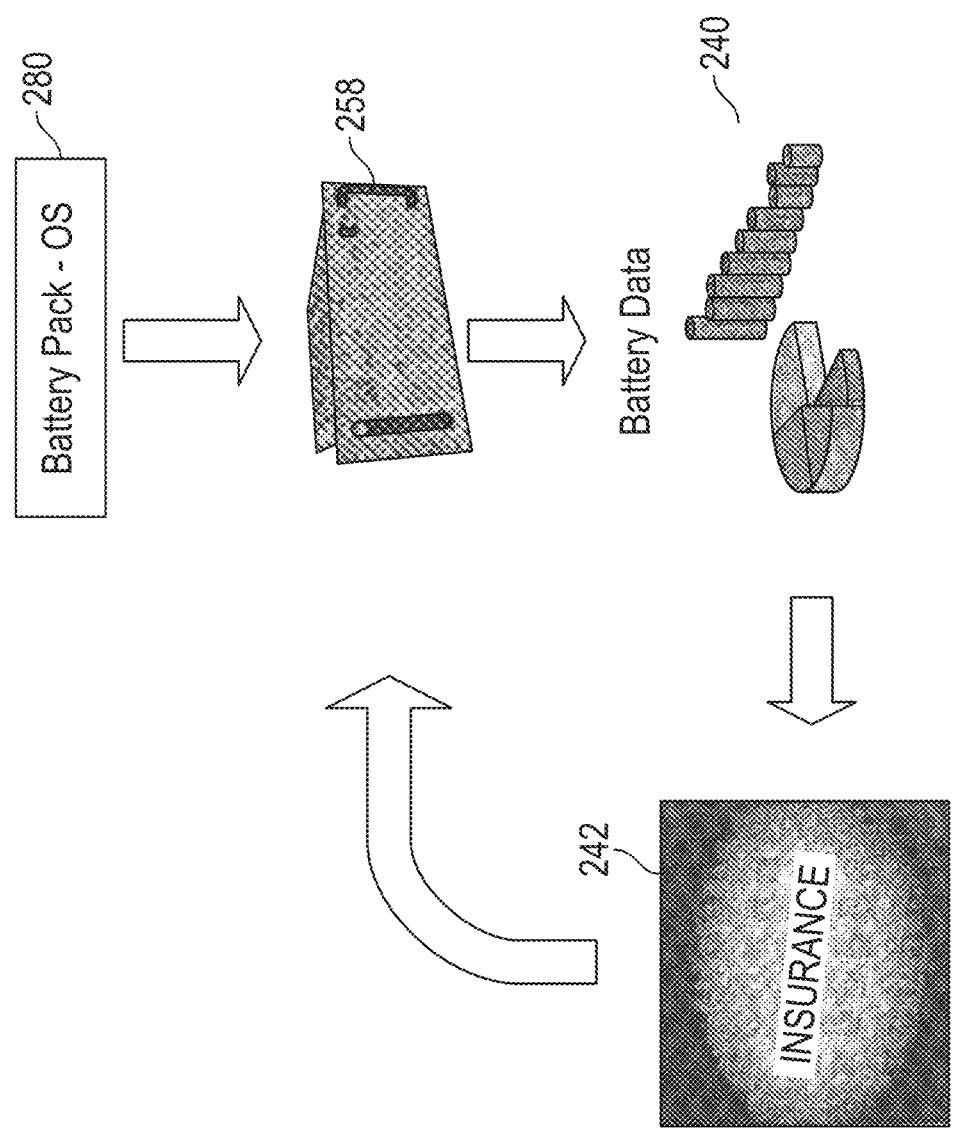
FIG. 2B is a diagram that illustrates a battery pack having an operating system that is used to collect battery data and to produce battery rate data that is used to sell battery insurance according to an embodiment.

FIG. 2B is a diagram that illustrates a battery pack 258 having an operating system 280 that is used to collect battery data 240 and to produce battery rate data that is used to sell battery insurance 242 according to an embodiment. In an embodiment, battery pack operating system 280 is a suite of modules that performs many functions as described in more detail below. Data center 262 is any data center that can store battery data. In an embodiment, this battery data includes data that represents the expected lifetime of the battery, data that represents the usage of the battery, and or data related to the battery warranty. Such data may include, for example, battery voltage data, battery temperature data, battery charge and discharge current data, and/or battery power data. In embodiments, this battery data is associated with particular battery models, particular battery manufacturers and/or particular manufacturers of battery packs and/or energy storage systems.

In an embodiment, the battery data 240 (stored for example in data center 262) is analyzed and used to form rate data for insurance purposes. For example, the battery data can be analyzed to determine an expected lifetime for particular batteries made by particular battery manufacturers and/or particular battery packs made by particular manufacturers. This expected lifetime data can then be used to determine the cost of insurance sold to cover battery packs 258. Batteries and battery packs that have a longer expected lifetime can potentially get term insurance coverage at a lower rate than batteries and battery packs that have a shorter expected lifetime. In embodiments, the rate data is determined similarly to how life insurance rate data is determined.

Battery data 240, which can be collected, analyzed, and used to produce insurance rate data, for example, is described in more detail below.

Figure 2C:
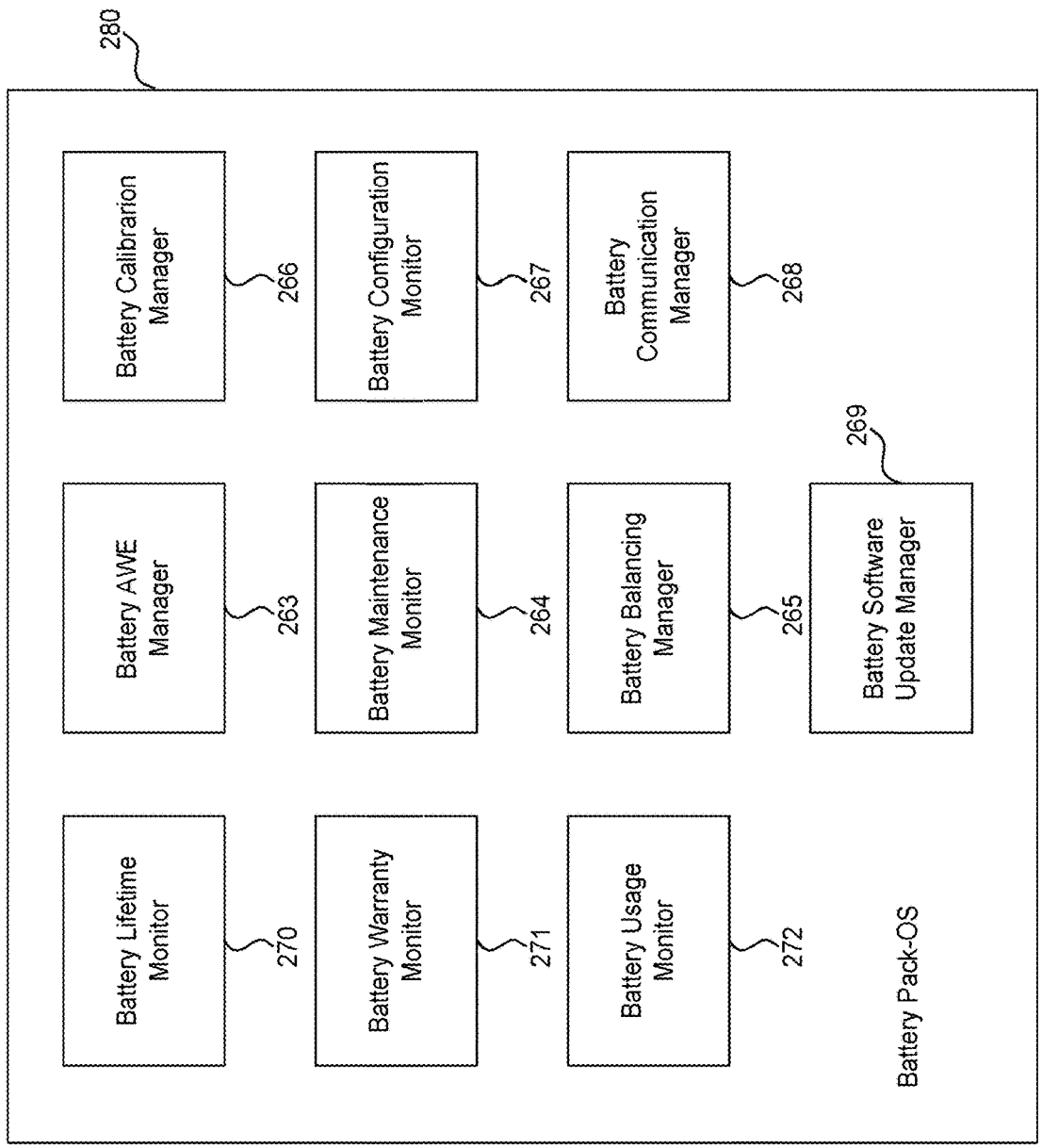
FIG. 2C is a diagram that illustrates a battery pack operating system according to an embodiment.

FIG. 2C is a diagram that further illustrates battery pack operating system 280 according to an embodiment. As shown, in one embodiment battery pack operating system 280 includes a battery lifetime monitor 270, a battery warranty monitor 271, a battery usage monitor 272, a battery alarms, warnings, and errors (AWE) manager 263, a battery maintenance manager 264, a battery balancing manager 265, a battery calibration manager 266, a battery configuration manager 267, a battery communication manager 268, and a battery software update manager 269.

Battery lifetime monitor 270 tracks the lifetime usage of the battery. In an embodiment, this is done by calculating a battery lifetime value as described in more detail below with reference to FIG. 36A. This value may be a product of three factors multiplied together and then continually accumulated. These three factors are a current factor, a voltage factor, and a temperature factor, which are further described below with reference to FIGS. 33, 34, and 35. When the battery is used at high charge or discharge rates, the battery lifetime value increases at a greater rate than when the battery is used at lower charge or discharge rates. When the battery is not being charged or discharged, the battery lifetime value does not increase. Similarly, the rate at which the battery lifetime value increases is also affected by the voltage factor and the temperature factor.

Battery warranty monitor 271 ensures that the battery is used in accordance with warranty requirements specified, for example, by the battery manufacturer. Battery warranty monitor 271 determines when a warranty condition for the battery has been violated, and in an embodiment sends a message to a monitoring center that contains information about the warranty violation. In an embodiment, the battery user and/or owner is also informed about the warranty violation. This is described in more detail below with reference to FIG. 36B.

Battery usage monitor 272 records data that can be analyzed to determine how the battery was used over its lifetime. In embodiments, this data includes voltage data, temperature data, current data and/or power data. In embodiments, this data can be displayed in the form of usage graphs. This is described below in more detail with reference to FIG. 37.

Battery alarms, warnings, and errors (AWE) manager 263 protects the battery and identifies operating issues. In embodiments, alarms, warnings and errors are generated due, for example, to over-voltage conditions, under-voltage conditions, high-temperature conditions, low-temperature conditions, high-differential temperate conditions, fast-temperature rise conditions, high charge current, high discharge current, loss of communications, circuit board issues or failures and/or weak or bad battery cells or battery modules.

Battery maintenance manager 264 reports issues with the battery pack so that they may be corrected by maintenance.

Battery balancing manager 265 balances the battery in a reliable and cost effective manner. This is described in more detail below.

Battery calibration manager 266 recalibrates battery pack values such as state-of-charge, amp-hour capacity, Watt-hour capacity, voltage measurement calibration factors and temperature calibration factors.

Battery configuration manager 267 implements among other things the plug and play features of the battery pack. These include such things as establishing communication with other components of an energy storage unit when the battery pack is first installed and energized, obtaining a communication address of ID, and associating itself with a particular network of battery packs to form an energy storage unit.

Battery communication manager 268 monitors communications between the battery pack and other system components to ensure the safe and reliable operation of the battery pack. It also tries to reestablish communications if communications are lost.

Battery software update manager 269 enables and facilitates the remote updating of the battery pack software and firmware. This updating can be done automatically when the update feature is enabled.

Figure 2D:
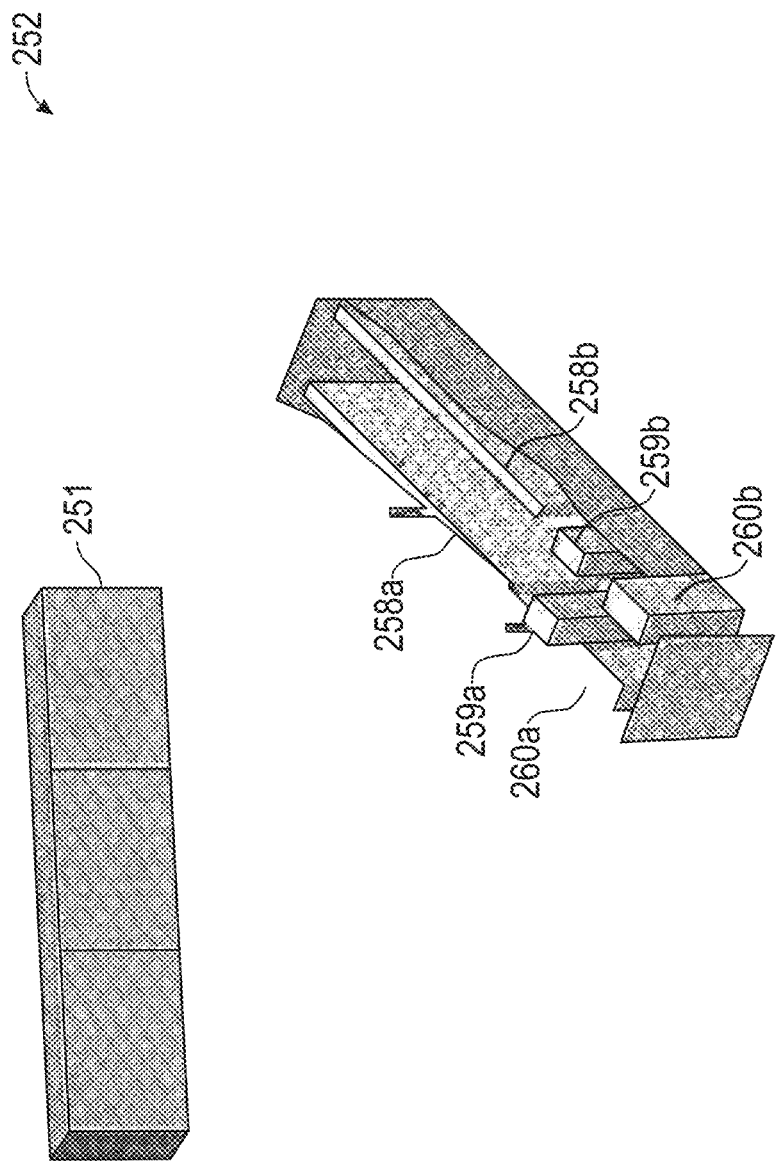
FIG. 2D is a diagram that illustrates an electrical energy storage unit according to an embodiment.

FIG. 2D is a diagram that illustrates an electrical energy storage unit 252 according to an embodiment of the disclosure. As shown in FIG. 2, electrical energy storage unit 252 includes battery units 258a and 258b, control units 259a and 259b, and inverters 260a and 260b. In an embodiment, electrical energy storage unit 252 is housed in a container 251, which is similar to a shipping container. In such embodiments, electrical energy storage unit 252 is movable and can be transported by truck.

Figure 2E:
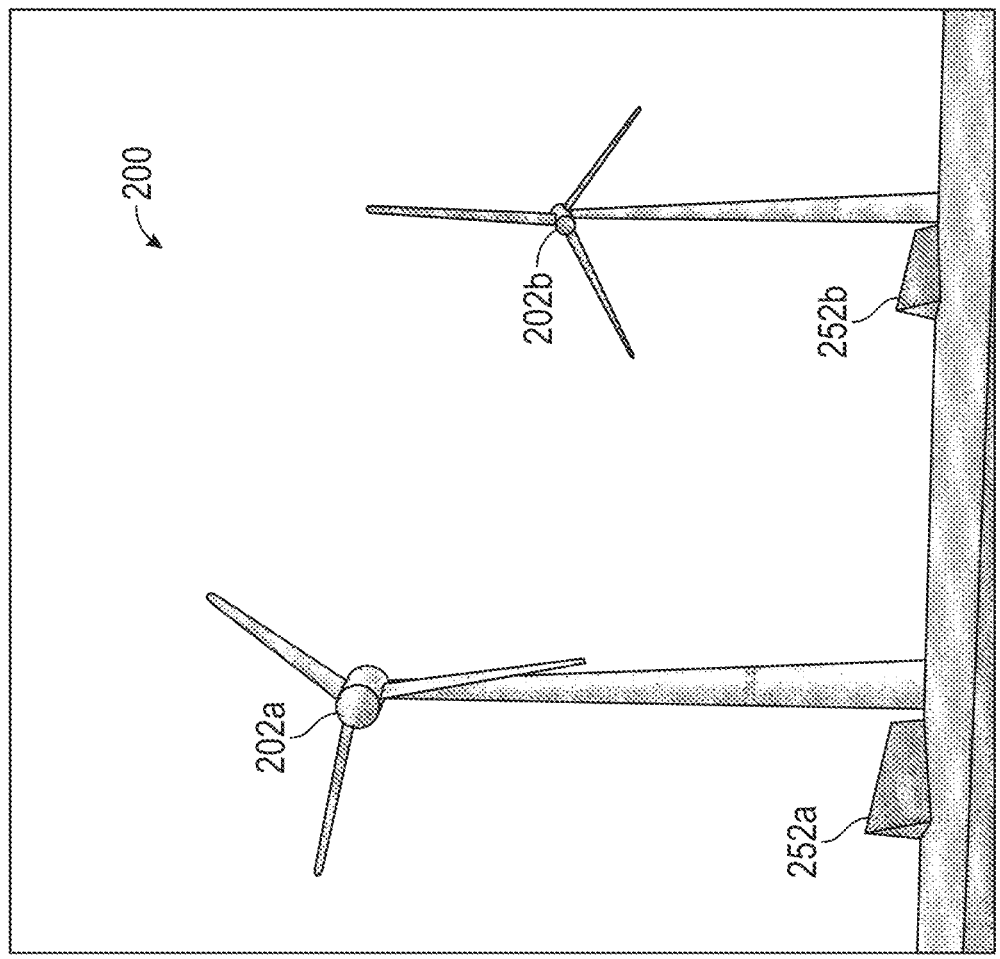
FIG. 2E is a diagram that illustrates the electrical energy storage unit of FIG. 2D being used in conjunction with wind mills.
Figure 2F:
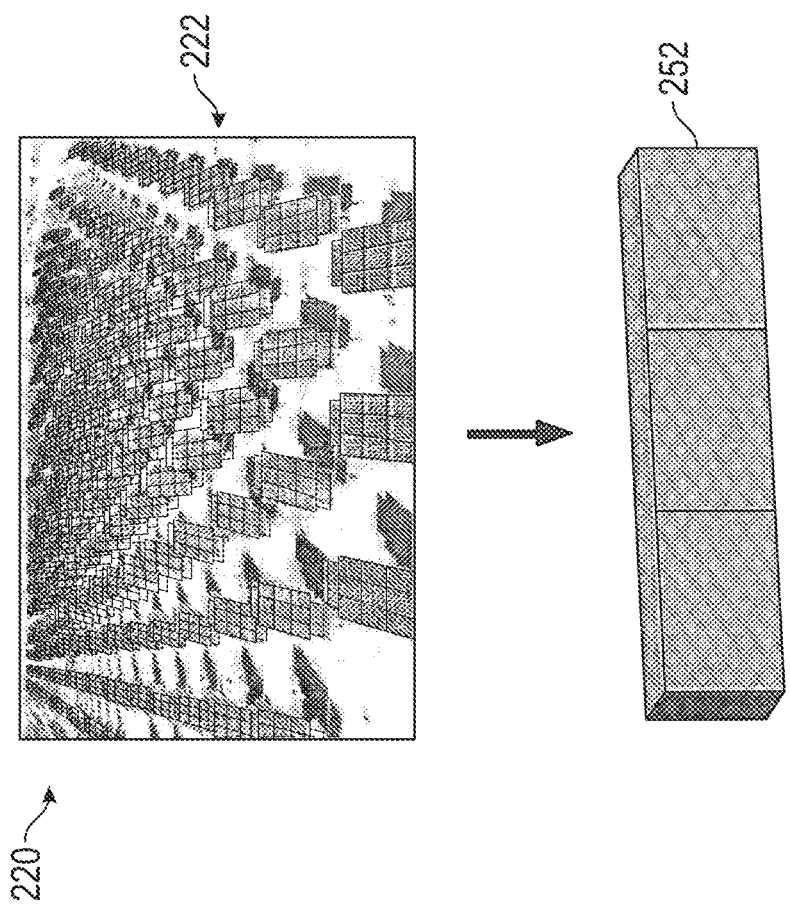
FIG. 2F is a diagram that illustrates the electrical energy storage unit of FIG. 2D being used in conjunction with solar panels.
Figure 2G:
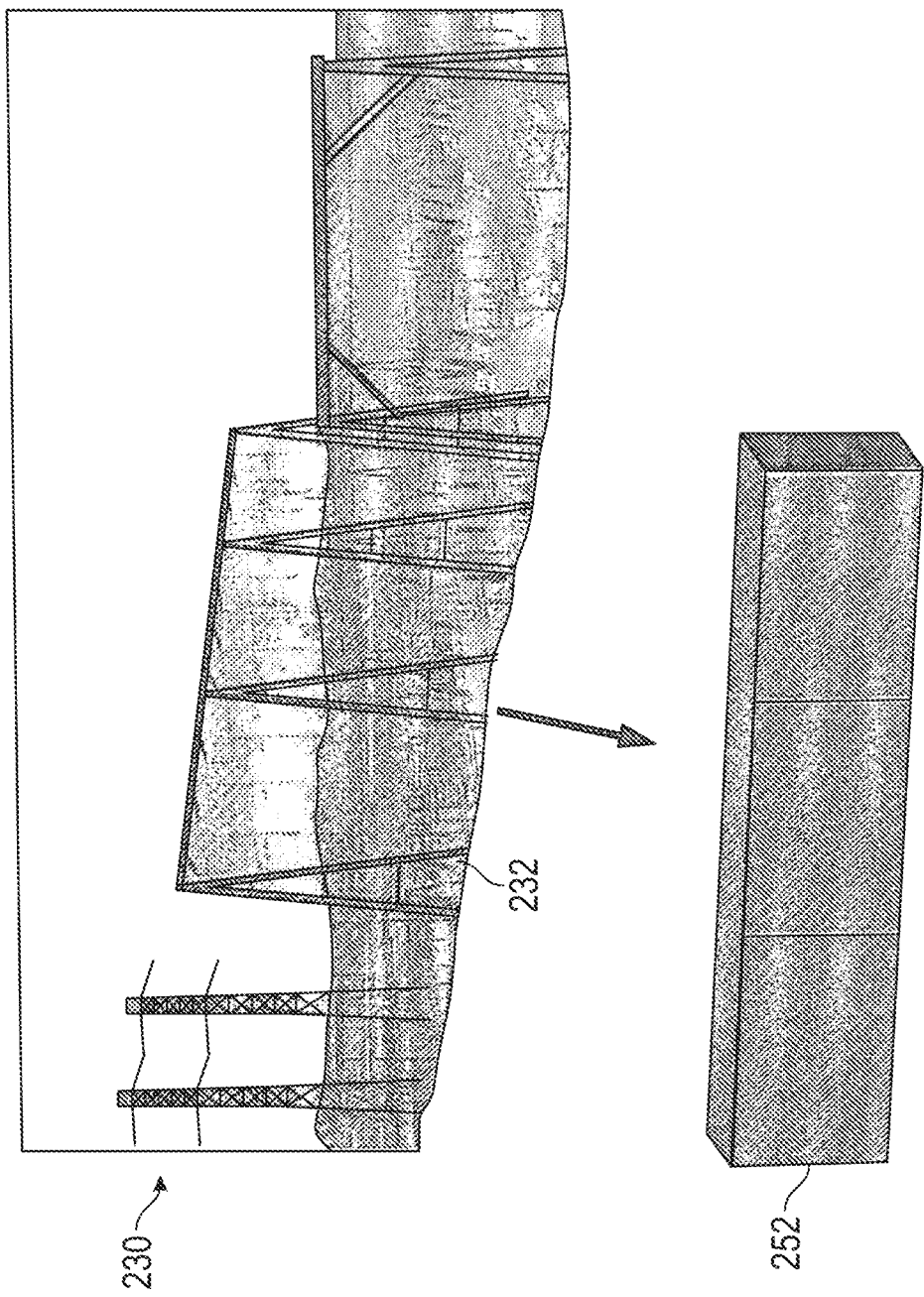
FIG. 2G is a diagram that illustrates the electrical energy storage unit of FIG. 2D being used in conjunction with the power grid.

As shown in FIGS. 2E-2G, electrical energy storage unit 252 is suitable for storing large amounts of electrical energy.

FIG. 2E is a diagram that illustrates the electrical energy storage unit 252 of FIG. 2D being used as a part of a renewable wind energy system 200. Wind energy system 200 includes wind turbines 202a and 202b. Energy from wind turbine 202a is stored in an electrical energy storage unit 252a. Energy from wind turbine 202b is stored in an electrical energy storage unit 252b. As will be understood by persons skilled in the relevant art, electrical energy storage units 252a and 252b enable stored electrical energy generated by wind turbines 202a and 202b to be dispatched.

FIG. 2F is a diagram that illustrates the electrical energy storage unit 252 of FIG. 2D being used as a part of a renewable solar energy system 220. Solar energy system 220 includes a solar array 222 and an electrical energy storage unit 252. Energy from solar array 222 is stored in the electrical energy storage unit 252. Electrical energy storage unit 252 enables stored electrical energy generated by solar array 222 to be dispatched.

FIG. 2G is a diagram that illustrates the electrical energy storage unit 252 of FIG. 2D being used as a part of a grid energy system 230. Grid energy system 230 includes electrical equipment 232 and an electrical energy storage unit 252. Energy from grid energy system 230 is stored in the electrical energy storage unit 252. Electrical energy stored by electrical energy storage unit 252 can be dispatched.

Figure 3:
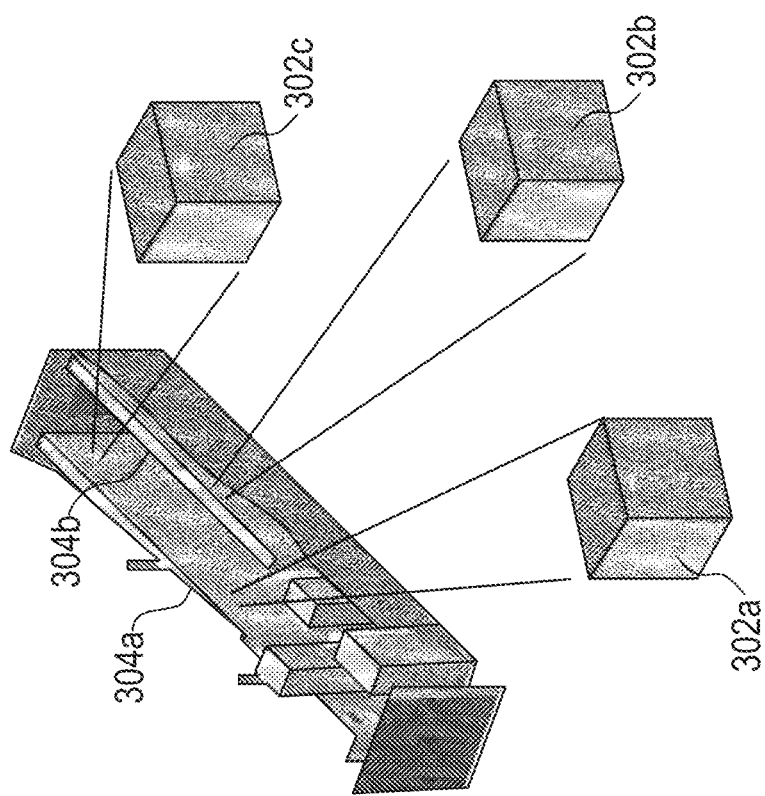
FIG. 3 is a diagram that illustrates battery packs according to an embodiment.

FIG. 3 is a diagram that further illustrates battery units 304a and 304b of electrical energy storage unit 252. As shown in FIG. 3, battery units 304a and 304b are formed using multiple battery packs 302 according to an embodiment of the disclosure. In FIG. 3, three battery packs 302a-c are shown. Battery packs 302a and 302c form a part of battery unit 304a. Battery pack 302b forms a part of battery unit 304b.

Figure 4:
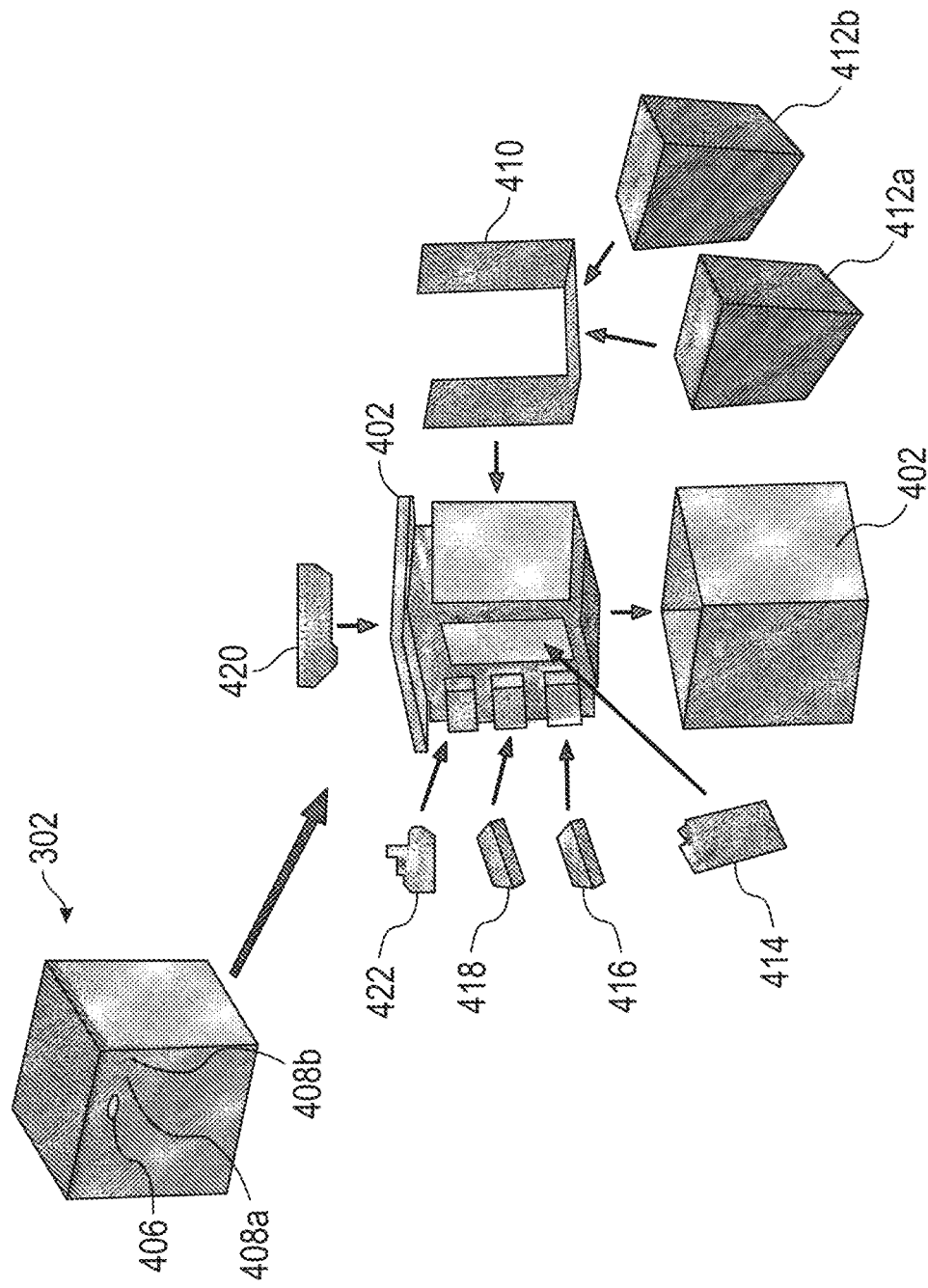
FIG. 4 is a diagram that further illustrates a battery pack according to an embodiment.

FIG. 4 is a diagram that further illustrates a battery pack 302 according to an embodiment of the disclosure. Battery pack 302 includes an enclosure 402, a lid 404, a power connector 406, and two signal connectors 408a and 408b. Enclosure 402 and lid 404 are preferably made from a strong plastic or metal. The power connector 406 includes connections for the positive and negative terminals of the battery pack, connections for the DC supply power, and connections for AC supply power. In embodiments of the disclosure, only DC supply power or AC supply power can be used. The signal connectors 408a and 408b are RJ-45 connectors, but other types of connectors can be used too. The signal connectors are used, for example, for CAN (CANBus) communications between battery pack 302 and other components of electrical energy storage unit 252.

As shown in FIG. 4, in an embodiment enclosure 402 houses a battery lift plate 410 that supports two battery modules 412a and 412b. Battery modules 412a and 412b each include multiple pouch-type batteries connected together in a series/parallel configuration. In embodiments, battery modules 412a and 412b can comprise, but are not limited to, for example, 10 to 50 AH cells arranged in a 1P16S configuration, a 2P16S configuration, a 3P16S configuration, or a 4P16S configuration. Other configurations are also possible and form a part of the scope of the disclosure. In an embodiment, the battery cells are connected using a printed circuit board that includes the wiring and connections for voltage and temperature monitoring of the battery cells as well as for balancing the battery cells.

Other items housed in enclosure 402 include a battery pack controller 414, an AC power supply 416, a DC power supply 418, a battery pack cell balancer 420, and a fuse and fuse holder 422. In embodiments of the disclosure, only AC power supply 416 or DC power supply 418 can be used.

Figure 5:
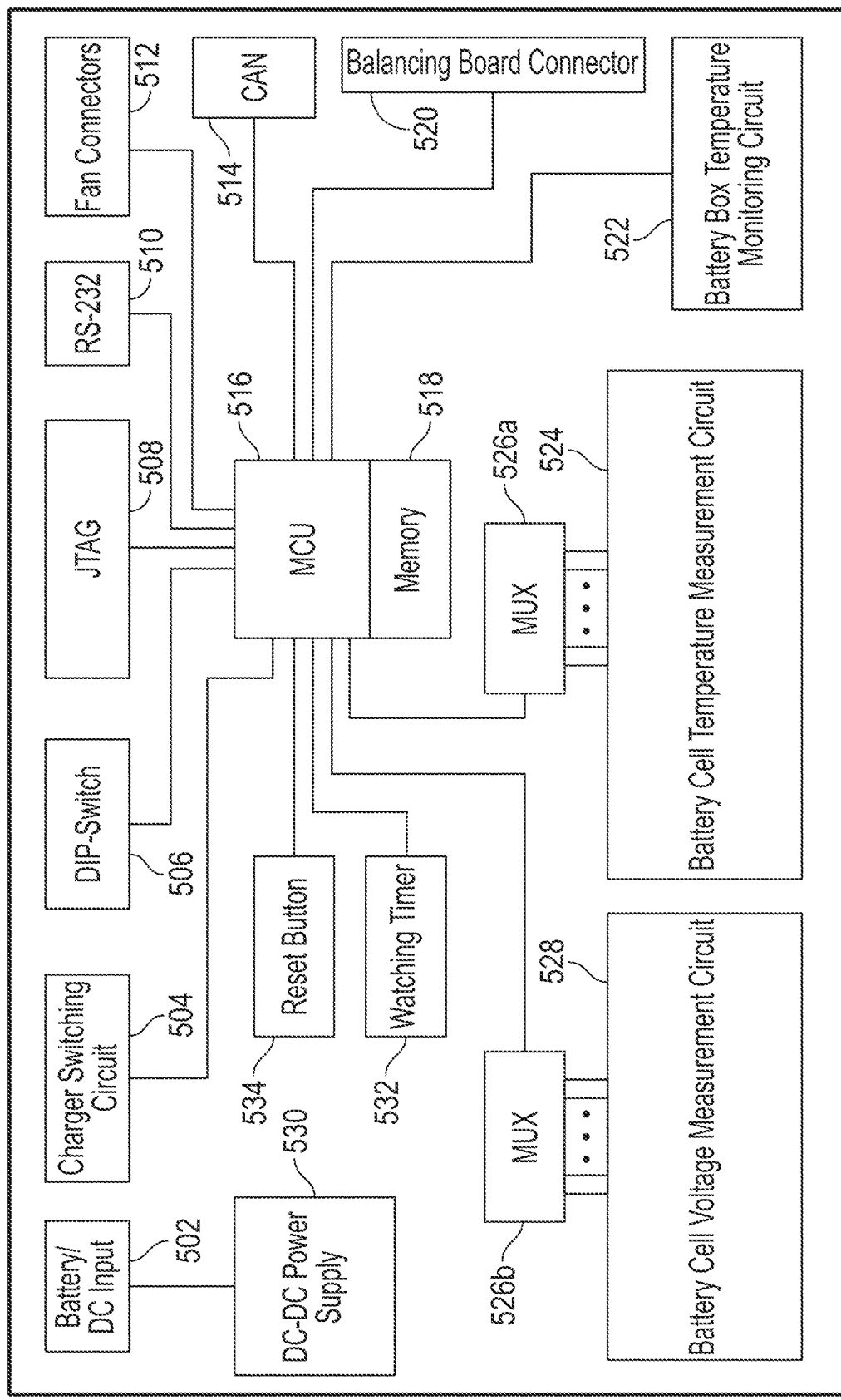
FIG. 5 is a diagram that illustrates a battery pack controller according to an embodiment.

FIG. 5 is a diagram that further illustrates battery pack controller 414 according to an embodiment of the disclosure. In an embodiment, battery pack controller 414 includes a battery/DC input 502, a charger switching circuit 504, a DIP-switch 506, a JTAG connection 508. and RS-232 connection 510, fan connectors 512, a CAN (CANBus) connection 514, a microprocessor unit (MCU) 516, memory 518, a balancing board connector 520, a battery box (enclosure) temperature monitoring circuit 522, a battery cell temperature measurement circuit 524, a battery cell voltage measurement circuit 528, a DC-DC power supply 530, a watchdog timer 532, and a reset button 534. The battery cell temperature measurement circuit 524 and the battery cell voltage measurement circuit 528 are coupled to MCU 516 using multiplexers (MUX) 526a and 526b, respectively.

In an embodiment, battery pack controller 414 is powered from energy stored in the battery cells. Battery pack controller 414 is connected to the battery cells by battery/DC input 502. In other embodiments, battery pack controller 414 is powered from a DC power supply connected to battery/DC input 502. DC-DC power supply 530 then converts the input DC power to one or more power levels appropriate for operating the various electrical components of battery pack controller 414.

Charger switching circuit 504 is coupled to MCU 516. Charger switching circuit 504 and MCU 516 are used to control operation of AC power supply 416 and/or DC power supply 418. As described herein, AC power supply 416 and/or DC power supply 418 are used to add energy to the battery cells of battery pack 302.

Battery pack controller 414 includes several interfaces and connectors for communicating. These interfaces and connectors are coupled to MCU 516 as shown in FIG. 5. In an embodiment, these interfaces and connectors include: DIP-switch 506, which is used to set a portion of software bits used to identify battery pack controller 414; JTAG connection 508, which is used for testing and debugging battery pack controller 414; RS-232 connection 510, which is used to communicate with MCU 516; CAN (CANBus) connection 514, which is used to communicate with MCU 516; and balancing board connector 520, which is used to communicate signals between battery pack controller 414 and battery pack cell balancer 420.

Fan connectors 512 are coupled to MCU 516. Fan connectors 512 are used together with MCU 516 and battery box temperature monitoring circuit 522 to operate one or more optional fans that can aid in cooling battery pack 302. In an embodiment, battery box temperature monitoring circuit 522 includes multiple temperature sensors that can monitor the temperature of battery pack cell balancer 420 and/or other heat sources within battery pack 302 such as, for example, AC power supply 416 and/or DC power supply 418.

Microprocessor unit (MCU) 516 is coupled to memory 518. MCU 516 is used to execute an application program that manages battery pack 302. As described herein, in an embodiment the application program performs the following functions: monitors the voltage and temperature of the battery cells of battery pack 302, balances the battery cells of battery pack 302, monitor and controls (if needed) the temperature of battery pack 302, handles communications between battery pack 302 and other components of electrical energy storage system 252, and generates warnings and/or alarms, as well as taking other appropriate actions, to prevent over-charging or over-discharging the battery cells of battery pack 302.

Battery cell temperature measurement circuit 524 is used to monitor the cell temperatures of the battery cells of battery pack 302. In an embodiment, individual temperature monitoring channels are coupled to MCU 516 using a multiplexer (MUX) 526a. The temperature readings are used to ensure that the battery cells are operated within their specified temperature limits and to adjust temperature related values calculated and/or used by the application program executing on MCU 516, such as, for example, how much dischargeable energy is stored in the battery cells of battery pack 302.

Battery cell voltage measurement circuit 528 is used to monitor the cell voltages of the battery cells of battery pack 302. In an embodiment, individual voltage monitoring channels are coupled to MCU 516 using a multiplexer (MUX) 526b. The voltage readings are used, for example, to ensure that the battery cells are operated within their specified voltage limits and to calculate DC power levels.

Watchdog timer 532 is used to monitor and ensure the proper operation of battery pack controller 414. In the event that an unrecoverable error or unintended infinite software loop should occur during operation of battery pack controller 414, watchdog timer 532 can reset battery pack controller 414 so that is resumes operating normally.

Reset button 534 is used to manually reset operation of battery pack controller 414. As shown in FIG. 5, reset button 534 is coupled to MCU 516.

Figure 6A:
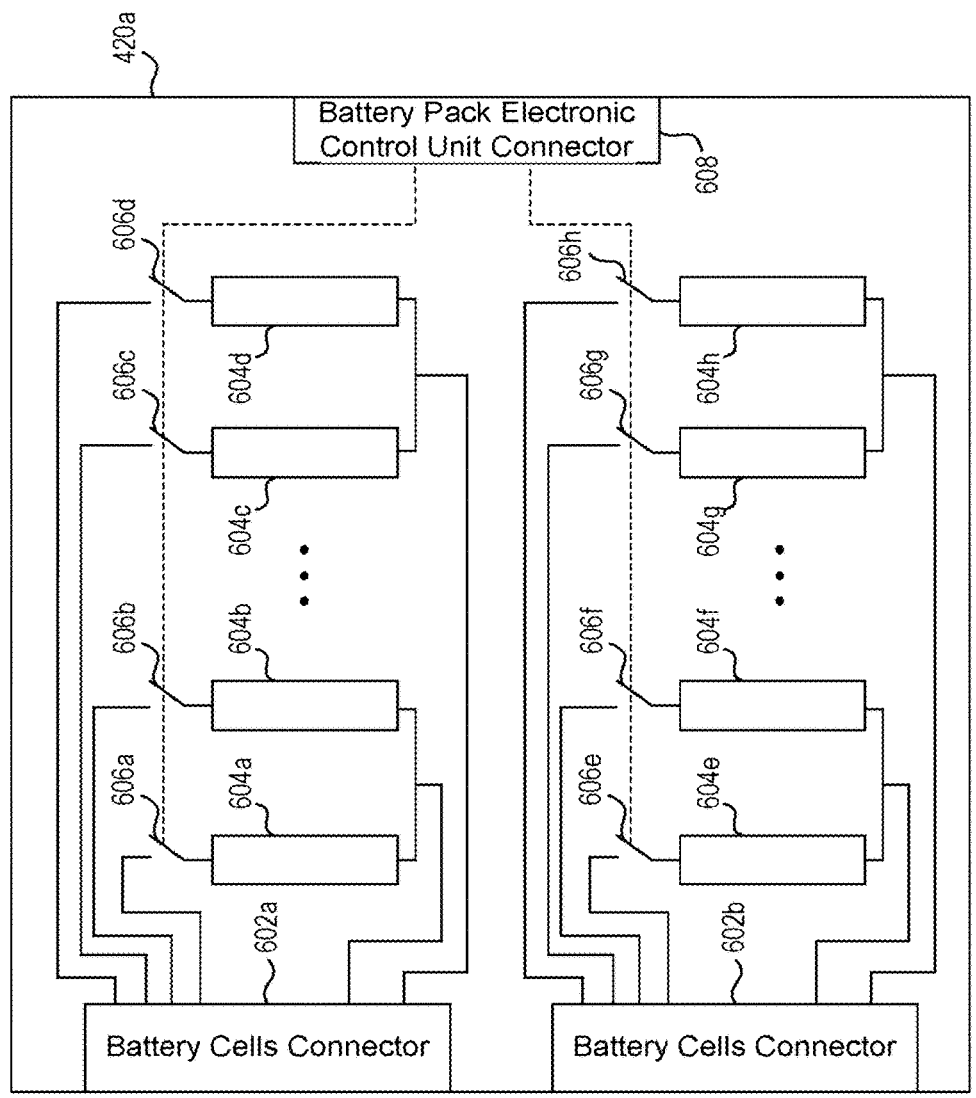
FIG. 6A is a diagram that illustrates a battery pack cell balancer according to an embodiment.

FIG. 6A is a diagram that illustrates a battery pack cell balancer 420a according to an embodiment of the disclosure. Battery pack cell balancer 420a includes a first set of resistors 604a-d coupled through switches 606a-d to a battery cells connector 602a and a second set of resistors 604e-h coupled through switches 606e-h to a battery cells connector 602b. Battery cells connectors 602a and 602b are used to connect battery pack cell balancer 420a to the battery cells of battery pack 302. A battery pack electronic control unit (ECU) connector 608 connects switches 604a-h to battery pack controller 414.

In operation, switches 604a-h of battery pack cell balancer 420a are selectively opened and closed to vary the amount of energy stored in the battery cells of battery pack 302. The selective opening and closing of switches 604a-h allows energy stored in particular battery cells of battery pack to be discharged through resistors 604a-h, or for energy to bypass selected battery cells during charging of the battery cells of battery pack 302. The resistors 604a-h are sized to permit a selected amount of energy to be discharged from the battery cells of battery pack 302 in a selected amount of time and to permit a selected amount of energy to bypass the battery cells of battery pack 302 during charging. In an embodiment, when the charging energy exceeds the selected bypass energy amount, the closing of switches 604a-h is prohibited by battery pack controller 414.

Figure 6B:
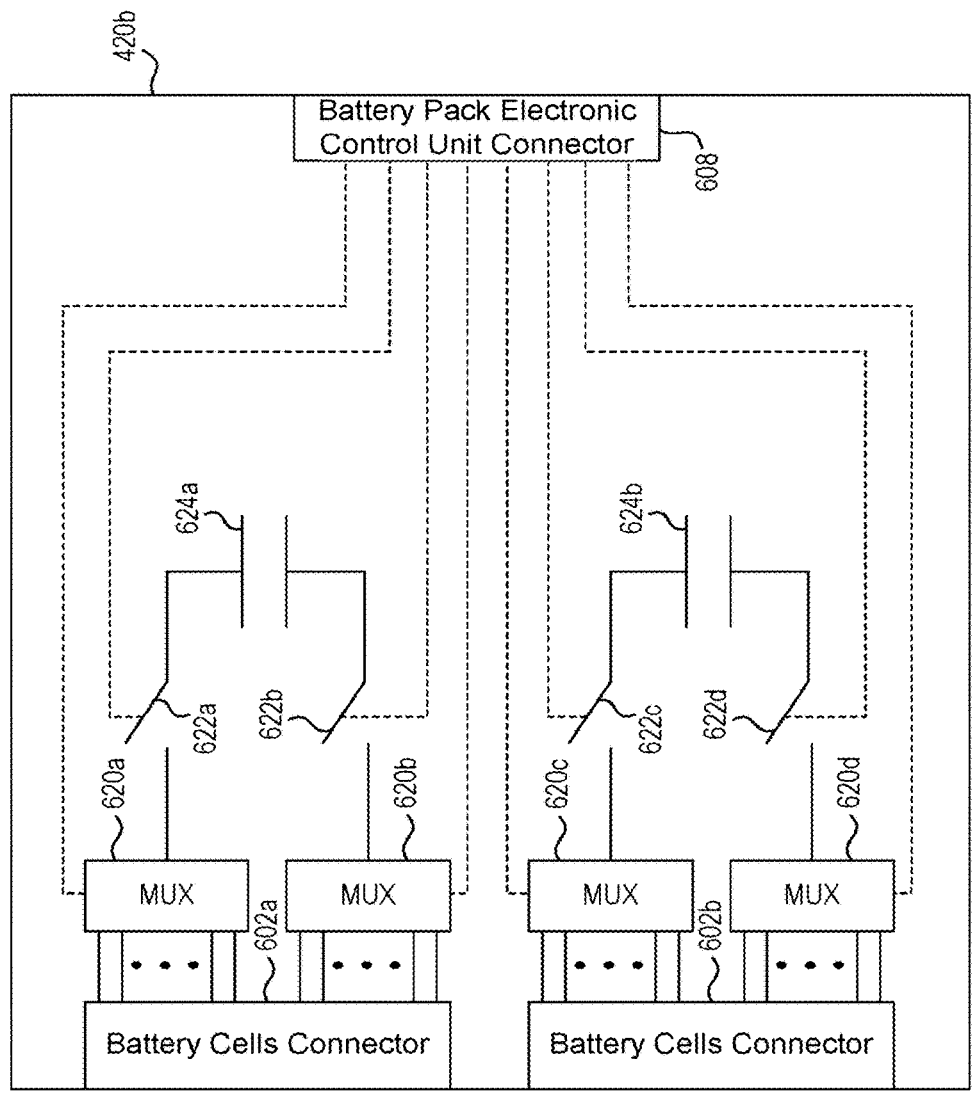
FIG. 6B is a diagram that illustrates a battery pack cell balancer according to an embodiment.

FIG. 6B is a diagram that illustrates a battery pack cell balancer 420b. Battery pack cell balancer 420b includes a first capacitor 624a coupled to two multiplexers (MUX) 620a and 620b through switches 622a and 622b, and a second capacitor 624b coupled to two multiplexers (MUX) 620c and 620d through switches 622c and 622d. Multiplexers 620a and 620b are connected to battery cells connector 602a. Multiplexers 620c and 620d are connected to battery cells connector 602b. Battery pack electronic control unit (ECU) connector 608 connects switches 622a-d to battery pack controller 414.

In operation, multiplexers 620a-b and switches 622a-b are first configured to connect capacitor 624a to a first battery cell of battery pack 302. Once connected, capacitor 624a is charged by the first battery cell, and this charging of capacitor 624a reduces the amount of energy stored in the first battery cell. After charging, multiplexers 620a-b and switches 622a-b are then configured to connect capacitor 624a to a second battery cell of battery pack 302. This time, energy stored in capacitor 624a is discharged into the second battery cell thereby increasing the amount of energy stored in the second battery cell. By continuing this process, capacitor 624a shuttles energy between various cells of battery pack 302 and thereby balances the battery cells. In a similar manner, multiplexers 620c-d, switches 622c-d, and capacitor 624b are also used to shuttle energy between various cells of battery pack 302 and balance the battery cells.

Figure 6C:
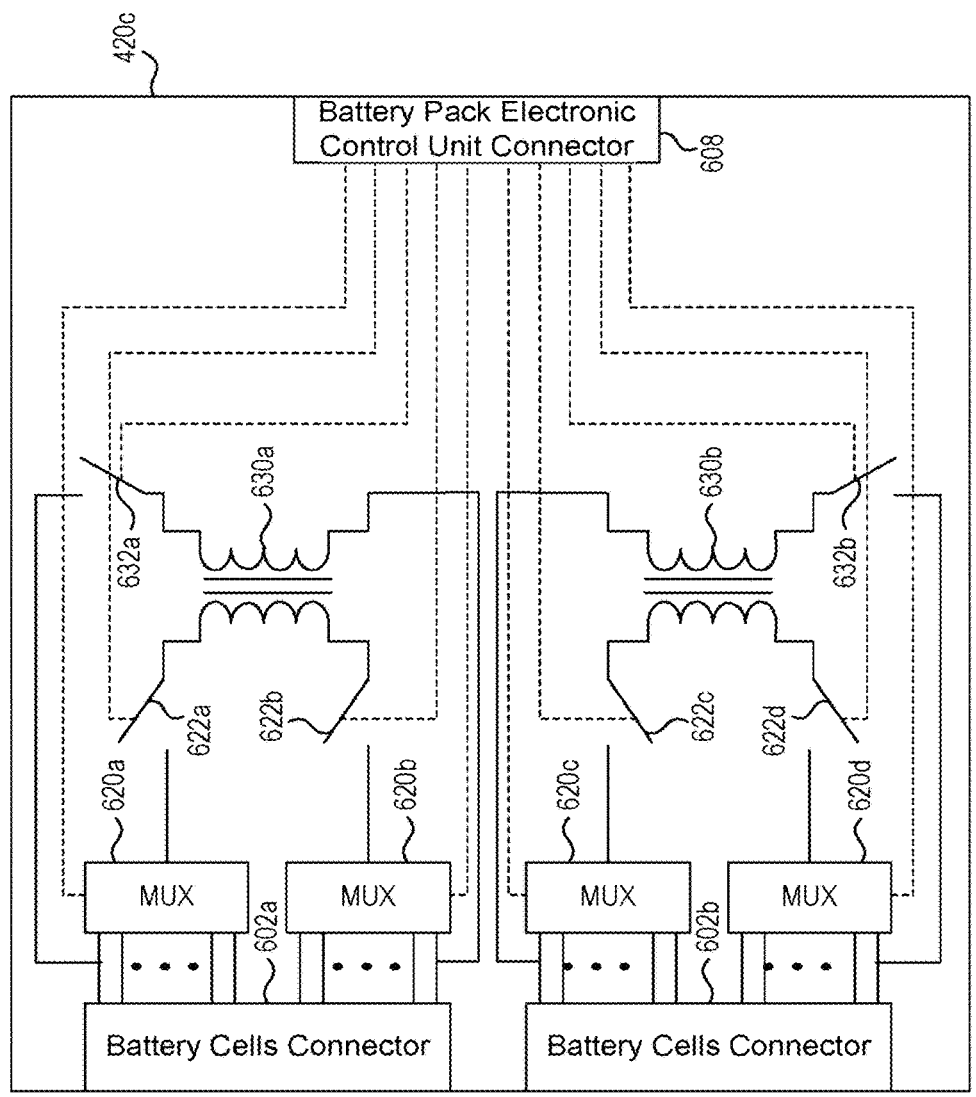
FIG. 6C is a diagram that illustrates a battery pack cell balancer according to an embodiment.

FIG. 6C is a diagram that illustrates a battery pack cell balancer 420c. Battery pack cell balancer 420c includes a first inductor 630a coupled to two multiplexers (MUX) 620a and 620b through switches 622a and 622b, and a second inductor 630b coupled to two multiplexers (MUX) 620c and 620d through switches 622c and 622d. Multiplexers 620a and 620b are connected to battery cells connector 602a. Multiplexers 620c and 620d are connected to battery cells connector 602b. Battery cells connectors 602a and 602b are used to connect battery pack cell balancer 420a to the battery cells of battery pack 302. Inductor 630a is also connected by a switch 632a to battery cells of battery pack 302, and inductor 630b is connected by a switch 632b to battery cells of battery pack 302. Battery pack electronic control unit (ECU) connector 608 connects switches 622a-d and switches 632a-b to battery pack controller 414.

In operation, switch 632a is first closed to allow energy from the batteries of battery pack 302 to charge inductor 630a. This charging removes energy from the battery cells of battery pack 302 and stores the energy in inductor 630a. After charging, multiplexers 620a-b and switches 622a-b are configured to connect inductor 630a to a selected battery cell of battery pack 302. Once connected, inductor 630a discharges its stored energy into the selected battery cell thereby increasing the amount of energy stored in the selected battery cell. By continuing this process, inductor 630a is thus used to take energy from the battery cells of battery pack 302 connected to inductor 632a by switch 632a and to transfer this energy only to selected battery cells of battery pack 302. The process thus can be used to balance the battery cells of battery pack 302. In a similar manner, multiplexers 620c-d, switches 622c-d and 632b, and inductor 630b are also used to transfer energy and balance the battery cells of battery pack 302.

As will be understood by persons skilled in the relevant art given the description herein, each of the circuits described in FIGS. 6A-C have advantages in their operation, and in embodiments of the disclosure elements of these circuits are combined and used together to bypass and/or transfer energy and thereby balance the battery cells of battery pack 302.

Figure 7:
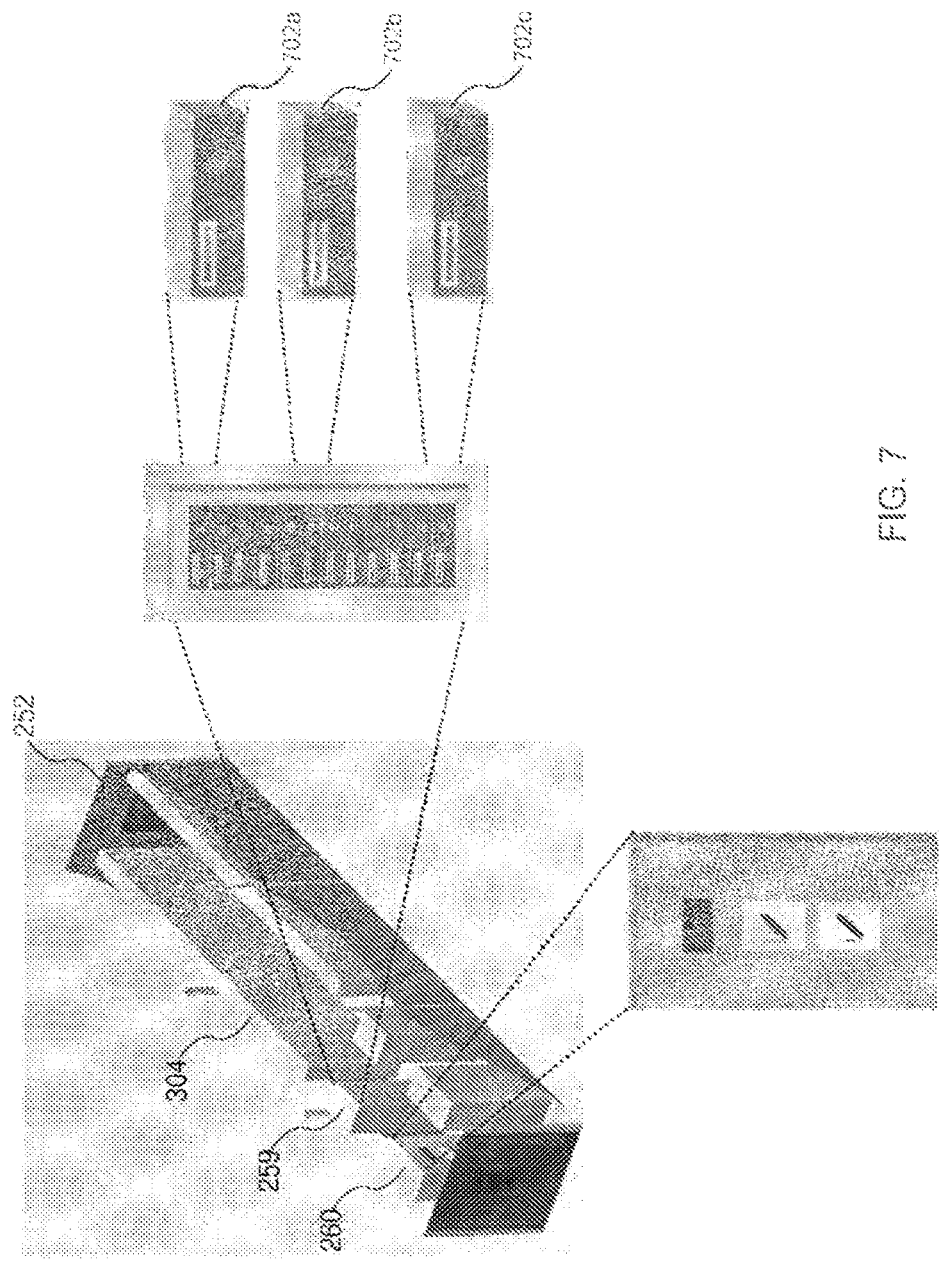
FIG. 7 is a diagram that illustrates an electrical energy storage unit according to an embodiment.

FIG. 7 is a diagram that further illustrates an electrical energy storage unit 252 according to an embodiment of the disclosure. As shown in FIG. 7, a control unit 259 includes multiple battery system controllers 702a-c. As described in more detail below, each battery system controller 702 monitors and controls a subset of the battery packs 302 that make up a battery unit 304 (see FIG. 3). In an embodiment, the battery system controllers 702 are linked together using CAN (CANBus) communications, which enables the battery system controllers 702 to operate together as part of an overall network of battery system controllers. This network of battery system controllers can manage and operate any size battery system such as, for example, a multi-megawatt-hour centralized storage battery system. In an embodiment, one of the networked battery system controllers 702 can be designated as a master battery system controller and used to control battery charge and discharge operations by sending commands that operate one or more inverters and/or chargers connected to the battery system.

As shown in FIG. 7, in an embodiment electrical energy storage unit 252 includes a bi-directional inverter 260. Bi-directional inverter 260 is capable of both charging a battery unit 304 and discharging the battery unit 304 using commands issued, for example, via a computer over a network (e.g. the Internet, an Ethernet, et cetera) as described in more detail below with reference to FIGS. 10B and 10C. In embodiments of the disclosure, both the real power and the reactive power of inverter 260 can be controlled. Also, in embodiments, inverter 260 can be operated as a backup power source when grid power is not available and/or electrical energy storage unit 252 is disconnected from the grid.

FIG. 8A is a diagram that further illustrates a battery system controller 702 according to an embodiment of the disclosure. As shown in FIG. 8A, in an embodiment battery system controller 702 includes an embedded computer processing unit (Embedded CPU) 802, an ampere-hour/power monitor 806, a low voltage relay controller 816, a high voltage relay controller 826, a fuse 830, a current shunt 832, a contactor 834, and a power supply 836.

As shown in FIG. 8A, in an embodiment embedded CPU 802 communicates via CAN (CANBus) communications port 804a with ampere-hour/power monitor 806, low voltage relay controller 816, and battery packs 302. In embodiments, as described herein, embedded CPU 802 also communicates with one or more inverters and/or one or more chargers using, for example, CAN (CANBus) communications.

Other means of communications can also be used however such as, for example, RS 232 communications or RS 485 communications. In operation, embedded CPU 802 performs many functions. These functions include: monitoring and controlling selected functions of battery packs 302, ampere-hour/power monitor 806, low voltage relay controller 816, and high voltage relay controller 826; monitoring and controlling when, how much, and at what rate energy is stored by battery packs 302 and when, how much, and at what rate energy is discharged by battery packs 302; preventing the over-charging or over-discharging of the battery cells of battery packs 302; configuring and controlling system communications; receiving and implementing commands, for example, from an authorized user or another networked battery system controller 702; and providing status and configuration information to an authorized user or another networked battery system controller 702. These functions, as well as other functions performed by embedded CPU 802, are described in more detail below.

As described in more detail below, examples of the types of status and control information monitored and maintained by embedded CPU 802 include that identified with references to FIGS. 19A-E, 21, 22A-B, and 23A-B. In embodiments, embedded CPU 802 monitors and maintains common electrical system information such as inverter output power, inverter output current, inverter AC voltage, inverter AC frequency, charger output power, charger output current, charger DC voltage, et cetera. Additional status and control information monitored and maintained by embodiments of embedded CPU 802 will also be apparent to persons skilled in the relevant arts given the description herein.

As shown in FIG. 8A, ampere-hour/power monitor 806 includes a CAN (CANBus) communications port 804b, a micro-control unit (MCU) 808, a memory 810, a current monitoring circuit 812, and a voltage monitoring circuit 814. Current monitoring circuit 812 is coupled to current shunt 832 and used to determine a current value and to monitor the charging and discharging of battery packs 302. Voltage monitoring circuit 814 is coupled to current shunt 832 and contactor 834 and used to determine a voltage value and to monitor the voltage of battery packs 302. Current and voltage values obtained by current monitoring circuit 812 and voltage monitoring circuit 814 are stored in memory 810 and communicated, for example, to embedded CPU 802 using CAN (CANBus) communications port 804b.

In an embodiment, the current and voltage values determined by ampere-hour/power monitor 806 are stored in memory 810 and are used by a program stored in memory 810, and executed on MCU 808, to derive values for power, ampere-hours, and watt-hours. These values, as well as status information regarding ampere-hour/power monitor 806, are communicated to embedded CPU 802 using CAN (CANBus) communications port 804b.

As shown in FIG. 8A, low voltage relay controller 816 includes a CAN (CANBus) communications port 804c, a micro-control unit (MCU) 818, a memory 820, a number of relays 822 (i.e., relays R0, R1 . . . RN), and MOSFETS 824. In embodiments, low voltage relay controller 816 also includes temperature sensing circuits (not shown) to monitor, for example, the temperature of the enclosure housing components of battery system controller 702, the enclosure housing electrical energy storage unit 252, et cetera.

In operation, low voltage relay controller 816 receives commands from embedded CPU 802 via CAN (CANBus) communications port 804c and operates relays 822 and MOSFETS 824 accordingly. In addition, low voltage relay controller 816 sends status information regarding the states of the relays and MOSFETS to embedded CPU 802 via CAN (CANBus) communications port 804c. Relays 822 are used to perform functions such, for example, turning-on and turning-off cooling fans, controlling the output of power supplies such as, for example, power supply 836, et cetera. MOSFETS 824 are used to control relays 828 of high voltage relay controller 826 as well as, for example, to control status lights, et cetera. In embodiments, low voltage relay controller 816 executes a program stored in memory 820 on MCU 818 that takes over operational control for embedded CPU 802 in the event that embedded CPU stops operating and/or communication as expected. This program can then make a determination as to whether it is safe to let the system continue operating when waiting for embedded CPU 802 to recover, or whether to initiate a system shutdown and restart.

As shown in FIG. 8A, high voltage relay controller 826 includes a number of relays 828. One of these relays is used to operate contactor 834, which is used to make or break a connection in a current carrying wire that connects battery packs 302. In embodiments, other relays 828 are used, for example to control operation of one or more inverters and/or one or more chargers. Relays 828 can operate devices either directly or by controlling additional contactors (not shown), as appropriate, based on voltage and current considerations.

In embodiments, a fuse 830 is included in battery system controller 702. The purpose of fuse 830 is to interrupt high currents that could damage battery cells or connecting wires.

Current shunt 832 is used in conjunction with ampere-hour/power monitor 806 to monitor the charging and discharging of battery packs 302. In operation, a voltage is developed across current shunt 832 that is proportional to the current flowing through current shunt 832. This voltage is sensed by current monitoring circuit 812 of ampere-hour/power monitor 806 and used to generate a current value.

Power supply 836 provides DC power to operate the various components of battery system controller 702. In embodiments, the input power to power supply 836 is either AC line voltage, DC battery voltage, or both.

FIGS. 8B and 8C are diagrams that further illustrate an exemplary battery system controller 702 according to an embodiment of the disclosure. FIG. 8B is a top, front-side view of the example battery system controller 702, with the top cover removed in order to show a layout for the housed components. FIG. 8C is a top, left-side view of the exemplary battery system controller 702, also with the top cover removed to show the layout of the components.

As shown in FIG. 8B, FIG. 8C, or both, battery system controller 702 includes an enclosure 840 that houses embedded CPU 802, ampere-hour/power monitor 806, low voltage relay controller 816, high voltage relay controller 826, a fuse holder and fuse 830, current shunt 832, contactor 834, and power supply 836. Also included in enclosure 840 are a circuit breaker 842, a power switch 844, a first set of signal connectors 846 (on the front side of enclosure 840), a second set of signal connectors 854 (on the back side of enclosure 840), a set of power connectors 856a-d (on the back side of enclosure 840), and two high voltage relays 856a and 856b. In FIGS. 8B and 8C, the wiring has been intentionally omitted so as to more clearly show the layout of the components. How to wire the components together, however, will be understood by persons skilled in the relevant art given the description herein.

The purpose and operation of embedded CPU 802, ampere-hour/power monitor 806, low voltage relay controller 816, high voltage relay controller 826, a fuse holder and fuse 830, current shunt 832, contactor 834, and power supply 836 have already been described above with reference to FIG. 8A. As will be known to persons skilled in the relevant art, the purpose of circuit breaker 842 is safety. Circuit breaker 842 is connected in series with current shunt 832 and is used to interrupt high currents that could damage battery cells or connecting wires. It can also be used, for example, to manually open the current carry wire connecting battery packs 302 together during periods of maintenance or non-use of electrical energy storage unit 252. Similarly, power switch 844 is used to turn on and turn off the AC power input to battery system controller 702.

The purpose of the first set of signal connectors 846 (on the front side of enclosure 840) is to be able to connect to embedded CPU 802 without having to take battery system controller 702 out of control unit 259 and/or without having to remove the top cover of enclosure 840. In an embodiment, the first set of signal connectors 846 includes USB connectors 848, RJ-45 connectors 850, and 9-pin connectors 852. Using these connectors, it is possible to connect, for example, a keyboard and a display (not shown) to embedded CPU 802.

The purpose of the second set of signal connectors 854 (on the back side of enclosure 840) is to be able to connect to and communicate with other components of electrical energy storage unit 252 such as, for example, battery packs 302 and inverters and/or chargers. In an embodiment, the second set of signal connectors 854 includes RJ-45 connectors 850 and 9-pin connectors 852. The RJ-45 connectors 850 are used, for example, for CAN (CANBus) communications and Ethernet/internet communications. The 9-pin connectors 852 are used, for example, for RS-232 or RS-485 communications.

The purpose of the power connectors 856a-d (on the back side of enclosure 840) is for connecting power conductors. In an embodiment, each power connect 856 has two larger current carrying connection pins and four smaller current carrying connection pins. One of the power connectors 856 is used to connect one end of current shunt 832 and one end of contactor 834 to the power wires connecting together battery packs 302 (e.g., using the two larger current carrying connection pins) and for connecting the input power to one or both of power supplies 416 or 418 of battery packs 302 to control a relay or relays inside enclosure 840 (e.g., using either two or four of the four smaller current carrying connection pins). A second power connector 856 is used, for example, to connect grid AC power to a control relay inside housing 840. In embodiments, the remaining two power connectors 856 are used, for example, to connect relays inside enclosure 840 such as relays 856a and 856b to power carrying conductors of inverters and/or chargers.

In an embodiment, the purpose of high voltage relays 856a and 856b is to make or to break a power carrying conductor of a charger and/or an inverter connected to battery packs 302. By breaking the power carrying conductors of a charger and/or an inverter connected to battery packs 302, these relays can be used to prevent operation of the charger and/or inverter and thus protect against the over-charging or over-discharging of battery packs 302.

FIG. 9 is a diagram that illustrates an electrical energy storage unit 900 according to an embodiment of the disclosure. Electrical energy storage unit 900, as described herein, can be operated as a stand-alone electrical energy storage unit, or it can be combined together with other electrical energy storage units 900 to form a part of a larger electrical energy storage unit such as, for example, electrical energy storage unit 252.

As shown in FIG. 9, electrical energy storage unit 900 includes a battery system controller 702 coupled to one or more battery packs 302a-n. In embodiments, as described in more detail below, battery system controller 702 can also be coupled to one or more chargers and one or more inverters represented in FIG. 9 by inverter/charge 902.

The battery system controller 702 of electrical energy storage unit 900 includes an embedded CPU 802, an ampere-hour/power monitor 806, a low voltage relay controller 816, a high voltage relay controller 826, a fuse 830, a current shunt 832, a contactor 834, and a power supply 836. Each of the battery packs 302a-n includes a battery module 412, a battery pack controller 414, an AC power supply 416, and a battery pack cell balancer 420.

In operation, for example, during a battery charging evolution, electrical energy storage unit 900 performs as follows. Embedded CPU 802 continually monitors status information transmitted by the various components of electrical energy storage unit 900. If based on this monitoring, embedded CPU 802 determines that the unit is operating properly, then when commanded, for example, by an authorized user or by a program execution on embedded CPU 802 (see, e.g., FIG. 10B below), embedded CPU 802 sends a command to low voltage relay controller 816 to close a MOSFET switch associated with contactor 834. Closing this MOSFET switch activates a relay on high voltage relay controller 826, which in turn closes contactor 834. The closing of contactor 834 couples the charger (i.e., inverter/charger 902) to battery packs 302a-n.

Once the charger is coupled to battery packs 302a-n, embedded CPU 802 sends a command to the charger to start charging the battery packs. In embodiments, this command can be, for example, a charger output current command or a charger output power command. After performing self checks, the charge will start charging. This charging causes current to flow through current shunt 832, which is measured by ampere-hour/power monitor 806. Ampere-hour/power monitor 806 also measures the total voltage of the battery packs 302a-n. In addition to measuring current and voltage, ampere-hour/power monitor 806 calculates a DC power value, an ampere-hour value, and a watt-hour value. The ampere-hour value and the watt-hour value are used to update an ampere-hour counter and a watt-hour counter maintained by ampere-hour/power monitor 806. The current value, the voltage value, the ampere-hour counter value, and the watt-hour counter value are continuously transmitted by ampere-hour/power monitor 806 to embedded CPU 802 and the battery packs 302*a-n*.

During the charging evolution, battery packs 302*a-n* continuously monitor the transmissions from ampere-hour/power monitor 806 and use the ampere-hour counter values and watt-hour counter values to update values maintained by the battery packs 302*a-n*. These values include battery pack and cell state-of-charge (SOC) values, battery pack and cell ampere-hour (AH) dischargeable values, and battery pack and cell watt-hour (WH) dischargeable values, as described in more detail below with reference to FIG. 21. Also during the charging evolution, embedded CPU 802 continuously monitors the transmissions from ampere-hour/power monitor 806 as well as the transmissions from battery packs 302*a-n*, and uses the ampere-hour counter transmitted values and the battery pack 302*a-n* transmitted values to update values maintained by embedded CPU 802. The values maintained by embedded CPU 802 include battery pack and cell SOC values, battery pack and cell AH dischargeable values, battery pack and cell WH dischargeable values, battery and cell voltages, and battery and cell temperatures as described in more detail below with reference to FIGS. 22A and 22B. As long as everything is working as expected, the charging evolution will continue until a stop criteria is met. In embodiments, the stop criteria include, for example, a maximum SOC value, a maximum voltage value, or a stop-time value.

During the charging evolution, when a stop criterion is met, embedded CPU 802 sends a command to the charger to stop the charging. Once the charging is stopped, embedded CPU 802 sends a command to low voltage relay controller 816 to open the MOSFET switch associated with contactor 834. Opening this MOSFET switch changes the state of the relay on high voltage relay controller 826 associated with contactor 834, which in turn opens contactor 834. The opening of contactor 834 decouples the charger (i.e., inverter/charger 902) from battery packs 302*a-n*.

As described in more detail below, battery packs 302*a-n* are responsible for maintaining the proper SOC and voltage balances of their respective battery modules 412. In an embodiment, proper SOC and voltage balances are achieved by the battery packs using their battery pack controllers 414, and/or their AC power supplies 416 to get their battery modules 412 to conform to target values such as, for example, target SOC values and target voltage values transmitted by embedded CPU 802. This balancing can take place either during a portion of the charging evolution, after the charging evolution, or at both times.

As will be understood by persons skilled in the relevant art given the description here, a discharge evolution by electrical energy storage unit 900 occurs in a manner similar to that of a charge evolution except that the battery packs 302*a-n* are discharged rather than charged.

FIG. 10A is a diagram that further illustrates electrical energy storage unit 252 according to an embodiment of the disclosure. As shown in FIG. 10A, electrical energy storage unit 252 is formed by combining and networking several electrical energy storage units 900*a-n*. Electrical energy storage unit 900*a* includes a battery system controller 702*a* and battery packs 302*a*₁-n₁. Electrical energy storage unit 900 *n* includes a battery system controller 702 *n* and battery packs 302*aₙ-nₙ*. The embedded CPUs 802*a-n* of the battery system controllers 702*a-n* are coupled together and communicate with each other using CAN (CANBus) communications. Other communication protocols can also be used. Information communicated between the embedded CPUs 802*a-n* include information identified below with reference to FIGS. 22A and 22B.

In operation, electrical energy storage unit 252 operates similarly to that described herein for electrical energy storage system 900. Each battery system controller 702 monitors and controls its own components such as, for example, battery packs 302. In addition, one of the battery system controllers 702 operates as a master battery system controller and coordinates the activities of the other battery system controllers 702. This coordination includes, for example, acting as an overall monitor for electrical energy storage unit 252 and determining and communicating target values such as, for example target SOC values and target voltage values that can be used to achieve proper battery pack balancing. More details regarding how this is achieved are described below, for example, with reference to FIG. 25.

FIG. 10B is a diagram that illustrates an electrical energy storage system 1050 according to an embodiment of the disclosure. As illustrated in FIG. 10B, in an embodiment, system 1050 includes an electrical energy storage unit 252 that is in communication with a server 1056. Server 1056 is in communication with data bases/storage devices 1058 *a-n*. Server 1056 is protected by a firewall 1054 and is shown communicating with electrical energy storage unit 252 via internet network 1052. In other embodiments, other means of communication are used such as, for example, cellular communications or an advanced metering infrastructure communication network. Users of electrical energy storage system 1050 such as, for example, electric utilities and/or renewable energy asset operators interact with electrical energy storage system 1050 using user interface(s) 1060. In an embodiment, the user interfaces are graphical, web-based user interfaces, for example, which can be accessed by computers connected directly to server 1056 or to internet network 1052. In embodiments, the information displayed and/or controlled by user interface(s) 1060 include, for example, the information identified below with references to FIGS. 19A-E, 21, 22A-B, and 23A-B. Additional information as will be apparent to persons skilled in the relevant art(s) given the description herein can also be included and/or controlled.

In embodiments, user interface(s) 1060 can be used to update and/or change programs and control parameters used by electrical energy storage unit 252. By changing the programs and/or control parameters, a user can control electrical energy storage unit 252 in any desired manner. This includes, for example, controlling when, how much, and at what rate energy is stored by electrical energy storage unit 252 and when, how much, and at what rate energy is discharged by electrical energy storage unit 252. In an embodiment, the user interfaces can operate one or more electrical energy storage units 252 so that they respond, for example, like spinning reserve and potentially prevent a power brown out or black out.

In an embodiment, electrical energy storage system 1050 is used to learn more about the behavior of battery cells. Server 1056, for example, can be used for collecting and processing a considerable amount of information about the behavior of the battery cells that make up electrical energy storage unit 252 and about electrical energy storage unit 252 itself. In an embodiment, information collected about the battery cells and operation of electrical energy storage unit 252 can be utilized by a manufacturer, for example, for improving future batteries and for developing a more effective future system. The information can also be analyzed to determine, for example, how operating the battery cells in a particular manner effects the battery cells and the service life of the electrical energy storage unit 252. Further features and benefits of electrical energy storage system 1050 will be apparent to persons skilled in the relevant art(s) given the description herein.

FIG. 10C is a diagram that illustrates an electrical energy storage system 1050 according to an alternative embodiment of the disclosure. A user of the electrical energy storage system 1050 may use a computer 1070 (on which a user interface may be provided) to access the electrical energy storage unit 252 via a network connection 1080 other than the internet. The network 1080 in FIG. 10C may be any network contemplated in the art, including an Ethernet, or even a single cable that directly connects the computer 1070 to the electrical energy storage unit 252.

FIGS. 11-20 are diagrams that further illustrate exemplary electrical energy storage units and various electrical energy storage systems that employee the electrical energy storage units according to the disclosure.

FIG. 11 is a diagram that illustrates an electrical energy storage system 1100 according to an embodiment of the disclosure. Electrical energy storage system 1100 includes an electrical energy storage unit 900, a generator 1104, cellular telephone station equipment 1112, and a cellular telephone tower and equipment 1114. As shown in FIG. 11, electrical energy storage unit 900 includes a battery 1102 comprised on ten battery packs 302a-j, a battery system controller 702, a charger 1106, and an inverter 1108. In embodiments of the disclosure, battery 1102 can contain more ten or less than ten battery packs 302.

In operation, generator 1104 is run and used to charge battery 1102 via charger 1106. When battery 1102 is charged to a desired state, generator 1104 is shutdown. Battery 1102 is then ready to supply power to cellular telephone station equipment 1112 and/or to equipment on the cellular telephone tower. Battery system controller 702 monitors and controls electrical energy storage unit 900 as described herein.

In embodiments of the disclosure, inverter 1108 can operate at the same time charger 1106 is operating so that inverter 1108 can power equipment without interruption during charging of battery 1102. Electrical energy storage system 1100 can be use for backup power (e.g., when grid power is unavailable), or it can be used continuously in situations in which there is no grid power present (e.g., in an off-grid environment).

FIG. 12 is a diagram that illustrates an electrical energy storage system 1200 according to an embodiment of the disclosure. Electrical energy storage system 1200 is similar to electrical energy storage system 1100 except that electrical energy storage unit 900 now powers a load 1202. Load 1202 can be any electrical load so long as battery 1102 and generator 1104 are sized accordingly.

Electrical energy storage system 1200 is useful, for example, in off-grid environments such as remote hospitals, remote schools, remote government facilities, et cetera. Because generator 1104 is not required to run continuously to power load 1202, significant fuel savings can be achieved as well as an improvement in the operating life of generator 1104. Other savings can also be realized using electrical energy storage system 1200 such as, for example, a reduction in the costs of transporting the fuel needed to operate generator 1104.

FIG. 13 is a diagram that illustrates an electrical energy storage system 1300 according to an embodiment of the disclosure. Electrical energy storage system 1300 is similar to electrical energy storage system 1200 except that generator 1104 has been replaced by solar panels 1302. In electrical energy storage system 1300, solar panels 1302 are used to generate the electricity that is used to charge battery 1102 and to power load 1202.

Electrical energy storage system 1300 is useful, for example, in off-grid environments similar to electrical energy storage system 1200. One advantage of electrical energy storage system 1300 over electrical energy storage system 1200 is that no fuel is required. Not having a generator and the no fuel requirement makes electrical energy storage system 1300 easier to operate and maintain than electrical energy storage system 1200.

FIG. 14 is a diagram that illustrates an electrical energy storage system 1400 according to an embodiment of the disclosure. Electrical energy storage system 1400 is similar to electrical energy storage system 1300 except that solar panels 1302 have been replaced by a grid connection 1402. In electrical energy storage system 1400, grid connection 1402 is used to provide the electricity that is used to charge battery 1102 and to power load 1202.

Electrical energy storage system 1400 is useful, for example, in environments where grid power is available. One advantage of electrical energy storage system 1400 over electrical energy storage system 1300 is that its initial purchase price is less than the purchase price of electrical energy storage system 1400. This is because no solar panels 1302 are required.

FIG. 15 is a diagram that illustrates an electrical energy storage system 1500 according to an embodiment of the disclosure. Electrical energy storage system 1500 includes an electrical energy storage unit 900 connected to the power grid via grid connection 1402.

Electrical energy storage system 1500 stores energy from the grid and supplies energy to the grid, for example, to help utilities shift peak loads and perform load leveling. As such, electrical energy storage unit 900 can use a bi-directional inverter 1502 rather than, for example, a separate inverter and a separate charger. Using a bi-directional inverter is advantageous in that it typically is less expensive than buying a separate inverter and a separate charger.

In embodiments of the disclosure, electrical energy storage unit 900 of electrical energy storage system 1500 is operated remotely using a user interface and computer system similar to that described herein with reference to FIG. 10B. Such a system makes the energy stored in battery 1102 dispatchable in a manner similar to how utility operators interact to dispatch energy from a gas turbine.

FIG. 16 is a diagram that illustrates an electrical energy storage system 1600 according to an embodiment of the disclosure. Electrical energy storage system 1600 includes an electrical energy storage unit 900 (housed in an outdoor enclosure 1602) that is coupled to solar panels 1606 (mounted on the roof of a house 1640) and to a grid connection 1608.

In operation, solar panels 1606 and/or grid connection 1608 can be used to charge the battery of electrical energy storage unit 900. The battery of electrical energy storage unit 900 can then be discharge to power loads within house 1604 and/or to provide power to the grid via grid connection 1608.

FIG. 17 is a diagram that illustrates the electrical energy storage unit 900 housed in outdoor enclosure 1602 according to an embodiment of the disclosure. As shown in FIG. 17, electrical energy storage unit 900 includes a battery 1102, a battery system controller 702, a charger 1106, and inverter 1108, and a circuit breaker box and circuit breakers 1704. Electrical energy storage unit 900 operates in a manner described herein.

In an embodiment, outdoor enclosure 1602 is a NEMA 3R rated enclosure. Enclosure 1602 has two door mounted on the front side and two doors mounted on the back side of enclosure 1602 for accessing the equipment inside the enclosure. The top and side panels of the enclosure can also be removed for additional access. In embodiment, enclosure 1602 is cooled using fans controlled by battery system controller 702. In embodiments, cooling can also be achieved by an air conditioning unit (not shown) mounted on one of the doors.

As will be understood by persons skilled in the relevant art(s) given the description herein, the disclosure is not limited to using outdoor enclosure 1602 to house electrical energy storage unit 900. Other enclosures can also be used.

As shown in FIG. 18, in an embodiment of the disclosure a computer 1802 is used to interact with and control electrical energy storage unit 900. Computer 1802 can be any computer such as, for example, a personal computer running a Windows or a Linux operating system. The connection between the computer 1802 and electrical energy storage system 900 can be either a wired connection or a wireless connection. This system for interacting with electrical energy storage unit 900 is suitable, for example, for a user residing in house 1604 who wants to use the system. For other users such as, for example, a utility operator, a system similar to that described herein with reference to FIG. 10B may be used, thereby providing additional control and more access to information available from electrical energy storage unit 900.

In embodiments of the disclosure, electrical energy storage unit 900 may be monitored and/or controlled by more than one party such as, for example, by the resident of house 1602 and by a utility operator. In such cases, different priority levels for authorized users can be established in order to avoid any potential conflicting commands.

FIGS. 19A-E are diagrams that illustrate an exemplary user interface 1900 according to an embodiment of the disclosure, which is suitable for implementation, for example, on computer 1802. The exemplary interface is intended to be illustrative and not limiting of the disclosure.

Figure 19A:
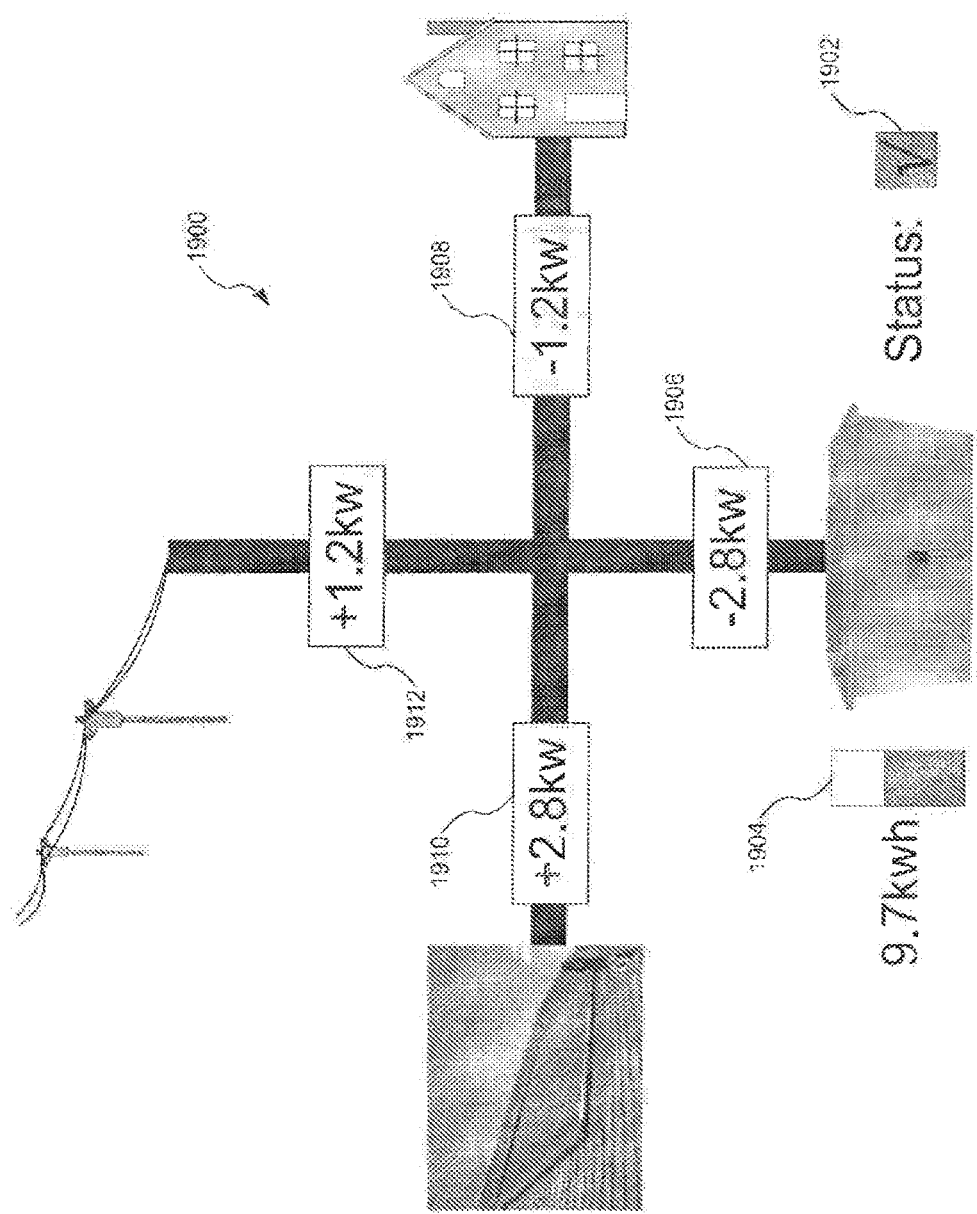

In an embodiment, as shown in FIG. 19A, user interface 1900 includes a status indicator 1902, a stored energy indicator 1904, an electrical energy storage unit power value 1906, a house load value 1908, a solar power value 1910, and a grid power value 1912. The status indicator 1902 is used to indicate the operational status of electrical energy storage unit 900. The stored energy indicator 1904 is used to show how much energy is available to be discharged from electrical energy storage unit 900. The four values 1906, 1908, 1910 and 1912 show the rate and the direction of energy flow of the components of electrical energy storage system 1600.

In FIG. 19A, the value 1906 indicates that energy is flowing into electrical energy storage unit 900 at a rate of 2.8 kw. The value 1908 indicates that energy is flowing into house 1604 to power loads at a rate of 1.2 kw. The value 1910 indicates that energy is being generated by solar panels 1606 at a rate of 2.8 kw. The value 1912 indicates that energy being drawn from grid connection 1608 at a rate of 1.2 kw. From these values, one can determine that the system is working, that the solar panels are generating electricity, that the battery of the electrical energy storage unit is being charged, and that energy is being purchased from a utility at a rate of 1.2 kw.

Figure 19B:
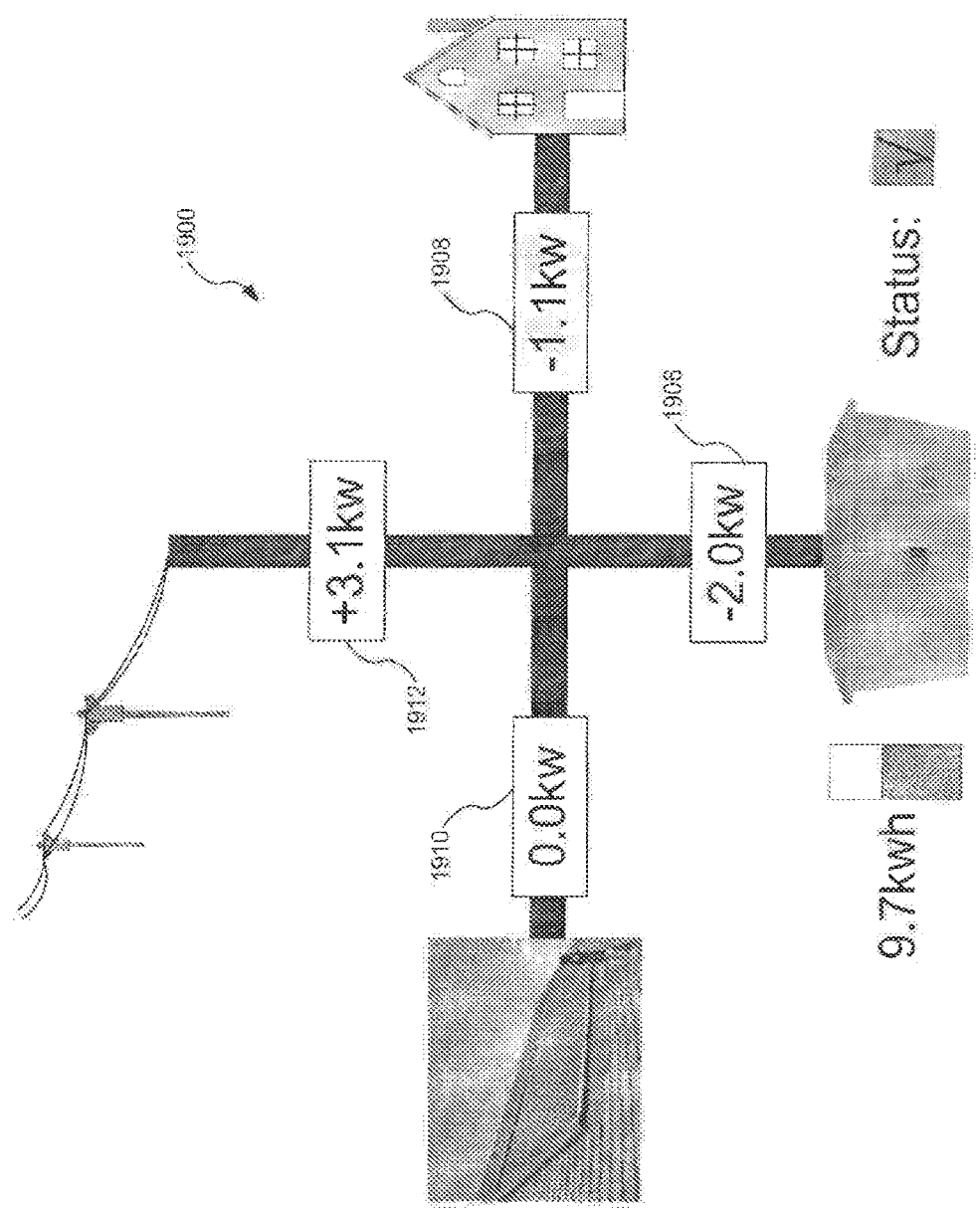

FIG. 19B depicts the state of electrical energy power system 1600 at a point in time when no energy is being produced by the solar panels such as, for example, at night. The value 1906 indicates that energy is flowing into electrical energy storage unit 900 at a rate of 2.0 kw. The value 1908 indicates that energy is flowing into house 1604 to power loads at a rate of 1.1 kw. The value 1910 indicates that no energy is being generated by solar panels 1606. The value 1912 indicates that energy is being provided from grid connection 1608 at a rate of 3.1 kw. From these values, one can determine that the system is working, that the solar panels are not generating electricity, that the battery of the electrical energy storage unit is being charged, and that energy is being purchased from the utility at a rate of 3.1 kw.

Figure 19C:
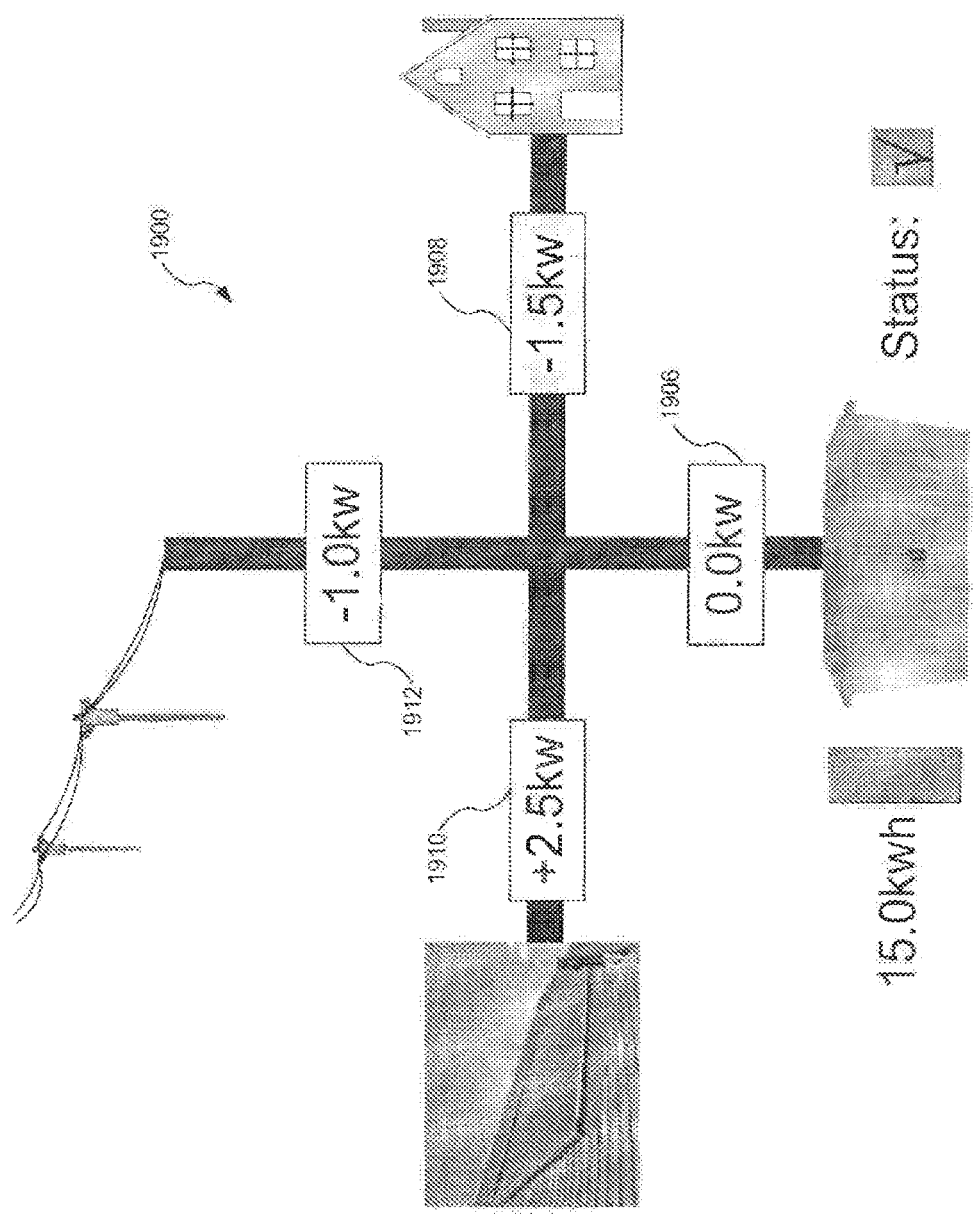

FIG. 19C depicts the state of electrical energy power system 1600 at a point in time in which the battery of electrical energy storage unit 900 is fully charged and the solar panels are generating electricity. The value 1906 indicates electrical energy storage unit 900 is neither consuming power nor generating power. The value 1908 indicates that energy is flowing into house 1604 to power loads at a rate of 1.5 kw. The value 1910 indicates that energy is being generated by solar panels 1606 at a rate of 2.5 kw. The value 1912 indicates that energy is being provided to grid connection 1608 at a rate of 1.0 kw.

Figure 19D:
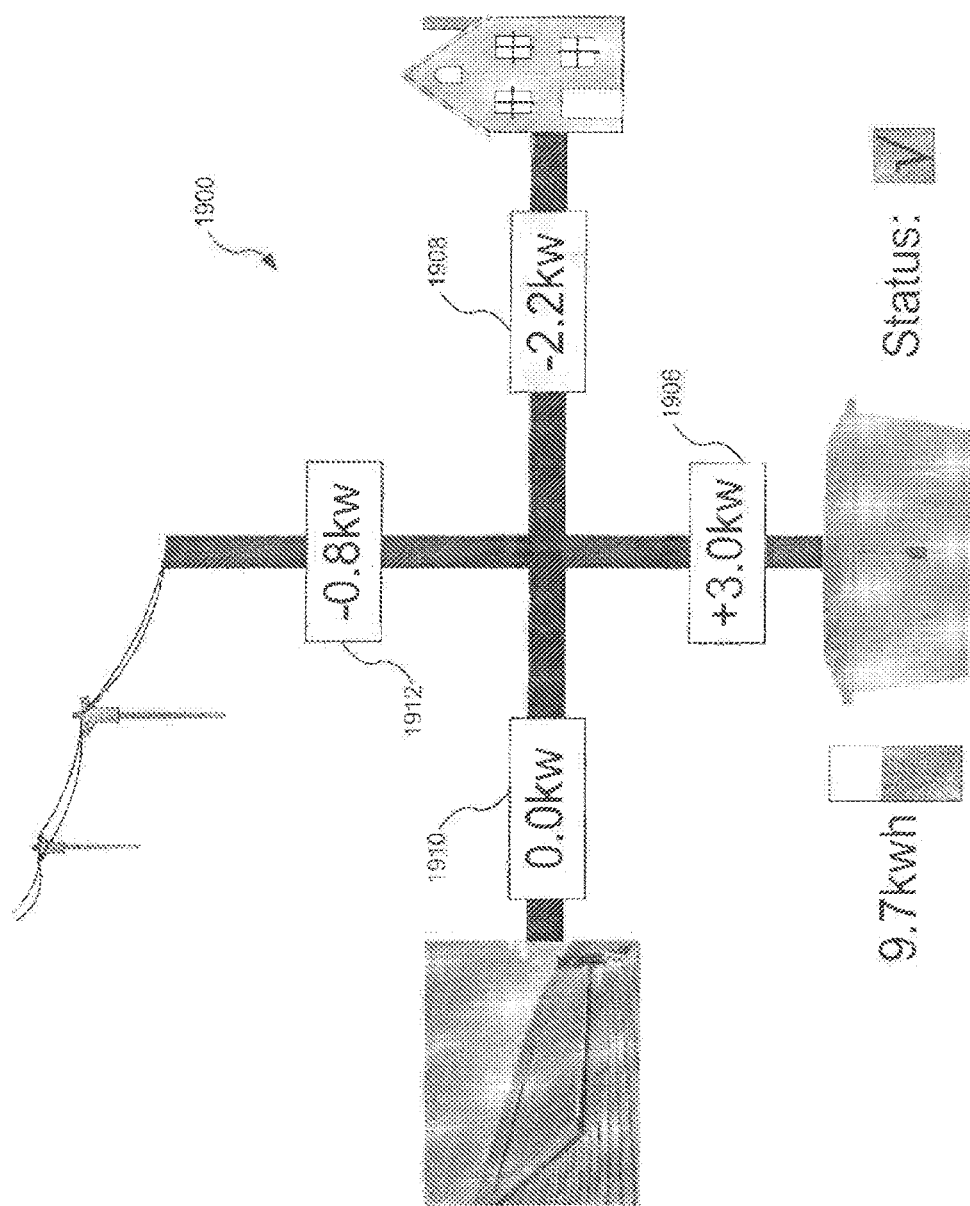

FIG. 19D depicts the state of electrical energy power system 1600 at a point in time when no energy is being produced by the solar panels such as, for example, at night, and when electrical energy storage unit 900 is generating more electricity than is being used to power loads in house 1604. The value 1906 indicates that energy is flowing out of electrical energy storage unit 900 at a rate of 3.0 kw. The value 1908 indicates that energy is flowing into house 1604 to power loads at a rate of 2.2 kw. The value 1910 indicates that no energy is being generated by solar panels 1606. The value 1912 indicates that energy is being provided to grid connection 1608 at a rate of 0.8 kw.

Figure 19E:
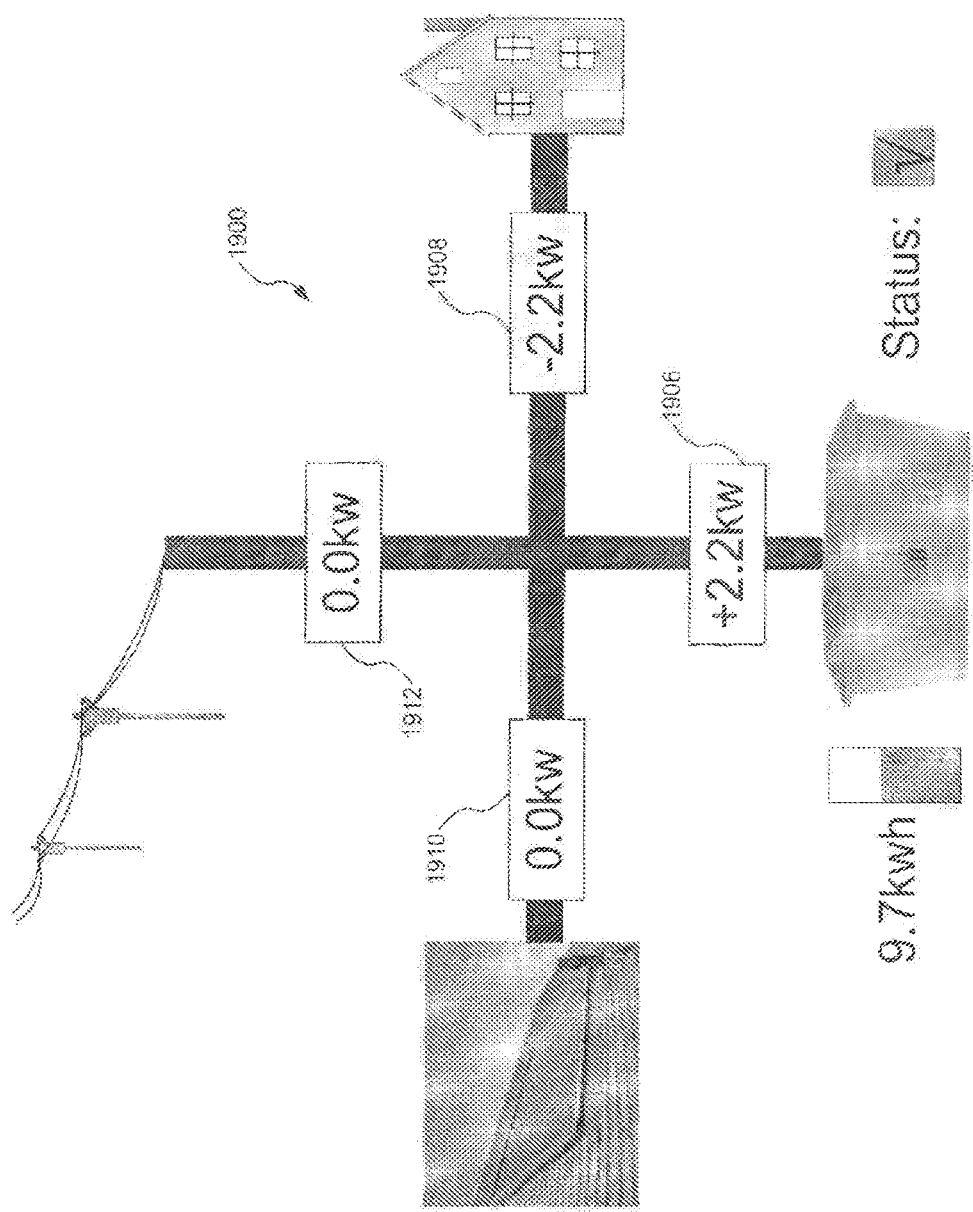

FIG. 19E depicts the state of electrical energy power system 1600 at a point in time when no energy is being produced by the solar panels such as, for example, at night, and when electrical power storage unit 900 is being controlled so as only to generate the electrical needs of loads in house 1604. The value 1906 indicates that energy is flowing out of electrical energy storage unit 900 at a rate of 2.2 kw. The value 1908 indicates that energy is flowing into house 1604 to power loads at a rate of 2.2 kw. The value 1910 indicates that no energy is being generated by solar panels 1606. The value 1912 indicates that no energy is being drawn from or supplied to grid connection 1608.

As will be understood by persons skilled in the relevant arts after reviewed FIGS. 19A-E and the description of the disclosure herein, electrical energy storage system 1600 has many advantages for both electricity consumers and utilities. These advantages include, but are not limited to, the ability of the utility to level its loads, the ability to provide back-up power for the customer in the event of power disruptions, support for plug-in electric vehicles and the deployment and renewable energy sources (e.g., solar panels), the capability to provide better grid regulation, and the capability to improve distribution line efficiencies.

FIGS. 20-25 are diagrams that illustrate various software features of the disclosure. In embodiments, the software features are implemented using both programmable memory and non-programmable memory.

FIG. 20 is a diagram that illustrates how various software features of the disclosure described herein are distributed among the components of an exemplary electrical energy storage unit 900. As shown in FIG. 20, in an embodiment a battery system controller 702 of electrical energy storage unit 900 has three components that include software. The software is executed using a micro-control unit (MCU). These components are an embedded CPU 802, an ampere-hour/power monitor 806, and a low voltage relay controller 816.

Embedded CPU 802 includes a memory 2004 that stores an operating system (OS) 2006 and an application program (APP) 2008. This software is executed using MCU 2002. In an embodiment, this software works together to receive input commands from a user using a user interface, and it provides status information about electrical energy storage unit 900 to the user via the user interface. Embedded CPU 802 operates electrical energy storage unit 900 according to received input commands so long as the commands will not put electrical energy storage unit 900 into an undesirable or unsafe state. Input commands are used to control, for example, when a battery 1102 of electrical energy storage unit 900 is charged and discharged. Input commands are also used to control, for example, the rate at which battery 1102 is charged and discharged as well as how deeply battery 1102 is cycled during each charge-discharge cycle. The software controls charging of battery 1102 by sending commands to a charger electronic control unit (ECU) 2014 of a charger 1106. The software controls discharging of battery 1102 by sending commands to an inverter electronic control unit (ECU) 2024 of an inverter 1108.

In addition to controlling operation of charger 1106 and inverter 1108, embedded CPU 802 works together with battery packs 302a-302n and ampere-hour/power monitor 806 to manage battery 1102. The software resident and executing on embedded CPU 802, the battery pack controller 414a-n of battery packs 302a-n, and ampere-hour/power monitor 806 ensure safe operation of battery 1102 at all times and take appropriate action, if necessary, to ensure for example that battery 1102 is neither over-charged nor over-discharged.

As shown in FIG. 20, ampere-hour/power monitor 806 includes a memory 810 that stores an application program 2010. This application program is executed using MCU 808. In embodiments, application program 2010 is responsible for keeping track of how much charge is put into battery 1102 during battery charging evolutions or taken out of battery 1102 during battery discharging evolutions. This information is communicated to embedded CPU 802 and the battery system controllers 414 of battery packs 302.

Low voltage relay controller 816 includes a memory 820 that stores and application program 2012. Application program 2012 is executed using MCU 818. In embodiments, application program 2012 opens and closes both relays and MOSFET switches in responds to commands from embedded CPU 802. In addition, it also sends status information about the states of the relays and MOSFET switches to embedded CPU 802. In embodiments, low voltage relay controller 816 also includes temperature sensors that are monitored using application program 2012, and in some embodiments, application program 2012 includes sufficient functionality so that low voltage relay controller 816 can take over for embedded CPU 802 when it is not operating as expected and make a determination as to whether to shutdown and restart electrical energy storage unit 900.

Charger ECU 2014 of charger 1106 includes a memory 2018 that stores an application program 2020. Application program 2020 is executed using MCU 2016. In embodiments, application program 2020 is responsible for receiving commands from embedded CPU 802 and operating charger 1106 accordingly. Application program 2020 also sends status information about charger 1106 to embedded CPU 802.

Inverter ECU 2024 of inverter 1108 includes a memory 2028 that stores an application program 2030. Application program 2030 is executed using MCU 2026. In embodiments, application program 2030 is responsible for receiving commands from embedded CPU 802 and operating inverter 1108 accordingly. Application program 2030 also sends status information about inverter 1108 to embedded CPU 802.

As also shown in FIG. 20, each battery pack 302 includes a battery system controller 414 that has a memory 518. Each memory 518 is used to store an application program 2034. Each application program 2034 is executed using an MCU 516. The application programs 2034 are responsible for monitoring the cells of each respective battery pack 302 and sending status information about the cells to embedded CPU 802. The application programs 2034 are also responsible for balancing both the voltage levels and the state-of-charge (SOC) levels of the battery cells of each respective battery pack 302.

In an embodiment, each application program 2034 operates as follows. At power on, MCU 518 starts executing boot loader software. The boot loader software copies application software from flash memory to RAM, and the boot loader software starts the execution of the application software. Once the application software is operating normally, embedded CPU 802 queries battery pack controller 414 to determine whether it contains the proper hardware and software versions for the application program 2008 executing on embedded CPU 802. If battery pack controller 414 contains an incompatible hardware version, the battery pack controller is ordered to shutdown. If battery pack controller 414 contains an incompatible or outdated software version, embedded CPU 802 provides the battery pack controller with a correct or updated application program, and the battery pack controller reboots in order to start executing the new software.

Once embedded CPU 802 determines that battery pack controller 414 is operating with the correct hardware and software, embedded CPU 802 verifies that battery pack 414 is operating with the correct configuration data. If the configuration data is not correct, embedded CPU 802 provides the correct configuration data to battery pack controller 414, and battery pack controller 414 saves this data for use during its next boot up. Once embedded CPU 802 verifies that battery pack controller 414 is operating with the correct configuration data, battery pack controller 414 executes its application software until it shuts down. In an embodiment, the application software includes a main program that runs several procedures in a continuous while loop. These procedures include, but are not limited to: a procedure to monitor cell voltages; a procedure to monitor cell temperatures; a procedure to determine each cell's SOC; a procedure to balance the cells; a CAN (CANBus) transmission procedure; and a CAN (CANBus) reception procedure. Other procedures implemented in the application software include alarm and error identification procedures as well as procedures needed to obtain and manage the data identified in FIG. 21 not already covered by one of the above procedures.

As will be understood by persons skilled in the relevant art(s) given the description herein, the other application programs described herein with reference to FIG. 20 operate in a similar manner except that the implemented procedures obtain and manage different data. This different data is described herein both above and below with reference to other figures.

FIG. 21 is a diagram that illustrates exemplary data obtained and/or maintained by the battery pack controllers 414 of battery packs 302. As shown in FIG. 21, this data includes: the SOC of the battery pack as well as the SOC of each cell; the voltage of the battery pack as well as the voltage of each cell; the average temperature of the battery pack as well as the temperature of each cell; the AH dischargeable of the battery pack as well as each cell; the WH dischargeable of the battery pack as well as each cell; the capacity of the battery pack as well as each cell; information about the last calibration discharge of the battery pack; information about the last calibration charge of the battery pack, information about the AH and WI-I efficiency of the battery pack and each cell; and self discharge information.

FIGS. 22A and 23B are diagrams that illustrate exemplary data obtained and/or maintained by embedded CPU 802 in an embodiment of electrical energy storage unit 900 according to the disclosure. As shown in FIGS. 22A-B, this data includes: SOC information about battery 1102 and each battery pack 302; voltage information about battery 1102 and each battery pack 302; temperature information about battery 1102 and each battery pack 302; AH dischargeable information about battery 1102 and each battery pack 302; WH dischargeable information about battery 1102 and each battery pack 302; capacity information about battery 1102 and each battery pack 302; information about the last calibration discharge of battery 1102 and each battery pack 302; information about the last calibration charge of battery 1102 and each battery pack 302, information about the AH and WH efficiency of battery 1102 and each battery pack 302; and self discharge information.

In addition to the data identified in FIGS. 22A and 23B, embedded CPU 802 also obtains and maintains data related to the health or cycle life of battery 1102. This data is identified in FIGS. 23A and 23B.

In an embodiment, the data shown in FIGS. 23A and 23B represents a number of charge and discharge counts (i.e., counter values), which work as follows. Assume for example that the battery is initially at 90% capacity, and it is discharged down to 10% of its capacity. This discharge represents an 80% capacity discharge, in which the ending discharge state is 10% of capacity. Thus, for this discharge, the discharge counter represented by a battery SOC after discharge of 10-24%, and which resulted from a 76-90% battery capacity discharge (i.e., the counter in FIG. 23B having a value of 75), would be incremented. In a similar manner, after each charge evolution or discharge evolution of the battery, embedded CPU 802 determines the appropriate counter to increment and increments it. A procedure implemented in software adds the values of the counts, using different weights for different counter values, to determine an effective cycle-life for the battery. For purposes of the disclosure, the exemplary counters identified in FIGS. 23A and 23B are intended to be illustrative and not limiting.

FIGS. 24A-B are diagrams that illustrate how calibration, charging and discharging evolutions of an electrical energy storage unit are controlled according to an embodiment of the disclosure. As described herein, the battery of an electrical energy storage unit is managed based on both battery cell voltage levels and battery cell state-of-charge (SOC) levels.

As shown in FIG. 24A and described below, four high voltage values 2402 (i.e., $V_{H1}$, $V_{H2}$, $V_{H3}$, and $V_{H4}$) and four high state-of-charge values 2406 (i.e., $SOC_{H1}$, $SOC_{H2}$, $SOC_{H3}$, and $SOC_{H4}$) are used to control charging evolution. Four low voltage values 2404 (i.e., $V_{L1}$, $V_{L2}$, $V_{L3}$, and $V_{L4}$) and four low state-of-charge values 2408 (i.e., $SOC_{L1}$, $SOC_{L2}$, $SOC_{L3}$, and $SOC_{L4}$) are used to control discharging evolution. In embodiments of the disclosure, as shown in FIG. 24A, the voltages 2410a for a particular set of battery cells (represented by X's in FIG. 24A) can all be below a value of $V_{H1}$, while the SOC values 2410b for some or all of these cells is at or above a value of $SOC_{H1}$. Similarly, as shown in FIG. 24B, the voltages 2410c for a set of battery cells (represented by X's in FIG. 24B) can all be above a value of $V_{L1}$ while the SOC values 2410d for some or all of these cells is at or below a value of $SOC_{L1}$. Therefore, as described in more detail below, all eight voltage values and all eight SOC values are useful, as described herein, for managing the battery of an electrical energy storage unit according to the disclosure.

Because, as described herein, cell voltage values and cell SOC values are important to the proper operation of an electrical energy storage unit according to the disclosure, it is necessary to periodically calibrate the unit so that it is properly determining the voltage levels and the SOC levels of the battery cells. This is done using a calibration procedure implemented in software.

The calibration procedure is initially executed when a new electrical energy storage unit is first put into service. Ideally, all the cells of the electrical energy storage unit battery should be at about the same SOC (e.g., 50%) when the battery cells are first installed in the electrical energy storage unit. This requirement is to minimize the amount of time needed to complete the initial calibration procedure. Thereafter, the calibration procedure is executed whenever one of the following recalibration triggering criteria is satisfied: Criteria 1: a programmable recalibration time interval such as, for example six months have elapsed since the last calibration date; Criteria 2: the battery cells have been charged and discharged (i.e., cycled) a programmable number of weighted charge and discharge cycles such as, for example, the weighted equivalent of 280 full charge and full discharge cycles; Criteria 3: the high SOC cell and the low SOC cell of the electrical energy storage unit battery differ by more than a programmable SOC percentage such as, for example 2-5% after attempting to balance the battery cells; Criteria 4: during battery charging, a situation is detected where one cell reaches a value of $V_{H4}$ while one or more cells are at a voltage of less than $V_{H1}$ (see FIG. 24A), and this situation cannot be corrected by cell balancing; Criteria 5: during battery discharging, a situation is detected where one cell reaches $V_{L4}$ while one or more cells are at a voltage of greater than $V_{L1}$, and this situation cannot be corrected by cell balancing.

When one of the above recalibration trigger criteria is satisfied, a battery recalibration flag is set by embedded CPU 802. The first battery charge performed after the battery recalibration flag is set is a charge evolution that fully charges all the cells of the battery. The purpose of this charge is to put all the cells of the battery into a known full charge state. After the battery cells are in this known full charge state, the immediately following battery discharge is called a calibration discharge. The purpose of the calibration discharge is to determine how many dischargeable ampere-hours of charge are stored in each cell of the battery and how much dischargeable energy is stored in each cell of the battery when fully charged. The battery charge conducted after the calibration discharge is called a calibration charge. The purpose of the calibration charge is to determine how many ampere-hours of charge must be supplied to each battery cell and how many watt-hours of energy must be supplied to each battery cell following a calibration discharge to get all the cells back to their known conditions at the end of the full charge. The values determined during implementation of this calibration procedure are stored by embedded CPU 802 and used to determine the SOC of the battery cells during normal operation of the electrical energy storage unit.

In an embodiment, the first charge after the battery recalibration flag is set is performed as follows. Step 1: Charge the cells of the battery at a constant current rate of CAL-I until the first cell of the battery reaches a voltage of $V_{H2}$. Step 2: Once the first cell of the battery reaches a voltage of $V_{H2}$, reduce the battery cell charging current to a value called END-CHG-I, and resume charging the battery cells. Step 3: Continue charging the battery cells at the END-CHG-I current until all cells of the battery have obtained a voltage value between $V_{H3}$ and $V_{H4}$. Step 4: If during Step 3, any cell reaches a voltage of $V_{H4}$: (a) Stop charging the cells; (b) Discharge, for example, using balancing resistors all battery cells having a voltage greater than $V_{H3}$ until these cells have a voltage of $V_{H3}$; (c) Once all cell voltages are at or below $V_{H3}$, start charging the battery cells again at the END-CHG-I current; and (d) Loop back to Step 3. This procedure when implemented charges all of the cells of the battery to a known state-of-charge called $SOC_{H3}$ (e.g., an SOC of about 98%). In embodiments, the charge rate (CAL-I) should be about 0.3 C and the END-CHG-I current should be about 0.02 to 0.05 C.

As noted above, the first discharge following the above charge is a calibration discharge. In embodiments, the calibration discharge is performed as follows. Step 1: Discharge the cells of the battery at a constant current rate of CAL-I until the first cell of the battery reaches a voltage of $V_{L2}$. Step 2: Once the first cell of the battery reaches a voltage of $V_{L2}$, reduce the battery cell discharging current to a value called END-DISCHG-I (e.g., about 0.02-0.05 C), and resume discharging the battery cells. Step 3: Continue discharging the battery cells at the END-DISCHG-I current until all cells of the battery have obtained a voltage value between $V_{L3}$ and $V_{L4}$. Step 4: If during Step 3, any cell reaches a voltage of $V_{L4}$: (a) Stop discharging the cells; and (b) Discharge, for example using the balancing resistors all battery cells having a voltage greater than $V_{L3}$ until these cells have a voltage of $V_{L3}$. At the end of the calibration discharge, determine the ampere-hours discharged by each cell and the watt-hours discharged by each cell, and record these values as indicated by FIGS. 21, 22A, and 22B. As described herein, the purpose of the calibration discharge is to determine how many dischargeable ampere-hours of charge are stored in each battery cell and how much dischargeable energy is stored in each battery cell when fully charged.

Following the calibration discharge, the next charge that is performed is called a calibration charge. The purpose of the calibration charge is to determine how many ampere-hours of charge must be supplied to each battery cell and how many watt-hours of energy must be supplied to each battery cell following a calibration discharge to get all the cells back to a fill charge. This procedure works as follows: Step 1: Charge the cells of the battery at a constant current rate of CAL-I until the first cell of the battery reaches a voltage of $V_{H2}$; Step 2: Once the first cell of the battery reaches a voltage of $V_{H2}$, reduce the battery cell charging current to a value called END-CHG-I, and resume charging the battery cells. Step 3: Continue charging the battery cells at the END-CHG-I current until all cells of the battery have obtained a voltage value between $V_{H3}$ and $V_{H4}$. Step 4: If during Step 3, any cell reaches a voltage of $V_{H4}$: (a) Stop charging the cells; (b) Discharge, for example, using the balancing resistors all battery cells having a voltage greater than $V_{H3}$ until these cells have a voltage of $V_{H3}$; (c) Once all cell voltages are at or below $V_{H3}$, start charging the battery cells again at the END-CHG-I current; and (d) Loop back to Step 3. At the end of the calibration charge, the determined ampere-hours needed to recharge each battery cell and the determined watt-hours needed to recharge each battery cell are recorded as indicated by FIGS. 21, 22A, and 22B. By comparing the calibration charge information to the calibration discharge information, one can determine both the AH efficiency and the WH efficiency of the electrical energy storage unit.

In embodiments of the disclosure, when the battery of the electrical energy storage unit is charged during normal operations, it is charged using the follow charge procedure. Step 1: Receive a command specifying details for charging the electrical energy storage unit battery from an authorized user or the application program running on embedded CPU 802. This message can specify, for example, a charging current (CHG-I), a charging power (CHG-P), or an SOC value to which the battery should be charged. The command also can specify a charge start time, a charge stop time, or a charge duration time. Step 2: After receipt of the command, the command is verified, and a charge evolution is scheduled according to the specified criteria. Step 3: At the appropriate time, the electrical energy storage unit battery is charged according to the specified criteria so long as no battery cell reaches an SOC greater than $SOC_{H2}$ and no battery cell reaches a voltage of $V_{H2}$. Step 4: If during the charge, a cell of the battery reaches a state-of-charge of $SOC_{H2}$ or a voltage of $V_{H2}$, the charging rate is reduced to a rate no greater than END-CHG-I, and in an embodiment the balancing resistor for the cell is employed (i.e., the balancing resistor's switch is closed) to limit the rate at which the cell is charged. Step 5: After the charging rate is reduced in Step 4, the charging of the battery cells continues at the reduced charging rate until all cells of the battery have obtained an SOC of at least $SOC_{H1}$ or a voltage value between $V_{H1}$ and $V_{H3}$. As battery cells obtain a value of $SOC_{H0}$ or $V_{H2}$, their balancing resistors are employed to reduce their rate of charge. Step 6: If during Step 5, any cell reaches a state-of-charge of $SOC_{H3}$ or a voltage of $V_{H3}$: (a) The charging of the battery cells is stopped; (b) After the charging is stopped, all battery cells having a state-of-charge greater than $SOC_{H2}$ or a voltage greater than $V_{H2}$ are discharged using the balancing resistors until these cells have a state-of-charge of $SOC_{H2}$ or a voltage of $V_{H2}$; (c) Once all cell voltages are at or below $SOC_{H2}$ and $V_{H2}$, start charging the battery cells again at the END-CHG-I current; and (d) Loop back to Step 3.

In embodiments, at the end of the charge procedure described above, the recalibration criteria are checked to determine whether the calibration procedure should be implemented. If any of the calibration triggering criteria is satisfied, then the recalibration flag is set by embedded CPU 802.

In embodiments of the disclosure, when the battery of the electrical energy storage unit is discharged during normal operations, it is discharged using the follow charge procedure. Step 1: Receive a command specifying details for discharging the electrical energy storage unit battery. This command can specify, for example, a discharging current (DISCHG-1), a discharging power (DISCHG-P), or an SOC value to which the battery should be discharged. The command also can specify a discharge start time, a discharge stop time, or a discharge duration time. Step 2: After receipt of the command, the command is verified, and a discharge evolution is scheduled according to the specified criteria. Step 3: At the appropriate time, the electrical energy storage unit battery is discharged according to the specified criteria so long as no battery cell reaches an SOC less than $SOC_{L2}$ and no battery cell reaches a voltage of $V_{L2}$. Step 4: If during the discharge, a cell of the battery reaches a state-of-charge of $SOC_{L2}$ or a voltage of $V_{L2}$, the discharging rate is reduced to a rate no greater than END-DTSCHG-I, and the balancing resistor for the cell is employed (i.e., the balancing resistor's switch is closed) to limit the rate at which the cell is discharged. Step 5: After the discharging rate is reduced in Step 4, the discharging of the battery cells continues at the reduced discharging rate until all cells of the battery have obtained an SOC of at least $SOC_{L1}$ or a voltage value between $V_{L1}$ and $V_{L3}$. Step 6: If during Step 5, any cell reaches a state-of-charge of $SOC_{L3}$ or a voltage of $V_{L3}$: (a) The discharging of the battery cells is stopped; (b) After the discharging is stopped, all battery cells having a state-of-charge greater than $SOC_{L1}$ or a voltage greater than $V_{L1}$ are discharged using the balancing resistors until these cells have a state-of-charge of $SOC_{L1}$ or a voltage of $V_{L1}$; (c) Once all cell voltages are at or below $SOC_{L1}$ or $V_{L1}$, all balancing switches are opened and the discharge of the battery cells is stopped.

At the end of the discharge procedure, the battery recalibration criteria are checked to determine whether the calibration procedure should be implemented. If any of the calibration triggering criteria is satisfied, then the battery recalibration flag is set by embedded CPU 802.

As described herein, embedded CPU 802 and the battery packs 302 continuously monitor the voltage levels and SOC levels of all the cells of the ESU battery. If at any time a cell's voltage or a cell's SOC exceeds or falls below a specified voltage or SOC safety value (e.g., $V_{H4}$, $SOC_{H4}$, $V_{L4}$, or $SOC_{L4}$), embedded CPU 802 immediately stops whatever operation is currently being executed and starts, as appropriate, an over-charge prevention or an over-discharge prevention procedure as described below.

An over-charge prevention procedure is implemented, for example, any time embedded CPU 802 detects a battery cell having a voltage greater than $V_{H4}$ or a state-of-charge greater than $SOC_{H4}$. In embodiments, when the over-charge prevention procedure is implemented, it turns-on a grid-connected inverter (if available) and discharges the battery cells at a current rate called OCP-DISCHG-I (e.g., 5 Amps) until all cells of the battery are at or below a state-of-charge level of $SOC_{H3}$ and at or below a voltage level of $V_{H3}$. If no grid connected inverter is available to discharge the battery cells, then balancing resistors are used to discharge any cell having a state-of-charge level greater than $SOC_{H3}$ or a voltage level greater than $V_{H3}$ until all cells are at a state-of-charge level less than or equal to $SOC_{H3}$ and a voltage level less than or equal to $V_{H3}$.

If during operation, embedded CPU 802 detects a battery cell having a voltage less than $V_{L1}$ or a state-of-charge less than $SOC_{L4}$, embedded CPU 802 will immediately stop the currently executing operation and start implementing an over-discharge prevention procedure. The over-discharge prevention procedure turns-on a charger (if available) and charges the batteries at a current rate called ODP-CHG-I (e.g., 5 Amps) until all cells of the battery are at or above a state-of-charge level of $SOC_{L3}$ and at or above a voltage level of $V_{L3}$. If no charger is available to charge the battery cells, then the individual battery pack balancing chargers are used to charge any cell having a state-of-charge level lower than $SOC_{L3}$ or a voltage level lower than $V_{L3}$ until all cells are at a state-of-charge level greater than or equal to $SOC_{L3}$ and a voltage level greater than or equal to $V_{L3}$.

As described herein, one of the functions of the battery packs 302 is to control the voltage balance and the SOC balance of its battery cells. This is achieved using a procedure implemented in software. In an embodiment, this procedure is as follows. Embedded CPU 802 monitors and maintains copies of the voltage and SOC information transmitted by the battery packs 302. The information is used by embedded CPU 802 to calculate target SOC values and/or target voltage values that are communicated to the battery packs 302. The battery packs 302 then try to match the communicated target values to within a specified tolerance range. As described above, this is accomplished by the battery packs 302 by using, for example, balancing resistors or energy transfer circuit elements and balancing chargers.

In order to more fully understand how balancing is achieved in accordance with embodiments of the disclosure, consider the situation represented by the battery cell voltage values or cell SOC values 2502a depicted in the top half of FIG. 25. The cells 2504 of battery pack 1 (BP-1) are closely centered about a value V/$SOC_2$. The cells 2506 of battery pack 2 (BP-2) are loosely centered about a value between V/$SOC_2$ and V/$SOC_3$. The cells 2508 of battery pack 3 (BP-3) are closely centered about a value V/$SOC_1$. The cells 2510 of battery pack 4 (BP-4) are closely centered about a value between V/$SOC_2$ and V/$SOC_3$. Assuming the targeted value communicated to the battery packs by embedded CPU 802 is that shown in the bottom half of FIG. 25 (i.e., a value between V/$SOC_2$ and V/$SOC_3$), the following actions can be taken by the battery packs to achieve this targeted value. For battery pack 1, the battery pack's balancing charger (e.g., AC balancing charger 416) can be turned-on to add charge to cells 2504 and thereby increase their values from the shown in the top half of FIG. 25 to that shown in the bottom half of FIG. 25 For battery pack 2, the battery pack's balancing charger can be turned-on to add charge to cells 2506 while at the same time closing balancing resistors associated with certain high value cells (thereby by passing charging current), and then turning-off the balancing charger while still leaving some of the balancing resistors closed to discharge energy from the highest value cells until the cells 2506 achieve the state shown in the bottom half of FIG. 25. For battery pack 3, the battery pack's balancing charger can be turned-on to add charge to cells 2508 while at the same time closing balancing resistors associated with certain high value cells (thereby by passing charging current) until the cells 2508 achieve the state shown in the bottom half of FIG. 25. For battery pack 4, no balancing is required because the cells 2510 already conform to the targeted value.

Figure 26A:
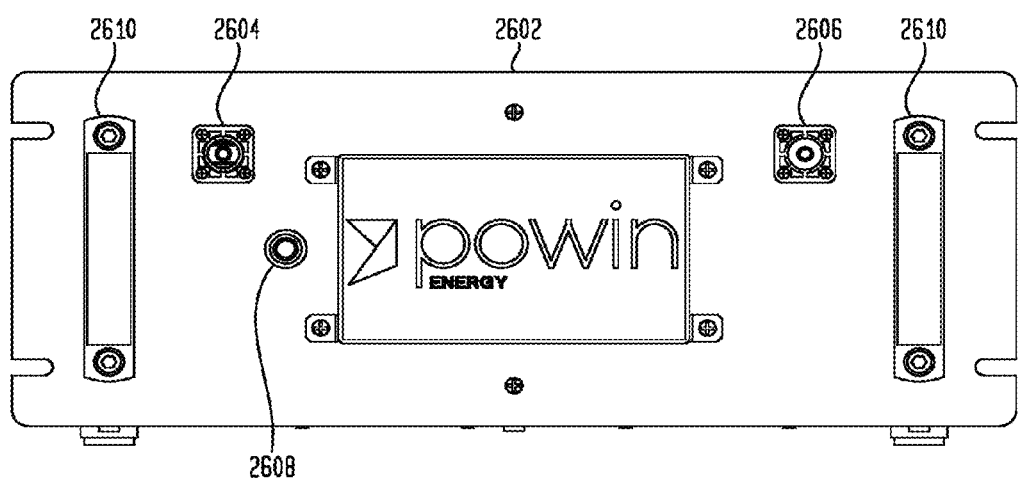
Figure 26B:
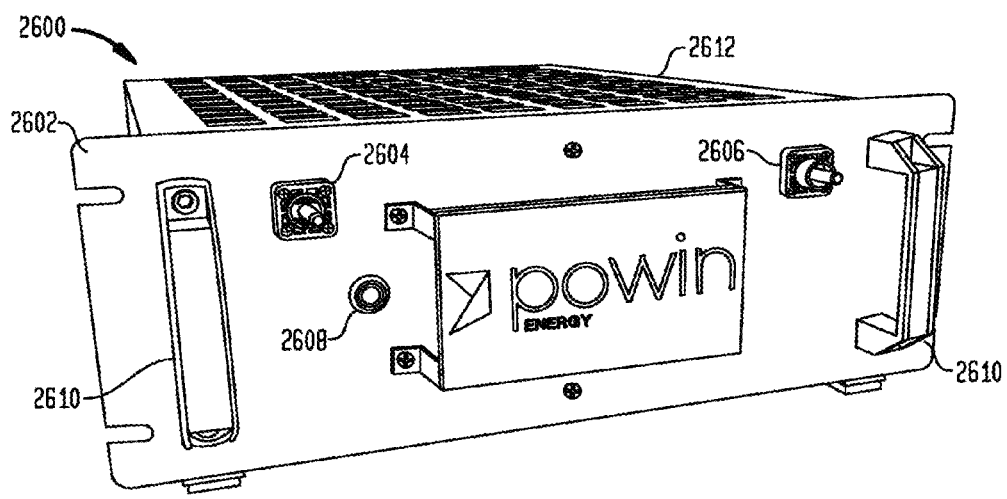
Figure 26C:
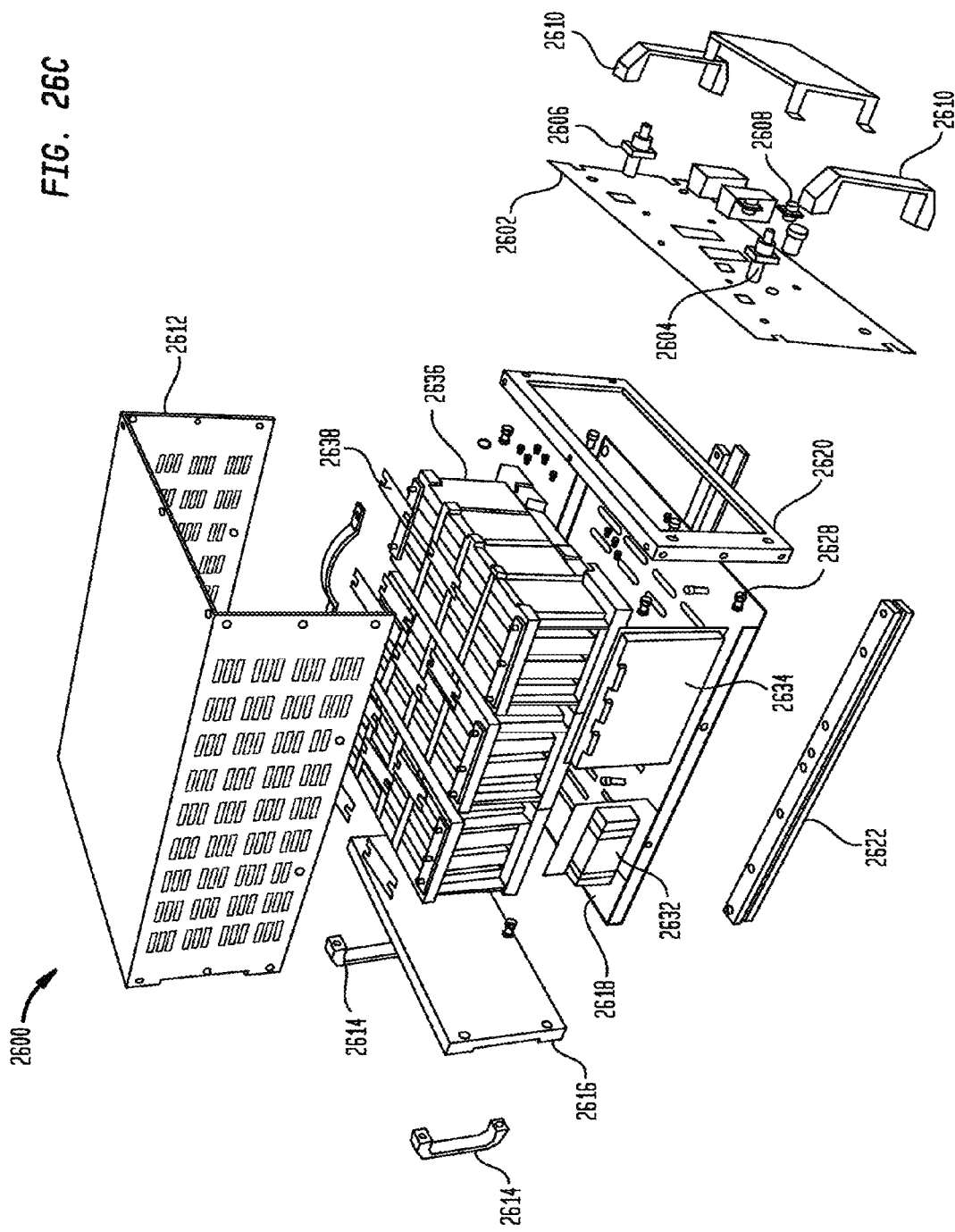
Figure 26D:
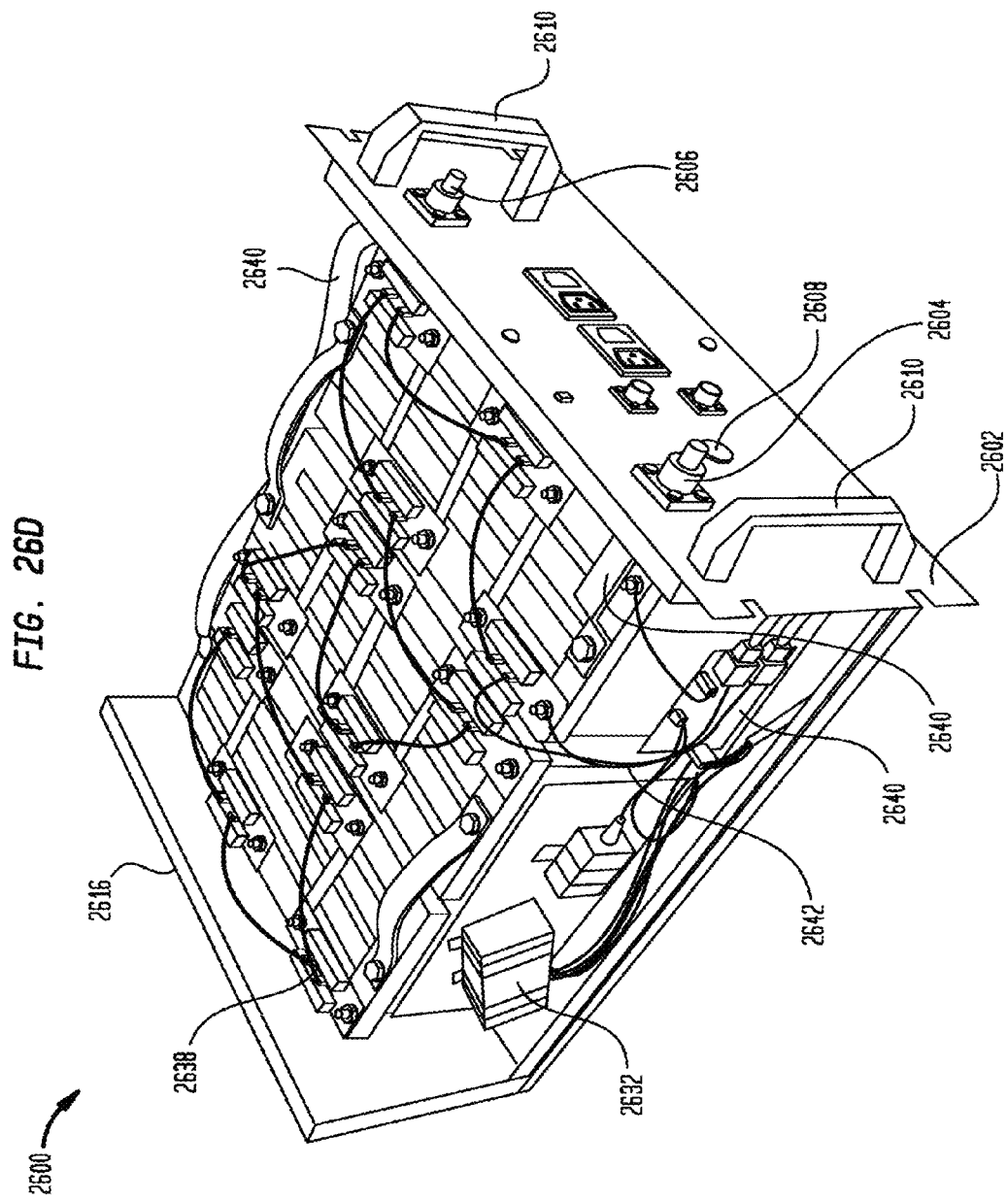

FIGS. 26A, 26B, 26C, and 26D are diagrams illustrating another example battery pack 2600 according to an embodiment of the disclosure. Specifically, FIGS. 26A and 26B depict front views of battery pack 2600, FIG. 26C depicts an exploded view of battery pack 2600, and FIG. 26D depicts a front and side view of battery pack 2600. As shown in FIGS. 26A-D, the housing of battery pack 2600 may include a front panel 2602, a lid or cover 2612, a back panel 2616, and a bottom 2618. The lid 2612, which includes left and right side portions, may include a plurality of air vents to facilitate air flow through battery pack 2600 and aid in cooling the internal components of battery pack 2600. In a non-limiting embodiment, the lid 2612 is "U"-shaped and may be fabricated from a single piece of metal, plastic, or any other material known to one of ordinary skill in the art. The battery packs of FIGS. 48A-48B (below) may be implemented as described in accordance with battery pack 2600 of FIGS. 26A-26D.

The housing of battery pack 2600 may be assembled using fasteners 2628 shown in FIG. 26C, which may be screws and bolts or any other fastener known to one of ordinary skill in the art. The housing of battery pack 2600 may also include front handles 2610 and back handles 2614. As shown in FIG. 26C, front plate 2602 may be coupled to lid 2612 and bottom 2618 via front panel mount 2620. In one embodiment, battery pack 2600 is implemented as a rack-mountable equipment module. For example, battery pack 2600 may be implemented as a standard 19-inch rack (e.g., front panel 2602 having a width of 19 inches, and battery pack 2600 having a depth of between 22 and 24 inches and a height of 4 rack units or "U," where U is a standard unit that is equal to 1.752 inches). As shown in FIG. 26C, battery pack 2600 may include one or more mounts 2622 attached to bottom 2618. Mount 2622 may be used to secure battery pack 2600 in a rack in order to arrange a plurality of battery packs in a stacked configuration (shown in BESS 4700 of FIG. 47 below).

In FIGS. 26A-26D, battery pack 2600 includes a power connector 2604 that may be connected to the negative terminal of the battery pack and a power connector 2606 that may be connected to a positive terminal of the battery pack. In other embodiments, the power connector 2604 may be used to connect to a positive terminal of the battery pack, and power connector 2606 may be used to connect to a negative terminal of the battery pack. As shown in FIGS. 26A and 26B, the power connectors 2604 and 2606 may be provided on the front plate or panel 2602 of battery pack 2600. Power cables (not shown) may be attached to the power connectors 2604 and 2606 and used to add or remove energy from battery pack 2600.

The front panel 2602 of battery pack 2600 may also include a status light and reset button 2608. In one embodiment, status button 2608 is a push button that can be depressed to reset or restart battery pack 2600. In one embodiment, the outer ring around the center of button 2608 may be illuminated to indicate the operating status of battery pack 2600. The illumination may be generated by a light source, such as one or more light emitting diodes, that is coupled to or part of the status button 2608. In this embodiment, different color illumination may indicate different operating states of the battery pack. For example, constant or steady green light may indicate that battery pack 2600 is in a normal operating state; flashing or strobing green light may indicate that battery pack 2600 is in a normal operating state and that battery pack 2600 is currently balancing the batteries; constant or steady yellow light may indicate a warning or that battery pack 2600 is in an error state; flashing or strobing yellow light may indicate a warning or that battery pack 2600 is in an error state and that battery pack 2600 is currently balancing the batteries; constant or steady red light may indicate that the battery pack 2600 is in an alarm state; flashing or strobing red light may indicate that battery pack 2600 needs to be replaced; and no light emitted from the status light may indicate that battery pack 2600 has no power and/or needs to be replaced. In some embodiments, when the status light emits red light (steady or flashing) or no light, connectors in battery pack 2600 or in an external controller are automatically opened to prevent charging or discharging of the batteries. As would be apparent to one of ordinary skill in the art, any color, strobing technique, etc., of illumination to indicate the operating status of battery pack 2600 is within the scope of this disclosure.

Turning to FIGS. 26C-26D, example components that are disposed inside the housing of battery pack 2600 are shown, including (but not limited to) balancing charger 2632, battery pack controller (BPC) 2634, and battery module controller (BMC) 2638. Balancing charger 2632 may be a power supply, such as a DC power supply, and may provide energy to all of the battery cells in a battery pack. In an embodiment, balancing charger 2632 may provide energy to all of the battery cells in the battery pack at the same time. BMC 2638 is coupled to battery module 2636 and may selectively discharge energy from the battery cells that are included in battery module 2636, as well as take measurements (e.g., voltage and temperature) of battery module 2636. BPC 2634 may control balancing charger 2632 and BMC 2638 to balance or adjust the voltage and/or state of charge of a battery module to a target voltage and/or state of charge value.

As shown, battery pack 2600 includes a plurality of battery modules and a BMC (e.g., battery module controller 2638) is coupled to each battery module (e.g., battery module 2636). In one embodiment, which is described in more detail below, n BMCs (where n is greater than or equal to 2) can be daisy-chained together and coupled to a BPC to form a single-wire communication network. In this example arrangement, each BMC may have a unique address and the BPC may communicate with each of the BMCs by addressing one or more messages to the unique address of any desired BMC. The one or more messages (which include the unique address of the BMC) may include an instruction, for example, to remove energy from a battery module, to stop removing energy from a battery module, to measure and report the temperature of the battery module, and to measure and report the voltage of the battery module. In one embodiment, BPC 2634 may obtain measurements (e.g., temperature, voltage) from each of the BMCs using a polling technique. BPC 2634 may calculate or receive (e.g., from a controller outside of battery pack 2600) a target voltage for battery pack 2600, and may use the balancing charger 2632 and the network of BMCs to adjust each of the battery modules to the target voltage. Thus, battery pack 2600 may be considered a smart battery pack, able to self-adjust its battery cells to a target voltage.

The electrical wiring that connects various components of battery pack 2600 has been omitted from FIG. 26C to enhance viewability. However, FIG. 26D illustrates example wiring in battery pack 2600. In the illustrated embodiment, balancing charger 2632 and battery pack controller 2634 may be connected to or mounted on the bottom 2618. While shown as mounted on the left side of battery pack 2600, balancing charger 2632 and battery pack controller 2634, as well as all other components disposed in battery pack 2600, may be disposed at any location within battery pack 2600.

Battery module 2636 includes a plurality of battery cells. Any number of battery cells may be included in battery module 2636. Example battery cells include, but are not limited to, Li ion battery cells, such as 18650 or 26650 battery cells. The battery cells may be cylindrical battery cells, prismatic battery cells, or pouch battery cells, to name a few examples. The battery cells or battery modules may be, for example, up to 252 AH battery cells or battery modules. In some embodiments, the battery cells are connected in series/parallel configuration. Example battery cell configurations include, but are not limited to, 1P16S configuration, 2P16S configuration, 3P16S configuration, 4P16S configuration, 1P12S configuration, 2P12S configuration, 3P12S configuration, and 4P12S configuration. Other configurations known to one of ordinary skill in the art are within the scope of this disclosure. Battery module 2636 includes positive and negative terminals for adding energy to and removing energy from the plurality of battery cells included therein.

As shown in FIG. 26C, battery pack 2600 includes 12 battery modules that form a battery assembly. In another embodiment, battery pack 2600 may include 16 battery modules that form a battery assembly. In other embodiments, battery pack 2600 may include 20 battery modules or 25 battery modules that form a battery assembly. As would be apparent to one of ordinary skill in the art, any number of battery modules may be connected to form the battery assembly of battery pack 2600. In battery pack 2600, the battery modules that are arranged as a battery assembly may be arranged in a series configuration.

In FIG. 26C, battery module controller 2638 is coupled to battery module 2636. Battery module controller 2638 may be couple to the positive and negative terminals of battery module 2636. Battery module controller 2638 may be configured to perform one, some, or all of the following functions: remove energy from battery module 2636, measure the voltage of battery module 2636, and measure the temperature of battery module 2636. As would be understood by one of ordinary skill in the art, battery module controller 2638 is not limited to performing the functions just described. In one embodiment, battery module controller 2638 is implemented as one or more circuits disposed on a printed circuit board. In battery pack 2600, one battery module controller is coupled to or mounted on each of the battery modules in battery pack 2600. Additionally, each battery module controller may be coupled to one or more adjacent battery module controllers via wiring to form a communication network. As illustrated in FIG. 27A, n battery module controllers (where n is a whole number greater than or equal to two) may be daisy-chained together and coupled to a battery pack controller to form a communication network.

FIG. 27A is a diagram illustrating an example communication network 2700 formed by a battery pack controller and a plurality of battery module controllers according to an embodiment of the disclosure. In FIG. 27A, battery pack controller (BPC) 2710 is coupled to n battery module controllers (BMCs) 2720, 2730, 2740, 2750, and 2760. Said another way, n battery module controllers (where n is a whole number greater than or equal to two) are daisy-chained together and coupled to battery pack controller 2710 to form communication network 2700, which may be referred to as a distributed, daisy-chained battery management system (BMS). Specifically, BPC 2710 is coupled to BMC 2720 via communication wire 2715, BMC 2720 is coupled to BMC 2730 via communication wire 2725, BMC 2730 is coupled to BMC 2740 via communication wire 2735, and BMC 2750 is coupled to BMC 2760 via communication wire 2755 to form the communication network. Each communication wire 2715, 2725, 2735, and 2755 may be a single wire, forming a single-wire communication network that allows the BPC 2710 to communicate with each of the BMCs 2720-2760, and vice versa. As would be apparent to one of skill in the art, any number of BMCs may be daisy chained together in communication network 2700.

Each BMC in the communication network 2700 may have a unique address that BPC 2710 uses to communicate with individual BMCs. For example, BMC 2720 may have an address of 0002, BMC 2730 may have an address of 0003, BMC 2740 may have an address of 0004, BMC 2750 may have an address of 0005, and BMC 2760 may have an address of 0006. BPC 2710 may communicate with each of the BMCs by addressing one or more messages to the unique address of any desired BMC. The one or more messages (which include the unique address of the BMC) may include an instruction, for example, to remove energy from a battery module, to stop removing energy from a battery module, to measure and report the temperature of the battery module, and to measure and report the voltage of the battery module. BPC 2710 may poll the BMCs to obtain measurements related to the battery modules of the battery pack, such as voltage and temperature measurements. Any polling technique known to one of skill in the art may be used. In some embodiments, BPC 2710 continuously polls the BMCs for measurements in order to continuously monitor the voltage and temperature of the battery modules in the battery pack.

For example, BPC 2710 may seek to communicate with BMC 2740, e.g., in order to obtain temperature and voltage measurements of the battery module that BMC 2740 is mounted on. In this example, BPC 2710 generates and sends a message (or instruction) addressed to BMC 2740 (e.g., address 0004). The other BMCs in the communication network 2700 may decode the address of the message sent by BPC 2710, but only the BMC (in this example, BMC 2740) having the unique address of the message may respond. In this example, BMC 2740 receives the message from BPC 2710 (e.g., the message traverses communication wires 2715, 2725, and 2735 to reach BMC 2740), and generates and sends a response to BPC 2710 via the single-wire communication network (e.g., the response traverses communication wires 2735, 2725, and 2715 to reach BPC 2710). BPC 2710 may receive the response and instruct BMC 2740 to perform a function (e.g., remove energy from the battery module it is mounted on). In other embodiments, other types of communication networks (other than communication network 2700) may be used, such as, for example, an RS232 or RS485 communication network.

FIG. 27B is a flow diagram illustrating an example method 27000 for receiving instructions at a battery module controller, such as the battery module controller 2638 of FIG. 26C or the battery module controller 2720 of FIG. 27A. The battery module controller described with respect to FIG. 27B may be included in a communication network that includes more than one isolated, distributed, daisy-chained battery module controllers, such as the communication network 2700 of FIG. 27A.

The method 27000 of FIG. 7B may be implemented as software or firmware that is executable by a processor. That is, each stage of the method 27000 may be implemented as one or more computer-readable instructions stored on a non-transient computer-readable storage device, which when executed by a processor causes the processor to perform one or more operations. For example, the method 27000 may be implemented as one or more computer-readable instructions that are stored in and executed by a processor of a battery module controller (e.g., battery pack module controller 2638 of FIG. 26C or battery module controller 2720 of FIG. 7A) that is mounted on a battery module (e.g., battery module 2636 of FIG. 26C) in a battery pack (e.g., battery pack 2600 of FIGS. 26A-26D).

As the description of FIG. 7B refers to components of a battery pack, for the sake of clarity, the components enumerated in an example embodiment of battery pack 2600 of FIGS. 26A-26D and example communication network 2700 of FIG. 27A are used to refer to specific components when describing different stages of the method 27000 of FIG. 27B.

However, battery pack 2600 of FIGS. 26A-26D and communication network 2700 of FIG. 27A are merely examples, and the method 27000 may be implemented using embodiments of a battery pack other than the example embodiment depicted in FIGS. 26A-26D and a communication network 2700 other than the example embodiment depicted in FIG. 27A.

Upon starting (stage 27100), the method 27000 proceeds to stage 27200 where the battery module controller receives a message. For example, a battery pack controller may communicate with the network of daisy-chained battery module controllers (e.g., FIG. 27A) in order to balance the batteries in a battery pack (e.g., battery pack 2600 of FIGS. 26A-26D). The message may be received via a communication wire (e.g., communication wire 2715 of FIG. 27A) at a communication terminal of the battery module controller. This communication may include (but is not limited to) instructing the network of battery module controllers to provide voltage and/or temperature measurements of the battery modules that they are respectively mounted on, and instructing the battery modules controllers to remove energy from or stop removing energy from the battery modules that they are respectively mounted on.

As discussed with respect to FIG. 27A, each battery module controller (e.g., BMC 2720 of FIG. 27A) in a communication network (e.g., communication network 2700 of FIG. 27A) may have a unique address that a battery pack controller (e.g., BPC 2710 of FIG. 27A) uses to communicate with the battery module controllers. Thus, the message that is received at stage 27200 may include an address of the battery module controller that it is intended for and an instruction to be executed by that battery module controller. At stage 27300, the battery module controller determines whether the address included in the message matches the battery module controller's unique address. If the addresses do not match, the method 27000 returns to stage 27200 and the battery module controller waits for a new message. That is, the battery module controller ignores the instruction associated with the message in response to determining that the address associated with the message does not match the unique address of the battery module controller. If the addresses do match, the method 27000 advances to stage 27400.

In stage 27400, the battery module controller decodes the instruction that is included in the message and the method 27000 advances to stage 27500. In stage 27500, the battery module controller performs the instruction. Again, the instruction may be (but is not limited to) measure and report the temperature of the battery module, measure and report the voltage of the battery module, remove energy from the battery module (e.g., apply one or more shunt resistors across the terminals of the battery module), stop removing energy from the battery module (e.g., stop applying the one or more shunt resistors across the terminals of the battery module), or calibrate voltage measurements before measuring the voltage of the battery module. In various embodiments, temperature and voltage measurements may be sent as actual temperature and voltage values, or as encoded data that may be decoded after reporting the measurement. After stage 27500, the method 27000 loops back to stage 27200 and the battery module controller waits for a new message.

FIG. 28 is a diagram illustrating another example battery pack controller 2800 according to an embodiment of the disclosure. Battery pack controller 2634 of FIGS. 26C and 26D may be implemented as described in accordance with battery pack controller 2800 of FIG. 28. Battery pack controller 2710 of FIG. 27A may be implemented as described in accordance with battery pack controller 2800 of FIG. 28.

As shown in FIG. 28, the example battery pack controller 2800 includes a DC input 2802 (which may be an isolated 5V DC input), a charger switching circuit 2804, a DIP-switch 2806, a JTAG connection 2808, a CAN (CANBus) connection 2810, a microprocessor unit (MCU) 2812, memory 2814, an external EEPROM 2816, a temperature monitoring circuit 2818, a status light and reset button 2820, a watchdog timer 2822, and a battery module controller (BMC) communication connection 2824.

In one embodiment, battery pack controller 2800 may be powered from energy stored in the battery cells. Battery pack controller 2800 may be connected to the battery cells by DC input 2802. In other embodiments, battery pack controller 2800 may be powered from an AC to DC power supply connected to DC input 2802. In these embodiments, a DC-DC power supply may then convert the input DC power to one or more power levels appropriate for operating the various electrical components of battery pack controller 2800.

In the example embodiment illustrated in FIG. 28, charger switching circuit 2804 is coupled to MCU 2812. Charger switching circuit 2804 and MCU 2812 may be used to control operation of a balancing charger, such as balancing charger 2632 of FIG. 26C. As described above, a balancing charger may add energy to the battery cells of the battery pack. In an embodiment, temperature monitoring circuit 2818 includes one or more temperature sensors that can monitor the temperature heat sources within the battery pack, such as the temperature of the balancing charger that is used to add energy to the battery cells of the battery pack.

Battery pack controller 2800 may also include several interfaces and/or connectors for communicating. These interfaces and/or connectors may be coupled to MCU 2812 as shown in FIG. 28. In one embodiment, these interfaces and/or connectors include: DIP-switch 2806, which may be used to set a portion of software bits used to identify battery pack controller 2800; JTAG connection 2808, which may be used for testing and debugging battery pack controller 2800; CAN (CANBus) connection 2810, which may be used to communicate with a controller that is outside of the battery pack; and BMC communication connection 2824, which may be used to communicate with one or more battery module controllers, such as a distributed, daisy-chained network of battery module controllers (e.g., FIG. 27A). For example, battery pack controller 2800 may be coupled to a communication wire, e.g., communication wire 2715 of FIG. 27A, via BMC communication connection 2824.

Battery pack controller 2800 also includes an external EEPROM 2816. External EEPROM 2816 may store values, measurements, etc., for the battery pack. These values, measurements, etc., may persist when power of the battery pack is turned off (i.e., will not be lost due to loss of power). External EEPROM 2816 may also store executable code or instructions, such as executable code or instructions to operate microprocessor unit 2812.

Microprocessor unit (MCU) 2812 is coupled to memory 2814. MCU 2812 is used to execute an application program that manages the battery pack. As described herein, in an embodiment the application program may perform the following functions (but is not limited thereto): monitor the voltage and temperature of the battery cells of battery pack 2600, balance the battery cells of battery pack 2600, monitor and control (if needed) the temperature of battery pack 2600, handle communications between the battery pack and other components of a battery energy storage system, and generate warnings and/or alarms, as well as take other appropriate actions, to protect the battery cells of battery pack 2600.

As described above, a battery pack controller may obtain temperature and voltage measurements from battery module controllers. The temperature readings may be used to ensure that the battery cells are operated within their specified temperature limits and to adjust temperature related values calculated and/or used by the application program executing on MCU 2812. Similarly, the voltage readings are used, for example, to ensure that the battery cells are operated within their specified voltage limits.

Watchdog timer 2822 is used to monitor and ensure the proper operation of battery pack controller 2800. In the event that an unrecoverable error or unintended infinite software loop should occur during operation of battery pack controller 2800, watchdog timer 2822 can reset battery pack controller 2800 so that it resumes operating normally. Status light and reset button 2820 may be used to manually reset operation of battery pack controller 2800. As shown in FIG. 28, status light and reset button 2820 and watchdog timer 2822 may be coupled to MCU 2812.

FIG. 29 is a diagram illustrating an example battery module controller 2900 according to an embodiment of the disclosure. Battery module controller 2638 of FIGS. 26C and 26D may be implemented as described in accordance with battery module controller 2900 of FIG. 29. Each of battery module controllers 2720, 2730, 2740, 2750, and 2760 of FIG. 27A may be implemented as described in accordance with battery module controller 2900 of FIG. 29. Battery module controller 2900 may be mounted on a battery module of a battery pack and may perform the following functions (but is not limited thereto): measure the voltage of the battery module, measure the temperature of the battery module, and remove energy from (discharge) the battery module.

In FIG. 29, the battery module controller 2900 includes processor 2905, voltage reference 2910, one or more voltage test resistors 2915, power supply 2920, fail safe circuit 2925, shunt switch 2930, one or more shunt resistors 2935, polarity protection circuit 2940, isolation circuit 2945, and communication wire 2950. Processor 2905 controls the battery module controller 2900. Processor 2905 receives power from the battery module that battery module controller 2900 is mounted on via the power supply 2920. Power supply 2920 may be a DC power supply. As shown in FIG. 29, power supply 2920 is coupled to the positive terminal of the battery module, and provides power to processor 2905. Processor 2905 is also coupled to the negative terminal of the battery module via polarity protection circuit 2940, which protects battery module controller 2900 in the event that it is improperly mounted on a battery module (e.g., the components of battery module controller 2900 that are coupled to the positive terminal in FIG. 29 are improperly coupled to the negative terminal and vice versa).

Battery module controller 2900 may communicate with other components of a battery pack (e.g., a battery pack controller, such as battery pack controller 2634 of FIG. 26C) via communication wire 2950, which may be a single wire. As described with respect to the example communication network of FIG. 27A, communication wire 2950 may be used to daisy chain battery module controller 2900 to a battery pack controller and/or one or more other battery module controllers to form a communication network. Communication wire 2950 may be coupled to battery pack controller 2900 via a communication terminal disposed on battery pack controller 2900. As such, battery module controller 2900 may send and receive messages (including instructions sent from a battery pack controller) via communication wire 2950. When functioning as part of a communication network, battery module controller 2900 may be assigned a unique network address, which may be stored in a memory device of the processor 2905.

Battery module controller 2900 may be electrically isolated from other components that are coupled to the communication wire (e.g., battery pack controller, other battery module controllers, computing systems external to the battery pack) via isolation circuit 2945. In the embodiment illustrated in FIG. 29, isolation circuit 2945 is disposed between communication wire 2950 and processor 2905. Again, communication wire 2950 may be coupled to battery pack controller 2900 via a communication terminal disposed on battery pack controller 2900. This communication terminal may be disposed between communication wire 2950 and isolation circuit 2945, or may be part of isolation circuit 2945. Isolation circuit 2945 may capacitively couple processor 2905 to communication wire 2950, or may provide other forms of electrical isolation known to those of skill in the art.

As explained above, battery module controller 2900 may measure the voltage of the battery module it is mounted on. As shown in FIG. 29, processor 2905 is coupled to voltage test resistor 2915, which is coupled to the positive terminal of the battery module. Processor 2905 may measure the voltage across voltage test resistor 2915, and compare this measured voltage to voltage reference 2910 to determine the voltage of the battery module. As described with respect to FIG. 27A, battery module controller 2900 may be instructed to measure the voltage of the battery module by a battery pack controller. After performing the voltage measurement, processor 2905 may report the voltage measurement to a battery pack controller via communication wire 2950.

Battery module controller 2900 may also remove energy from the battery module that it is mounted on. As shown in FIG. 29, processor 2905 is coupled to fail safe circuit 2925, which is coupled to shunt switch 2930. Shunt switch 2930 is also coupled to the negative terminal via polarity protection circuit 2940. Shunt resistor 2935 is disposed between the positive terminal of the battery module and shunt switch 2930. In this embodiment, when shunt switch 2930 is open, shunt resistor 2935 is not applied across the positive and negative terminals of the battery module; and when shunt switch 2930 is closed, shunt resistor 2935 is applied across the positive and negative terminals of the battery module in order to remove energy from the battery module. Processor 2905 may instruct shunt switch 2930 to selectively apply shunt resistor 2935 across the positive and negative terminals of the battery module in order to remove energy from the battery module. In one embodiment, processor 2905 instructs shunt switch 2930 at regular intervals (e.g., once every 30 seconds) to apply shunt resistor 2935 in order to continuously discharge the battery module.

Fail safe circuit 2925 may prevent shunt switch 2930 from removing too much energy from the battery module. In the event that processor 2905 malfunctions, fail safe circuit 2925 may instruct shunt switch 2930 to stop applying shunt resistor 2935 across the positive and negative terminals of the battery module. For example, processor 2905 may instruct shunt switch 2930 at regular intervals (e.g., once every 30 seconds) to apply shunt resistor 2935 in order to continuously discharge the battery module. Fail safe circuit 2925, which is disposed between processor 2905 and shunt switch 2930, may monitor the instructions processor 2905 sends to shunt switch 2930. In the event that processor 2905 fails to send a scheduled instruction to the shunt switch 2930 (which may be caused by a malfunction of processor 2905), fails safe circuit 2925 may instruct or cause shunt switch 2930 to open, preventing further discharge of the battery module. Processor 2905 may instruct fail safe circuit 2925 to prevent shunt switch 2930 from discharging the battery module below a threshold voltage or state-of-charge level, which may be stored or calculated in battery module controller 2900 or in an external controller (e.g., a battery pack controller).

Battery module controller 2900 of FIG. 29 also includes temperature sensor 2955, which may measure the temperature of the battery module that battery module controller 2900 is connected to. As depicted in FIG. 29, temperature sensor 2955 is coupled to processor 2905, and may provide temperature measurements to processor 2905. Any temperature sensor known to those skilled in the art may be used to implement temperature sensor 2955.

Example String Controller

FIG. 30 is a diagram illustrating an example string controller 3000. Specifically, FIG. 30 illustrates example components of a string controller 3000. The example components depicted in FIG. 30 may be used to implement the disclosed string controller 4804 of FIG. 48A. String controller 3000 includes a string control board 3024 that controls the overall operation of string controller 3000. String control board 3024 may be implemented as one or more circuits or integrated circuits mounted on a printed circuit board (for example, string control board 3130 of FIG. 31A). String control board 3024 may include or be implemented as a processing unit, such as a microprocessor unit (MCU) 3025, memory 3027, and executable code. Units 3026, 3028, 3030, 3032, and 3042 illustrated in string control board 3024 may be implemented in hardware, software, or a combination of hardware and software. Units 3026, 3028, 3030, 3032, and 3042 may be individual circuits mounted on a print circuit board or a single integrated circuit.

The functions performed by string controller 3000 may include, but are not limited to, the following: issuing battery string contactor control commands, measuring battery string voltage; measuring battery string current; calculating battery string Amp-hour count; relaying queries between a system controller (e.g., at charging station) and battery pack controllers; processing query response messages; aggregating battery string data; performing software device ID assignment to the battery packs; detecting ground fault current in the battery string; and detect alarm and warning conditions and taking appropriate corrective actions. MCU 3025 may perform these functions by executing code that is stored in memory 3027.

String controller 3000 includes battery string terminals 3002 and 3004 for coupling to the positive and negative terminals, respectively, of a battery string (also referred to as a string of battery packs). Battery string terminals 3002 and 3004 are coupled to voltage sense unit 3042 on string control board 3024 that can be used to measure battery string voltage.

String controller 3000 also includes PCS terminals 3006 and 3008 for coupling to the positive and negative terminals, respectively of a power control system (PCS). As shown, positive battery string terminal 3002 is coupled to positive PCS terminal 3006 via contactor 3016, and negative battery string terminal 3004 is coupled to negative PCS terminal 3008 via contactor 3018. String control board 3024 controls contactors 3016 and 3018 (to open and close) via contactor control unit 3026 and 3030, respectively, allowing the battery string to provide energy to the PCS (discharging) or receive energy from the PCS (charging) when contractors 3016 and 3018 are closed. Fuses 3012 and 3014 protect the battery string from excessive current flow.

String controller 3000 also includes communication terminals 3010 and 3012 for coupling to other devices. In an embodiment, communication terminal 3010 may couple string controller 3000 to the battery pack controllers of the battery string, allowing string controller 3000 to issue queries, instructions, and the like. For example, string controller 3000 may issue an instruction used by the battery packs for cell balancing. In an embodiment, communication terminal 3012 may couple string controller 3000 to an array controller, such as array controller 4808 of FIG. 48A (below). Communication terminals 3010 and 3012 may allow string controller 3000 to relay queries between an array controller (e.g., array controller 4808 of FIG. 48A (below)) and battery pack controllers, aggregate battery string data, perform software device ID assignment to the battery packs, detect alarm and warning conditions and taking appropriate corrective actions, as well as other functions. In systems that do not include an array controller, the string controller may be coupled to a system controller.

String controller 3000 includes power supply unit 3022. Power supply 3120 of FIG. 31A may be implemented as described with respect to power supply unit 3022 of FIG. 30. In this embodiment, power supply unit 3022 can provide more than one DC supply voltage. For example, power supply unit 3022 can provide one supply voltage to power string control board 3024, and another supply voltage to operate contactors 3016 and 3018. In an embodiment, a +5V DC supply may be used for string control board 3022, and +12V DC may be used to close contactors 3016 and 3018.

String control board 3024 includes current sense unit 3028 which receives input from current sensor 3020, which may allow the string controller to measure battery string current, calculate battery string amp-hour count, as well as other functions. Additionally, current sense unit 3028 may provide an input for overcurrent protection. For example, if over-current (a current level higher than a pre-determined threshold) is sensed in current sensor 3020, current sensor unit 3028 may provide a value to MCU 3025, which instructs contactor control units 3026 and 3030 to open contactors 3016 and 3018, respectively, disconnecting battery string from PCS. Again, fuses 3012 and 3014 may also provide overcurrent protection, disconnecting battery sting from the PCS when a threshold current is exceeded.

String controller 3000 includes battery voltage and ground fault detection (for example, battery voltage and ground fault detection 3110 of FIG. 31A). Terminals 3038 and 3040 may couple string controller 3000 to battery packs in the middle of battery pack string. For example, in a string of 22 battery packs, terminal 3038 may be connected to the negative terminal of battery pack 11 and terminal 3040 may be connected to the positive terminal of battery pack 12. Considering FIG. 48B (below), SC1 may be coupled to BP11 and BP12 via terminals 3038 and 3040. Ground fault detection unit 3032 measures the voltage at the middle of the battery string using a resistor 3034 and provides ground fault detection. Fuse 3036 provides overcurrent protection.

FIGS. 31A-31B are diagrams illustrating an example string controller 3100. As shown in FIG. 31A, string controller 3100 includes battery voltage and ground fault detection unit 3110, power supply 3120, string control board 3130, positive fuse 3140, and positive contactor 3150. FIG. 31B illustrates another angle of string controller 3100 and depicts negative fuse 3160, negative contactor 3170, and current sensor 3180. These components are described in more detail with respect to FIG. 30.

Example Battery Pack Balancing Algorithm

FIG. 32 is a flow diagram illustrating an example method 3200 for balancing a battery pack, such as battery pack 2600 of FIGS. 26A-26D that includes a plurality of battery modules, a balancing charger, a battery pack controller, and a network of isolated, distributed, daisy-chained battery module controllers. The method 3200 may be implemented as software or firmware that is executable by a processor. That is, each stage of the method 3200 may be implemented as one or more computer-readable instructions stored on a non-transient computer-readable storage device, which when executed by a processor causes the processor to perform one or more operations. For example, the method 3200 may be implemented as one or more computer-readable instructions that are stored in and executed by a battery pack controller (e.g., battery pack controller 2634 of FIG. 26C) in a battery pack (e.g., battery pack 2600 of FIGS. 26A-26D).

As the description of FIG. 32 refers to components of a battery pack, for the sake of clarity, the components enumerated in an example embodiment of battery pack 2600 of FIGS. 26A-26D are used to refer to specific components when describing different stages of the method 3200 of FIG. 32. However, battery pack 2600 of FIGS. 26A-26D is merely an example, and the method 3200 may be implemented using embodiments of a battery pack other than the exemplary embodiment depicted in FIGS. 26A-26D.

Upon starting, the method 3200 proceeds to stage 3210 where a target voltage value is received by a battery pack controller, such as battery pack controller 2634. The target value may be used to balance the voltage and/or state of charge of each battery module (e.g., battery module 2636) in the battery pack and may be received from an external controller, such as a string controller described with respect to FIG. 48A or FIG. 30 or FIGS. 31A-31B. In stage 3215, the battery modules are polled for voltage measurements. For example, battery pack controller 2634 may request a voltage measurement from each of the battery modules controllers (e.g., battery module controller 2638) that are mounted on the battery modules. Again, one battery module controller may be mounted on each of the battery modules. Each battery module controller may measure the voltage of the battery module that it is mounted on, and communicate the measured voltage to the battery pack controller 2634. And as discussed with respect to FIG. 27A, a battery pack controller and a plurality of isolated, distributed, daisy-chained battery module controllers may be coupled together to form a communication network. Polling may be performed sequentially (e.g., poll BMC 2720, followed by BMC 2730, followed by BMC 2740, and so on). In an embodiment, a target state of charge value may be received at stage 3210 instead of a target voltage value.

In stage 3220, a determination is made as to whether each polled battery module voltage is in an acceptable range. This acceptable range may be determined by one or more threshold voltage values above and/or below the received target voltage. For example, battery pack controller 2634 may use a start discharge value, a stop discharge value, a start charge value, and a stop charge value that are used to determine whether balancing of battery modules should be performed. In an embodiment, the start discharge value may be greater than the stop discharge value (both of which may be greater than the target value), and the start charge value may be less than the stop charge value (both of which may be less than the target value). These threshold values may be derived by adding stored offset values to the received target voltage value. In an embodiment, the acceptable range may lie between the start discharge value and the start charge value, indicating a range in which no balancing may be necessary. If all battery module voltages are within the acceptable range, method 3200 proceeds to stage 3225. In stage 3225, a balancing charger (e.g., balancing charger 2632) is turned off (if on) and shunt resistors of each battery module controller 2638 that have been applied, such as shunt resistors 2935 of FIG. 29, are opened to stop removing energy from the battery module. For example, battery pack controller 2634 may instruct balancing charger 2632 to stop providing energy to the battery modules of battery pack 2600. Battery pack controller 2634 may also instruct each battery module controller that is applying a shunt resistor to the battery module it is mounted on to stop applying the shunt resistor, and thus stop removing energy from the battery module. Method 3200 then returns to step 3215 where the battery modules of the battery pack are again polled for voltage values.

Returning to stage 3220, if all battery module voltages are not within the acceptable range, the method proceeds to stage 3230. In stage 3230, for each battery module, it is determined whether the battery module voltage is above the start discharge value. If the voltage is above the start discharge value, method 3200 proceeds to stage 3235 where shunt resistors of the battery module controller (e.g., battery module controller 2638) coupled to the battery module are applied in order to remove (discharge) energy from the battery module. The method then continues to stage 3240.

In stage 3240, for each battery module, it is determined whether the battery module voltage is below the stop discharge value. If the voltage is below the stop discharge value, method 3200 proceeds to stage 3245 where shunt resistors of the battery module controller (e.g., battery module controller 2638) coupled to the battery module are opened in order to stop discharging energy from the battery module. That is, the battery module controller stops applying the shunt resistor(s) across the terminals of the battery module it is mounted on. This prevents the battery module controller from removing energy from the battery module. The method then continues to stage 3250.

In stage 3250, it is determined whether at least one battery module voltage is below the start charge value. If any voltage is below the start charge value, method 3200 proceeds to stage 3255 where a balancing charger is turned on to provide energy to all of the battery modules. For example, battery pack controller 2634 may instruct balancing charger 2632 to turn on, providing energy to each of the battery modules in the battery pack 2600. Method 3200 then continues to stage 3260.

In stage 3260, it is determined whether all battery module voltages are above the stop charge value. If all voltages are above the stop charge value, method 3200 proceeds to stage 3265 where a balancing charger is turned off (if previously on) to stop charging the battery modules of the battery pack. For example, battery pack controller 2634 may instruct balancing charger 2632 to stop providing energy to the battery modules of battery pack 2600. Method 3200 then returns to stage 3215 where the battery modules are again polled for voltage measurements. Thus, as previously described, stages 3215 to 3260 of method 3200 may be used to continuously balance the energy of the battery modules within a battery pack, such as battery pack 2600.

While the above balancing example only discusses balancing four battery packs, the balancing procedure can be applied to balance any number of battery packs. Also, since the procedure can be applied to both SOC values as well as voltage values, the procedure can be implemented at anything in a electrical energy storage unit according to the disclosure, and it is not limited to periods of time when the battery of the electrical energy storage unit is being charged or discharged.

Example Warranty Tracker for a Battery Pack

In an embodiment, a warranty based on battery usage for a battery pack, such as battery pack 2600 of FIGS. 26A-26D, may take into account various data associated with the battery pack, such as but not limited to, charge and discharge rates, battery temperature, and battery voltage. As should be apparent to a person of skill in the art, the warranty tracker disclosed below may be implemented and used in the systems and methods described above. A warranty tracker embedded in the battery pack may use this data to compute a warranty value representing battery usage for a period of time. Calculated warranty values may be aggregated over the life of the battery, and the cumulative value may be used to determine warranty coverage. With this approach, the warranty may not only factor in the total discharge of the battery pack, but also the manner in which the battery pack has been used. Various data used to calculate warranty values, according to an embodiment, are discussed further with respect to FIGS. 33-36.

Charge and discharge rates of a battery pack are related to and can be approximated or determined based on the amount of electric current flowing into and out of the battery pack, which can be measured. In general, higher charge and discharge rates may produce more heat (than lower rates), which may cause stress on the battery pack, shorten the life of the battery pack, and/or lead to unexpected failures or other issues. FIG. 33 is a diagram illustrating an example correlation between an electric current measurement and a current factor used in the calculation of a warranty value according to an embodiment. Electric current may be directly measured for a battery pack, such as battery pack 2600 of FIGS. 26A-26D, and may provide charge and/or discharge rates of the battery pack.

Normal charge and discharge rates for batteries of different capacities may vary. For this reason, in an embodiment, electric current measurements may be normalized in order to apply a standard for determining normal charge and discharge rates for different battery packs. One of skill in the art will recognize that the measured electric current may be normalized based on the capacity of the battery pack, producing a C-rate. As an example, a normalized rate of discharge of 1 C would deliver the battery pack's rated capacity in one hour, e.g., a 1,000 mAh battery would provide a discharge current of 1,000 mA for one hour. The C-rate may allow the same standard to be applied for determining normal charge and discharge, whether the battery pack is rated at 1,000 mAh or 100 Ah or any other rating known to one of ordinary skill in the art.

Still considering FIG. 33, example plot 3302 illustrates current factor 3306 as a function of a normalized C-rate 3304, according to an embodiment. Electric current measurements may be used to calculate warranty values by converting the measured electric current to a corresponding current factor. In an embodiment, the measured electric current is first normalized to produce a C-rate. The C-rate indicates the charge or discharge rate of the battery pack and allows for consistent warranty calculations regardless of the capacity of the battery pack. The C-rate may then be mapped to current factors for use in warranty calculations. For example, a normalized C-rate of 1 C may be mapped to a current factor of 2, whereas a C-rate of 3 C may be mapped to a current factor of 10, indicating a higher rate of charge or discharge. In an embodiment, separate sets of mappings may be maintained for charge and discharge rates. In an embodiment, these mappings may be stored in a lookup table residing in a computer-readable storage device within the battery pack. In another embodiment, mappings and current factors may be stored in a computer-readable storage device that is external to the battery pack. Alternatively, in an embodiment, a predefined mathematical function may be applied to C-rates or electric current measurements to produce a corresponding current factor, rather than explicitly storing mappings and current factors.

In an embodiment, calculated C-rates above a maximum C-rate warranty threshold 3308 may immediately void the warranty of the battery pack. This threshold may be predefined or set dynamically by the warranty tracker. In a non-limiting example, maximum warranty threshold 3308 may be set to a C-rate of 2 C. Calculated C-rates above maximum warranty threshold 3308 may indicate improper usage of the battery pack, and hence the warranty may not cover subsequent issues that arise. In an embodiment, maximum warranty thresholds may be defined for both the rate of charge and discharge of the battery pack, rather than maintaining a single threshold for both charge and discharge.

Temperature is another factor that may affect battery performance. In general, higher temperatures may cause the battery pack to age at a faster rate by generating higher internal temperatures, which causes increased stress on the battery pack. This may shorten the life of a battery pack. On the other hand, lower temperatures may, for example, cause damage when the battery pack is charged.

FIG. 34 is a diagram illustrating an example correlation between a temperature measurement and a temperature factor used in the calculation of a warranty value according to an embodiment. A battery pack, such as battery pack 2600 of FIGS. 26A-26D, may include one or more battery temperature measurement circuits that measure the temperature of the individual battery cells or the individual battery modules within the battery pack. Example plot 3402 illustrates temperature factor 3406 as a function of measured temperature 3404, according to an embodiment. Temperature measurements may be used to calculate warranty values by converting the measured temperature to a corresponding temperature factor. In an embodiment, temperature measurements may be mapped to temperature factors for use in warranty calculations. For example, a normal operating temperature of 20° C. may be mapped to a temperature factor of 1, whereas a higher temperature of 40° C. would be mapped to a higher temperature factor. A higher temperature factor may indicate that battery wear is occurring at a faster rate. In an embodiment, these mappings may be stored in a lookup table residing in a computer-readable memory device within the battery pack. In another embodiment, mappings and temperature factors may be stored in a computer-readable memory device that is external to the battery pack. Alternatively, in an embodiment, a predefined mathematical function may be applied to temperature measurements to produce a corresponding temperature factor, rather than explicitly storing mappings and temperature factors.

Warranty thresholds may also be a function of battery temperature such as, for example, charging the battery pack when the temperature is below a predefined value. In an embodiment, operating temperatures below a minimum temperature warranty threshold 3408 or above a maximum temperature warranty threshold 3410 may immediately void the warranty of the battery pack. These thresholds may be predefined or set dynamically by the warranty tracker.

Operating temperatures below minimum warranty threshold 3408 or above maximum warranty threshold 3410 may indicate improper usage of the battery pack, and hence the warranty may not cover subsequent operating issues or defects that arise. In an embodiment, minimum and maximum warranty thresholds may be defined for both charging and discharging the battery pack rather than maintaining the same thresholds for both charging and discharging.

Voltage and/or state-of-charge are additional factors that may affect battery performance. The voltage of a battery pack, which may be measured, may be used to calculate or otherwise determine the state-of-charge of the battery pack. In general, very high or very low states of charge or voltages cause increased stress on the battery pack. This, again, may shorten the life of the battery pack.

FIG. 35 is a diagram illustrating an example correlation between a voltage measurement and a voltage factor used in the calculation of a warranty value according to an embodiment. A battery pack, such as battery pack 2600 of FIGS. 26A-26D, may include a battery voltage measurement circuit that measures the voltage of individual battery cells or the voltage of battery modules within the battery pack. These voltage measurements may be aggregated or averaged for use in calculating warranty values for the battery pack. In an embodiment, the state-of-charge of the battery pack may be calculated and used in the calculation of a warranty value; however, this calculation is not always accurate and so care must be taken in determining a warranty calculation factor. In an embodiment, the measured voltage of the battery pack may be the average measured voltage of each battery cell or each battery module contained within the battery pack.

In FIG. 35, example plot 3502 illustrates voltage factor 3506 as a function of measured voltage 3504, according to an embodiment. Voltage measurements may be used to calculate warranty values by converting the measured voltage to a corresponding voltage factor. In an embodiment, voltage measurements may be mapped to voltage factors for use in warranty calculations. These mappings may be specific to the type of battery cells contained in the battery pack. For example, a battery pack including one or more lithium-ion battery cells may have an average cell voltage measurement of 3.2V, which may be mapped to a voltage factor of 1. In contrast, a voltage measurement of 3.6V or 2.8V may be mapped to a higher voltage factor. In an embodiment, these mappings may be stored in a lookup table residing in a computer-readable memory device within the battery pack. In another embodiment, mappings and voltage factors may be stored in a computer-readable memory device external to the battery pack. Alternatively, in an embodiment, a pre-defined mathematical function may be applied to voltage measurements to produce a corresponding voltage factor, rather than explicitly storing mappings and voltage factors.

In an embodiment, measured voltages below a minimum voltage warranty threshold 3508 or above a maximum voltage warranty threshold 3510 may immediately void the warranty of the battery pack. These thresholds may be predefined or set dynamically by the warranty tracker. In a non-limiting example, minimum and maximum warranty thresholds 3508 and 3510 may be set to voltages indicating the over-discharging and over-charging of the battery cells, respectively. Measured voltages below minimum warranty threshold 3508 or above maximum warranty threshold 3510 may indicate improper usage of the battery pack, and hence the warranty may not cover subsequent operating issues that arise.

FIG. 36A is diagram illustrating how to determine a battery lifetime value 3650, according to an embodiment. This value may also be used as a warranty value to determine when a battery warranty has expired. As shown in FIG. 36A, battery lifetime value 3650 at time (T+1) is equal to the sum of the battery lifetime value at time (T) and the product of the current factor at time (T) ($CF_{(T)}$), the voltage factor at time (T) ($VF_{(T)}$), and the temperature factor at time (T) ($TF_{(T)}$). In an embodiment, battery lifetime value 3650 is produced by battery lifetime monitor 270 of battery pack operating system 280.

FIG. 36B is a diagram illustrating example warranty thresholds used for voiding a warranty for a battery pack according to an embodiment. As previously described, improper usage of a battery pack may cause a warranty to be automatically voided. For example, extreme operating temperatures, voltages, or charge/discharge rates may immediately void a warranty.

In various embodiments, a battery pack may store the minimum recorded voltage 3601, maximum recorded voltage 3602, minimum recorded temperature 3603, maximum recorded temperature 3604, maximum recorded charging electric current 3605, and maximum recorded discharging electric current 3606 for the life of the battery pack. These values may be recorded by any device or combination of devices capable of measuring or calculating the aforementioned data, such as (but not limited to) one or more battery voltage measurement circuit(s), battery temperature measurement circuit(s), and electric current measurement circuit(s), respectively, which are further described with respect to FIGS. 35-36. In an alternate embodiment, the battery pack may store in a computer-readable memory device a maximum recorded electric current, rather than both a maximum charging and discharging electric current. In an embodiment, data measurements may be recorded in a computer-readable memory device periodically during the life of the battery. For minimum values 3601 and 3603, if a newly recorded value is less than the stored minimum value, the previously stored minimum value is overwritten with the newly recorded value. For maximum values 3602, 3604, 3605, and 3606, if a newly recorded value is greater than the stored maximum value, the previously stored maximum value is overwritten with the newly recorded value.

In an embodiment, each battery pack may maintain a list of warranty threshold values, for example warranty threshold values 3611-3616, in a computer-readable storage device. In another embodiment, the list of warranty threshold values may be maintained in a computer-readable storage device that is external to the battery pack. Warranty threshold values may indicate minimum and maximum limits used to determine uses of the battery pack that are outside the warranty coverage. The warranty tracker may periodically compare the stored minimum and maximum values 3601-3606 to warranty threshold values 3611-3616 to determine whether a warranty for the battery pack should be voided.

In an embodiment, the battery pack may store a warranty status in a computer-readable storage device. The warranty status may be any type of data capable of representing a status. For example, the warranty status may be a binary flag that indicates whether the warranty has been voided. The warranty status may also be, for example, an enumerated type having a set of possible values, such as but not limited to, active, expired, and void.

As illustrated in FIG. 36B, the warranty status is set based on a comparison of the recorded maximum and minimum values 3601-3606 to predefined warranty thresholds 3611-3616. For example, minimum recorded voltage 3601 is 1.6 V and minimum voltage threshold 3611 is 2.0 V. In this example, minimum recorded voltage 3601 is less than minimum voltage threshold 3611, and therefore the warranty is voided, as indicated at box 3621. This will be reflected in the warranty status and stored. In various embodiments, when the warranty is voided, an electronic communication may be generated and sent by the battery pack and/or system in which the battery pack is used to notify selected individuals that the warranty has been voided. The electronic communication may also include details regarding the conditions or use that caused the warranty to be voided.

FIG. 37 is a diagram illustrating example usage of a battery pack according to an embodiment. In addition to minimum and maximum data values being recorded, as described with respect to FIG. 36B, usage frequency statistics may also be collected. For example, usage statistics may be recorded based on battery voltage measurements, battery temperature measurements, charge/discharge current measurements, and power calculations (e.g., voltage measurements multiplied by current measurements).

In an embodiment, one or more ranges of values may be defined for each type of recorded data. In the example illustrated in FIG. 37, defined ranges for measured voltage are 2.0 V-2.2 V, 2.2 V-2.4 V, 2.4 V-2.6 V, 2.6 V-2.8 V, 2.8 V-3.0 V, 3.0 V-3.2 V, 3.2 V-3.3 V, 3.3 V-3.4 V, 3.4 V-3.5 V, 3.5 V to 3.6 V, and 3.6 V-3.7 V. These ranges may be common for lithium-ion batteries, for example, in order to capture typical voltages associated with such batteries. Each defined range may be associated with a counter. In an embodiment, each counter is stored in a computer-readable storage device within a battery pack. In other embodiments, counters may be stored external to a battery pack, for example in a string controller, an array controller, or a system controller (e.g., see FIG. 48A below). This may allow for further aggregation of usage statistics across multiple battery packs.

In an embodiment, voltage measurements may be taken periodically. When a measured value falls within a defined range, the associated counter may be incremented. The value of each counter then represents the frequency of measurements falling within the associated range of values. Frequency statistics may then be used to create a histogram displaying the distribution of usage measurements for the life of a battery pack, or during a period of time. Likewise, frequency statistics may be recorded for other measured or calculated data, such as but not limited to, battery temperature measurements and charge/discharge current measurements.

For example, battery usage 3702 represents the distribution of voltage measurements taken during the life of a battery pack. Battery usage 3702 may indicate ordinary or proper usage of a battery pack, having the highest frequency of measurements between 3.0 V and 3.2 V. In contrast, battery usage 3704 may indicate more unfavorable usage.

Histograms, such as those displayed in FIG. 37, may be useful to a manufacturer or seller in determining the extent of improper or uncovered usage of a battery pack. In an embodiment, the distribution data may also be used for analysis and diagnosis of battery pack defects and warranty claims.

FIG. 38 is a diagram illustrating an example warranty tracker according to an embodiment. Warranty tracker 3810 includes a processor 3812, a memory 3814, a battery voltage measurement circuit 3816, and a battery temperature measurement circuit 3818. The battery voltage measurement circuit 3816 and the battery temperature measurement circuit 3818 may be implemented as a single circuit or as separate circuits disposed on a printed circuit board. In some embodiments, such as those detailed above, each battery module disposed in a battery pack may be coupled to a battery module controller that includes a battery voltage measurement circuitry as well as battery temperature measurement circuitry. In these embodiments, the processor 3812 and memory 3814 of example warranty tracker 3810 may part of or implemented within a battery pack controller, such as battery pack controller 2800 of FIG. 28. For example, warranty tracker may be implemented as executable code stored in memory 2814, which is executed by MCU 2812 of battery pack controller 2800 to perform the warranty tracker's functions.

In various embodiments, voltage may be measured as an aggregate voltage or average voltage of the battery cells or battery modules contained within the battery pack. Battery temperature measurement circuit 3818 may include one or more temperature sensors to periodically measure battery cell temperatures or battery module temperatures within the battery pack and send an aggregate or average temperature measurement to processor 3812.

In an embodiment, processor 3812 also receives periodic electric current measurements from battery current measurement circuit 3822. Battery current measurement circuit 3822 may be external to warranty tracker 3810. For example, battery current measurement circuit 3822 may reside within string controller 3820 (e.g., string controller 3000 of FIG. 30). In another embodiment, battery current measurement circuit 3822 may be part of warranty tracker 3810.

Processor 3812 may compute warranty values based on received voltage, temperature, and electric current measurements. In an embodiment, each warranty value represents battery usage at the time the received measurements were recorded. Once received, measurements may be converted to associated factors for use in calculating a warranty value. For example, a voltage measurement received from battery voltage measurement circuit 3816 may be converted to a corresponding voltage factor as described with respect to FIG. 35. Similarly, received temperature measurements and electric current measurements may be converted to corresponding temperature and current factors as described with respect to FIGS. 33 and 34.

In an embodiment, processor 3812 may calculate a warranty value by multiplying the voltage factor, temperature factor, and current factor together. For example, the current factor may be 0 when a battery pack is neither charging nor discharging. The calculated warranty value will therefore also be 0, indicating that no usage is occurring. In another example, when battery temperature and voltage are at optimal levels, the corresponding temperature and voltage factors may be 1. The calculated warranty value will then be equal to the current factor corresponding to the measured electric current. When all factors are greater than zero, the warranty value indicates battery usage based on each of the voltage, temperature, and electric current measurements.

As described previously, additional measured or calculated data may also be used in the calculation of a warranty value. A warranty value may also be calculated based on any combination voltage, temperature, and current factors, according to an embodiment.

While a warranty value represents battery usage at a point in time, a warranty for a battery pack is based on battery usage for the life of the battery pack (which may be defined by the manufacturer of the battery pack). In an embodiment, memory 3814 stores a cumulative warranty value that represents battery usage over the life of the battery pack. Each time a warranty value is calculated, processor 3812 may add the warranty value to the cumulative warranty value stored in memory 3814. The cumulative warranty value may then be used to determine whether the battery pack warranty is active or expired.

FIG. 39 is an example method for calculating and storing a cumulative warranty value according to an embodiment. Each stage of the example method may represent a computer-readable instruction stored on a computer-readable storage device, which when executed by a processor causes the processor to perform one or more operations.

Method 3900 begins at stage 3904 by measuring battery cell voltages within a battery pack. In an embodiment, battery cell voltage measurements for different battery cells or battery modules may be aggregated or averaged across a battery pack. At stage 3906, battery cell temperatures may be measured. In an embodiment, battery cell temperature measurements for different battery cells or battery modules may be aggregated or averaged across a battery pack. At stage 3908, an electric charge/discharge current measurement may be received. Stages 3904, 3906, and 3908 may be performed concurrently or in any order.

At stage 3910, a warranty value is calculated using the measured battery voltage, measured battery temperature, and received electric current measurement. In an embodiment, each warranty value represents battery usage at the time the measurements were recorded. Once received, measurements may be converted to associated factors for use in calculating a warranty value. For example, a voltage measurement may be converted to a corresponding voltage factor as described with respect to FIG. 35. Similarly, temperature measurements and received electric current measurements may be converted to corresponding temperature and current factors as described with respect to FIGS. 33 and 34.

In an embodiment, a warranty value may be calculated by multiplying the voltage factor, temperature factor, and current factor together. For example, the current factor may be 0 when a battery pack is neither charging nor discharging. The calculated warranty value will therefore also be 0, indicating that no usage is occurring. In another example, when battery temperature and voltage are at optimal levels, the corresponding temperature and voltage factors may be 1. The calculated warranty value will then be equal to the current factor corresponding to the measured electric current. When all factors are greater than zero, the warranty value indicates battery usage based on each of the voltage, temperature, and electric current measurements.

As described previously, additional measured or calculated data may also be used in the calculation of a warranty value. A warranty value may also be calculated based on any combination voltage, temperature, and current factors, according to an embodiment.

At stage 3912, the calculated warranty value is added to a stored cumulative warranty value. In an embodiment the cumulative warranty value may be stored within the battery pack. In other embodiments, the cumulative warranty value may be stored external to the battery pack. The cumulative warranty value may then be used to determine whether the battery pack warranty is active or expired, as will be discussed further with respect to FIGS. 40 and 41.

FIG. 40 is an example method for using a warranty tracker according to an embodiment. FIG. 40 may be performed by a computer or a human operator at an energy management system, such as an energy management system. FIG. 40 begins at stage 4002 when a warning or alert is received indicating that a battery pack has an operating issue or is otherwise defective. In an embodiment, the alert may be issued as an email or other electronic communication to an operator responsible for monitoring the battery pack. In other embodiments, warnings or alerts may be audial or visual alerts, for example, a flashing red light on the defective battery pack, such as the warnings described above with respect to status button 2608 of FIGS. 26A and 26B.

At stage 4004, the cumulative warranty value stored in the defective battery pack is compared to a predefined threshold value. This threshold value may be set to provide a certain warranty period based on normal usage of the battery pack. For example, the threshold may be set such that a battery pack may be covered under warranty for 10 years based on normal usage. In this manner, aggressive usage of the battery pack may reduce the active warranty period for the battery pack.

At stage 4006, it is determined whether the stored cumulative warranty value exceeds the predefined threshold value. If the stored cumulative value exceeds the predefined threshold value, method 4000 proceeds to stage 4008. At stage 4008, the warranty for the battery pack is determined to be expired. If the stored cumulative value does not exceed the threshold value, the method ends, indicating that the battery pack warranty has not expired.

FIG. 41 is a diagram illustrating an example battery pack and associated warranty information according to an embodiment. When a battery pack is reported to be defective, analysis of warranty information may be conducted. As illustrated in FIG. 41, battery pack 4104 resides in an electrical storage unit 4102, similar to that of electrical storage unit 4802 of FIGS. 48A and 48B. In response to an alert that battery pack 4104 has an operating issue, battery pack 4104 may be removed from electrical storage unit 4102 for analysis.

In an embodiment, battery pack 4104 may be connected to a computing device with display 4106. In this manner, the battery pack operator, seller, or manufacturer may be able to view various warranty information and status in order to determine which party is financially responsible for repairing battery pack 4104. In the example illustrated in FIG. 41, a warranty threshold value may be set to 500,000,000, and the cumulative warranty value of the battery pack is 500,000,049. Because the cumulative warranty value exceeds the warranty threshold, the battery pack warranty is determined to be expired, and the battery pack operator or owner should be financially responsible for repairs.

In an embodiment, warranty information for battery pack 4104 may be viewed without physically removing battery pack 4104 from electrical storage unit 4102. For example, stored warranty information may be sent via accessible networks to a device external to battery pack 4104 for analysis.

Example Detection of a Battery Pack Having an Operating Issue or Defect

FIG. 42 is a diagram illustrating example distributions of battery packs based, for example, on self-discharge rates and charge times, according to an embodiment. Plot 4202 shows an example distribution of battery packs based on the self-discharge rate 4206 of each battery pack over a period of time. Axis 4204 indicates the number of battery packs having a particular self-discharge rate. Plot 4202 indicates a normal distribution, with some battery packs having higher or lower self-discharge.

Plot 4208 shows an analogous distribution of battery packs based on the charge time 4210 of each battery pack. In an embodiment, a timer may track the operating time of a balancing charger, such as balancing charger 2632 of FIG. 26C, to determine the charge time of a battery pack during a period of time. Axis 4212 indicates the number of battery packs having similar charge times during a period of time.

As illustrated in FIG. 42, the self-discharge rate and charge time of a battery pack are expected to be similar. In an embodiment, data may be gathered for a plurality of battery packs during a period of time in order to determine battery distributions 4202 and 4208. The mean charge time of the plurality of battery packs may provide a reliable indication of the expected charge time for a healthy battery pack, e.g., a battery pack that is operating within accepted tolerances. From these distributions, a maximum expected variance 4214 above the mean charge time may be chosen. For example, maximum variance 4214 may be set to two standard deviations from the mean charge time of the plurality of battery packs. In an embodiment, a charge time that exceeds maximum variance 4214 may indicate a battery pack having an operating issue or defect. One of skill in the art will recognize that maximum variance 4214 may be any value above the expected charge time of a battery pack and may be static or updated dynamically as additional data is gathered.

FIG. 43 is a diagram illustrating correlation between temperature and charge time of a battery pack (such as battery pack 2600 of FIGS. 26A-26D), according to an embodiment. Plot 4302 shows an example distribution of battery packs based on the charge time 4306 of each battery pack. Axis 4304 indicates the number of battery packs having similar charge times during a period of time. As illustrated in FIG. 43, plot 4302 represents the battery distribution based on a consistent battery temperature of 20° C. for each of the battery packs. In an embodiment, the battery temperature may be, for example, an average temperature of each battery cell or each battery module contained within a battery pack.

Temperature has a significant effect on the performance of a battery pack. For example, higher temperatures may increase the rate of self-discharge of a battery. In a non-limiting example, a battery pack may self-discharge 2% per month at a constant 20° C. and increase to 10% per month at a constant 30° C. Plot 4310 shows the distribution of battery packs based on charge time 4306 with each battery pack having a temperature of 30° C. At 30° C., the charge times of each battery pack maintain a normal distribution, but the mean and expected charge time is shifted.

Because of distribution shifts at different temperatures, maximum variance 4308 may be updated to compensate for temperature fluctuations. In an embodiment, one or more temperature sensors may monitor the average battery cell or battery module temperature of a battery pack. The temperature sensors may be internal or external to the battery pack. Maximum variance 4308 may then be adjusted dynamically in response to temperature changes. For example, if the average battery module temperature of a battery pack is determined to be 30° C., the maximum expected variance may be adjusted to maximum variance 4312. This may prevent replacement of healthy battery packs, for example, when charge time of a battery pack falls between maximum variance 4308 and maximum variance 4312 at a temperature of 30° C. In other embodiments, environmental temperature may be monitored instead of or in combination with battery module temperatures, and maximum variance 4308 may be adjusted dynamically in response to environmental temperature changes.

FIG. 44 is a diagram illustrating an example system for detecting a battery pack having an operating issue or defect, according to an embodiment. In an embodiment, system 4400 includes a battery pack 4402 and an analyzer 4408. As should be apparent to a person of skill in the art, the detection techniques disclosed below may be implemented and used in the systems and methods described above. Battery pack 4402 may include a balancing charger 4404, such as balancing charger 2632 of FIG. 26C, and a timer 4406. Battery pack 4402 may be coupled to an electrical power grid 4410. This enables balancing charger 4404 to be turned on and off when appropriate to charge the cells of battery pack 4402.

In an embodiment, timer 4406 records the amount of time that balancing charger 4404 is operating. Timer 4406 may be embedded in the battery pack as part of a battery pack controller, such as battery pack controller 2800 of FIG. 28. Alternatively, timer 4406 may be separate from the battery pack controller. In an embodiment, timer 4406 may be reset after a certain period of time or at particular intervals of time. For example, timer 4406 may be reset on the first of each month in order to record the amount of time balancing charger 4404 operates during the month. Alternatively, timer 4406 may maintain a cumulative operating time or the time the charger operated during a specified period of time, for example, the last 30 days.

In an embodiment, timer 4406 may periodically send recorded operating times to analyzer 4408. In an embodiment, analyzer 4408 may be a part of battery pack 4402. For example, analyzer 4408 may be integrated into a battery pack controller of battery pack 4402, such as battery pack controller 2800 of FIG. 28. In other embodiments, analyzer 4408 may be external to battery pack 4402 and may be implemented on any computing system. In an embodiment where battery pack 4402 is part of BESS, such as BESS 4802 of FIGS. 48A and 48B (below), analyzer 4408 may be part of a string controller, array controller, or system controller as described with respect to FIG. 48A.

In an embodiment, analyzer 4408 may select a time period and compare recorded operating times for the selected time period to a threshold time. The threshold time may indicate a maximum determined variance from the expected operating time of balancing charger 4406. The expected operating time may represent the expected charge time of the battery pack for the selected time period, taking into account factors such as, but not limited to, battery usage and self-discharge rate. Analyzer 4408 may set expected operating times and threshold times based on statistical analysis of data collected from a plurality of battery packs and may be adjusted as additional data is collected. If battery pack 4402 is part of an array of battery packs, expected and threshold operating times may be determined based on analysis of all or a subset of battery packs in the array. Additionally, in an embodiment, the threshold time may be dynamically adjusted based on the average battery cell or battery module temperature of the battery back or the environmental temperature surrounding the battery pack, as described with respect to FIG. 43. In an embodiment, one or more temperature sensors may monitor the battery pack temperature or environmental temperature and provide measurements to analyzer 4408. Analyzer 4408 may then use the received temperature measurements to adjust the threshold time.

In an embodiment, if the recorded operating time exceeds the threshold time, analyzer 4408 may determine that the battery pack has an operating issue or defect and may require maintenance and/or replacement. In this case, analyzer 4408 may issue an alert to an appropriate party, such as an operator responsible for monitoring the battery pack. In an embodiment, the alert may be issued as an email or other electronic communication. In other embodiments, the issued alert may be audial or visual, for example a flashing red light on the battery pack, such as the warnings described above with respect to status button 2608 of FIGS. 26A and 26B.

In an embodiment, analyzer 4408 may also halt operation of the battery pack in response to determining that the battery pack has an operating issue or defect. This may act as a mechanism to preclude any adverse effects that may occur from operating a battery pack having an operating issue or defect.

FIG. 45 is a diagram illustrating aggregation of data for analysis from an array of battery packs, according to an embodiment. As explained, an energy system, such as electrical storage unit 4802 of FIG. 48A (below), comprises a plurality of battery packs 4502. Each battery pack 4502 may include a timer to record the amount of time that the battery pack is charging. The recorded times may be stored in each battery pack, as shown at 4504. In an embodiment, each timer may be integrated into a battery pack controller of each battery pack, such as battery pack controller 2800 of FIG. 28, comprising a processor and a memory to store the recorded time.

In an embodiment, recorded times for each battery pack may be aggregated by one or more string controllers (such as string controller 4804 of FIG. 48A below), as indicated at 4506, and/or by an array controller (such as array controller 4808 of FIG. 48A below) and/or by a system controller (such as system controller 4812 of FIG. 48A below) as indicated at 4508. As illustrated in FIG. 45, each string controller may manage a subset of the plurality of battery packs.

In an embodiment, the aggregated recorded times may be sent by the one or more string controllers or the array or system controller to one or more analyzers 4510, such as analyzer 4408 of FIG. 44. Analyzer 4510 may collect various data about the plurality of battery packs in an effort to detect and identify battery packs having an operating issue or defect, as described with respect to FIG. 44. In an embodiment, an analyzer 4510 may be part of each string controller and/or the array or system controller. In this manner, analysis may be localized based on groupings of battery packs, or conducted for an entire system. In an embodiment, analyzer 4510 may be external to the plurality of battery packs, string controllers, array controller, and system controller.

FIG. 46 is a flowchart illustrating an example method for detecting a battery pack having an operating issue or defect according to an embodiment. Each stage of the example method may represent a computer-readable instruction stored on a computer-readable storage device, which when executed by a processor causes the processor to perform one or more operations.

Method 4600 begins at stage 4602 by recording the amount of time that a balancing charger is operating. The balancing charger may be part of the battery pack, such as balancing charger 2632 of FIG. 26C, and configured to charge the cells of the battery pack.

At stage 4604, the recorded operating time for a particular time period is compared to a threshold time. The threshold time may indicate a maximum determined variance from the expected operating time of the balancing charger. The expected operating time may represent the expected charge time of the battery pack for the time period, taking into account factors such as, but not limited to, battery usage and self-discharge rate.

At stage 4606, it is determined whether the recorded operating time exceeds the threshold time. This may indicate that the battery pack is charging longer than expected and may require maintenance and/or replacement. At stage 4608, if the recorded operating time exceeds the threshold time, an alert may be provided to an appropriate party, such as a computer or a human operator responsible for monitoring the battery pack (e.g., at an energy management system). In an embodiment, the alert may be issued as an email or other electronic communication. In other embodiments, the issued alert may be audial or visual, for example a red light on the battery pack. Returning to stage 4606, if the recorded operating time does not exceed the threshold time, the method ends.

FIG. 47 illustrates an example battery energy storage system ("BESS") 4700. Specifically, FIG. 47 illustrates a cross-sectional view of BESS 4700. BESS 4700 can be operated as a stand-alone system (e.g., commercial embodiment 4720) or it can be combined together with other BESS units to form a part of a larger system (e.g., utility embodiment 4730). In the embodiment illustrated in FIG. 47, BESS 4700 is housed in a container (similar to a shipping container) and is movable (e.g., transported by a truck). Other housings known to those skilled in the art are within the scope of this disclosure.

As shown in FIG. 47, BESS 4700 includes a plurality of battery packs, such as battery pack 4710. As shown, the battery packs can be stacked on racks in BESS 4700. This arrangement allows an operator easy access to each of the battery packs for replacement, maintenance, testing, etc. A plurality of battery packs may be connected in series, which may be referred to as a string of battery packs or a battery pack string.

In an embodiment (described in more detail below), each battery pack includes battery cells (which may be arranged into battery modules), a battery pack controller that monitors the battery cells, a balancing charger (e.g., DC power supply) that adds energy to each of the battery cells, and a distributed, daisy-chained network of battery module controllers that may take certain measurements of and remove energy from the battery cells. The battery pack controller may control the network of battery module controllers and the balancing charger to control the state-of-charge or voltage of a battery pack. In this embodiment, the battery packs that are included in BESS 4700 are considered "smart" battery packs that are able to receive a target voltage or state-of-charge value and self-balance to the target level.

FIG. 47 illustrates that BESS 4700 is highly scalable, ranging from a small kilowatt-hour size system to a multi-megawatt-hour size system. For example, the commercial embodiment 4720 of FIG. 47 includes a single BESS unit, which may be capable of providing 400 kWh of energy (but is not limited thereto). The commercial embodiment 4720 includes power control system (PCS) 4725 that is mounted on the housing at the back of the BESS unit. PCS 4725 may be connected to the power grid. PCS 4725 includes one or more bi-directional power converters that are capable of both charging and discharging the plurality of battery packs using commands issued, for example, via a computer over a network (e.g. the Internet, an Ethernet, etc.), such as by an operator at an energy monitoring station. PCS 4725 can control both the real power and the reactive power of the bi-directional power converters. Also, in some embodiments, PCS 4725 can be operated as a backup power source when grid power is not available and/or BESS 4720 is disconnected from the power grid.

On the other hand, the utility embodiment 4730 of FIG. 47 includes six BESS units (labeled 4731-4736), each of which may be capable of providing 400 kWh of energy (but are not limited thereto). Thus, utility embodiment 4730 may collectively provide 2.4 MWh of energy. In the utility embodiment, each of the BESS units is electrically connected to a central PCS 4737, which includes one or more bi-directional power converters that are capable of both charging and discharging the plurality of battery packs using commands issued, for example, via a computer over a network (e.g. the Internet, an Ethernet, etc.), such as by an operator at energy monitoring station. PCS 4737 can control both the real power and the reactive power of the bi-directional power converters. PCS 4737 may be coupled to the power grid. Also, in some embodiments, PCS 4737 can be operated as a backup power source when grid power is not available and/or BESS is disconnected from the power grid.

FIG. 48A is a block diagram illustrating an example BESS 4802 according to an embodiment. BESS 4802 may be coupled to energy management system (EMS) 4826 via communication network 4822. Communication network 4822 may be any type communication network, including (but not limited to) the Internet, a cellular telephone network, etc. Other devices coupled to communication network 4822, such as computers 4828, may also communicate with BESS 4802. For example, computers 4828 may be disposed at the manufacturer of BESS 4802 to maintain (monitor, run diagnostic tests, etc.) BESS 4802. In other embodiments, computers 4828 may represent mobile devices of field technicians that perform maintenance on BESS 4802. As shown in FIG. 48A, communications to and from BESS 4802 may be encrypted to enhance security.

Field monitoring device 4824 may also be coupled to EMS 4826 via communication network 4822. Field monitoring device 4824 may be coupled to an alternative energy source (e.g., a solar plant, a wind plant, etc.) to measure the energy generated by the alternative energy source. Likewise, monitoring device 4818 may be coupled to BESS 4802 and measure the energy generated by BESS 4802. While two monitoring devices are illustrated in FIG. 48A, a person of skill in the art would recognize that additional monitoring devices that measure the energy generated by energy sources (conventional and/or alternative energy sources) may be connected to communication network 4822 in a similar manner. An human operator and/or a computerized system at EMS 4826 can analyze and monitor the output of the monitoring devices connected to communication network 4822, and remotely control the operation of BESS 4802. For example, EMS 4826 may instruct BESS 4802 to charge (draw energy from power grid via PCS 4820) or discharge (provide energy to power grid via PCS 4820) as needed (e.g., to meet demand, stabilize line frequency, etc.).

BESS 4802 includes a hierarchy of control levels for controlling BESS 4802. The control levels of BESS 4802, starting with the top level are system controller, array controller, string controller, battery pack controller, and battery module controller. For example, system controller 4812 may be coupled to one or more array controllers (e.g., array controller 4808), each of which may be coupled to one or more string controllers (e.g., string controller 4804), each of which may be coupled to one or more battery pack controllers, each of which may be coupled to one or more battery module controllers. Battery pack controllers and battery modules controllers are disposed with battery packs 4806(*a*)-4806(*n*), as was discussed in detail with respect to FIGS. 26-29 above.

As shown in FIG. 48A, system controller 4812 is coupled to monitoring device 4818 via communication link 4816(*a*), to communication network 4822 via communication link 4816(*b*), and to PCS 4820 via communication link 4816(*c*). In FIG. 48A, communication links 4816(*a*)-(*c*) are MOD busses, but any wired and wireless communication link may be used. In an embodiment, system controller 4812 is also connected to communication network 4822 by TCP/IP connection 4817.

System controller 4812 can monitor and report the operation of BESS 4802 to EMS 4826 or any other device connected to communication network 4822 and configured to communicate with BESS 4802. System controller 4812 can also receive and process instructions from EMS 4826, and relay instructions to an appropriate array controller (e.g., array controller 4806) for execution. System controller 4812 may also communicate with PCS 4820, which may be coupled to the power grid, to control the charging and discharging of BESS 4802.

Although system controller 4812 is shown disposed within BESS 4802 in FIG. 48A, system controller 4812 may be disposed outside of and communicatively coupled to BESS 4802 in other embodiments. Considering FIG. 47 again, commercial embodiment 4720 may be a standalone unit used by a business, apartment, hotel, etc. A system controller may be disposed within the BESS of commercial embodiment 4720 to, e.g., communicate with an EMS or a computer at the business, apartment, hotel, etc. via a communication network.

In other embodiments, such as utility embodiment 4730, only one of BESS units 4731-4736 may include a system controller. For example, in FIG. 47, BESS unit 4731 may include a system controller and BESS units 4732-4736 may not. In this scenario, BESS 4731 is considered the master unit and is used to control BESS units 4732-4736, which are considered slave units. Also, in this scenario, the highest level of control included within each of BESS units 4732-4736 is an array controller, which is coupled to and communicates with the system controller within BESS unit 4731.

Considering FIG. 48A again, system controller 4812 is coupled to array controller 4808 via communication link 4814. Array controller 4808 is coupled to one or more string controllers, such as string controller 4804 via communication link 4810. While FIG. 48A depicts three string controllers (SC(1)-(3)) more or less string controllers may be coupled to array controller 4808. In FIG. 48A, communication link 4810 is CAN bus and communication link 4814 is a TCP/IP link, but other wired or wireless communication links may be used.

Each string controller in BESS 4802 is coupled to one or more battery packs. For example, string controller 4804 is coupled to battery packs 4806(*a*)-(*n*), which are connected in series to form a battery pack string. Any number of battery packs may be connected together to form a battery pack string. Strings of battery packs can be connected in parallel in BESS 4802. Two or more battery pack strings connected in parallel may be referred to as an array of battery packs or a battery pack array. In one embodiment, BESS 4802 includes an array of battery packs having six battery pack strings connected in parallel, where each of the battery pack strings has 22 battery packs connected in series.

As its name suggests, a string controller may monitor and control the battery packs in the battery pack string. The functions performed by a string controller may include, but are not limited to, the following: issuing battery string contactor control commands, measuring battery string voltage; measuring battery string current; calculating battery string Amp-hour count; relaying queries between a system controller (e.g., at charging station) and battery pack controllers; processing query response messages; aggregating battery string data; performing software device ID assignment to the battery packs; detecting ground fault current in the battery string; and detect alarm and warning conditions and taking appropriate corrective actions. Example embodiments of a string controller are described below with respect to FIGS. 30, 31A, and 31B.

Likewise, an array controller may monitor and control a battery pack array. The functions performed by an array controller may include, but are not limited to, the following: sending status queries to battery pack strings, receiving and processing query responses from battery pack strings, performing battery pack string contactor control, broadcasting battery pack array data to the system controller, processing alarm messages to determine necessary actions, responding to manual commands or queries from a command line interface (e.g., at an EMS), allowing a technician to set or change the configuration settings using the command line interface, running test scripts composed of the same commands and queries understood by the command line interpreter, and broadcasting data generated by test scripts to a data server for collection.

FIG. 48B illustrates a cross-sectional view of an example BESS. FIG. 48B illustrates three battery pack strings ("String 1," "String 2," and "String 3"), each of which includes a string controller ("SC1," "SC2," and "SC3," respectively) and 22 battery packs connected in series. Strings 1-3 may be connected in parallel and controlled by array controller 4808.

In String 1, each of the 22 battery packs is labeled ("BP1" through "BP22"), illustrating the order in which the battery packs are connected in series. That is, BP1 is connected to the positive terminal of a string controller (SC1) and to BP2, BP2 is connected to BP1 and BP3, BP3 is connected to BP2 and BP4, and so on. As shown, BP22 is connected to the negative terminal of SC1. In the illustrated arrangement, SC1 may access the middle of string 1 (i.e., BP11 and BP12). In an embodiment, this middle point is grounded and includes a ground fault detection device.

BESS 4802 includes one or more lighting units 4830 and one or more fans 4832, which may be disposed at regular intervals in ceiling panels of BESS 4802. Lighting units 4830 can provide illumination to the interior of BESS 4802. Fans 4832 are oriented so that they blow down from the ceiling panels toward the floor of BESS 4802 (i.e., they blow into the interior of BESS 4802). BESS 4802 also includes a split A/C unit including air handler 4834 housed within the housing of BESS 4802 and condenser 4836 housed outside the housing of BESS 4802. The A/C unit and fans 4832 may be controlled (e.g., by array controller 4808) to create an air flow system and regulate the temperature of the battery packs housed within BESS 4802.

Example BESS Housing

FIGS. 49A, 49B, and 49C are diagrams illustrating the housing (e.g., a customized shipping container) of an example BESS 4900. In FIGS. 49A-49C, the back and front of the housing of BESS 4900 are labeled. As shown, one or more PCSs 4910 may be mounted on the back of BESS 4900, which couple BESS 4900 to the power grid. The front of BESS 4900 may include one or more doors (not shown) that provide access to the inside of the housing. An operator may enter BESS 4900 through the doors and access the internal components of BESS 4900 (e.g., battery packs, computers, etc.). FIG. 49A depicts BESS 4900 with the top of its housing in place.

FIG. 49B depicts BESS 4900 with the top of its housing removed. As seen, BESS 4900 includes one or more ceiling panels 4920, one or more lighting units 4930, and one or more fans 4940. Lighting units 4930 and fans 4940 may be disposed at regular intervals in ceiling panels 4920. Lighting units 4930 can provide illumination to the interior of BESS 4900. Fans 4940 are oriented so that they blow down from ceiling panels 4920 toward the floor of BESS 4900 (i.e., they blow into the interior of BESS 4900). Openings 4950, which are above the racks of battery packs housed in BESS 4900, allow warm air to flow up to the space between the top of the housing and ceiling panels 4920, creating a hot air region above ceiling panels 4920. FIG. 49C depicts BESS 4900 with ceiling panels 4920 removed. As can be seen, openings 4950 are disposed above racks of battery packs that are housed in BESS 4900.

FIGS. 50A, 50B, and 50C are diagrams illustrating an example BESS 5000 without its housing (i.e., the internal structures of BESS 5000). FIGS. 50A and 50B show racks of battery packs housed within BESS 5000 from different angles. FIG. 50C illustrates a front view of BESS 5000. This is the view that may be seen by an operator that opens the doors at the front of BESS 5000 and enters BESS 5000 to perform maintenance or testing. FIG. 50C illustrates split A/C unit 5010 at the back of BESS 5000. A/C unit 5010 is controlled (e.g., by an array controller) to regulate the temperature of BESS 5000. A/C unit 5010 provides cool air to the interior of BESS 5000 and creates a cool air region in the aisle of BESS 5000.

FIG. 51 illustrates another front view of an example BESS 5100 and depicts air flow in BESS 5100. As explained with respect to FIGS. 49A-49C and 50A-50C, fans in the ceiling panels of BESS 5100 blow hot air from hot air region 5110 above the ceiling toward the floor of BESS 5100. An A/C unit at the back of BESS 5100 draws the hot air out of BESS 5100 and provides cool air to the interior of BESS 5100, creating cool air region 5120. The cool air regulates the temperature of the battery packs housed in BESS 5100, and raises to hot air region 5110 as it cools the battery packs.

FIGS. 52A and 52B are diagrams illustrating an example BESS 5200 coupled to a bi-directional power converter 5202. In an embodiment, BESS 5200 includes two external HVAC units 5204a and 5204b. In an embodiment, bi-directional power converter 5202 may be capable of both charging and discharging the plurality of battery packs residing in BESS 5200 using commands issued, for example, via a computer over a network (e.g. the Internet, an Ethernet, etc.), such as by an operator at an energy monitoring station.

FIG. 52B is a more detailed view of BESS 5200. As shown in FIG. 52B, in an embodiment, BESS 5200 may have several doors 5206 that may be opened to gain access to battery stacks 5208. Battery stacks 5208 may be installed inside BESS 5200 and removed from BESS 5200 using a forklift vehicle (not shown). This enables each battery stack 5208 to be assembled external to BESS 5200 and transported and installed as a single unit.

FIGS. 53A and 53B are diagrams further illustrating BESS 5200 according to an embodiment. FIG. 53A illustrates a rear view of BESS 5200 with doors 5206 closed, and FIG. 53B illustrates a rear view of BESS 5200 with doors 5206 open.

FIGS. 54A, 54B, and 54C are diagrams illustrating another view of BESS 5200 with its roof removed and doors 5206 open. BESS 5200 is shown with several battery stacks 5208 installed. In an embodiment, BESS 5200 also includes switchgear 5210, which is located at one end of BESS 5200.

FIG. 54B illustrates a more detailed view of switchgear 5210, according to an embodiment. FIG. 54C illustrates another view of BESS 5200 including switchgear 5210 located at one end of BESS 5200, according to an embodiment.

Figure 55A:
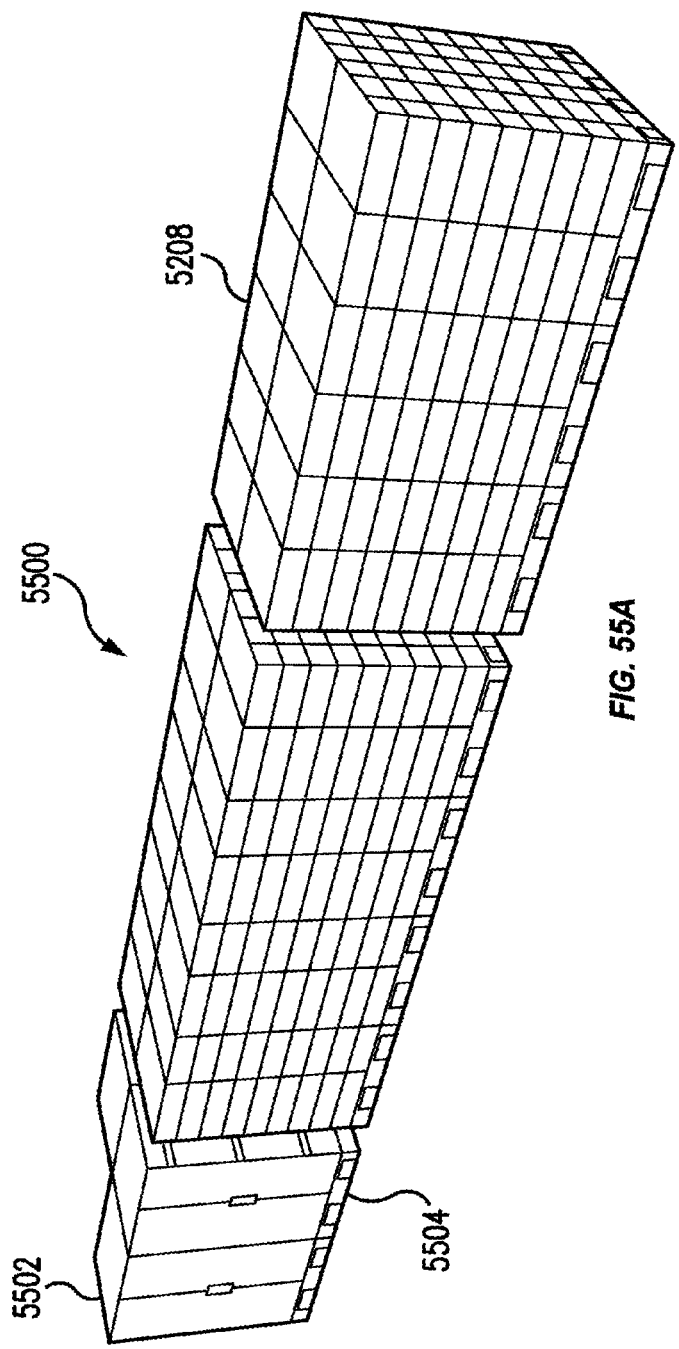

FIGS. 55A, 55B, 55C, and 55D are diagrams illustrating various example modular, stackable BESS systems according to embodiments. FIG. 55A illustrates a BESS 5500 having fifteen battery stacks 5208, an AC switchgear unit 5502, and a DC switchgear unit 5504. In an embodiment, each battery stack 5208 may be assembled externally and installed as a single unit into BESS 5500.

Figure 55B:
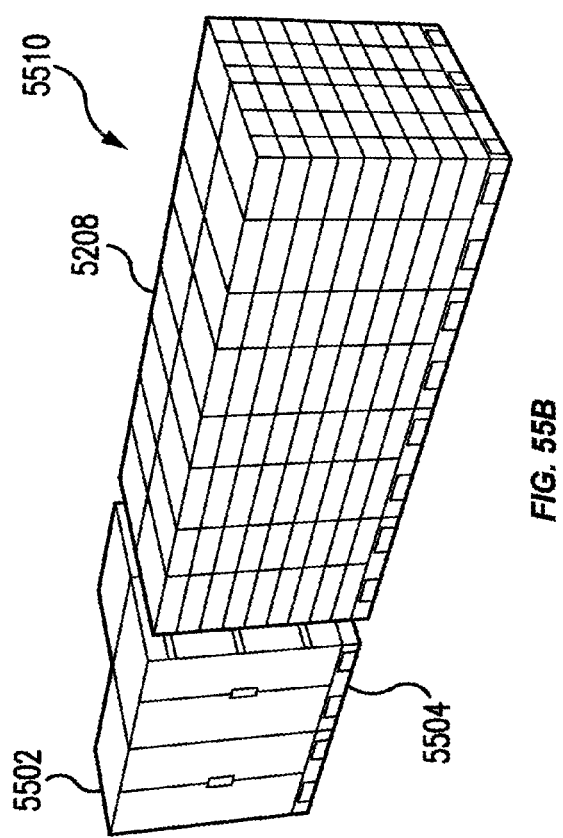
Figure 55C:
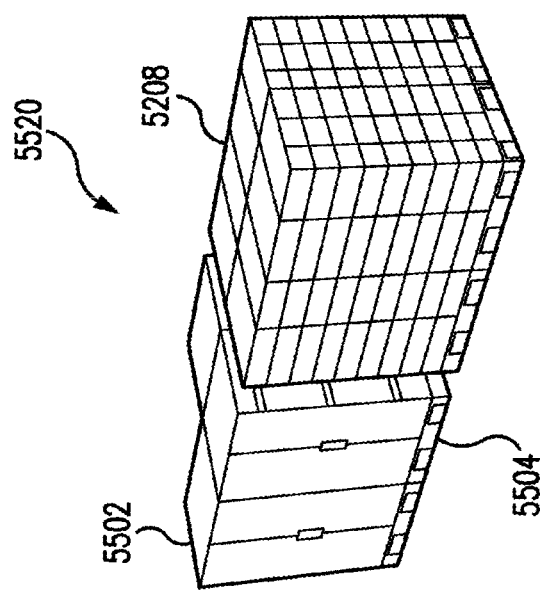
Figure 55D:
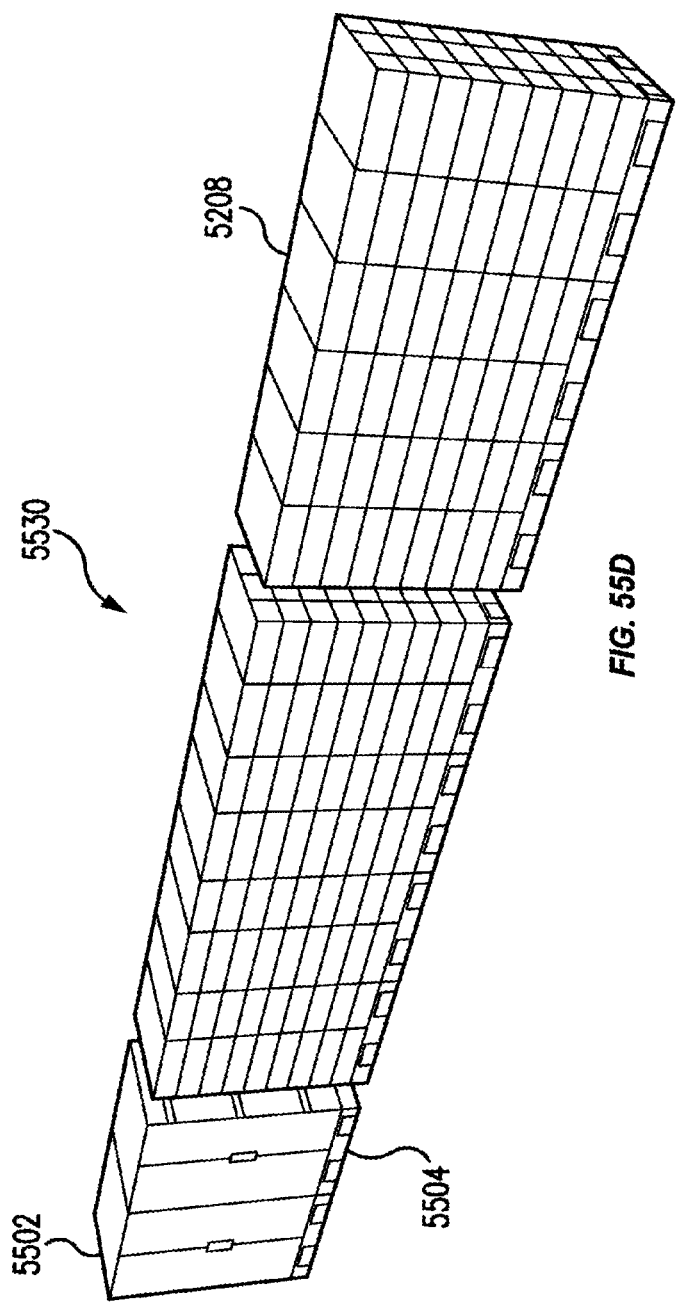

FIG. 55B illustrates a BESS 5510 having nine battery stacks 5208, an AC switchgear unit 5502, and a DC switchgear unit 5504. FIG. 55C illustrates a BESS 5520 having five battery stacks 5208, an AC switchgear unit 5502, and a DC switchgear unit 5504. FIG. 55D illustrates a BESS 5530 having seven battery stacks 5208, an AC switchgear unit 5502, and a DC switchgear unit 5504.

Figure 56A:
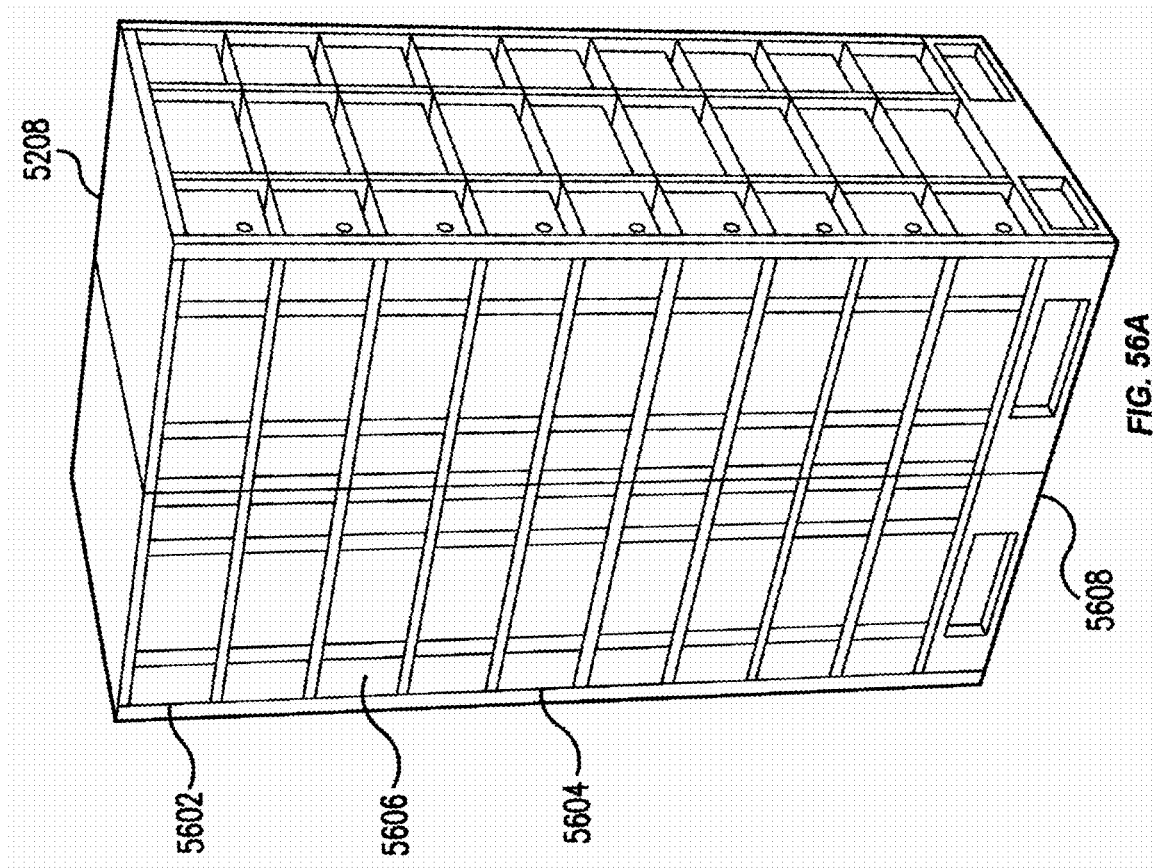
Figure 56B:
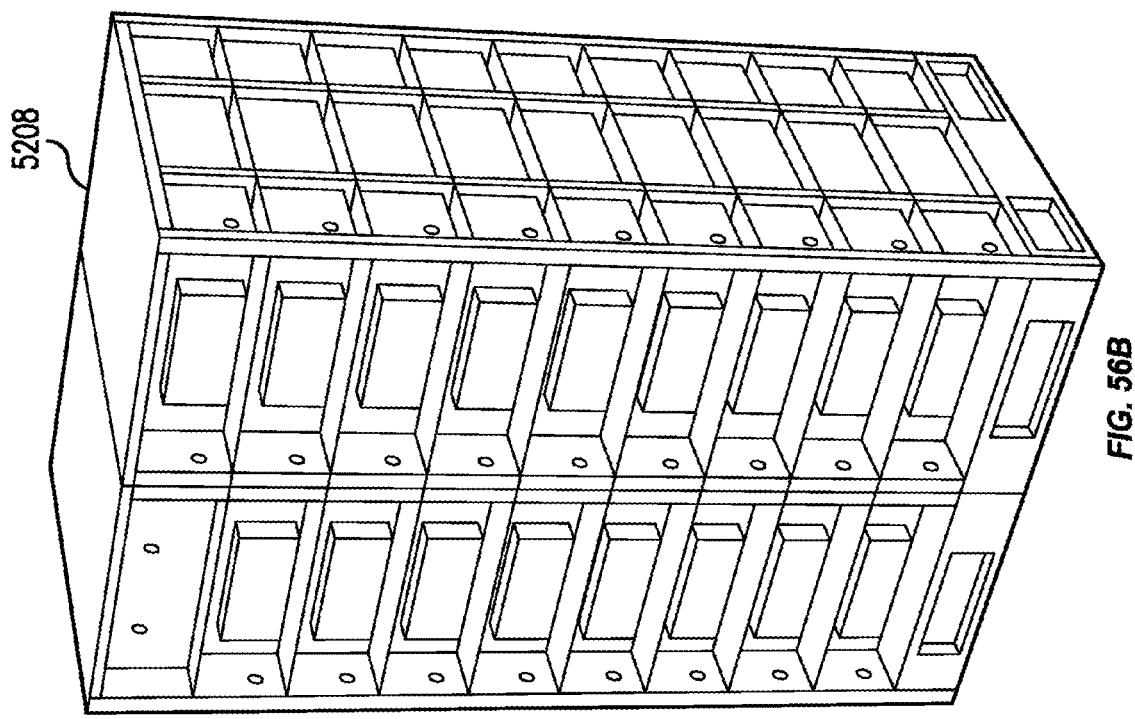

FIGS. 56A, 56B, 56C, 56D, and 56E are diagrams illustrating a modular, stackable battery stack 5208, according to embodiments. Battery stack 5208 has a battery stack controller 5602 (also referred to herein as a battery string controller) and seventeen battery packs 5604. Plexiglass shields 5606 protect the faces of battery stack controller 5602 and the battery packs 5604. Battery stack 5208 has a base 5608 that enables battery stack 5208 to be lifted and moved using a forklift vehicle (not shown) or similar equipment. FIG. 56B illustrates another view of a battery stack 5208 with plexiglass shields 5606 removed, according to an embodiment.

Figure 56D:
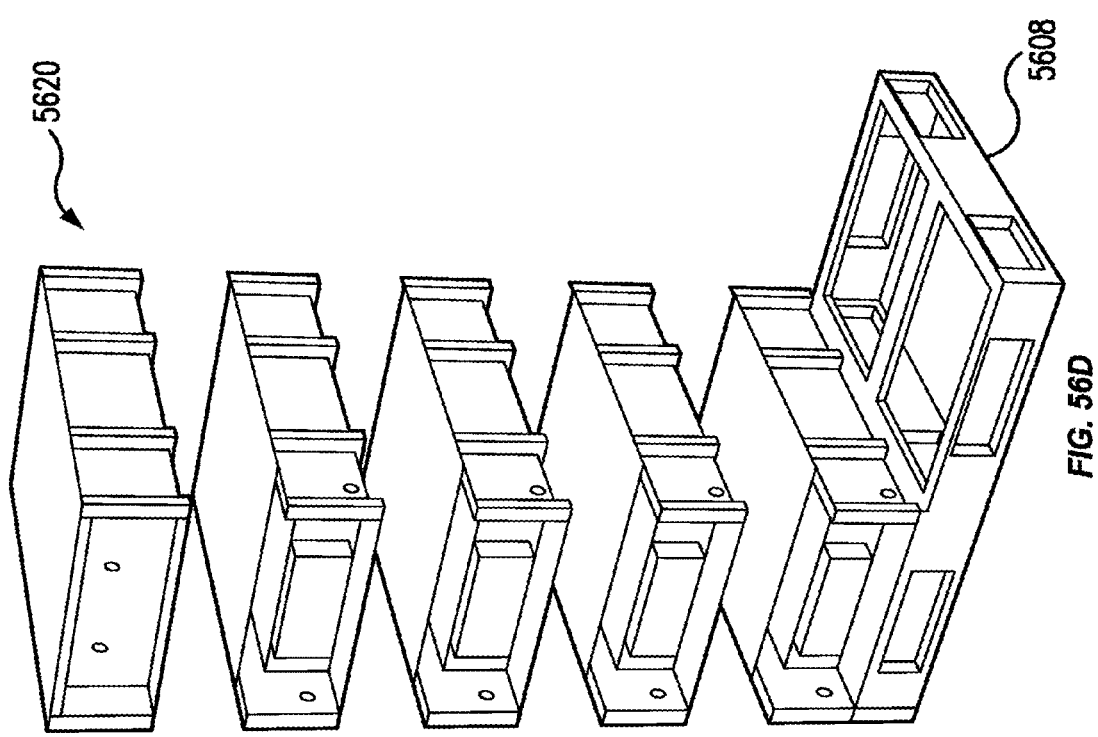
Figure 56E:
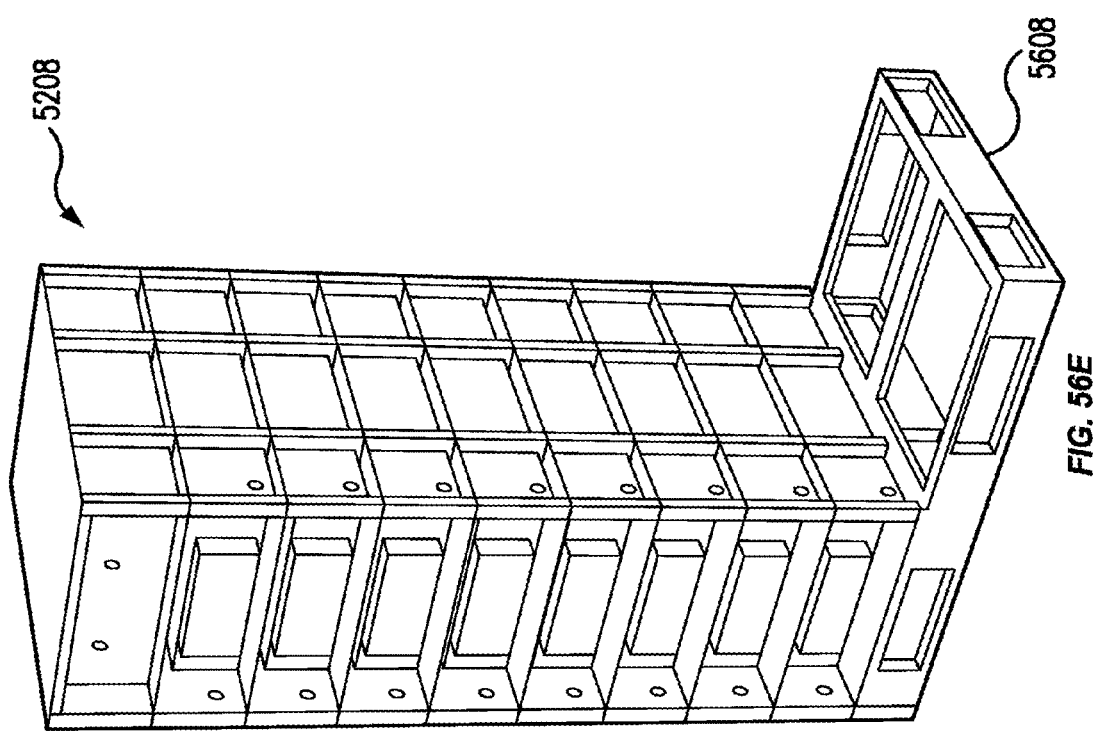

FIG. 56C is an exploded view of a battery stack 5620, according to an embodiment. As shown in FIG. 56C, battery stack 5620 may have a battery stack controller 5602, nine battery packs 5604, and a battery stack base 5608. FIG. 56D is another exploded view of battery stack 5620 that further illustrates battery stack base 5608, according to an embodiment. FIG. 56E is a view of battery stack 5208 that further illustrates battery stack base 5608, according to an embodiment.

FIGS. 57A, 57B, 57C, 57D, 57E, and 57F are diagrams illustrating a modular, stackable battery pack 5604 (also referred to herein as a battery unit), according to embodiments. Battery pack 5604 may function similarly to and include similar structure as battery pack 258 of FIG. 2B and battery pack 2600 of FIGS. 26A-26D, as discussed in detail above.

Figure 57A:
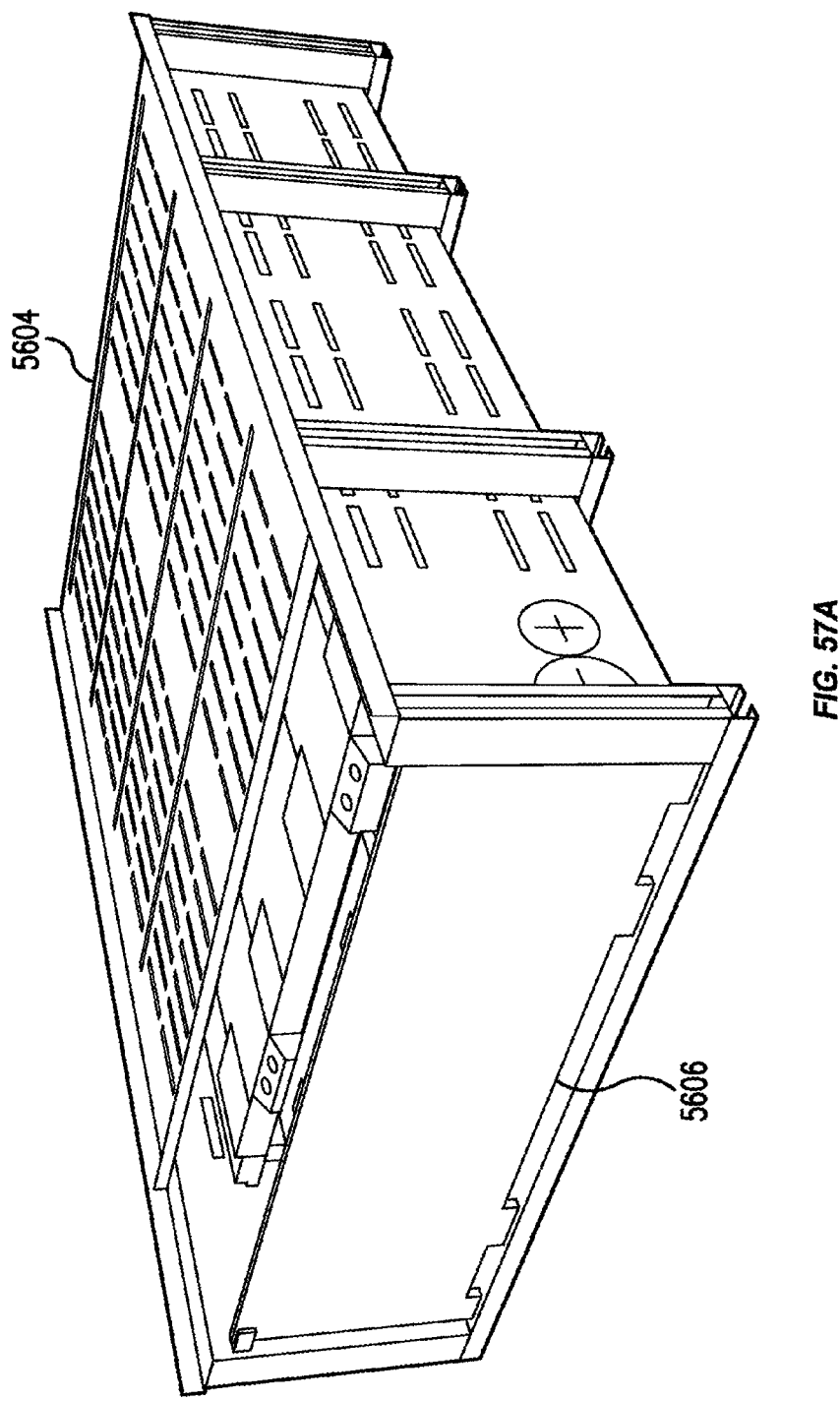
Figure 57B:
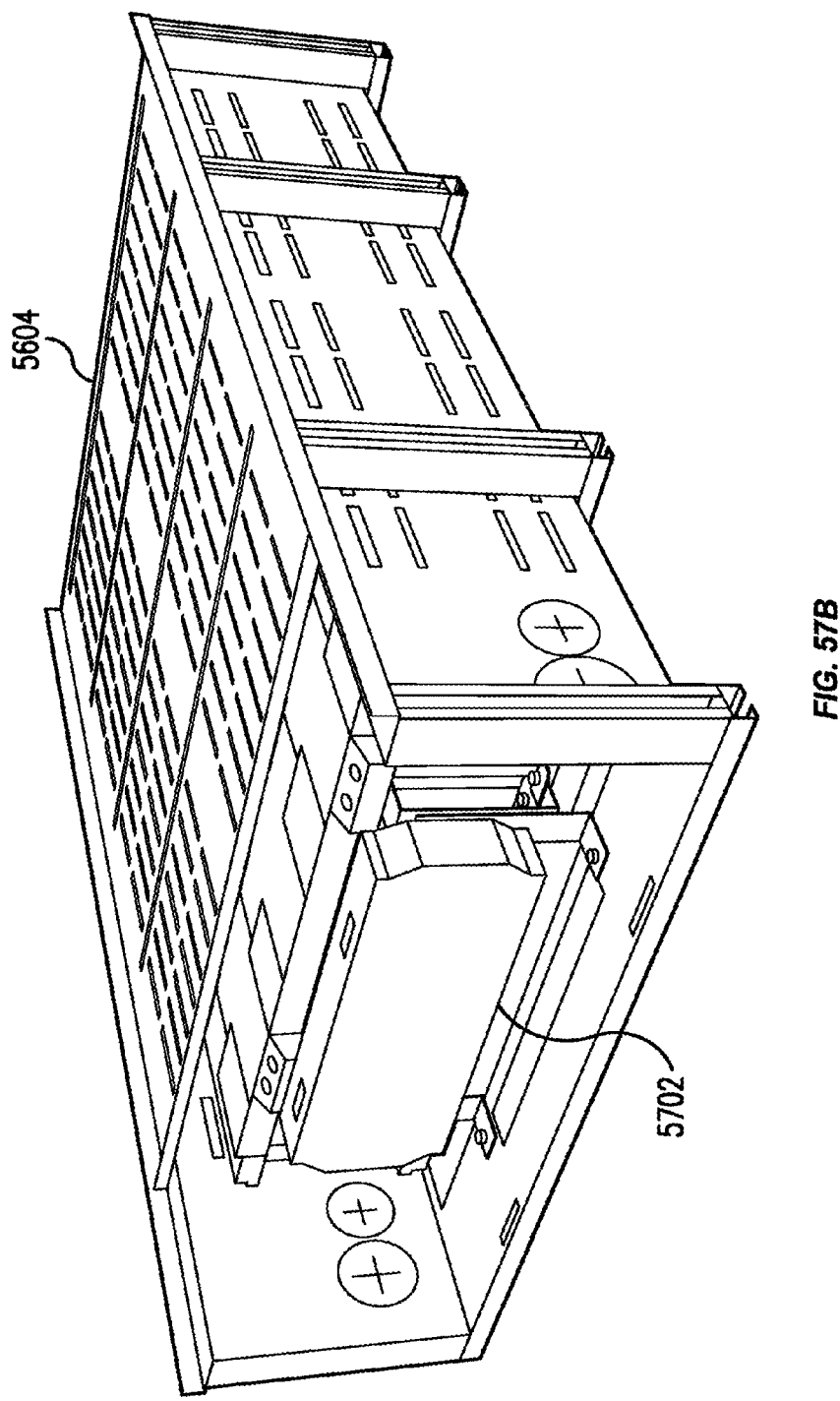

FIG. 57A shows battery pack 5604 with the plexiglass shield 5606 installed. FIG. 57B shows battery pack 5604 with the plexiglass shield 5606 removed. As can be seen in FIG. 57B, battery pack 5604 has a battery pack control unit 5702. The functions and structure of a battery pack control unit 5702 or battery pack controller are described above.

Figure 57C:
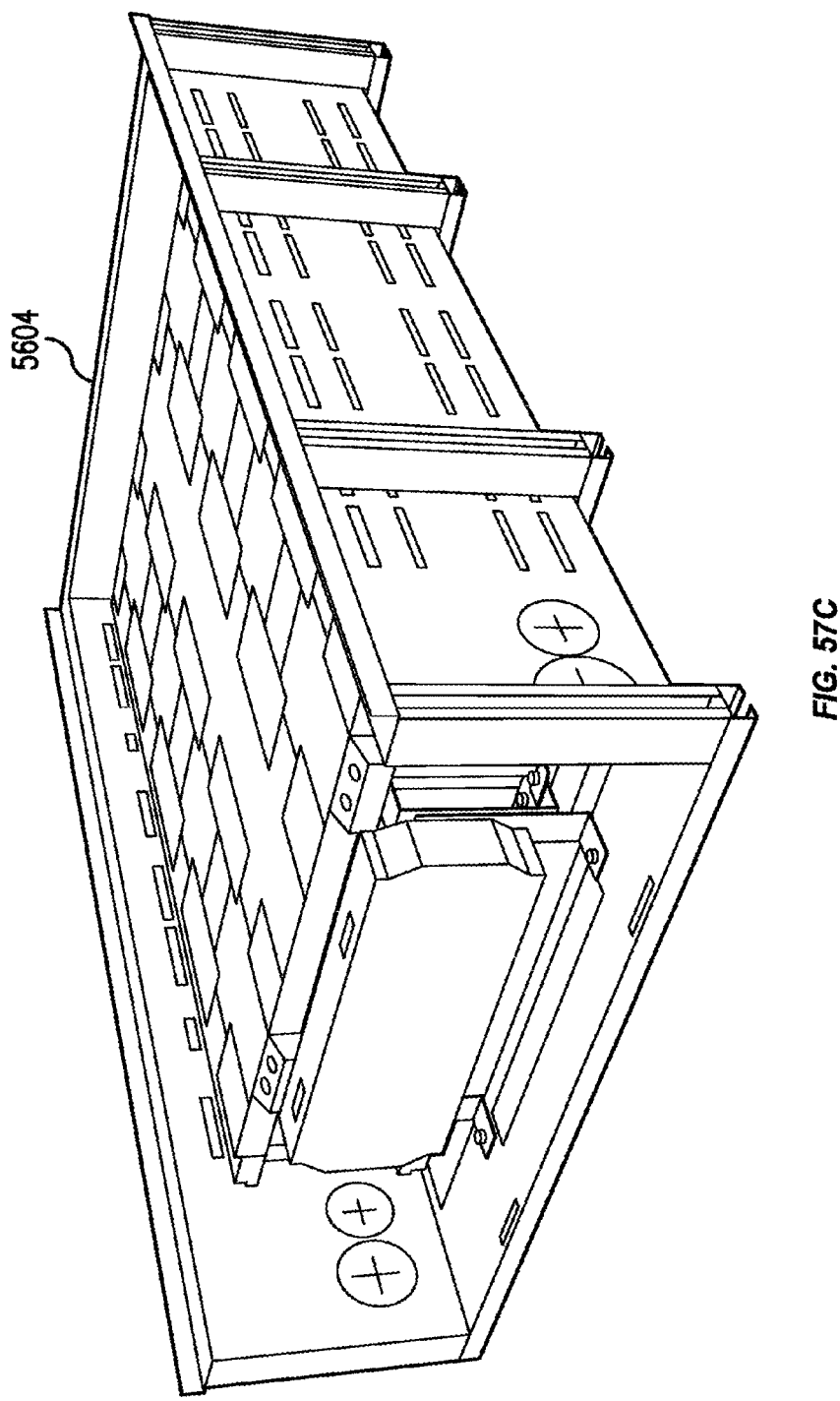
Figure 57D:
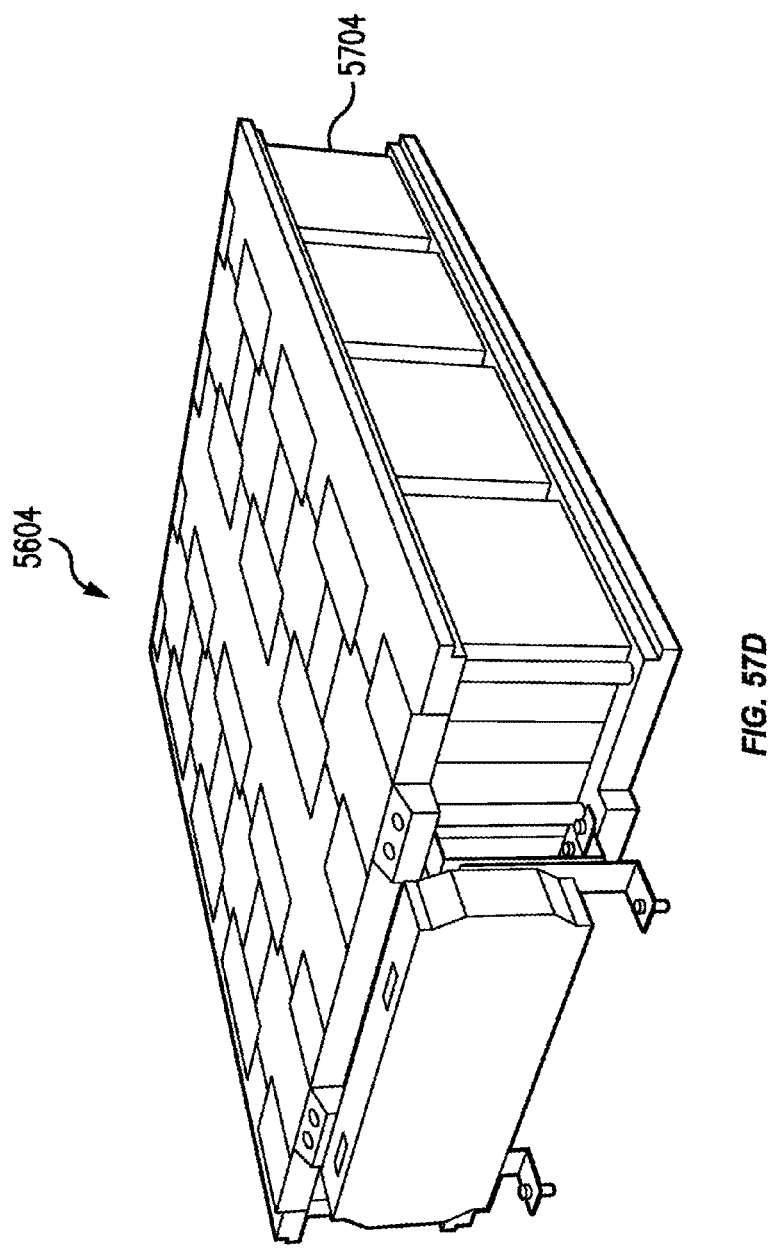
Figure 57F:
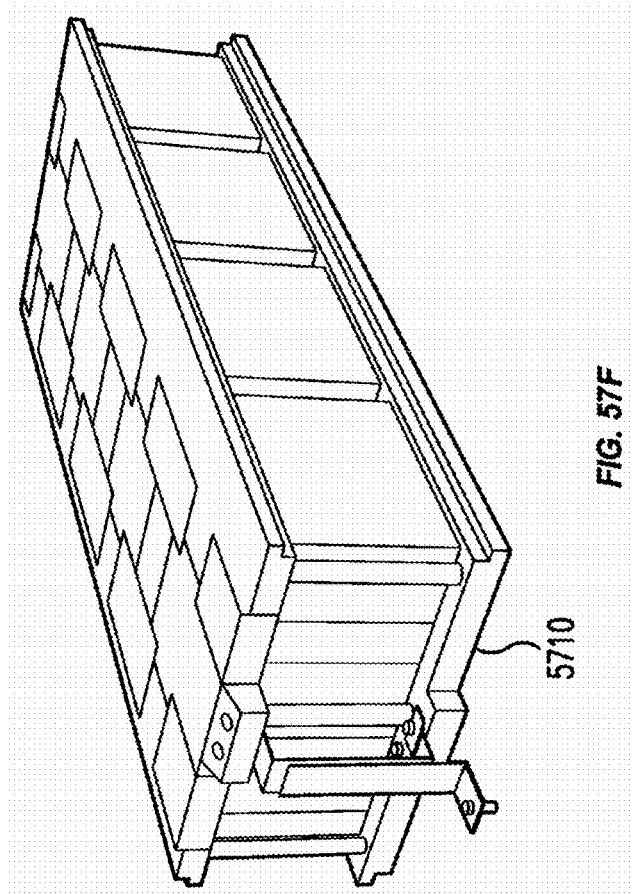

FIG. 57C illustrates another view of battery pack 5604 with the top removed. FIG. 57D illustrates a view of battery pack 5604 with the housing removed in order to better see the battery cells 5704 used in battery pack 5604. FIG. 57E illustrates a view of battery pack 5604 with battery pack control unit 5702 removed. As shown in FIG. 57E, battery pack 5604 includes two battery assemblies 5710a and 5710b. Finally, FIG. 57F illustrates another view of a battery assembly 5710.

FIGS. 58A, 58B, and 58C are diagrams further illustrating modular, stackable battery pack 5604, according to embodiments. FIG. 58A shows battery pack 5604 with plexiglass shield 5606 installed.

FIG. 58B is an exploded view of battery pack 5604 showing plexiglass shield 5606, battery pack control unit 5702, and battery assemblies 5710a and 5710b. These components of battery pack 5604 may be housed in a battery pack housing 5802. FIG. 58C is another exploded view of battery pack 5604 showing plexiglass shield 5606, battery pack control unit 5702, and battery assemblies 5710a and 5710b.

FIGS. 59A, 59B, and 59C are diagrams further illustrating a battery assembly 5710 for a modular, stackable battery pack 5604, according to embodiments. As shown in FIG. 59A, battery assembly 5710 includes battery cells 5704, battery module control units 5902, and bus bars 5904. Each battery module control unit 5902 may monitor and control two groups of battery cells, wherein each group of battery cells comprises one or more battery cells 5704 connected in parallel. The functions and structure of a battery module control unit 5902 (also referred to as a battery module controller) are described above.

FIG. 59B is an exploded view of a battery assembly 5710. In an embodiment, each battery assembly 5710 has four battery module control units 5902. FIG. 59C is a more detailed view of a battery module control unit 5902. Battery module control unit 5902 may function similarly to and include similar structure as battery module controller 2638 described above with respect to FIG. 26C, or may function similarly to and include similar structure as battery module controller 2900 described above with respect to FIG. 29.

FIGS. 60A and 60B are diagrams illustrating an example battery stack controller 5602, according to embodiments. In FIG. 60A, battery stack controller 5602 is shown with plexiglass shield 5606 installed. FIG. 60B is an exploded view of battery stack controller 5602. The functions and structure of a battery stack controller 5602 are described above, for example with respect to string controller 3000 of FIG. 30.

Figure 61A:
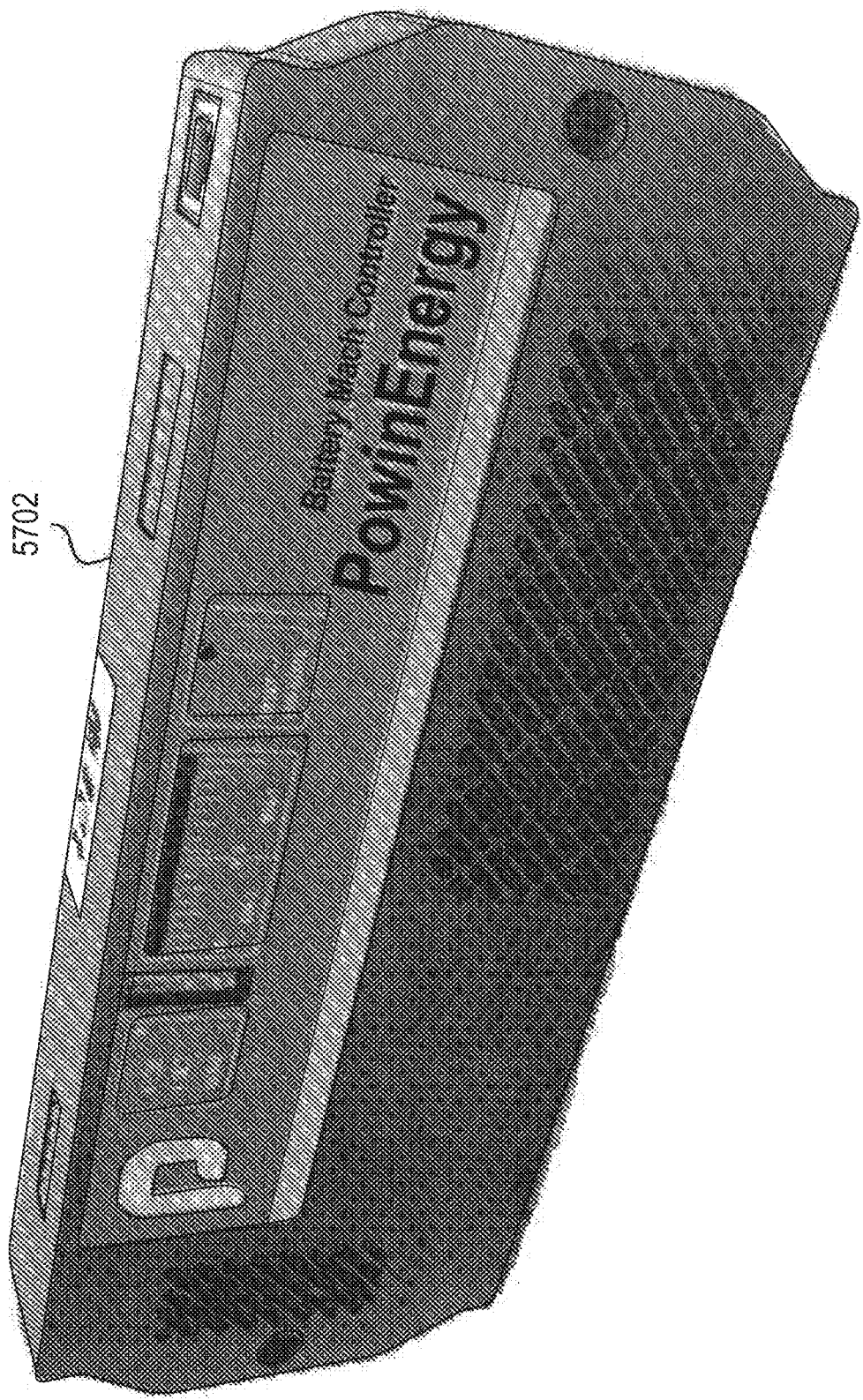
Figure 61B:
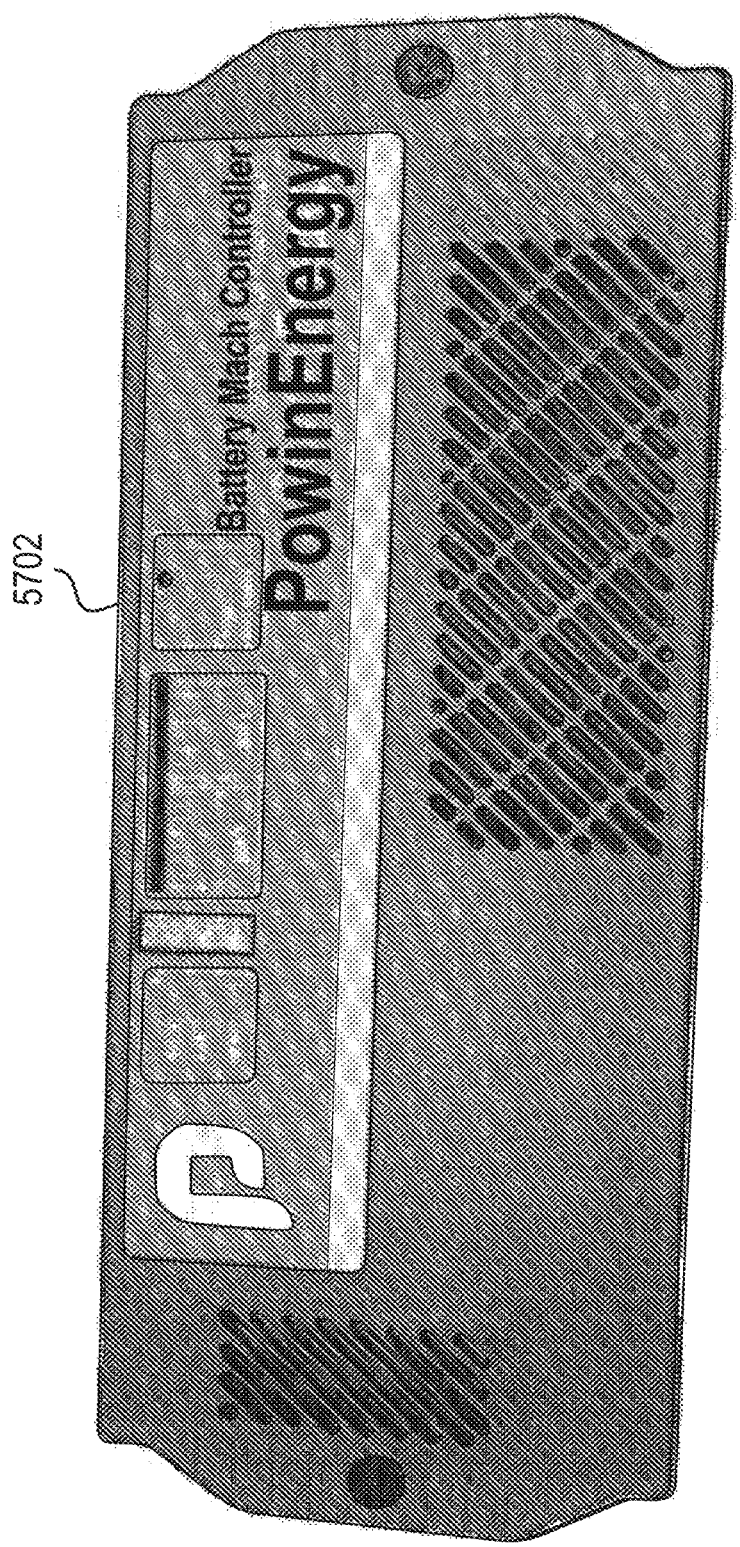
Figure 61C:
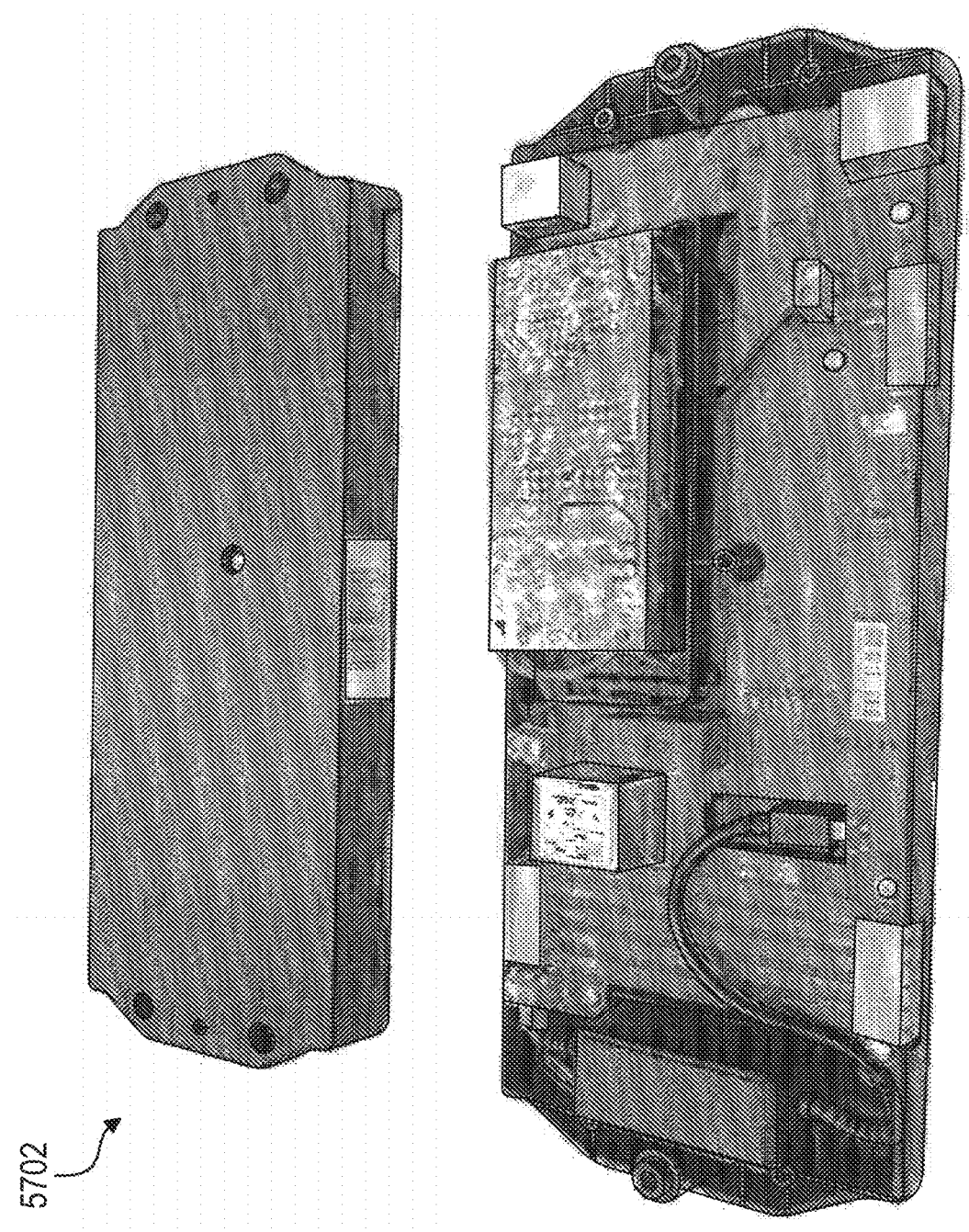
Figure 61D:
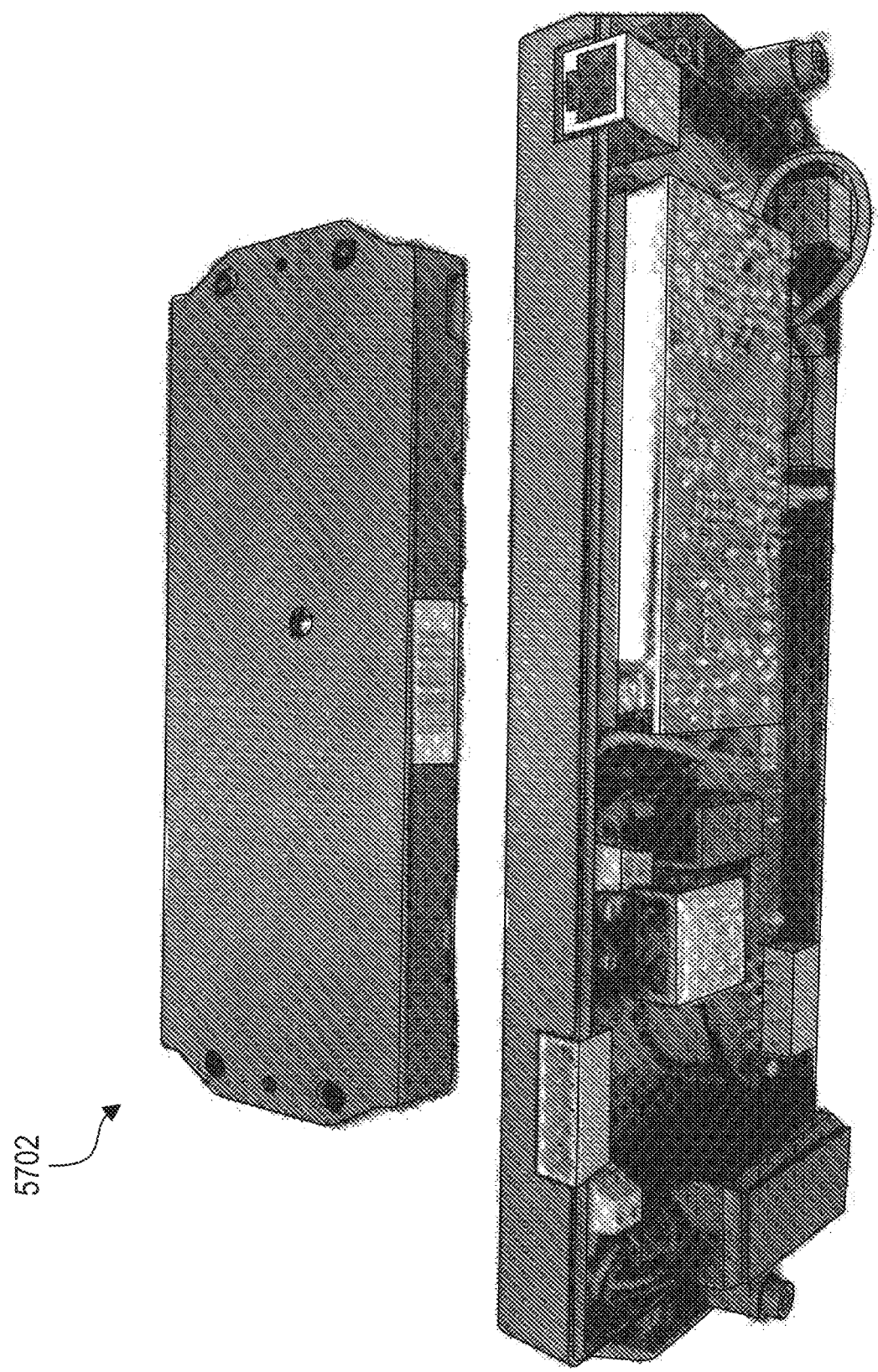

FIGS. 61A, 61B, 61C, and 61D are diagrams illustrating an example battery pack controller 5702. FIG. 61A shows a first view of battery pack controller 5702. FIG. 61B shows a second view of battery pack controller 5702. FIG. 61C shows a third view of battery pack controller 5702 with the rear cover detached. FIG. 61D shows a fourth view of battery pack controller 5702 with the rear cover detached. The functions and structure of a battery pack controller 5702 are described above, for example with respect to battery pack controller 414 of FIGS. 4 and 5 or battery pack controller 2710 of FIG. 27A or battery pack controller 2800 of FIG. 28.

As will be understood by persons skilled in the relevant art(s) given the description herein, various features of the disclosure can be implemented using processing hardware, firmware, software and/or combinations thereof such as, for example, application specific integrated circuits (ASICs). Implementation of these features using hardware, firmware and/or software will be apparent to a person skilled in the relevant art. Furthermore, while various embodiments of the disclosure have been described above, it should be understood that they have been presented by way of example, and not limitation. It will be apparent to persons skilled in the relevant art(s) that various changes can be made therein without departing from the scope of the disclosure.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. Also, Identifiers, such as "(a)," "(b)," "(i)," "(ii)," etc., are sometimes used for different elements or steps. These identifiers are used for clarity and do not necessarily designate an order for the elements or steps.

The foregoing description of specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described embodiments, but should be defined only in accordance with the following claims and their equivalents.

The invention claimed is:

1. A method comprising:
   monitoring a state of charge of a battery system of a power station of a microgrid power system;
   monitoring a state of charge of an energy storage unit coupled to a different point of the microgrid power system than the power station, wherein the energy storage unit comprises a plurality of battery packs having cells and a battery pack controller that controls a state of charge of the cells; and
   controlling charging of the energy storage unit from an AC power source of the power station based on the state of charge of the battery system and the state of charge of the cells of the energy storage unit.

2. The method of claim 1, wherein controlling charging of the energy storage unit comprises determining an amount of AC power allowed to be consumed to charge the energy storage unit based on the state of charge of the battery system and the state of charge of the cells of the energy storage unit.

3. The method of claim 1, further comprising monitoring a usage of the battery packs and determining a warranty value for the battery packs based on the usage.

4. The method of claim 1, further comprising circulating cooling air around the battery packs to regulate a temperature of the battery packs.

5. The method of claim 1, wherein controlling charging of the energy storage unit is performed by a microgrid controller communicatively coupled to the energy storage unit and the power station.

6. The method of claim 1, wherein the energy storage unit is one of a plurality of energy storage units, each comprising a respective plurality of battery packs having cells and a respective battery pack controller that controls a state of charge of the cells, and wherein the method comprises controlling charging of each of the plurality of energy storage units from the AC power source based on the state of charge of the battery system and the state of charge of the cells of each energy storage unit.

7. The method of claim 6, wherein controlling charging of each of the plurality of energy storage units comprises determining, for each energy storage unit, an amount of AC power allowed to be consumed to charge the energy storage unit based on the state of charge of the battery system and the state of charge of the cells of the energy storage unit.

8. The method of claim 1, wherein controlling the charging of the energy storage unit comprises one or both of charging the plurality of battery packs or discharging the plurality of battery packs with a bi-directional power converter.

9. The method of claim 8, wherein controlling the charging of the energy storage unit comprises issuing a command to the bi-directional power converter from an energy management system via a communication network.

10. The method of claim 1, further comprising, for at least one battery pack of the plurality of battery packs, determining a warranty value of the battery pack with a warranty tracker based on the usage of the battery pack.

11. The method of claim 10, wherein determining the warranty value of the battery pack comprises:
    (i) determining a C-rate value indicating a charge or discharge rate of the battery pack; and
    (ii) comparing the C-rate value to a maximum C-rate warranty threshold.

12. The method of claim 10, wherein determining the warranty value of the battery pack comprises:
    (i) measuring a temperature of the battery pack; and
    (ii) comparing the temperature of the battery pack to one or both of a minimum temperature warranty threshold or a maximum temperature warranty threshold.

13. The method of claim 10, wherein determining the warranty value of the battery pack comprises:
    (i) measuring a voltage of one or more of the cells of the battery pack; and
    (ii) comparing the voltage of the one or more cells to one or both of a minimum voltage warranty threshold or a maximum voltage warranty threshold.

14. A method comprising:
    monitoring, with a microgrid controller of a microgrid power system, a state of charge of a battery system of a power station of the microgrid power system;
    monitoring, with the microgrid controller, a state of charge of one or more cells of an energy storage unit that is coupled to a different point of the microgrid power system than the power station;
    monitoring, with the microgrid controller, an amount of a first AC power that is outputted by an AC power source of the power station;
    determining, with the microgrid controller, an amount of the first AC power that may be consumed to charge the energy storage unit, wherein determining the amount of the first AC power is based on the state of charge of the battery system and the state of charge of the cells of the energy storage unit; and
    controlling, with the microgrid controller, charging of the energy storage unit based on the determined amount of the first AC power.

15. The method of claim 14, further comprising:
    controlling, with a battery pack controller of the energy storage unit, a state of charge of the cells, wherein controlling the state of charge of the cells comprises one or both of:
    (i) operating a battery cell back balancer of the energy storage unit to adjust an amount of energy stored in the cells; or (ii) operating a battery pack charger of the energy storage unit to charge the cells.

16. The method of claim 14, further comprising:
converting, with a bi-directional power converter, the first AC power to DC power to charge the energy storage unit.

17. The method of claim 14, further comprising:
supplying electrical power from the energy storage unit to a load center.

18. The method of claim 17, wherein supplying electrical power from the energy storage unit to the load center comprises controlling, with the microgrid controller, discharging of the energy storage unit.

19. The method of claim 18, wherein controlling discharging of the energy storage unit comprises converting, with a bi-directional power converter, DC power from the energy storage unit to a second AC power that is provided to the load center.

20. The method of claim 18, wherein the load center is one of a plurality of load centers comprising one or more non-critical load centers, and wherein controlling discharging of the energy storage unit comprises disconnecting the one or more non-critical load centers from the energy storage unit.

* * * * *